(12) United States Patent
Karin et al.

(10) Patent No.: US 12,458,630 B2
(45) Date of Patent: Nov. 4, 2025

(54) COMBINATION THERAPY FOR CANCER

(71) Applicant: The Regents of the University of California, Oakland, CA (US)

(72) Inventors: Michael Karin, La Jolla, CA (US); Hua Su, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 529 days.

(21) Appl. No.: 17/792,387

(22) PCT Filed: Jan. 13, 2021

(86) PCT No.: PCT/US2021/013203
§ 371 (c)(1),
(2) Date: Jul. 12, 2022

(87) PCT Pub. No.: WO2021/146258
PCT Pub. Date: Jul. 22, 2021

(65) Prior Publication Data
US 2023/0068698 A1 Mar. 2, 2023

Related U.S. Application Data

(60) Provisional application No. 62/960,832, filed on Jan. 14, 2020.

(51) Int. Cl.
| | | |
|---|---|---|
| *A61K 31/427* | (2006.01) | |
| *A61K 31/137* | (2006.01) | |
| *A61K 31/366* | (2006.01) | |
| *A61P 35/00* | (2006.01) | |

(52) U.S. Cl.
CPC .......... *A61K 31/427* (2013.01); *A61K 31/137* (2013.01); *A61K 31/366* (2013.01); *A61P 35/00* (2018.01)

(58) Field of Classification Search
CPC ..... A61P 35/00; A61K 31/427; A61K 31/137; A61K 31/366
See application file for complete search history.

(56) References Cited

U.S. PATENT DOCUMENTS

| | | | |
|---|---|---|---|
| 2011/0268722 A1 | 11/2011 | Siegelin et al. | |
| 2018/0140584 A1* | 5/2018 | Thompson | A61K 31/366 |
| 2018/0335420 A1* | 11/2018 | Bar-Sagi | A61K 31/435 |

FOREIGN PATENT DOCUMENTS

WO    WO-2011/106684 A2    9/2011

OTHER PUBLICATIONS

Liu, Wei Jing, Lin Ye, Wei Fang Huang, Lin Jie Guo, Zi Gan Xu, Hong Luan Wu, Chen Yang, and Hua Feng Liu. "p62 links the autophagy pathway and the ubiqutin-proteasome system upon ubiquitinated protein degradation." Cellular & molecular biology letters 21 (2016): 1-14) (Year: 2016).*
Bryant, et al., "Blocking autophagy to starve pancreatic cancer", Nature Reviews | Molecular Cell Biology, May 2019, vol. 20, pp. 265.
Chude, et al., "Targeting Autophagy in Cancer: Update on Clinical Trials and Novel Inhibitors", Int. J. Mol. Sci., 2017, vol. 18, 11 pages.
Commisso, et al., "Macropinocytosis of protein is an amino acid supply route in Ras-transformed cells" Nature, May 30, 2013, vol. 497, pp. 633-637.
International Search Report and Written Opinion dated Jun. 3, 2021, from application No. PCT/US2021/013203, 12 pages.
Katsuragi, et al., "Regulation of the Keap1-Nrf2 pathway by p62/SQSTM1", Current Opinion Toxicology, 2016, vol. 1, pp. 54-61.
Kimmelman, et al., "Autophagy and Tumor Metabolism", Cell Metab., May 2, 2017, 25(5), pp. 1037-1043.
Levy, et al., "Targeting autophagy in cancer", Nature Reviews | Cancer, Sep. 2017, vol. 17, pp. 528-542.
Moscat, et al., "p62 in cancer: signaling adaptor beyond autophagy", Cell, Oct. 20, 2016, 167(3), pp. 606-609.
Nakase, et al., "Active macropinocytosis induction by stimulation of epidermal growth factor receptor and oncogenic Ras expression potentiates cellular uptake efficacy of exosomes", Scientific Reports, 5:10300, 14 pages.
Petherick, et al., "Pharmacological Inhibition of ULK1 Kinase Blocks Mammalian Target of Rapamycin (mTOR)-dependent Autophagy", Journal of Biological Chemistry, May 1, 2015, vol. 290, No. 18, pp. 11376-11383.
Todoric, et al. "Stress-Activated NRF2-MDM2 Cascade Controls Neoplastic Progression in Pancreas", Cancer Cell, Dec. 11, 2017, 32(6), pp. 824-839.e8.
Umemura, et al., "p62, upregulated during preneoplasia, induces hepatocellular carcinogenesis by maintaining survival of stressed HCC-initiating cells", Cancer Cell, Jun. 13, 2016, 29(6), pp. 935-948.
Ying, et al., "Genetics and biology of pancreatic ductal adenocarcinoma", Genes & Development, 2016, vol. 30, pp. 355-385.

* cited by examiner

*Primary Examiner* — James H Alstrum-Acevedo
*Assistant Examiner* — Carolyn L. Ladd
(74) *Attorney, Agent, or Firm* — Foley & Lardner LLP

(57) ABSTRACT

Provided herein are methods and compositions for treating cancer through a combination of an inhibitor of macropinocytosis upregulation and an autophagy inhibitor. Also provided are methods and compositions for inducing cell death of cancer cells, and transgenic animal models regarding same.

4 Claims, 89 Drawing Sheets
Specification includes a Sequence Listing.

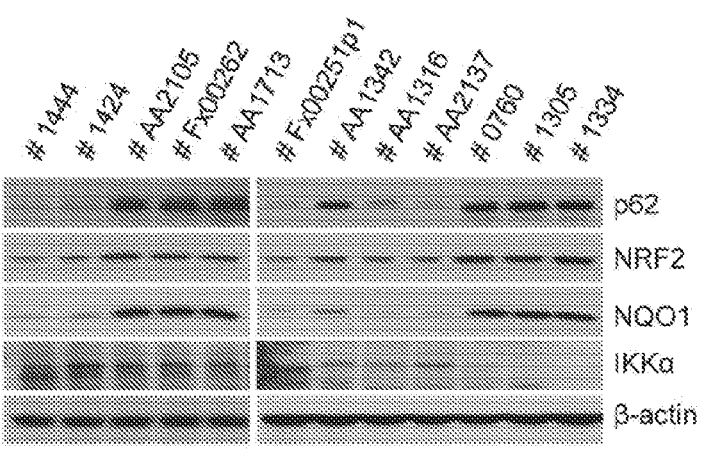
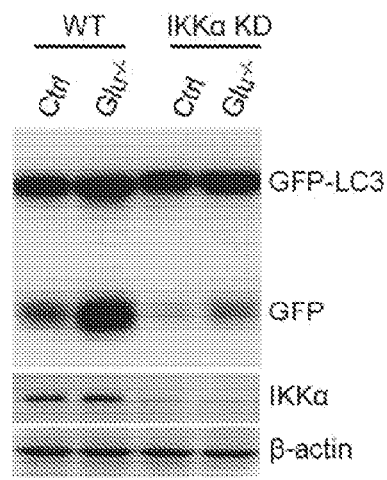
FIG. 1A  FIG. 1B
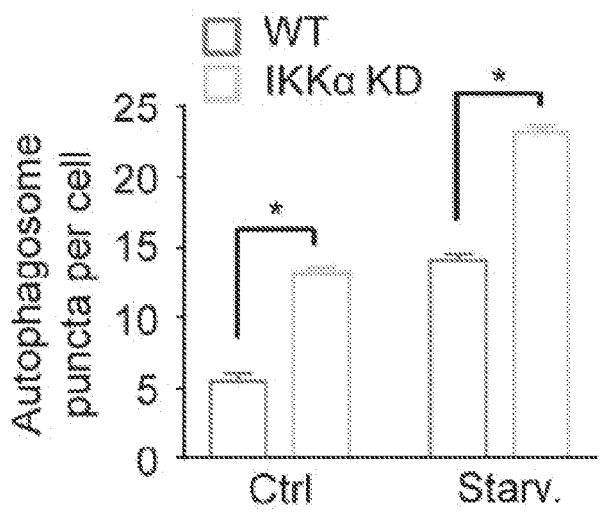
FIG. 1C

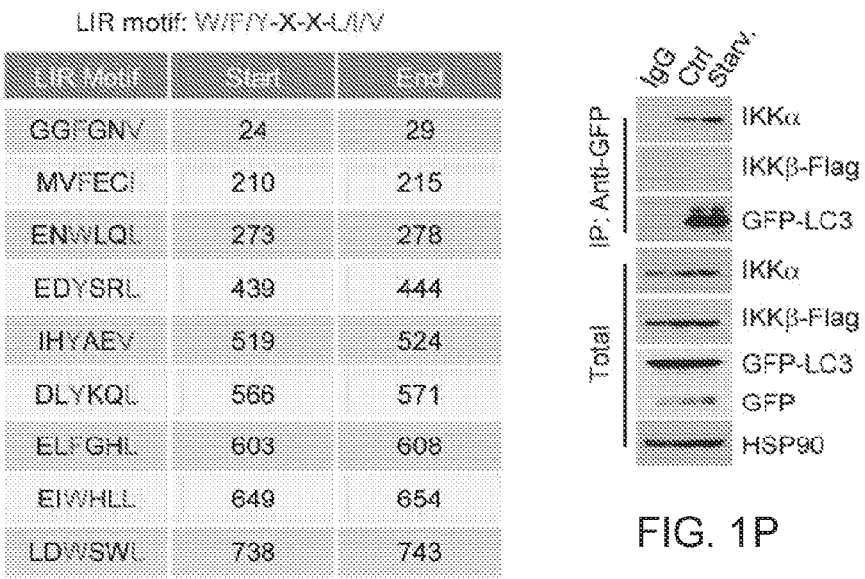
FIG. 1O
FIG. 1P
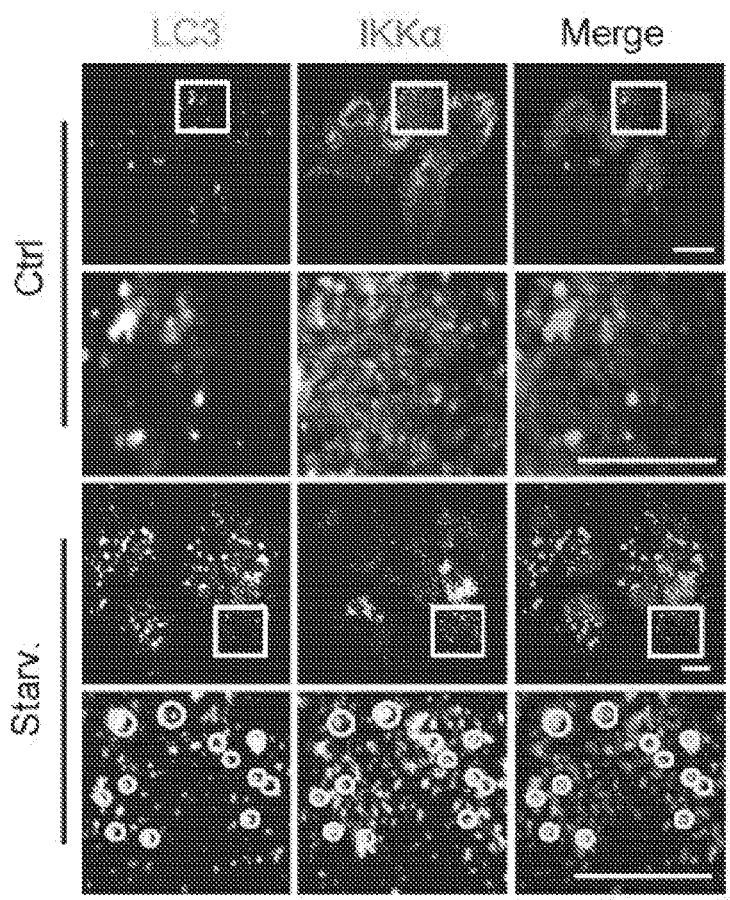
FIG. 1Q

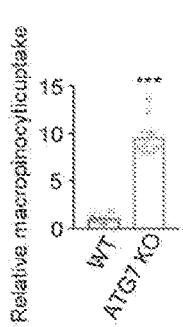
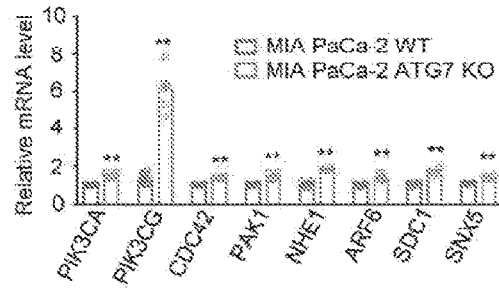
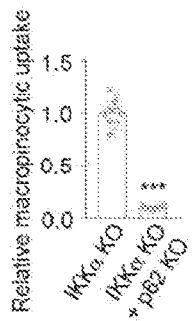
FIG. 3K  FIG. 3L  FIG. 3M
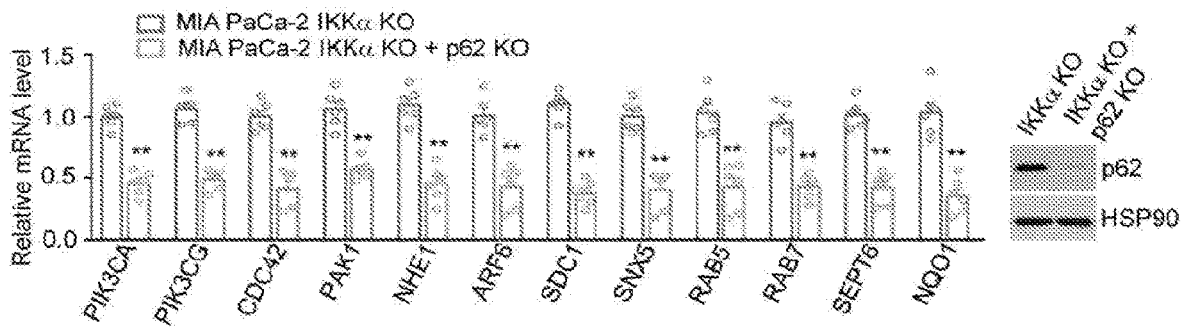
FIG. 3N
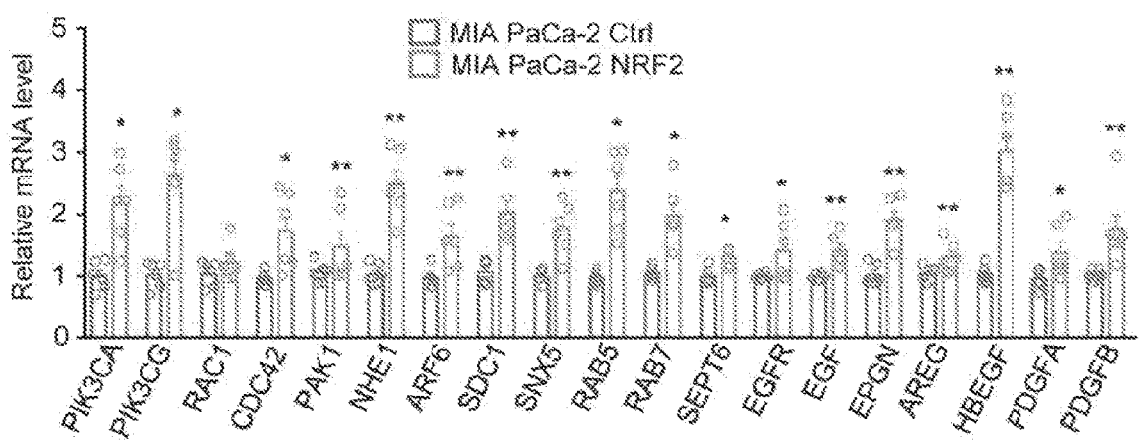
FIG. 3O

| Gene | NRF2 binding sites | Gene | NRF2 binding sites |
|---|---|---|---|
| PIK3CG | -987, -507, -451, -105, 85 | HBEGF | 84, -785 |
| SNX5 | -30, -960, -968 | EGF | -574, -14 |
| CDC42 | -909, -705 | PDGFB | -436, -464, -880 |
| PAK1 | -548, -755 | SDC1 | 39, -590, -730 |
| NHE1 | -85, -754 | ARF6 | -956 |
FIG. 3Q
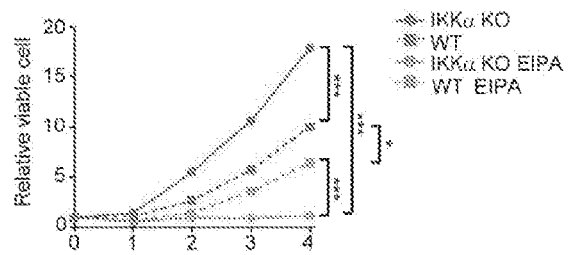
FIG. 4A
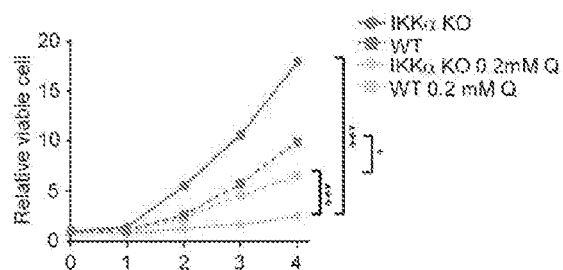
FIG. 4B
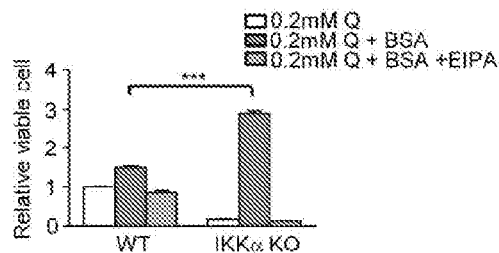
FIG. 4C
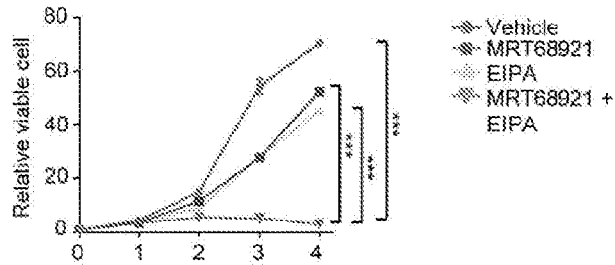
FIG. 4D

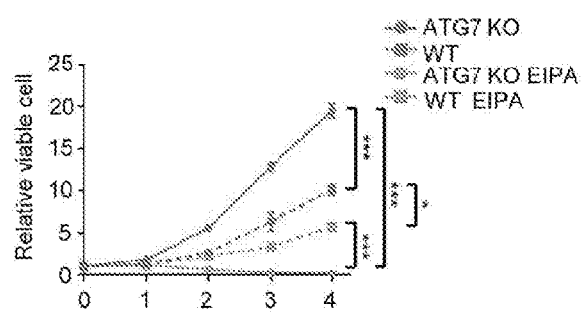 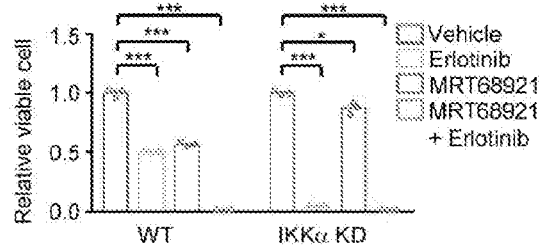
FIG. 4E
FIG. 4F
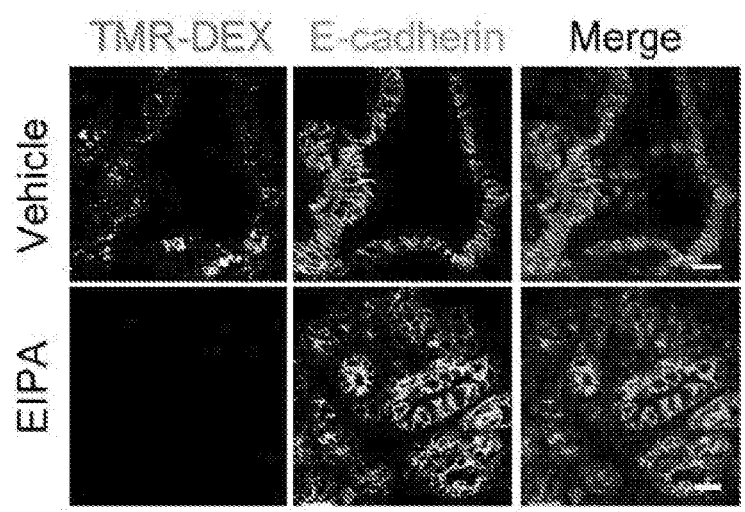 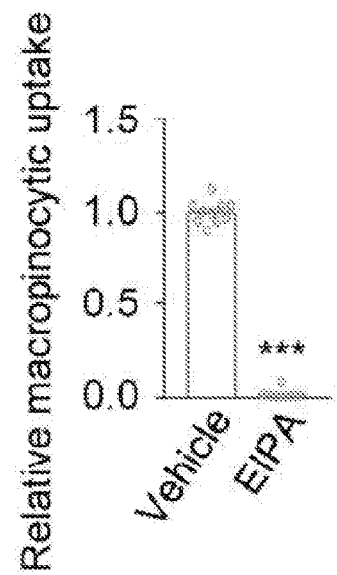
FIG. 4G

FIG. 14A
| LIR motif: W/F/Y-X-X-L/I/V | | |
|---|---|---|
| LIR Motif | Start | End |
| GGFGNV | 24 | 29 |
| MVFECI | 210 | 215 |
| ENWLQL | 273 | 278 |
| EDYSRL | 439 | 444 |
| IHYAEV | 519 | 524 |
| DLYKQL | 566 | 571 |
| ELFGHL | 603 | 608 |
| EIWHLL | 649 | 654 |
| LDWSWL | 738 | 743 |
FIG. 14B
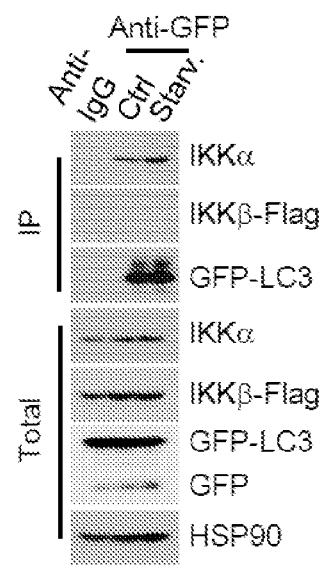
FIG. 14C
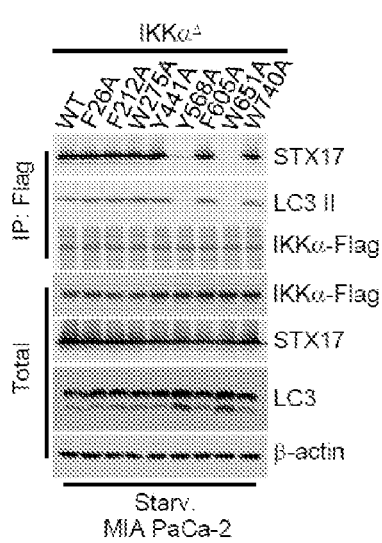
FIG. 14D
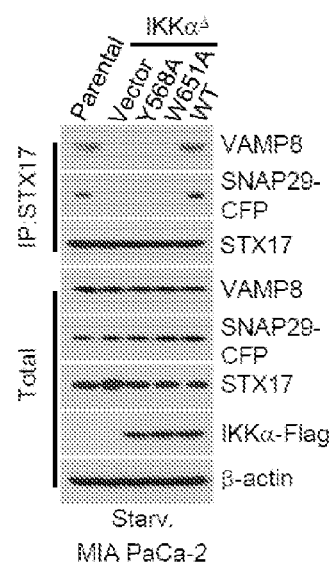

MIA PaCa-2

BxPC3

MIA PaCa-2

BxPC3

BxPC3

|  | Low | | High | |
| --- | --- | --- | --- | --- |
|  | Negative | Weak | Intermediate | Strong |
| IKKα | 6/100 | 25/100 | 60/100 | 9/100 |
| p62 | 6/100 | 39/100 | 9/100 | 46/100 |
| NRF2 | 5/100 | 35/100 | 10/100 | 50/100 |
| NQO1 | 3/100 | 37/100 | 15/100 | 45/100 |
| CDC42 | 8/100 | 37/100 | 20/100 | 35/100 |
| NHE1 | 10/100 | 38/100 | 15/100 | 37/100 |
| SDC1 | 11/100 | 35/100 | 11/100 | 43/100 |

FIG. 17C

CDC42 Chi-square test $p=0.004$ **

|  | CDC42 low | CDC42 high | Total |
|---|---|---|---|
| IKKα low/p62 high/NRF2 high | 5 | 20 | 25 |
| Others | 40 | 35 | 75 |
| Total | 45 | 55 | 100 |

FIG. 17D

SDC1 Chi-square test $p=0.011$ *

|  | SDC1 low | SDC1 high | Total |
|---|---|---|---|
| IKKα low/p62 high/NRF2 high | 6 | 19 | 25 |
| Others | 40 | 35 | 75 |
| Total | 46 | 54 | 100 |

FIG. 17E

NHE1 Chi-square test $p=0.006$ **

|  | NHE1 low | NHE1 high | Total |
|---|---|---|---|
| IKKα low/p62 high/NRF2 high | 6 | 19 | 25 |
| Others | 42 | 33 | 75 |
| Total | 48 | 52 | 100 |

FIG. 17F

| Gene | NRF2 binding sites | Gene | NRF2 binding sites |
|---|---|---|---|
| PIK3CG | -509, -105, 80 | NHE1 | -85, -523, -756 |
| SNX5 | -30, -960, -968 | EGF | -574, -20 |
| CDC42 | -911, -705 | PDGFB | -436, -464, -880 |
| PAK1 | -548, -755 | SDC1 | 39, -590, -755 |

MIA PaCa-2

COMBINATION THERAPY FOR CANCER

CROSS-REFERENCE TO RELATED APPLICATIONS

This application is a U.S. National Stage Application under 35 U.S.C. § 371 of International Application No. PCT/US2021/013203, filed Jan. 13, 2021, which claims priority under 35 U.S.C. § 119(e) to U.S. Provisional Application No. 62/960,832, filed Jan. 14, 2020, the entire content of each of which is incorporated herein by reference.

STATEMENT OF GOVERNMENT SUPPORT

This invention was made with government support under Grant Nos. CA211794, AI043477, DK098108, CA223717, CA218254, and DK108743 awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Aug. 5, 2025, is named 114198-7051_SL.txt and is 32,491 bytes in size.

TECHNICAL FIELD

The disclosure relates generally to cancer and more specifically to methods and compositions for treating cancer by targeting macropinocytosis and autophagy pathways.

BACKGROUND

Throughout this application, various publications, patents, and patent applications are referenced, some of which are referenced by an Arabic number, the full citation of which can be found immediately preceding the claims. All publications, patents and applications are herein incorporated by reference to the same extent as if each individual publication, patent, patent application or appendix, was specifically and individually indicated to be incorporated by reference.

Autophagy is an evolutionarily conserved, catabolic quality control process that maintains cellular homeostasis[1]. While eliminating toxic protein aggregates and damaged organelles, autophagy supports the high metabolic rate and energetic demands of proliferating cancer cells by releasing amino acids (AA) and other building blocks from lysosomally-degraded macromolecules[2]. Cancer cells rely on autophagy for survival, generating the notion that autophagy inhibitors can be used therapeutically[3]. Paradoxically, by maintaining cellular health and eliminating damaged proteins and organelles, autophagy is also an important tumor suppressive mechanism during preneoplasia[4-6]. Adding to this conundrum, it is entirely unknown how nutrient and amino acid supply are maintained in autophagy-compromised cancers.

According to the American Cancer Society, for all stages of pancreatic cancer combined, the one-year relative survival rate is 20%, and the five-year rate is 7%. These low survival rates are attributable to the fact that fewer than 20% of patients' tumors are confined to the pancreas at the time of diagnosis; in most cases, the malignancy has already progressed to the point where surgical removal is impossible. In those cases where resection can be performed, the average survival rate is 23 to 36 months. The overall five-year survival rate is about 10%, although this can rise as high as 20% to 35% if the tumor is removed completely and when cancer has not spread to lymph nodes. A need therefore exists for treatments that attenuate progression and/or ameliorate the symptoms associated with cancer in general and specifically pancreatic cancer.

SUMMARY OF THE DISCLOSURE

Many cancers, including pancreatic ductal adenocarcinoma (PDAC), depend on autophagy-mediated scavenging and recycling of intracellular macromolecules. These observations suggest that autophagy blockade should cause tumor starvation. However, apart from lysosomotropic agents, specific autophagy inhibiting monotherapies have not demonstrated potent anti-cancer activity. The present disclosure now shows that autophagy blockade prompted established PDAC to upregulate and utilize an alternative nutrient procurement pathway. This pathway was identified as the macropinocytosis (MP) nutrient uptake pathway that allows tumor cells to extract nutrients from extracellular sources and use them for energy generation. Accordingly, the present disclosure is based on the unexpected identification of this unprecedented autophagy to MP switch used by cancer cells. This novel autophagy to MP switch may be evolutionarily conserved and not cancer cell restricted, because it depends on the activation of the transcription factor NRF2 by the autophagy adaptor p62/SQSTM1. NRF2 activation by oncogenic mutations, hypoxia and oxidative stress also resulted in MP upregulation. While the role of NRF2 in autophagy was well established, the role of NRF2 in the modulation of macropinocytosis is novel and unexpected. The present disclosure shows that inhibition of MP in autophagy compromised PDAC elicited dramatic regression of transplanted and autochthonous tumors. Thus, combining autophagy and macropinocytosis inhibitors could be the treatment of choice to cure or cause significant regression of pancreatic tumors. Accordingly, the present disclosure is directed to a combination therapy comprising autophagy and MP inhibitors for the treatment of various diseases including, but not limited to cancer, and methods and compositions for treating these diseases.

The present disclosure provides a method of inducing cell death of a cancer cell, such as a PDAC cell. The method comprises, consists essentially of, or yet further consists of contacting a cancer cell with an inhibitor of macropinocytosis upregulation and contacting the cancer cell with an autophagy inhibitor, thereby inducing cell death of the cancer cell. In some embodiments, the cancer cell is a breast cancer cell, triple negative breast cancer cell, non-small-cell lung cancer cell, pancreatic cancer, leukemia, melanoma, colorectal cancer, bladder cancer, lung cancer, or a pancreatic ductal adenocarcinoma (PDAC) cell. In some embodiments, the cancer cell is mammalian. In some embodiments, the cancer cell is a human cell, e.g., a human breast cancer cell, triple negative breast cancer cell, non-small-cell lung cancer cell, pancreatic cancer, leukemia, melanoma, colorectal cancer, bladder cancer, lung cancer, or a pancreatic ductal adenocarcinoma (PDAC) cell. The contacting can be sequential or concurrent and can be in vitro, ex vivo or in vivo. When performed in vitro or ex vivo, the method is useful as an assay to test for personalized therapy, wherein the cell has been isolated from a subject to be treated. Alternatively, the method can be practiced in vitro to assay for new therapies or combination therapies. When practiced in an animal model, it is useful to test new combination therapies. The cancer cell can be from a biopsy or a cultured cancer cell, obtained from a subject sample, or a tissue bank, such as the American Type Culture Collection (ATCC). As is apparent to the skilled artisan, one can determine if the method is successful by assaying for reduction in growth kinetics or cell death. In addition, the method can be combined with other therapies.

In some embodiments, the autophagy inhibitor is selected from 3-Methyladenine (3-MA), LY294002, bafilomycin A1 (Baf A1), chloroquine (CQ), hydroxychloroquine (HCQ), ABT-737, obatoclax, clarithromycin, resveratrol, quinacrine, 4-Acetylantroquinonol B, antroquinonol, epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, or Vps34 inhibitors. In some embodiments, the autophagy inhibitor is an inhibitor of ULK1, such as MRT68921 dihydrochloride, ULK-100, ULK-101, DCC-3116 or SBI-0206965. In some embodiments, the autophagy inhibitor is a lysosomal acidification inhibitor. In some embodiments, the lysosomal acidification inhibitor is chloroquine. In some embodiments, the autophagy inhibitor is an IKKα downregulator.

In some embodiments, the inhibitor of macropinocytosis upregulation is from the group of: 5-(N-ethyl-N-isopropyl) amiloride (EIPA), 3-methylsulphonyl-4-piperidinobenzoyl) guanidine methanesulphonate (HOE-694), amiloride and amiloride derivatives, eganelisib, IPI-549, MBQ-167, wortmannin, LP1-106, XRK3F2, or LY294002. In some embodiments, the inhibitor of macropinocytosis upregulation is 5-(N-ethyl-N-isopropyl) amiloride, 3-methylsulphonyl-4-piperidinobenzoyl) guanidine methanesulphonate or IPI-549. In some embodiments, the inhibitor of macropinocytosis upregulation is an inhibitor of activity or expression of one or more proteins selected from NRF2, PIK3CG, CDC42, PAK1, SLC9A1, SNX5, SDC1, NHE1, p110α, p110γ, CDC42 and EGFR or EGF. In some embodiments, the inhibitor of macropinocytosis upregulation is 5-(N-ethyl-N-isopropyl) amiloride. In some embodiments, the inhibitor of macropinocytosis upregulation is 3-methylsulphonyl-4-piperidinobenzoyl) guanidine methanesulphonate or IPI-549. In some embodiments, the inhibitor of NRF2 is ML385 or Brusatol. In some embodiments, the inhibitor of EGFR is selected from erlotinib, gefitinib, lapatinib, cetuximab, osimertinib, neratinib, panitumumab, vandetanib, necitumumab, or dacomitinib. In some embodiments, the inhibitor of macropinocytosis upregulation is an inhibitor of p62 activity or expression. In some embodiments, the inhibitor of macropinocytosis upregulation comprises LP1-106 or XRK3F2.

In another aspect, the disclosure provides a method of treating cancer in a subject in need thereof. The method comprises, consists essentially of, or yet further consists of administering to the subject a combination of an inhibitor of macropinocytosis upregulation and an autophagy inhibitor, thereby treating cancer in the subject. In some embodiments, the subject is mammalian. In some embodiment, the subject is human. In some embodiments, the combination of an inhibitor of macropinocytosis upregulation and an autophagy inhibitor achieves near complete tumor regression. In some embodiments, the cancer is breast cancer, triple negative breast cancer, non-small-cell lung cancer, pancreatic cancer, leukemia, melanoma, colorectal cancer, bladder cancer, lung cancer or pancreatic ductal adenocarcinoma (PDAC). In some embodiments, the subject is a mammal such as a human.

Administration of the inhibitor of macropinocytosis upregulation and the autophagy inhibitor can be sequential or concurrent and the method can be combined with other cancer treatments or therapies, e.g., tumor resection or immunotherapy. The treatment can be administered as a first line, second line, third line or fourth line therapy, e.g., and can be used to treat primary or metastatic disease. Modes of administration are known in the art and described herein. The amount of each agent to be delivered will vary with the disease, the subject and the cancer and can be determined by the treating physician or veterinarian.

In some embodiments, the autophagy inhibitor is a lysosomal acidification inhibitor. In some embodiments, the lysosomal acidification inhibitor is chloroquine. In some embodiments, the autophagy inhibitor is an IKKα downregulator. In some embodiments, the autophagy inhibitor is selected from 3-Methyladenine (3-MA), LY294002, bafilomycin A1 (Baf A1), chloroquine (CQ), hydroxychloroquine (HCQ), ABT-737, obatoclax, clarithromycin, resveratrol, quinacrine, 4-Acetylantroquinonol B, antroquinonol, epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, or Vps34 inhibitors. In some embodiments, the autophagy inhibitor is an inhibitor of ULK1, such as MRT68921 dihydrochloride, ULK-100, ULK-101, DCC-3116 or SBI-0206965.

In some embodiments, the inhibitor of macropinocytosis upregulation is an inhibitor of activity or expression one or more proteins selected from NRF2, PIK3CG, CDC42, PAK1, SLC9A1, SNX5, SDC1, NHE1, p110α, p110γ, CDC42 and EGFR or EGF. In some embodiments, the inhibitor of NRF2 is ML385 or Brusatol. In some embodiments, the inhibitor of EGFR is selected from erlotinib, gefitinib, lapatinib, cetuximab, osimertinib, neratinib, panitumumab, vandetanib, necitumumab, or dacomitinib. In some embodiments, the inhibitor of macropinocytosis upregulation is selected from 5-(N-ethyl-N-isopropyl) amiloride (EIPA), 3-methylsulphonyl-4-piperidinobenzoyl) guanidine methanesulphonate (HOE-694), amiloride and amiloride derivatives, eganelisib, IPI-549, MBQ-167, wortmannin, LP1-106, XRK3F2, or LY294002. In some embodiments, the inhibitor of macropinocytosis upregulation is 5-(N-ethyl-N-isopropyl) amiloride, 3-methylsulphonyl-4-piperidinobenzoyl) guanidine methanesulphonate or IPI-549. In some embodiments, the inhibitor of macropinocytosis upregulation is 5-(N-ethyl-N-isopropyl) amiloride. In some embodiments, the inhibitor of macropinocytosis upregulation is an inhibitor of an ion channel selected from a sodium-proton exchanger, a sodium-calcium exchanger, or a sodium channel. In some embodiments, the inhibitor of macropinocytosis upregulation is an inhibitor of p62. In some embodiments, the inhibitor of macropinocytosis upregulation comprises LP1-106 or XRK3F2.

In another aspect, the disclosure provides a composition for treating cancer in a subject in need thereof. The composition comprises, consists essentially of, or yet further consists of a combination of an inhibitor of macropinocytosis upregulation and an autophagy inhibitor. In some embodiments, administering the composition comprising a combination of the inhibitor of macropinocytosis upregulation and the autophagy inhibitor induces cancer cell death. In some embodiments, the cancer cell is breast cancer, triple negative breast cancer, non-small-cell lung cancer, pancreatic cancer, leukemia, melanoma, colorectal cancer, bladder cancer, lung cancer or pancreatic ductal adenocarcinoma (PDAC) cell. In some embodiments, the composition comprises, consists essentially of, or yet further consists of an inhibitor of macropinocytosis upregulation selected from 5-(N-ethyl-N-isopropyl)amiloride (EIPA), 3-methylsulphonyl-4-piperidinobenzoyl)guanidine methanesulphonate (HOE-694), amiloride and amiloride derivatives, eganelisib, IPI-549, MBQ-167, wortmannin, LP1-106, XRK3F2, LY294002, an inhibitor of activity or expression of one or more proteins of NRF2, PIK3CG, CDC42, PAK1, SLC9A1, SNX5, SDC1, NHE1, p110α, p110γ, CDC42, EGFR, EGF, ML385, brusatol, or a combination thereof; and the autophagy inhibitor is selected from 3-Methyladenine (3-MA), LY294002, bafilomycin A1 (Baf A1), chloroquine (CQ), hydroxychloroquine (HCQ), ABT-737, obatoclax, clarithromycin, resveratrol, ruinacrine, 4-acetylantroquinonol B, antroquinonol, epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, or Vps34 inhibitors.

In some embodiments, the autophagy inhibitor is selected from 3-Methyladenine (3-MA), LY294002, Bafilomycin A1 (Baf A1), Chloroquine (CQ), hydroxychloroquine (HCQ), ABT-737, obatoclax, Clarithromycin, Resveratrol, Quinacrine, 4-Acetylantroquinonol B, antroquinonol, Epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, or Vps34 inhibitors. In some embodiments, the autophagy inhibitor is an inhibitor of ULK1, such as MRT68921 dihydrochloride, ULK-100, ULK-101, DCC-3116, or SBI-0206965. In some embodiments, the autophagy inhibitor is a lysosomal acidification inhibitor, such as chloroquine. In some embodiments, the autophagy inhibitor is an IKKα downregulator.

In some embodiments, the inhibitor of macropinocytosis upregulation is selected from 5-(N-ethyl-N-isopropyl) amiloride (EIPA), 3-methylsulphonyl-4-piperidinobenzoyl) guanidine methanesulphonate (HOE-694), amiloride and amiloride derivatives, eganelisib, IPI-549, MBQ-167, wortmannin, LP1-106, XRK3F2, or LY294002. In some embodiments, the inhibitor of macropinocytosis upregulation is an inhibitor of activity or expression of one or more proteins selected from NRF2, PIK3CG, CDC42, PAK1, SLC9A1, SNX5, SDC1, NHE1, p110α, p110γ, CDC42 and EGFR or EGF. In some embodiments, the inhibitor of macropinocytosis upregulation is 5-(N-ethyl-N-isopropyl) amiloride. In other embodiments, the inhibitor of macropinocytosis upregulation is 3-methylsulphonyl-4-piperidinobenzoyl) guanidine methanesulphonate or IPI-549. In some embodiments, the inhibitor of macropinocytosis upregulation is an inhibitor of an ion channel selected from a sodium-proton exchanger, a sodium-calcium exchanger, or a sodium channel. In some embodiments, the inhibitor of macropinocytosis upregulation is an inhibitor of activity or expression of one or more proteins selected from NRF2, PIK3CG, CDC42, PAK1, SLC9A1, SNX5, SDC1, NHE1, p110α, p110γ, CDC42 and EGFR or EGF. In some embodiments, the inhibitor of NRF2 is ML385 or Brusatol. In some embodiments, the inhibitor of EGFR is selected from erlotinib, gefitinib, lapatinib, cetuximab, osimertinib, neratinib, panitumumab, vandetanib, necitumumab, or dacomitinib. In some embodiments, the inhibitor of macropinocytosis upregulation is an inhibitor of p62 activity or expression, such as LP1-106, or XRK3F2. In some embodiments, the composition further comprises a pharmaceutically acceptable carrier.

In another aspect, the disclosure provides a kit comprising, consisting essentially of, or yet further consisting of, a composition comprising, or consisting essentially of, or yet further consisting of an inhibitor of macropinocytosis upregulation and an autophagy inhibitor, and instruction for use.

BRIEF DESCRIPTION OF THE DRAWINGS

Various aspects of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings.

FIGS. 1A-1I are pictorial and graphical diagrams showing that 1 KB kinase α (IKKα) is absent in a portion of human pancreatic ductal adenocarcinoma (PDAC) and is needed for autophagosome-lysosome fusion by bridging microtubule-associated protein light chain 3 (LC3) and syntaxin (STX17). FIG. 1A shows the results from immunoblot (IB) analysis of human PDAC with high and low IKKα expression. FIG. 1B shows the results from IB analysis showing the free GFP fragment generated in GFP-LC3 expressing parental (WT) and IKKα knockdown (KD) MIA PaCa-2 cells incubated in normal or glucose-free medium for 4 hrs. FIG. 1C shows quantification of LC3 puncta in WT and IKKα KD MIA PaCa-2 cells incubated in normal or starvation medium for 2 hrs. Data are presented as mean±SEM (n=30). Statistical significance was determined via t-test; *p<0.05. FIG. 1D shows immunofluorescence imaging and fluorescence quantification of GFP-LC3 and Lamp1 co-localization in GFP-LC3-stable WT and IKKα KD MIA PaCa-2 cells incubated in starvation medium for 2 hrs. Co-localization coefficients are presented to the right as the percentage of GFP-LC3 puncta positive for Lamp1. Mean±SEM (n=30). **P<0.01. Scale bar, 10 μm. FIG. 1E shows co-immunoprecipitation of CFP-SNAP29 and endogenous VAMP8 with Flag-STX17 from MIA PaCa-2 cells expressing Flag-STX17 and CFP-SNAP29. FIG. 1F shows co-immunoprecipitation of IKKα-Flag with GFP-LC3 from co-transfected MIA PaCa-2 cells. FIG. 1G shows co-localization of LC3 and STX17 in WT and IKKα KD MIA PaCa-2 cells incubated in starvation medium for 2 hrs. Scale bar, 10 μm. The right-hand panels show higher magnifications of the marked areas. FIG. 1H shows co-immunoprecipitation of Flag-STX17 with GFP-LC3 from WT and IKKa KD MIA PaCa-2 cells incubated in normal or starvation medium for 2 hrs. FIG. 1I shows co-immunoprecipitation of LC3 and STX17 with endogenous IKKα in MIA PaCa-2 cells incubated as above.

FIGS. 1J-1Q are pictorial and graphical diagrams showing that IKKα is needed for autophagic flux and can localize to autophagosomes. FIG. 1J shows imaging of LC3 puncta in WT and IKKα KD MIA PaCa-2 cells incubated in normal or starvation medium for 2 hrs. Scale bar, 20 μm. FIG. 1K shows the results from IB analysis of p62 and LC3 amounts in WT and IKKα KD MIA PaCa-2 cells incubated in normal or starvation medium for 2 hrs with or without chloroquine (CQ). FIG. 1L shows imaging of LC3 puncta in pancreata of 8-week-old (wo) mice of the indicated genotypes which were starved for 36 hrs prior to the analysis. The lower panels show higher magnifications of the marked areas. Scale bar, 10 μm. FIG. 1M shows the results from IB analysis of p62 and LC3 amounts in pancreata of 8-wo mice of indicated genotypes that were starved for 36 hrs and were either injected or not with CQ. FIG. 1N shows representative images and quantification of GFP and mCherry co-localization in GFP-mCherry-LC3 transfected WT and IKKα-KD MIA PaCa-2 cells that were starved for 2 hrs. The colocalization coefficients as shown as the percentage of punctate mCherry signals that were positive for GFP. Mean±SEM (n=30). Statistical significance was determined by t-test; **P<0.01. Scale bar, 10 μm. FIG. 1O shows LC3 interaction motifs (LIR motifs) in human IKKα. Figure discloses SEQ ID NOS 149-157, respectively, in order of appearance. FIG. 1P shows co-immunoprecipitation of IKKα, IKKβ-Flag with GFP-LC3 in co-transfected MIA PaCa-2 cells. FIG. 1Q shows co-localization of LC3 and IKKα in MIA PaCa-2 cells incubated in normal or starvation medium for 2 hrs. Scale bar, 10 μm.

FIG. 2A shows the results from qRT-PCR analysis of MP-related mRNAs in 8-week-old (wo) mice of indicated genotypes. Mean±SEM (n=6). *p<0.05, p<0.01. FIG. 2B shows representative images and quantification of MP in TMR-dextran (TMR-DEX: red) injected pancreata from 8-wo mice of indicated genotypes. PECs are marked by E-cadherin staining (green). Scale bar, 10 μm. Mean±SEM (n=10). *p<0.001. FIG. 2C shows MP visualization and quantification using TMR-DEX in parental and IKKα-knockout (KO) MIA PaCa-2 cells treated with or without 75 μM EIPA. Scale bar, 20 μm. Mean±SEM (n=10). ***p<0.001. FIG. 2D shows the results from DQ-BSA fluorescence in WT and IKKα-KO MIA PaCa-2 cells co-incubated with DQ-BSA and TMR-DEX and fixed either immediately (t=0) or following a 1 hr chase (t=1). The fluorescent signal emanating from DQ-BSA reflects albumin degradation. Insets show higher magnifications of marked areas. Scale bar, 20 μm.

FIG. 2E shows the results from qRT-PCR analysis of MP-related genes in WT and IKKα-KO MIA PaCa-2 cells. Mean±SEM (n=6). Statistical significance was determined by t-test; *P<0.05, **P<0.01. FIG. 2F shows representative IHC analysis of pancreatic sections from 8-wo mice of indicated genotypes. Scale bar, 100 μm. The right-hand panels show higher magnifications of the marked areas.

FIG. 2G shows images of SDC1 and NHE1 localization in pancreata of above mice. PECs are marked by anti-cytokeratin 18 (CK18, red) or anti-E-cadherin staining (red). Scale bar, 20 μm. FIG. 2H shows the results from DQ-Collagen IV fluorescence in WT and IKKα KO MIA PaCa-2 cells co-incubated with DQ-Collagen IV and TMR-DEX and fixed either immediately (t=0) or following a 1 hr chase (t=1 hr). The fluorescent signal emanating from DQ-Collagen IV reflects Collagen IV degradation. Insets show a higher magnification. Scale bar, 20 μm.

FIG. 3A shows macropinosome formation in WT and ATG7 KO MIA PaCa-2 cells imaged with TMR-DEX. Scale bar, 10 μm. FIG. 3B shows the results from IB analysis of MP-related proteins in WT, IKKα- or ATG7-KO MIA PaCa-2 cells. FIG. 3C shows autophagosome and macropinosome formation in MIA PaCa-2 cells treated with or without MRT68921. Scale bar, 10 μm. For relative macropinocytic uptake, Mean±SEM (n=6); For autophagosome puncta per cell, Mean±SEM (n=30). ***p<0.001. FIG. 3D shows macropinososme formation in IKKα KO and IKKα and p62 double KO (DKO) MIA PaCa-2 cells. Scale bar, 10 μm. FIG. 3E shows the results from IB analysis of indicated proteins in IKKα KO and IKKα and p62 DKO MIA PaCa-2 cells with or without exogenous p62 or NRF2 overexpression. FIG. 3F shows the results from IB analysis of MP-related pancreatic proteins from 8-wo mice of indicated genotypes. FIG. 3G shows macropinosome formation in WT and IKKα KO BxPC3 cells treated with or without the NRF2 inhibitor ML385 (10 μM) for 24 hrs. Scale bar, 10 μm. FIG. 3H shows the results from IB analysis of indicated proteins in WT and IKKα KO BxPC3 cells treated as in FIG. 3G. FIG. 3I shows the results from IB analysis of MP-related proteins in WT and NRF2-Flag-stable BxPC3 cells. FIG. 3J shows macropinosomes and SDC1 and NHE1 localization in WT and NRF2-Flag-stable BxPC3 cells. Scale bar, 10 μm.

FIGS. 3K-3Q are graphical diagrams showing that inhibition of autophagy and NRF2 activation upregulate MP. FIG. 3K shows quantification of MP using TMR-DEX in WT and ATG7-KO MIA PaCa-2 cells. Mean±SEM (n=10). Statistical significance was determined by t-test; ***p<0.001. FIG. 3L shows the results from qRT-PCR analysis of MP-related genes in WT and ATG7-KO MIA PaCa-2 cells. Mean±SEM (n=6). Statistical significance was determined by t-test; *P<0.05, P<0.01. FIG. 3M shows quantification of MP using TMR-DEX in IKKα-KO and IKKα and p62 DKO MIA PaCa-2 cells. Mean f SEM (n=10). *p<0.001. FIG. 3N shows the results from qRT-PCR analysis of MP-related genes in IKKα-KO and p62 DKO MIA PaCa-2 cells. Mean±SEM (n=6). **P<0.01. FIG. 3O shows the results from qRT-PCR analysis of MP-related genes in parental and NRF2 overexpressing MIA PaCa-2 cells. Mean±SEM (n=6). *P<0.05, **P<0.01. FIG. 3P show the results from analysis of RNA expression of MP-related genes in human PDAC specimens divided into High and Low-SQSTM1 groups and High and Low NFE2L2 groups, Data were procured from The Cancer Genome Atlas (TCGA). *P<0.05, P<0.01, *p<0.001. FIG. 3Q shows potential NRF2 binding sites relative to the transcriptional start site (TSS, +1) in the indicated MP-related genes.

FIGS. 4A-4D are graphical diagrams showing the effect of MP and autophagy inhibitors on PDAC cell growth. FIGS. 4A and 4B show WT and IKKα KO MIA PaCa-2 cells were cultured in complete medium with or without the NHE1 inhibitor EIPA (10 μM) or in medium containing sub-physiological glutamine (0.2 mM Q). Total viable cells were measured with a CCK-8 assay after 0, 1, 2, 3 and 4 days. Data are presented relative to the day 0 value. Mean±SEM (n=3 independent experiments). Statistical significance was determined by t-test. ***p<0.001, *p<0.05. FIG. 4C shows WT and IKKα KO MIA PaCa-2 cells were grown in media containing 0.2 mM Q, with or without albumin supplementation. Total viable cells were measured after 3 days and data are presented relative to the WT 0.2 mM Q value. Mean±SEM (n=3 independent experiments). Statistical significance was determined by t-test. *p<0.001. FIG. 4D shows KC6141 cells were treated with vehicle, the ULK1/2 inhibitor MRT68921, EIPA or MRT68921 and EIPA and total viable cells were measured as above after 0, 1, 2, 3 and 4 days. Data are presented relative to the day 0 viability value. Mean±SEM (n=3 independent experiments). Statistical significance was determined by t-test. *p<0.001.

FIGS. 4E-4G are graphical and pictorial diagrams showing that EIPA treatment inhibits cell proliferation and MP. FIG. 4E shows WT and ATG7 KO MIA PaCa-2 cells were cultured in complete medium with or without EIPA (10 μM) and total viable cells were measured with the CCK-8 assay after 0, 1, 2, 3 and 4 days. Data are presented relative to the day 0 value. Mean±SEM (n=3 independent experiments). ***p<0.001, *p<0.05. FIG. 4F shows WT and IKKα KD KC6141 were treated with vehicle, the EGFR inhibitor erlotinib, MRT68921 or MRT68921 and erlotinib and total viable cells were measured as above after 3 days of growth and data are presented relative to the WT or IKKα KD vehicle controls. Mean±SEM (n=3 independent experiments). Statistical significance was determined by t-test; *p<0.05, *p<0.001. FIG. 4G shows images and quantification of MP in TMR-DEX injected pancreata from 8-wo $Kras^{G12D}$; $Ikk\alpha^{\Delta pan}$ mice treated with vehicle or 10 mg/kg EIPA for 1 month. PECs are marked by anti-E-cadherin staining. Scale bar, 20 μm. Mean±SEM (n=10). *p<0.001.

FIG. 5A shows gross morphology and weight of pancreata from 8-wo $Kras^{G12D}$; $Ikk\alpha^{\Delta pan}$ mice treated with vehicle or 10 mg/kg EIPA for 1 month. Mean±SEM (n=8). Statistical significance was determined by t-test. *p<0.001. FIG. 5B shows H&E stained pancreatic sections from above mice. Scale bars, 100 μm. FIG. 5C shows the results from immunohistochemistry (IHC) of pancreatic sections from above mice. Scale bars, 100 μm. FIG. 5D shows representative photographs and sizes of dissected MIA PaCa-2 tumors from nude mice treated with EIPA or vehicle-only controls. Mean±SEM (n=10). Statistical significance was determined by t-test. *p<0.001. Note that the residual dissected tumors mostly represent the Matrigel Plus in which the cancer cells were embedded. FIG. 5E shows representative photographs and sizes of dissected KC6141 tumors from C57BL/6 mice treated with vehicle, MRT68921, EIPA, or MRT68921 and EIPA. Mean±SEM (n=8). Statistical significance was determined by t-test. ***p<0.001.

FIGS. 6A-6L show that IKKα promotes Autophagosome-Lysosome fusion by bridging LC3 and STX17. FIG. 6A shows a co-immunoprecipitation (co-IP) analysis illustrating the interaction of CFP-SNAP29 and endogenous VAMP8 with Flag-STX17 in control and starved MIA PaCa-2 cells, and in the presence (WT) and absence of IKKα (KD). MIA PaCa-2 cells were starved for 2 hrs. FIG. 6B shows a Co-IP analysis illustrating the interaction of IKKα-Flag with GFP-LC3 in control and starved MIA PaCa-2 cells. FIG. 6C shows an immunofluorescence staining and quantification illustrating the co-localization of LC3 and STX17 in parental (WT) and IKKα Knock Down (KD) MIA PaCa-2 cells that were incubated in starvation medium for 2 hrs. The right-hand panels show higher magnifications of the areas marked by squares. A bar graph illustrating the immunofluorescence staining quantification shows that LC3 and STX17 colocalization was abolished in the absence of IKKα. Mean±SEM (n=30). Scale bar, 10 μm. Statistical significance was determined by 2-tailed t-test. *p<0.001, **p<0.0001.

FIG. 6D shows a Co-IP analysis illustrating the interaction of Flag-STX17 and GFP-LC3 in control and starved MIA PaCa-2 cells, and in the presence (WT) and absence of IKKα (KD). FIG. 6E shows a Co-IP analysis illustrating the interaction of LC3 and STX17 with endogenous IKKα in control and starved MIA PaCa-2 cells. FIG. 6F shows a Co-IP analysis illustrating the interaction of endogenous STX17 and transiently expressed Flag-tagged WT and LIR-mutated IKKα variants (Y568A and W651A) with GFP-LC3 in IKKα Knock Down (KD) MIA PaCa-2 cells. FIG. 6G shows an immunoblot (IB) analysis illustrating the expression of IKKα, IKKα L.E., NRF2, p62, and LC3 in various human PDAC cell lines; and further shows human PDAC cell lines with high and low IKKα expression. FIG. 6H shows an immunofluorescence staining and quantification illustrating LC3 puncta in PDAC cells expressing high and low IKKα$^{\Delta}$; and a bar graph illustrating the immunofluorescence staining quantification further shows that the number of LC3 puncta is higher in COLO and AsPC-1 cells when compared to BxPC3 and MIA cells. Mean±SEM (n=30). Scale bar, 10 μm. Statistical significance was determined by 2-tailed t-test. *p<0.001, p<0.0001. FIG. 6I shows an immunofluorescence staining and quantification of LC3 puncta in COLO 357/FG cells incubated in normal or starvation medium for 2 hrs in the absence or presence (+/−) of chloroquine (CQ); and a bar graph illustrating the immunofluorescence staining quantification on the right further shows chloroquine has no effect on the LC3 puncta, but starvation enhanced the number of LC3 puncta per cell. Mean f SEM (n=30). Scale bar, 10 μm. Statistical significance was determined by 2-tailed t-test. *p<0.001, ****p<0.0001.

FIG. 7A shows a bar graph illustrating the quantification of a qRT-PCR analysis of the mRNA levels of MP-related genes in pancreatic epithelial cells (PEC) from 8-week-old (wo) $Kras^{G12D}$ and 2-mo $Kras^{G11D}$;$Ikk\alpha^{\Delta PEC}$ mice. Mean±SEM (n=4 mice). Statistical significance was determined by a 2-tailed t-test; *p<0.05, p<0.01, *p<0.001, ****p<0.0001. FIG. 7B shows representative immunofluorescence staining and quantification illustrating macropinocytosis (MP) in TMR-dextran (TMR-DEX: red) injected pancreatic tissue from 8-wo $Kras^{G12D}$ and 2-mo $Kras^{G12D}$;$Ikk\alpha^{\Delta PEC}$ mice. PEC or carcinoma cells are marked by E-cadherin staining; and a bar graph illustrating the immunofluorescence staining quantification on the right further shows that macropinocytosis (MP) was enhanced in $Kras^{G12D}$;$Ikk\alpha^{\Delta PEC}$ mice when compared to $Kras^{G12D}$ mice. Scale bar, 10 μm. Mean±SEM (n=4 mice). Statistical significance was determined by a 2-tailed t-test; *p<0.05, p<0.01, *p<0.001, ****p<0.0001. Statistical significance was determined by a 2-tailed t-test; *p<0.05, p<0.01, *p<0.001, ****p<0.0001. FIG. 7C shows a bar graph illustrating the quantification of a qRT-PCR analysis of mRNA levels of MP-related genes in pancreatic epithelial cells (PEC) from 12-month-old (mo) $Kras^{G12D}$ and 2-mo $Kras^{G12D}$;$Ikk\alpha^{\Delta PEC}$ mice. Mean±SEM (n=3 mice). Statistical significance was determined by a 2-tailed t-test; *p<0.05, p<0.01, *p<0.001, ****p<0.0001. FIG. 7D shows representative Hematoxylin and eosin (H&E) and immunofluorescence staining and quantification illustrating TMR-DEX uptake (macropinocytosis) in pancreata from 12-month-old (mo) $Kras^{G12D}$ and 2-mo $Kras^{G12D}$;$Ikk\alpha^{\Delta pan}$ mice; and a bar graph illustrating the immunofluorescence staining quantification on the right further shows that macropinocytosis (MP) was enhanced in $Kras^{G12D}$;$Ikk\alpha^{\Delta PEC}$ mice when compared to $Kras^{G12D}$ mice. Scale bar, 20 μm. Mean±SEM (n=3 mice). Statistical significance was determined by a 2-tailed t-test; *p<0.05, p<0.01, *p<0.001, ****p<0.0001.

FIG. 7E shows an immunofluorescence staining and quantification illustrating macropinocytosis (MP) using TMR-DEX in parental, IKKα$^{\Delta}$ MIA PaCa-2 cells, and IKKα$^{\Delta}$ 1444 cells in the absence and presence (+/−) of 75 μM 5-(N-ethyl-N-isopropyl) amiloride (EIPA); and bar graphs illustrating the immunofluorescence staining quantification on the right further show that macropinocytosis (MP) was enhanced in IKKα$^{\Delta}$ MIA PaCa-2 cells and IKKα$^{\Delta}$ cells when compared to parental cells (WT), and this enhancement was suppressed by EIPA. Scale bar, 10 μm. Mean±SEM (n=10). Statistical significance was determined by a 2-tailed t-test; *p<0.05, p<0.01, *p<0.001, ****p<0.0001. FIG. 7F shows a bar graph illustrating the quantification of a qRT-PCR analysis of mRNA levels of MP-related genes in WT and IKKα$^Δ$ MIA PaCa-2 cells. Mean±SEM (n=6). Statistical significance was determined by a 2-tailed t-test. *p<0.05, p<0.01, *p<0.001, ****p<0.0001. FIG. 7G shows an immunoblot (IB) analysis illustrating the expression of MP-related proteins in pancreatic epithelial cells (PEC) isolated from 2-month-old (2M) Kras$^{G12D}$, 12-month-old (12M) Kras$^{G12D}$ and 2-month-old Kras$^{G12D}$;Ikkα$^{ΔPEC}$ mice. FIG. 7H shows an immunofluorescence staining illustrating the localization of SDC1 and NHE1 in pancreata isolated from 2-month-old (2M) Kras$^{G12D}$, 12-month-old (12M) Kras$^{G12D}$, and 2-month-old Kras$^{G12D}$;Ikkα$^{ΔPEC}$ mice; pancreatic intraepithelial neoplasia (PanIN) are labeled with a cytokeratin 18 (CK18) antibody and PDAC cells are labeled with an E-cadherin antibody. Scale bar, 20 μm. FIG. 7I shows an immunofluorescence staining illustrating the degradation of albumin (DQ-BSA fluorescence) internalized by macropinocytosis (TMR-DEX) in WT and IKKα$^Δ$ MIA PaCa-2 cells. Cells were co-incubated with DQ-BSA and TMR-DEX and fixed immediately (t=0) or after a 1 hr chase (t=1). The DQ-BSA signal reflects albumin degradation. Insets show higher magnifications of marked areas. Scale bar, 20 μm.

FIG. 8A shows an immunofluorescence staining illustrating macropinosomes stained with TMR-DEX in WT and ATG7A MIA PaCa-2 cells. Scale bar, 10 μm. FIG. 3D shows an immunofluorescence staining illustrating macropinosomes in IKKα$^Δ$ and IKKα$^Δ$;p62$^Δ$ double knock out (DKO) in MIA PaCa-2 cells; and that macropinosomes are absent in cells lacking IKKα and p62. Scale bar, 10 μm.

FIG. 8O shows a bar graph illustrating the quantification of the immunofluorescence staining of FIG. 8N and an immunoblot analysis illustrating the enhanced AKT phosphorylation in NRF2(E79Q)-Myc-overexpressing (OE) MIA PaCa-2 cells, and the suppression of AKT phosphorylation in the cell treated with 600 nM IPI549. Mean±SEM (n=6). Statistical significance was determined by a 2-tailed t-test. *p<0.001, **p<0.0001.

FIG. 9A shows an immunohistochemical (IHC) analysis illustrating the expression of MP-related proteins in human PDAC tissues from four patients. The areas marked by the squares were further magnified (inset). Scale bars, 25 μm. FIG. 9B shows an immunohistochemical (IHC) analysis illustrating the expression of MP-related proteins in non-tumor (NT) and tumor (T) areas in human PDAC specimens having high IKKα expression (IKKα$^{high}$; patient #5) and low IKKα expression (IKKα$^{low}$; patient #6). Marked areas were examined under higher magnification (inset). Scale bars, 25 μm. FIG. 9C shows an immunofluorescence staining and quantification illustrating the colocalization of autophagosome (LC3) and lysosome (LAMP1) in the specimens from FIG. 9B; and that the LC3 puncta occupancy and LC3-LAMP1 co-localization were enhanced in tumor area when compared to non-tumor area in both patients. Mean±SEM (n=10 patients). Statistical significance was determined by a 2-tailed t-test; *p<0.001. Scale bars, 10 μm. FIG. 9D shows an immunofluorescence staining and quantification illustrating the presence of MP in TMR-DEX injected fresh surgical specimens from patients #5 (IKKα$^{high}$;NRF2$^{low}$ tumor) and #6 (IKKα$^{low}$;NRF2$^{high}$ tumor). PEC or carcinoma cells are marked by E-cadherin staining. Scale bar, 20 μm. Mean±SEM (n=10). **p<0.0001.

FIG. 10A shows a gel electrophoresis of PCR-amplified promoter DNA fragments containing NRF2 binding sites (antioxidant response elements (AREs)) from ChIP assays illustrating the recruitment of NRF2 to the NHE1, CDC42, PIK3CG, SDC1, and EGF promoters in WT, ATG7$^\Delta$ and ATG7$^\Delta$;NRF2 KD MIA PaCa-2 cells. FIGS. 10B-10F show the quantification of the PCR-amplified promoter DNA fragments of FIG. 10A illustrating the enhanced recruitment of NRF2 to the CDC42 promoter (FIG. 10B), SDC1 promoter (FIG. 10C), NHE1 promoter (FIG. 10D), PIK3CG promoter (FIG. 10E), EGF promoter (FIG. 10F). Results are mean f SEM (n=3 independent experiments). Statistical significance was determined by a 2-tailed t-test; *p<0.05, p<0.01, *p<0.001, ****p<0.0001. FIG. 10G shows a bar graph illustrating the relative fold activation by NRF2 of luciferase reporters controlled by WT and ARE$^\Delta$ promoter regions of the NHE1, CDC42, PIK3CG, SDC1, and EGF genes. pGL3-WT or ARE$^\Delta$ promoters fused to a luciferase reporter were co-transfected into MIA PaCa-2 cells+/−NRF2 expression vector and pRL-TK control reporter. Results are mean±SEM (n=3 independent experiments). Statistical significance was determined by a 2-tailed t-test; *p<0.05, p<0.01, *p<0.001, ****p<0.0001. FIG. 10H shows an immunoblot analysis illustrating the expression of NRF2 and SDC1 in lung cancer cell lines (H1299, H358, A549, H838, and H1435).

FIG. 10I shows an immunofluorescence staining and quantification illustrating the colocalization of macropinosome and NRF2 in the human lung cancer cell lines of FIG. 10H; and the quantification shows the relative number of macropinocytic uptake correlated with NRF2 expression, mean±SEM (n=10). Scale bar, 10 μm. Results are mean±SEM (n=3 independent experiments). Statistical significance was determined by a 2-tailed t-test; *p<0.05, p<0.01, *p<0.001, ****p<0.0001. FIG. 10J shows a bar graph illustrating a qRT-PCR analysis of MP-related mRNAs of NRF2, SQSTM1, NHE1, CDC42, PIK3CG, SDC1, and EGF in the human lung cancer cell lines of FIG. 10H. Results are mean±SEM (n=3 independent experiments). Statistical significance was determined by a 2-tailed t-test; *p<0.05, p<0.01, *p<0.001, ****p<0.0001. FIG. 10K shows a bar graph illustrating a qRT-PCR analysis of MP-related mRNAs similar to FIG. 10J. Results are mean±SEM (n=3 independent experiments). Statistical significance was determined by a 2-tailed t-test; *p<0.05, p<0.01, *p<0.001, ****p<0.0001.

FIG. 11A shows a graph illustrating the suppression of cell viability in WT and IKKα$^\Delta$ MIA PaCa-2 cells that were cultured in complete medium containing the NHE1 inhibitor EIPA (10.5 μM) when compared to control. Total viable cells were measured with a CCK-8 assay on the indicated days. Data are presented relative to day 0. FIG. 11B illustrating the suppression of cell viability in WT and IKKα$^\Delta$ MIA PaCa-2 cells that were cultured in complete medium containing sub-physiological glutamine (0.2 mM Q). Total viable cells were measured with a CCK-8 assay on the indicated days. Data are presented relative to day 0. FIG. 11C shows a bar graph illustrating that albumin supplementation enhanced the relative viability of IKKα$^\Delta$ MIA PaCa-2 cells when WT and IKKα$^\Delta$ MIA PaCa-2 cells were grown in the presence of 0.2 mM Q, 0.2 mM Q with albumin supplementation, or 0.2 mM Q with albumin supplementation and EIPA. Total viable cells were measured after 3 days and data are presented relative to the WT 0.2 mM Q value. FIG. 11D shows a bar graph illustrating that the extracellular matrix (ECM) enhanced cell viability, which was suppressed by EIPA, IPI549, and MBQ-167, when WT and IKKα KD 6141 cells were grown on plates containing the extracellular matrix (ECM) in the presence of 0.5 mM glucose with EIPA, the selective inhibitor of phosphoinositide-3-kinase gamma (PI3K-gamma; p110γ) inhibitor IPI549 (IPI, 600 nM), or the dual RAC and CDC42 inhibitor MBQ-167 (500 nM). Total viable cells were measured after 3 days and data are presented relative to the WT without ECM.

FIG. 11E shows a graph illustrating the suppression of cell viability by various drug when KC6141 cells were incubated with vehicle, the ULK1/2 inhibitor MRT68921 (MRT), EIPA (5-(N-ethyl-N-isopropyl)amiloride), or MRT and EIPA; total viable cells were measured and presented as in FIG. 11A. FIG. 11F shows a bar graph illustrating the effects of EMC and EIPA, MRT or a combination of both on the relative ATP levels when WT, p62KD, or Nrf2 KD KC6141 cells were grown on plates coated with an ECM in the presence of 0.5 mM Glu and EIPA, MRT, or EIPA and MRT for 24 hrs. Total cellular ATP was measured and data were normalized to cell number and presented relative to untreated WT cells grown without ECM. FIG. 11G shows a bar graph illustrating the effects of EMC and EIPA, MRT or a combination of both on relative L-amino acids (AA) levels, when WT, p62KD, or Nrf2 KD KC6141 cells were grown were cultured and treated as in FIG. 11F. Data were normalized and presented as in FIG. 11F. FIG. 11H shows a bar graph illustrating the effects of EMC and EIPA, MRT or a combination of both on relative NADPH and NADP levels, when WT, and Nrf2 KD KC6141 cells were cultured and treated as in FIG. 11F. Data were normalized to cell number and are presented as NADPH to NADP ratio relative to the value of untreated WT cells grown without ECM.

FIG. 11I shows an immunofluorescence staining and quantification illustrating the effects of EMC and EIPA, MRT or a combination of both on cell proliferation as shown by Bromodeoxyuridine (BrdU) staining when WT and Nrf2 KD KC6141 cells grown on plates coated with an ECM n the presence of 0.5 mM glucose and 0.5 mg/ml BrdU for 24 hrs; the quantification shows that ECM and MRT enhanced cell proliferation in WT, but not in Nrf2 KD KC6141, and EIPA suppressed cell proliferation in all conditions. Scale bar, 10 μm. Mean±SEM (n=6 fields). FIGS. 11J-11K show bar graph illustrating the mole percent enrichment (fractional labeling) of intracellular amino acids (FIG. 11J) and TCA cycle intermediates (FIG. 11K) in WT and IKKα-KD KC6141 cells cultured for 24 hrs in 0.5 mM glucose medium on ECM deposited by fibroblasts that were cultured with U-$^{13}$C-glutamine for 6 days (n=3 per condition). Mean±SEM. Statistical significance was determined by a 2-tailed t-test; *p<0.05, p<0.01, *p<0.001, ****p<0.0001.

FIG. 12A shows an image illustrating the gross morphology of the pancreas and pancreatic weight in 8-mo Kras$^{G12D}$;Ikkα$^{\Delta pan}$ mice treated with vehicle or 10 mg/kg EIPA for 1 month.

Scale bars, 100 µm.

FIG. 12N shows a bar graph illustrating the percentage reduction in tumor volume following MRT, EIPA, and MRT and EIPA treatment as in FIG. 12J. Mean±SEM (n=4 mice). Statistical significance in FIGS. 12B 12G, 12I, 12K, 12M, and 12N was determined by a 2-tailed t-test; $p<0.01$, *$p<0.001$, ****$p<0.0001$.

FIG. 13A shows an immunoblot analysis illustrating the expression of free GFP fragment in GFP-LC3 expressing parental (WT) and IKKα-KD MIA PaCa-2 cells incubated in normal or glucose-free medium for 4 hrs. FIG. 13B shows an immunofluorescence staining and quantification illustrating the localization of LC3 puncta in WT and IKKα-KD MIA PaCa-2 cells incubated in normal or starvation (starv.) medium for 2 hrs; the quantification shows that LC3 puncta are significantly enhanced in IKKα-KD MIA PaCa-2 cells when compared to WT cells. Scale bar, 20 µm. Mean±SEM (n=30). Statistical significance was determined by a 2-tailed t-test; *$p<0.05$, $p<0.01$, *$p<0.001$, ****$p<0.0001$.

FIG. 13C shows an immunoblot analysis illustrating the expression of p62, IKKα, and LC3 in WT and IKKα KD MIA PaCa-2 cells incubated in normal or starvation medium for 2 hrs in the absence and presence of CQ. The LC3II/β-actin and p62/β-actin ratios were determined by Image J analysis. FIG. 13D shows an immunoblot analysis illustrating the expression of p62, NRF2, NQO1, and IKKα in human PDAC patient derived xenografts (PDXs) with high and low IKKα expression (#1444, #1424, #AA2105, #Fx00262, #AA1713, #Fx00251p1, #AA1342, #AA1316, #AA1316, #AA2137, #AA0760, #1305, #1334). FIG. 13E shows an immunoblot analysis illustrating the expression of p62, LC3, NRF2, and IKKα in IKKα$^{high}$ (1444) and IKKα$^{low}$ (1305, 1334) human primary PDAC cells derived from above PDXs. FIG. 13F shows an immunofluorescence staining and quantification illustrating the localization of LC3 puncta and NRF2 in IKKα$^{high}$ and IKKα$^{low}$ cells; the quantifications show that the levels of LC3 puncta (n=30 cells) correlated with NRF2 (n=6 fields) nuclear localization as shown on the right. Scale bar 10 µm.

FIG. 13G show an immunoblot analysis illustrating the expression of the free GFP fragment generated in GFP-LC3 transfected 1444 and 1334 cells incubated in normal or glucose-free medium for 4 hrs. The GFP/β-actin ratio was determined by Image J analysis. FIG. 13H an immunoblot analysis illustrating the expression of p62 and LC3 in 1334 cells overexpressing (OE) IKKα incubated in normal or starvation medium for 2 hrs. FIG. 13I shows an immunofluorescence staining and quantification illustrating the localization of LC3 puncta in the cells of FIG. 13H; quantification shows that starvation enhanced LC3 puncta, while IKKα suppressed LC3 puncta. Scale bar, 10 µm. Mean±SEM (n=30). Statistical significance was determined by a 2-tailed t-test; *$p<0.05$, $p<0.01$, *$p<0.001$, ****$p<0.0001$. FIG. 13J shows an immunoblot analysis illustrating the expression of p62 and LC3 in WT and IKKα$^Δ$ 1444 cells incubated in normal or starvation medium for 2 hrs in the presence of CQ. FIG. 13K shows an immunofluorescence staining and quantification illustrating the colocalization GFP-LC3 and LAMP1 in GFP-LC3-stable WT and IKKα-KD MIA PaCa-2 cells incubated in starvation medium for 2 hrs; the quantification of the co-localization coefficients are presented to the right as the percentage of GFP-LC3 puncta positive for LAMP1, and shows that the colocalization is significantly suppressed in IKKα-KD MIA PaCa-2 cell when compared to WT. Scale bar, 10 µm. Mean±SEM (n=30). Statistical significance was determined by a 2-tailed t-test; *$p<0.05$, $p<0.01$, *$p<0.001$, ****$p<0.0001$.

FIGS. 14A-14K show that IKKα binds LC3 to enhance autophagic flux. FIG. 14A shows LC3 interaction (LIR) motifs in human IKKα, and that the LIR motif comprises W/F/Y-X-X-L/I/V. Figure discloses SEQ ID NOS 149-157, respectively, in order of appearance. FIG. 14B shows an immunoblot analysis of a Co-IP assay illustrating the interaction between IKKα, and IKKβ-Flag with GFP-LC3 in co-transfected MIA PaCa-2 cells incubated in the presence or absence of a starvation medium for 2 hrs. FIG. 14C shows an immunoblot analysis of a Co-IP assay illustrating the interaction between STX17, and LC3 with Flag-tagged WT with LIR-mutated IKKα in IKKα$^Δ$ MIA PaCa-2 cells incubated in starvation medium for 2 hrs.

FIG. 14D shows an immunoblot analysis of a Co-IP assay illustrating the interaction between VAMP8, SNAP29-CFP with STX17 in starved WT and IKKα$^Δ$ MIA PaCa-2 cells transiently co-transfected with vector control, WT or LIR-mutated IKKα variants. FIG. 14E shows an immunofluorescence staining and quantification illustrating the subcellular localization of GFP-LC3 puncta, and the colocalization of GFP-LC3 and LAMP1 in GFP-LC3-stable WT and IKKα$^Δ$ MIA PaCa-2 cells treated as in FIG. 14D. The quantification shows that LC3 puncta are enhanced in IKKα$^Δ$ regardless of the LIR variants, but the co-localization coefficients as the percentage of GFP-LC3 puncta positive for LAMP1 was suppressed when compared to WT and parental cells. Mean±SEM (n=30). Statistical significance was determined by a 2-tailed t-test; ****$p<0.0001$. Scale bar, 10 µm. FIG. 14F shows an immunofluorescence staining illustrating the co-localization of LC3 and IKKα in MIA PaCa-2 cells incubated in normal or starvation medium for 2 hrs. Scale bar, 10 µm.

FIG. 14G shows representative images of an immunofluorescence staining and quantification (on the right) illustrating the proximity ligated (red) IKKα and LC3 in WT and IKKα KD MIA PaCa-2 cells in the presence and absence of a starvation medium. Mean f SEM (n=30). Statistical significance was determined by a 2-tailed t-test; ***$p<0.001$. Scale bar, 10 μm. FIG. 14H an immunoblot analysis of a Co-IP assay illustrating the interaction between IKKα with GFP-LC3 in WT and STX17 KD MIA PaCa-2 (MIA) or 1356E cells incubated in starvation medium for 2 hrs. FIG. 14I shows a schematic illustrating a proposed mechanism by which IKKα enhances autophagosome-lysosome fusion. FIG. 14J shows an immunoblot analysis illustrating the expression of p62 and LC3 in COLO 357/FG cells incubated in normal or starvation medium for 2 hrs in the presence or absence of CQ. FIG. 14K shows an immunoblot analysis illustrating the expression of p62 and LC3 in COLO 357/FG cells transfected with IKKα (+/−) and incubated in normal or starvation medium for 2 hrs.

FIG. 15A shows a bar graph illustrating the quantification of MP using TMR-DEX in WT and ATG7A MIA PaCa-2 cells, and that MP are significantly enhanced in ATG7A MIA PaCa-2 cells when compared to WT.

FIG. 15N shows a bar graph of a qRT-PCR analysis illustrating the relative mRNA levels of MP-related genes in PEC isolated from 3-mo Kras$^{G12D}$; Ikkα$^{\Delta PEC}$, and Kras$^{G12D}$;Ikkα$^{\Delta PEC}$;Nfe2/2$^{-/-}$ mice. Results in (A), (C), (H) and (L) (n=10), (B), (F) and (i) (n=6) and (E), (K) and (N) (n=3) are mean±SEM. Statistical significance was determined by a 2-tailed t-test; *$p<0.05$, $p<0.01$, *$p<0.001$, ****$p<0.0001$.

FIGS. 16A-15M shows that NRF2 stimulates MP. FIGS. 16A and 16B show an immunoblot analysis illustrating the expression of MP-related proteins in established human PDAC cell lines (FIG. 16A) and human primary cells (FIG. 16B).

FIGS. 17A-17E show that MP-related gene expression in human PDAC correlated with IKKα, p62 and NRF2 expression. FIG. 17A shows correlation scatter plots illustrating the correlation between the mRNA expression of MP-related genes and SQSTMJ1 or NFE2L2 mRNAs. The p values and Spearman correlation coefficient (r) are indicated. mRNA expression data were procured from TCGA. FIG. 17B shows a table depicting the numbers and percentages of human PDAC tissues (n=100) positive for IKKα, p62, NRF2, NQO1, CDC42, NHE1, and SDC1 (arbitrarily indicated as negative, weak, intermediate or strong).

FIGS. 17C-17E show tables depicting the correlation between the MP proteins CDC42 (FIG. 17C), SDC1 (FIG. 17D) and NHE1 (FIG. 17E)) and the IKKα/p62/NRF2 status analyzed by a Chi-square test; *p<0.05, **p<0.01. A human PDAC tissue array was analyzed by immunohistochemistry (IHC) for IKKα, p62, NRF2 and MP-related proteins in parallel sections. FIG. 17F shows a table depicting the locations of potential NRF2 binding sites relative to the transcriptional start site (TSS, +1) in the MP-related human genes PIK3CG, SNX5, CDC42, PAK1, NHE1, EGF, PDGFB, and SDC1.

FIG. 18A shows a gel electrophoresis of PCR-amplified promoter DNA fragments containing NRF2 binding sites (AREs) from ChIP assays illustrating the recruitment of NRF2 to the NHE1, CDC42, PIK3CG, SDC1, and EGF promoters in WT, ATG7$^\Delta$, and ATG7$^\Delta$;p62 KD MIA PaCa-2 cells.

FIG. 18N shows an immunoblot analysis illustrating the expression of MP-related proteins in WT, p62$^\Delta$ MIA PaCa-2 cells of FIG. 18L.

FIG. 19A shows a graph illustrating the suppression of cell viability in WT and IKKα$^{66}$ 1444 cells that were cultured in complete medium containing the NHE1 inhibitor EIPA (10.5 μM) when compared to control. Total viable cells were measured with the CCK-8 assay after 0, 1, 2, 3 and 4 days. Data are presented relative to the day 0 value.

FIG. 19Q shows an immunoblot analysis illustrating the expression of CDC42 protein in the IKKα^Δ MIA PaCa-2 cells lacking the CDC42 gene (CDC42 KD1; CDC42 KD2) of FIG. 19N. Results in FIGS. 19A, 19B, 19D-19H, 19J, 19L and 19M are mean±SEM (n=3 independent experiments). Statistical significance was determined by a 2-tailed t-test. *$p<0.05$, $p<0.01$, *$p<0.001$, ****$p<0.0001$.

FIG. 20A shows an immunofluorescence staining illustrating the co-localization of macropinosomes (TMR-DEX) and DQ-BSA, and the co-localization of LC3 and LAMP1 in MIA PaCa-2 cells treated with 10 μM, 20 μM, 40 μM, and 80 μM HCQ.

FIG. 20K shows an H&E-stained pancreatic sections from C57BL/6 mice orthotopically transplanted with WT, Cdc42 KD, Pik3cg KD, Ikkα KD, Ikkα KD; Cdc42 KD, and Ikkα KD; Pik3cg KD KC6141 cells. Scale bars, 100 μm. Statistical significance in FIGS. 20B, 20D-20J, and 20M was determined by a 2-tailed t-test; *$p<0.05$, $p<0.01$, *$p<0.001$, ****$p<0.0001$.

DETAILED DESCRIPTION

Figure 1D:
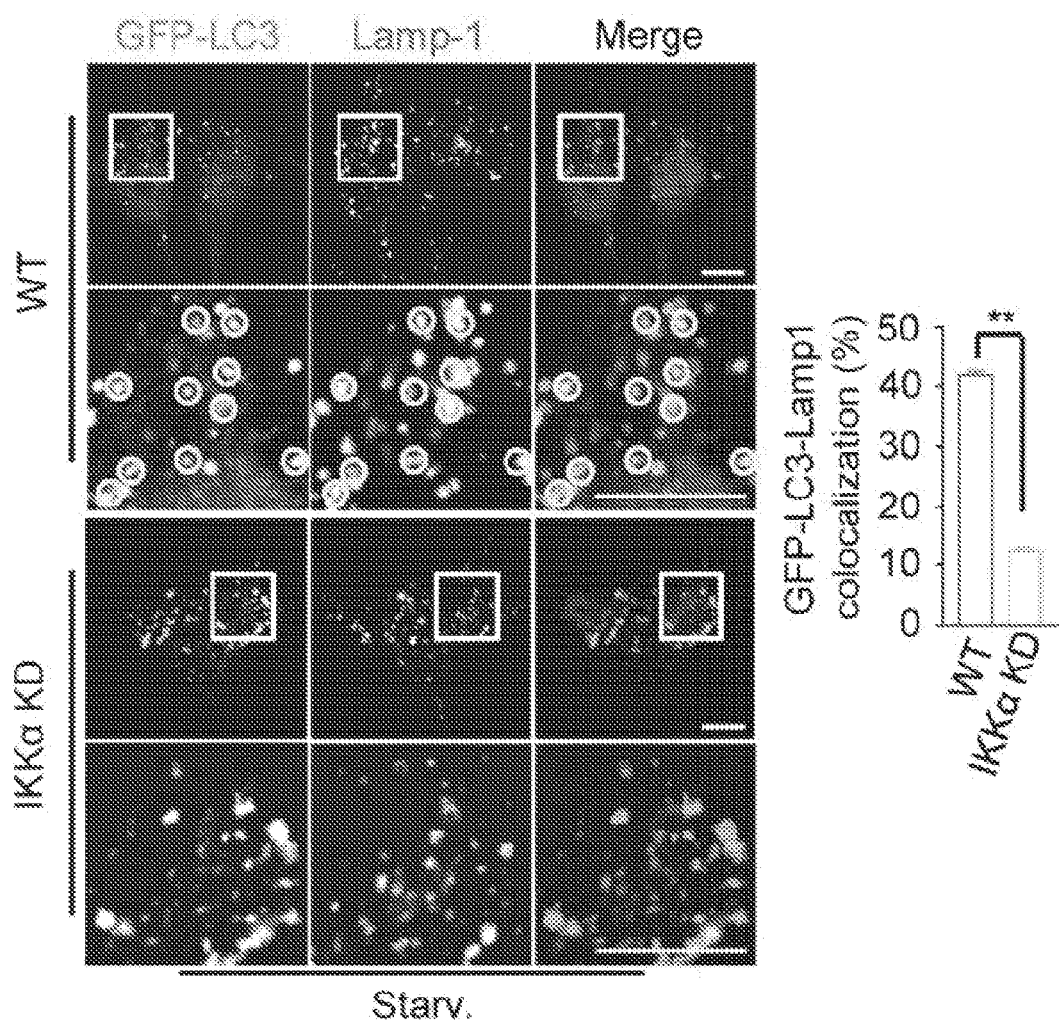

In one aspect, the present disclosure relates to Applicant's finding that a combination of an inhibitor of macropinocytosis upregulation and an autophagy inhibitor can induce cell death of pancreatic ductal adenocarcinoma and other cancers.

Before the present compositions and methods are described, it is to be understood that this disclosure is not limited to particular compositions, methods, and experimental conditions described, as such compositions, methods, and conditions may vary. It is also to be understood that the terminology used herein is for purposes of describing particular embodiments only, and is not intended to be limiting, since the scope of the present disclosure will be limited only in the appended claims.

Definitions

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

As use herein, the term "comprising," which is used interchangeably with "including," "containing," or "characterized by," is inclusive or open-ended language and does not exclude additional, unrecited elements or method steps. As use herein, the phrase "consisting of" excludes any element, step, or ingredient not specified in the claim. As use herein, the phrase "consisting essentially of" limits the scope of a claim to the specified materials or steps and those that do not materially affect the basic and novel characteristics of the claimed invention. The present disclosure contemplates embodiments of the disclosure compositions and methods corresponding to the scope of each of these phrases. Thus, a composition or method comprising recited elements or steps contemplates particular embodiments in which the composition or method consists essentially of or consists of those elements or steps.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the invention, the preferred methods and materials are now described.

As use herein, the term "subject" refers to any individual or patient to which the subject methods are performed. Generally the subject is human, although as will be appreciated by those in the art, the subject may be an animal. Thus other animals, including mammals such as rodents (including mice, rats, hamsters and guinea pigs), cats, dogs, rabbits, farm animals including cows, horses, goats, sheep, pigs, etc., and primates (including monkeys, chimpanzees, orangutans and gorillas) are included within the definition of subject.

As use herein, "a subject in need" of treatment with the invention's methods includes a subject that is "suffering from disease," i.e., a subject that is experiencing and/or exhibiting one or more symptoms of the disease, and a subject "at risk" of the disease. A subject "in need" of treatment includes animal models of the disease. As use herein, "a subject at risk" of disease refers to a subject that is not currently exhibiting disease symptoms and is predisposed to expressing one or more symptoms of the disease. This predisposition may be genetic based on family history, genetic factors, environmental factors such as exposure to detrimental compounds present in the environment, etc.). It is not intended that the present disclosure be limited to any particular signs or symptoms. Thus, it is intended that the present disclosure encompass subjects that are experiencing any range of disease, from sub-clinical symptoms to full-blown disease, wherein the subject exhibits at least one of the indicia (e.g., signs and symptoms) associated with the disease.

As used herein, a "non-human mammal" may be any animal as long as it is other than human, and includes a transgenic animal and animals for which a production method of ES cells and/or iPS cells has been established. For example, rodents such as mouse, rat, hamster, guinea pig, rabbit, swine, bovine, goat, horse, sheep, dog, cat, or monkey are envisioned as non-human mammals.

As use herein, the term "administering" to a subject means delivering a molecule, drug, or composition to a subject. In some embodiments, "administering" a composition to a subject in need of reducing a disease and/or of reducing one or more disease symptoms includes prophylactic administration of the composition (i.e., before the disease and/or one or more symptoms of the disease are detectable) and/or therapeutic administration of the composition (i.e., after the disease and/or one or more symptoms of the disease are detectable). In some embodiments, when the methods described herein include administering a combination of a first composition and a second composition, the first and second compositions may be administered simultaneously at substantially the same time. In some embodiments, the first and second compositions may be administered sequentially at different times in any order (first composition followed second composition, or second composition followed by first composition). In some embodiments, administering the second composition substantially simultaneously and sequentially in any order includes, for example, (a) administering the first and second compositions simultaneously at substantially the same time, followed by administering the first composition then the second composition at different times, (b) administering the first and second compositions simultaneously at substantially the same time, followed by administering the second composition then the first composition at different times, (c) administering the first composition then the second composition at different times, followed by administering the first and second compositions simultaneously at substantially the same time, and (d) administering the second composition then the first composition at different times, followed by administering the first and second compositions simultaneously at substantially the same time.

As used herein, an "effective amount" is an amount of a substance or molecule sufficient to effect beneficial or desired clinical results including alleviation or reduction in any one or more of the symptoms associated with cancer. In some embodiments, an effective amount of a compound or molecule of the disclosure is an amount sufficient to reduce the signs and symptoms associated with cancer and/or to induce expression of one or more genes associated with cell surface antigens. As is apparent to the skilled artisan, an effective amount is administered to the subject in need of such therapy.

As use herein, the terms "reduce," "inhibit," "diminish," "suppress," "decrease," and grammatical equivalents when used in reference to the level of any molecule (e.g., amino acid sequence, and nucleic acid sequence, antibody, etc.), cell (e.g., B cell, T cell, tumor cell), and/or phenomenon (e.g., disease symptom), in a first sample (or in a first subject) relative to a second sample (or relative to a second subject), mean that the quantity of molecule, cell and/or phenomenon in the first sample (or in the first subject) is lower than in the second sample (or in the second subject) by any amount that is statistically significant using any art-accepted statistical method of analysis.

As use herein, the terms "increase," "elevate," "raise," and grammatical equivalents (including "higher," "greater," etc.) when used in reference to the level of any molecule (e.g., amino acid sequence, and nucleic acid sequence, antibody, etc.), cell (e.g., B cell, T cell, tumor cell), and/or phenomenon (e.g., disease symptom), in a first sample (or in a first subject) relative to a second sample (or relative to a second subject), mean that the quantity of the molecule, cell and/or phenomenon in the first sample (or in the first subject) is higher than in the second sample (or in the second subject) by any amount that is statistically significant using any art-accepted statistical method of analysis.

The effect may be prophylactic in terms of completely or partially preventing a disorder or sign or symptom thereof, and/or may be therapeutic in terms of amelioration of the symptoms of the disease or infection, or a partial or complete cure for a disorder and/or adverse effect attributable to the disorder. In some embodiments, the term "treatment" excludes prophylaxis.

As used herein, to "treat" further includes systemic amelioration of the symptoms associated with the pathology and/or a delay in onset of symptoms. Clinical and subclinical evidence of "treatment" will vary with the pathology, the individual and the treatment. In some embodiments, treatment excludes prophylaxis.

As used herein, "treatment" is an approach for obtaining beneficial or desired clinical results. In some embodiments, beneficial or desired clinical results include, but are not limited to, treatment of cancer, such as pancreatic ductal adenocarcinoma (PDAC). Treatment can therefore result in decreasing, reducing, inhibiting, suppressing, limiting, controlling or preventing a disease or condition, or an associated symptom or consequence, or underlying cause; decreasing, reducing, inhibiting, suppressing, limiting, controlling or preventing a progression or worsening of a disease, condition, symptom or consequence, or underlying cause; or further deterioration or occurrence of one or more additional symptoms of the disease condition, or symptom. Thus, a successful treatment outcome leads to a "therapeutic effect," or "benefit" of decreasing, reducing, inhibiting, suppressing, limiting, controlling or preventing the occurrence, frequency, severity, progression, or duration of one or more symptoms or underlying causes or consequences of a condition, disease or symptom in the subject, such as one or more adverse symptoms, disorders, illnesses, pathologies, diseases, or complications caused by or associated with a disease or condition. Treatment methods affecting one or more underlying causes of the condition, disease or symptom are therefore considered to be beneficial. Stabilizing a disorder or condition is also a successful treatment outcome.

A therapeutic benefit or improvement therefore need not be complete ablation of any one, most or all symptoms, complications, consequences or underlying causes associated with the condition, disorder or disease. Thus, a satisfactory endpoint is achieved when there is an incremental improvement in a subject's condition, or a partial decrease, reduction, inhibition, suppression, limit, control or prevention in the occurrence, frequency, severity, progression, or duration, or inhibition or reversal, of one or more associated adverse symptoms or complications or consequences or underlying causes, worsening or progression (e.g., stabilizing one or more symptoms or complications of the condition, disorder or disease), of one or more of the physiological, biochemical or cellular manifestations or characteristics of the disorder or disease, such as one or more adverse symptoms, disorders, illnesses, pathologies, diseases, or complications caused by or associated with the disease or condition, over a short or long duration of time (hours, days, weeks, months, etc.). In some embodiments, prophylaxis or prevention is excluded from "treatment" or "therapeutic benefit."

As used herein, the term "ameliorate" means a detectable improvement in a subject's condition. A detectable improvement includes a subjective or objective decrease, reduction, inhibition, suppression, limit or control in the occurrence, frequency, severity, progression, or duration of a symptom caused by or associated with a disease or condition, such as one or more adverse symptoms, disorders, illnesses, pathologies, diseases, or complications caused by or associated with the disease or condition, or an improvement in an underlying cause or a consequence of the disease or condition, or a reversal of the disease or condition.

As used herein, the term "cancer cell" refers to a cell undergoing early, intermediate or advanced stages of multi-step neoplastic progression as previously described (Pitot et al., Fundamentals of Oncology, 15-28 (1978)). This includes cells in early, intermediate and advanced stages of neoplastic progression including "pre-neoplastic" cells (i.e., "hyperplastic" cells and dysplastic cells), and neoplastic cells in advanced stages of neoplastic progression of a dysplastic cell. As used herein, a "metastatic" cancer cell refers to a cancer cell that is translocated from a primary cancer site (i.e., a location where the cancer cell initially formed from a normal, hyperplastic or dysplastic cell) to a site other than the primary site, where the translocated cancer cell lodges and proliferates.

As used herein, the term "cancer" refers to a plurality of cancer cells that may or may not be metastatic, such as prostate cancer, liver cancer, bladder cancer, skin cancer (e.g., cutaneous, melanoma, basal cell carcinoma, Kaposi's sarcoma, etc.), ovarian cancer, breast cancer, lung cancer, cervical cancer, pancreatic cancer, colon cancer, stomach cancer, esophageal cancer, mouth cancer, tongue cancer, gum cancer, muscle cancer, heart cancer, bronchial cancer, testis cancer, kidney cancer, endometrium cancer, and uterus cancer. In some embodiments, a cancer may be a primary cancer, a recurrent cancer, and/or metastatic cancer. In some embodiments, the place where a cancer starts in the body is called the "primary cancer" or "primary site." In some embodiments, if cancer cells spread to another part of the body the new area of cancer is called a "secondary cancer" or a "metastasis."

As use herein, "recurrent cancer" means the presence of cancer after treatment and after a period of time during which the cancer cannot be detected. The same cancer may be detected at the primary site or somewhere else in the body, e.g., as a metastasis.

As used herein, the term "genetic modification" is used to refer to any manipulation of an organism's genetic material in a way that does not occur under natural conditions. Methods of performing such manipulations are known to those of ordinary skill in the art and include, but are not limited to, techniques that make use of vectors for transforming cells with a nucleic acid sequence of interest. Included in the definition are various forms of gene editing in which DNA is inserted, deleted or replaced in the genome of a living organism using engineered nucleases, or "molecular scissors." These nucleases create site-specific double-strand breaks (DSBs) at desired locations in the genome. The induced double-strand breaks are repaired through nonhomologous end-joining (NHEJ) or homologous recombination (HR), resulting in targeted mutations (i.e., edits). There are several families of engineered nucleases used in gene editing, for example, but not limited to, meganucleases, zinc finger nucleases (ZFNs), transcription activator-like effector-based nucleases (TALEN), and the CRISPR-Cas system.

As used herein, the term "test agent" or "candidate agent" refers to an agent that is to be screened in one or more of the assays described herein. The agent can be virtually any chemical compound. It can exist as a single isolated compound or can be a member of a chemical (e.g., combinatorial) library. In one embodiment, the test agent is a small organic molecule. As use herein, the term small organic molecule refers to any molecules of a size comparable to those organic molecules generally used in pharmaceuticals. The term excludes biological macromolecules (e.g., proteins, nucleic acids, etc.). In some embodiments, small organic molecules range in size up to about 5000 Da, up to 2000 Da, or up to about 1000 Da.

As used herein, the terms "sample" and "biological sample" refer to any sample suitable for the methods provided by the present invention. In one embodiment, the biological sample of the present disclosure is a tissue sample, e.g., a biopsy specimen such as samples from needle biopsy (i.e., biopsy sample). In other embodiments, the biological sample of the present disclosure is a sample of bodily fluid, e.g., serum, plasma, sputum, lung aspirate, urine, and ejaculate.

As use herein, the term "antibody" is meant to include intact molecules of polyclonal or monoclonal antibodies, chimeric, single chain, and humanized antibodies, as well as fragments thereof, such as Fab and F(ab')2, Fv and SCA fragments which are capable of binding an epitopic determinant. Monoclonal antibodies are made from antigen containing fragments of the protein by methods well known to those skilled in the art (Kohler, et al., Nature, 256:495, 1975). A Fab fragment consists of a monovalent antigen binding fragment of an antibody molecule, and can be produced by digestion of a whole antibody molecule with the enzyme papain, to yield a fragment consisting of an intact light chain and a portion of a heavy chain. A Fab' fragment of an antibody molecule can be obtained by treating a whole antibody molecule with pepsin, followed by reduction, to yield a molecule consisting of an intact light chain and a portion of a heavy chain. Two Fab' fragments are obtained per antibody molecule treated in this manner. A (Fab')2 fragment of an antibody can be obtained by treating a whole antibody molecule with the enzyme pepsin, without subsequent reduction. A (Fab')2 fragment is a dimer of two Fab' fragments, held together by two disulfide bonds. An Fv fragment is defined as a genetically engineered fragment containing the variable region of a light chain and the variable region of a heavy chain expressed as two chains. A single chain antibody ("SCA") is a genetically engineered single chain molecule containing the variable region of a light chain and the variable region of a heavy chain, linked by a suitable, flexible polypeptide linker.

As use herein, the terms "normal cells" or "corresponding normal cells" mean cells that are from the same organ and of the same type as any of the above-mentioned disease cell type. In some embodiments, the corresponding normal cells comprise a sample of cells obtained from a healthy individual. Such corresponding normal cells can, but need not be, from an individual that is age-matched and/or of the same sex as the individual providing the above-mentioned disease cells being examined. In some embodiments, the corresponding normal cells comprise a sample of cells obtained from an otherwise healthy portion of tissue of a subject having a macrophage-mediated inflammatory and/or degenerative disease.

As use herein, the term "lysosome" means acidic organelles with degradative potential and a layer of glycosylation on the luminal side of its membrane that is essential for protein degradation and autophagy regulation. In some embodiments, the lysosome comprises about 60 lysosomal hydrolases that work in unison to digest sequestered material targeted for degradation. In some embodiments, most lysosomal enzymes function only under acidic pH optima, which make their function reliant on efficient acidification of the lysosomes. The pH of lysosome is below 4.5 (pH<4.5). The correct acidification (pH<4.5) is critical for lysosomal proteolytic activity. Poor lysosomal acidification is the primary cause of impaired autophagy in numerous diseases that are not apparently related to autophagy protein. In some embodiments, the diseases comprise, consists essentially of, or yet further consists of cancer, inflammatory diseases, neurodegenerative disorders, cardiovascular disorders, diabetes and viral infections. In some embodiments, lysosomal re-acidification by treatment with acidic nanoparticles, drugs or by mTOR inhibition restore autophagic flux. In some embodiments, autophagy activation enhances lysosomal acidification.

Modes for Carrying Out the Disclosure

Autophagy

Autophagy is an evolutionarily conserved, quality control process that maintains cellular homeostasis (Green and Levine, 2014; Levine and Kroemer, 2019) and suppresses tumor initiation (Gozuacik and Kimchi, 2004; Levine, 2007; Nassour et al., 2019; Umemura et al., 2016). Paradoxically, autophagy is upregulated in established cancers, supporting their high metabolic rates and energetic demands by releasing amino acids (AA) and other components from lysosome degraded intracellular macromolecules (Onodera and Ohsumi, 2005). These findings imply that autophagy inhibition should cause tumor starvation and regression. However, chloroquine (CQ) and hydroxychloroquine (HCQ), which disrupt lysosomal acidification and manifest anti-cancer activity in mice (Yang et al., 2011), have not improved overall patient survival when combined with chemotherapy (Karasic et al., 2019). Specific blockade of autophagy initiation was also ineffective, unless combined with ERK or MEK inhibition (Bryant et al., 2019; Kinsey et al., 2019). Therapeutic autophagy inhibition has been of particular interest in pancreatic ductal adenocarcinoma (PDAC), the most common and lethal pancreatic malignancy (Ying et al., 2016). Most PDACs, often detected at an advanced metastatic stage, express high levels of autophagy and lysosome biosynthesis genes, correlating with MIT/TFE transcription factor upregulation (Perera et al., 2015). These findings further suggest that uninterrupted autophagy promotes PDAC growth and survival (Bryant and Der, 2019), a concept established in mouse models (Yang et al., 2014).

Macropinocytosis

Macropinocytosis is the engulfment and uptake process of large amounts of fluids and membranes. In other words, it is the utilization of extracellular proteins as nutrients by various cell types. It occurs by actin-dependent membrane protrusion and retraction, and results in large intracellular vacuoles (>0.2 μM), referred to as macropinosomes, which can mature to late endosomes. Constitutive macropinocytosis contributes to antigen presentation in macrophages and dendritic cells, and is widely exploited by pathogens to modulate the immune response. Macropinocytosis is an important nutrient-scavenging pathway in numerous cancer types, particularly in tumors with activated Ras, including pancreatic, lung, prostate, and bladder. In fact, PDAC almost always are initiated by KRAS mutations.

When sufficient amounts of soluble extracellular proteins are available, tumors easily tolerate insufficient autophagy-dependent protein degradation by switching on an alternative survival pathway-MP. This allows them to shift their dependence on digested internal proteins to the uptake and subsequent digestion of external proteins. Inhibition of MP in autophagy-deficient pancreatic ductal adenocarcinoma (PDAC) or a combined treatment with autophagy and MP inhibitors resulted in strong attenuation of tumor growth and almost complete elimination of established, aggressive and metastatic PDAC in mice.

PDACs are almost always initiated by KRAS mutations and harbor several other dominant genetic alterations (Ying et al., 2016). Oncogenic KRAS signaling to phosphoinositide 3 kinase (PI3K) post-translationally activates another nutrient procurement pathway, macropinocytosis (MP), in which cancer cells take up extracellular fluid droplets containing proteins and other macromolecules (Recouvreux and Commisso, 2017). Like autophagy, MP is an evolutionarily conserved and lysosome-dependent degradation pathway (Bloomfield and Kay, 2016; King and Kay, 2019). However, how any MP-enabled organism, including cancer cells, coordinately regulates and balances the autophagy and MP programs is unknown, although this conundrum was recently discussed (Florey and Overholtzer, 2019).

Autophagy to MP Switch as Novel Therapeutic Target for Homeostatic Disorders

Here, while investigating the regulation of autophagic flux in human PDAC, Applicant discovered that autophagy inhibition makes PDAC cells switch from autophagic degradation and metabolism of intracellular components to utilization of extracellular proteins taken-up via MP. This autophagy to MP switch was previously unknown and depends on the conserved pathway of p62/SQSTM1 accumulation, KEAP1 titration and NRF2 activation. NRF2 serves as the central transcriptional activator of the MP program and its nuclear accumulation in PDAC correlates with increased expression of critical MP proteins. Dual blockade of autophagy initiation and MP resulted in robust tumor regression.

Accordingly, the present disclosure revealed an important mechanistic coupling between the autophagy and MP programs. Autophagy enabled scavenging of nutrients from lysosome digested endogenous proteins and organelles and MP mediated fluid-phase uptake of exogenous proteins that are used as an amino acid and energy source by autophagy-compromised cells. In some embodiments, autophagy blockade strongly stimulated MP, explaining why autophagy inhibition alone does not cause effective tumor starvation and regression as long as exogenous nutrients are plentiful. In some embodiments, the master regulator linking autophagy inhibition to MP activation is NRF2. Although NRF2 maintains proteostasis in autophagy-deficient cells by inducing proteasome subunits (Towers et al., 2019), its role in MP was not known. In some embodiments, by stimulating MP, NRF2 allowed autophagy-inhibited cancer cells to meet their energetic demands through lysosomal, rather than proteasomal, degradation of external proteins, such as albumin or ECM components. In some embodiments, concurrent autophagy and MP blockade effectively cuts off the cancer cell's energy supply and triggers rapid tumor regression.

Autophagy and MP are linked via the p62/SQSTM1-KEAP1-NRF2 module; inhibition of autophagy results in accumulation of the autophagy adaptor and signaling protein p62, which by sequestering KEAP1 activates NRF2. Nuclear NRF2 binds to the promoters of key MP-controlling genes, including NHE1, SDC1, CDC42 and PIK3CG, and stimulates their transcription independently of oncogenic RAS-RAF signaling. Curiously, the fly CDC42, NHE1, SDC1 and PIK3CG homologs also contain antioxidant response elements (AREs) and the fly NRF2 homolog CncC can stimulate MP in the fat body (E. Baehrecke, P. Velentzas, H. Su and M. Karin, unpublished data). Given the conserved nature of the p62/SQSTM1-KEAP1-NRF2 module, present in two MP-competent organisms (King and Kay, 2019), Drosophila melanogaster (Jain et al., 2015) and Dictyostelium discoideum (Mantzouranis et al., 2010; Mesquita et al., 2017), without being bound by theory, Applicant the ability of NRF2 to activate MP extends beyond cancer and may not be exclusive to mammals. Thus, in one aspect, the present disclosure provides a method of treating homeostatic disorders. Mutational activation of NRF2 in lung cancer also stimulates MP and by analyzing 100 human PDAC specimens. High p62 expression and NRF2 activation strongly was found to correlate with upregulation of MP-related proteins, which further supported the role of NRF2 as a key transcriptional activator of the MP program. Thus, in some embodiments, the present disclosure provide a method of treating lung cancer and inhibiting the growth of a lung cancer cell.

Human PDACs that are IKKα$^{low}$ and NRF2$^{high}$ are autophagy-deficient and MP-elevated. But even IKKα$^{high}$ PDACs can exhibit elevated MP, as long as they are NRF2$^{high}$. Ex vivo studies shown in the examples below suggest that NRF2 activation by oxidative stress and/or hypoxia may account for MP upregulation in such tumors. Given that KRAS stimulates NFE2L2 mRNA expression (some of the effect of RAS-RAF signaling on MP activity may be NRF2 mediated). However, cancers with inactive NRF2 may be incapable of switching from autophagy to MP. Although MP-high PDACs (such as 1334 tumors) may regress upon MP blockade alone, from a translational perspective it is preferable to treat such tumors (such as MP-low 1444 tumors) and other adenocarcinomas with a combination of autophagy and MP inhibitors. Although lysosomotropic drugs should inhibit both autophagy and MP, the experiments in the present disclosure show that due to p62 accumulation, NRF2 activation and MP protein induction, such an outcome is only achieved at high HCQ concentrations that are clinically unattainable due to cardiotoxicity. In some embodiments, more promising and potent autophagy inhibitors contemplated by the present disclosure are Unc-51 like autophagy activating kinase 1 (ULK1) inhibitors (Chaikuad et al., 2019; Egan et al., 2015; Martin et al., 2018), even though they may have some off-target effects, but highly specific and potent MP inhibitors are missing from the anti-cancer armamentarium. Thus, in some embodiments, the present disclosure contemplates selective MP inhibitors for the treatment of homeostasis disorders. In some embodiments, the method of treatment contemplated by the present disclosure relies on inhibition of MP with approved PI3K or MEK/ERK inhibitors. Indeed, recent studies show that combination of HCQ/CQ or ULK1 inhibitors with MEK/ERK inhibitors can result in PDAC regression (Bryant et al., 2019; Kinsey et al., 2019). Although PI3K and MEK/ERK inhibitors have pleiotropic effects, MP inhibition can be an important component of their anti-cancer activity.

Established cancers, including pancreatic ductal adenocarcinoma (PDAC), display high autophagy rates enabling them to extract amino acids (AA) and energy from intracellular proteins. Curiously, a subset of PDACs lacking IκB kinase α (IKKα), an important regulator of autophagosome-lysosome fusion, retain proliferative capacity despite being unable to complete autophagy. It was found that IKKα downregulation or any inhibition of autophagy in established PDAC activates an alternative nutrient supply pathway: macropinocytosis (MP) that allows tumors to procure AAs and energy from extracellular proteins. The autophagy to MP switch depends on activation of transcription factor NRF2 by the autophagy substrate and adaptor p62/SQSTM1. Inhibition of MP in autophagy-compromised PDAC results in dramatic tumor regression, demonstrating the value of combining autophagy and MP inhibitors.

As demonstrated herein, autophagy is functionally suppressed in a subset (25%) of human pancreatic ductal adenocarcinomas (PDACs). As such, it was investigated how such tumors overcome insufficient autophagy to obtain nutrients. PDAC, the most common pancreatic cancer, is a highly aggressive solid malignancy that is commonly detected at an advanced metastatic stage, unsuitable for surgery[7]. Many advanced PDACs show elevated expression of autophagy-related and lysosomal biosynthesis genes, correlating with upregulation of MIT/TFE transcription factors[8]. These findings are consistent with the notion that autophagy supports PDAC growth and survival by providing cancer cells with essential AAs and other building blocks and that its inhibition should starve the growing tumor and trigger its regression[9]. Although mouse modeling experiments support this concept[10], autophagy inhibition with lysosome-targeting agents has not been overly successful in the clinic[3].

Unlike many other cancers, PDACs are characterized by four dominant genetic alterations (KRAS gain of function and TP53, CDKN2A and SMAD4 inactivation) and almost always are initiated by KRAS mutations[7]. Yet, KRAS mutations alone, give rise to low-grade pancreatic intraepithelial neoplasia (PanIN) that rarely progresses to cancer. The progression from low-grade PanIN to invasive PDAC remains poorly understood but PDAC risk is elevated in the setting of certain environmental and lifestyle factors, including tobacco smoking and excessive alcohol consumption and also in the context of obesity, type-2 diabetes, chronic pancreatitis and old age[11, 12]. Many of these factors interfere with either the initiation or the completion of autophagy[13]. As in humans, mice expressing an oncogenic Kras$^{G12D}$ allele in pancreatic epithelial cells (PEC), hereafter termed Kras$^{G12D/PEC}$, rarely progress to overt PDAC without pancreatic injury or stress to the background tissue[14]. Malignant progression in Kras$^{G12D/PEC}$ mice, whose pancreata harbor low-grade PanIN1 lesions, is also accelerated by downregulation of genes whose products control autophagy[15-17].

Starting with the observation that a fraction of human PDACs that are deficient in IKKα display defective autophagy as manifested by p62 accumulation, it was observed that this is of relevance to all PDACs and probably to all oncogenic KRAS-expressing cancers that rely on autophagy for survival. When sufficient amounts of soluble extracellular proteins are available, such tumors easily tolerate insufficient autophagy-dependent protein degradation by switching on an alternative survival pathway-MP. This allows them to shift their dependence on digested internal proteins to the uptake and subsequent digestion of external proteins. Of note, although MP was identified as a response activated by oncogenic KRAS signaling[19], it was found that inhibition of autophagy results in a further several hundred-fold increase in expression of MP-related genes through the p62-NRF2 module, that is invariantly activated in autophagy-deficient cells[32, 33]. Remarkably, NRF2 activation stimulates MP by inducing expression of key MP-related proteins even in cells lacking oncogenic KRAS. Importantly, inhibition of MP in autophagy-deficient PDAC or a combined treatment with autophagy and MP inhibitors results in strong attenuation of tumor growth and almost complete elimination of established, aggressive and metastatic PDAC in mice.

Cancer Cell Death Induction

The present disclosure provides a method of inducing cell death of a cancer cell. The method comprises or consist essentially of, contacting a cancer cell with an inhibitor of macropinocytosis upregulation and contacting the cancer cell with an autophagy inhibitor, thereby inducing cell death of the cancer cell. The contacting can be sequential or concurrent. The contacting can be ex vivo, in vitro or in vivo.

As use herein, the term "autophagy" refers to a catabolic process where cellular components are targeted for degradation by enclosing them in double-membrane vesicles (autophagosomes) that are fused with the protease-containing lysosomes. Autophagy comprises three mechanisms: macroautophagy, chaperone-mediated autophagy (CMA), and microautophagy. In some embodiments, autophagy is a mean for maintaining cellular function and homeostasis by handling damaged organelles and misfolded proteins. Autophagy is also a way of recirculating cellular content into new building blocks (Boya et al., Nat. Cell. Biol. 15: 713-720 (2013)). Autophagy is critical for the maintenance of cell viability under stress condition. In some embodiments, autophagy also refers to a cellular response to stressful conditions comprising, or consisting essentially of, or yet further consisting of nutrient deprivation, acidosis, hypoxia and drug treatment. Starvation and other threats to cellular homeostasis strongly induce autophagy to acquire nutrients by recycling non-essential material or to eliminate harmful material.

In some embodiments, autophagy is measured using a lipidated LC3 protein, which redistribute into autophagic puncta inside the autophagosome. In some embodiments, autophagy inhibition is a means to potentiate cancer drugs and/or resensitize drug resistant tumors (Nagelkerke et al., Semin. Cancer Biol. 31:99-105 (2014). Most advanced tumors show a high upregulation of autophagic flux (Leone et al. Trends in Endocrin. Metab. 24; 209-217 (2013)). Cancer that can be treated by inhibiting autophagy pathway include, but are not limited to, triple negative breast cancer, pancreatic cancer, leukemia, melanoma and lung cancer. In some embodiment, autophagy is highly activated in pancreatic ductal adenocarcinoma (PDAC) cells and autophagy requirement for tumor maintenance is well-established.

As use herein, the term "macropinocytosis" refers to a highly conserved endocytic process by which extracellular fluid and its contents (i.e. nutrients, proteins) are internalized into cells via large, heterogeneous vesicles known as macropinosomes. Internalized proteins undergo proteolytic degradation, yielding amino acids including glutamine that can enter central carbon metabolism. In some embodiments, macropinosomes are detected using tetramethylrhodamine-labeled high molecular weight dextran (TMR-dextran) that is internalized from the extracellular medium into macropinosome. In some embodiments, macropinocytosis is an alternative nutrient procurement pathway used by cancer cells to obtain nutrient from the environment. In some embodiments, the other pathways comprise, or consist essentially of, or yet further consist of: (1) uptake via a cell membrane protein such as an amino acid or glucose transport channel, or transporter, (2) low-density lipoprotein (LDL) import via LDL receptors, or autophagy.

In some embodiments, the cancer cell is a cell from breast cancer, triple negative breast cancer, non-small-cell lung cancer, pancreatic cancer, leukemia, melanoma, colorectal cancer, bladder cancer, lung cancer, or pancreatic ductal adenocarcinoma (PDAC). In some embodiments, the cancer cell is PDAC cells. PDAC cells are characterized by four dominant genetic alterations (KRAS gain of function and TP53, CDKN2A and SMAD4 inactivation) and almost always are initiated by KRAS mutations[7]. Yet, KRAS mutations alone, give rise to low-grade pancreatic intraepithelial neoplasia (PanIN) that rarely progresses to cancer. The progression from low-grade PanIN to invasive PDAC remains poorly understood, but PDAC risk is elevated in the setting of certain environmental and lifestyle factors, including tobacco smoking and excessive alcohol consumption and also in the context of obesity, type-2 diabetes, chronic pancreatitis and old age[11, 12]. Many of these factors interfere with either the initiation or the completion of autophagy[13]. As in humans, mice expressing an oncogenic Kras$^{G12D}$ allele in pancreatic epithelial cells (PEC), hereafter termed Kras$^{G12D/PEC}$, rarely progress to overt PDAC without pancreatic injury or stress to the background tissue[14]. Malignant progression in Kra$^{G12D/PEC}$ mice, whose pancreata harbor low-grade PanIN1 lesions, is also accelerated by downregulation of genes whose products control autophagy[15-17]. Although PEC-specific Atg7 ablation enhanced formation of advanced PanIN3 lesions, further progression was blocked due to tumor suppressor p53 accumulation[15]. In contrast, PEC-specific ablation of Ikkα, whose product IκB kinase α (IKKα) maintains autophagic flux through an unknown mechanism[18], led to appearance of aggressive and metastatic PDAC[16]. A considerable fraction (25%) of human PDACs are IKKα-deficient and display signs of defective autophagy. In some embodiments, the cancer cell is a mammalian cell such as a human cell, a primate cell or a non-human cell.

In some embodiments, the autophagy inhibitor is selected from ULK1 inhibitors, Vps34 inhibitors, Bcl2 inhibitor, PI3K inhibitor, vacuolar type H(+)-ATPase inhibitors, lysosome inhibitors, Ikkα inhibitors, or autophagy flux inhibitors. In some embodiments, the ULK1 inhibitor comprises MRT68921 dihydrochloride, ULK-100, ULK-101, DCC-3116, or SBI-0206965. In some embodiments, the VPS34 inhibitor comprises SAR405, Vps34-inhibitor 1 (Vps34-IN1; PIK-II), or 3-methyladenine (3-MA). In some embodiments, the Bcl2 inhibitor comprises ABT-737. In some embodiments, the PI3K inhibitor comprises 3-Methyladenine (3-MA), and LY294002. In some embodiments, the vacuolar type H(+)-ATPase inhibitors comprises bafilomycin A1 (Baf A1). In some embodiments, lysosome inhibitor comprises Chloroquine (CQ), hydroxychloroquine (HCQ), obatoclax, or Quinacrine. In some embodiments, the Ikkα inhibitors comprises SU1261. In some embodiments, the autophagy flux inhibitor comprises Clarithromycin, 4-Acetylantroquinonol B, antroquinonol, or Epigallocatechin gallate (EGCG). In some embodiments, the autophagy inhibitor is selected from 3-Methyladenine (3-MA), LY294002, Bafilomycin A1 (Baf A1), chloroquine (CQ), hydroxychloroquine (HCQ), ABT-737, obatoclax, clarithromycin, resveratrol, quinacrine, 4-Acetylantroquinonol B, antroquinonol, epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, or Vps34 inhibitors.

In some embodiments, the autophagy inhibitor is an inhibitor of ULK1. In some embodiment, ULK1 inhibitors are among some of the more promising and potent autophagy inhibitors contemplated by the present disclosure are (Chaikuad et al., 2019; Egan et al., 2015; Martin et al., 2018). In some embodiments, the autophagy inhibitor is MRT68921 dihydrochloride, ULK-100, ULK-101, DCC-3116, or SBI-0206965. In some embodiments, the autophagy inhibitor is a lysosomal acidification inhibitor such as chloroquine or hydroxychloroquine. In some embodiments, most lysosomal enzymes function only under acidic pH optima, which makes their function reliant on efficient acidification of the lysosomes. The pH of lysosome is below 4.5 (pH<4.5). The correct acidification (pH<4.5) is critical for lysosomal proteolytic activity. Poor lysosomal acidification is the primary cause of impaired autophagy in numerous diseases that are not apparently related to autophagy protein.

In some embodiments, the autophagy inhibitor is an IKKα downregulator, such as SU1261. Although PEC-specific Atg7 ablation enhanced formation of advanced PanIN3 lesions, further progression was blocked due to tumor suppressor p53 accumulation[15]. In contrast, PEC-specific ablation of Ikkα, whose product IκB kinase α (IKKα) maintains autophagic flux through an unknown mechanism[18], led to appearance of aggressive and metastatic PDAC[16]. How IKKα-deficient PDACs survive despite insufficient autophagy and whether IKKα downregulation occurs in human disease was previously unknown. As demonstrated herein, a considerable fraction (25%) of human PDACs are IKKα-deficient and display signs of defective autophagy. Moreover, IKKα-deficient mouse and human PDACs switch to and depend on an alternative pathway for obtaining amino acid and other nutrients using the macropinocytosis (MP) pathway. This pathway was previously shown to be stimulated following KRAS activation[19]. Importantly, genetic or pharmacological autophagy disruption strongly enhances MP, whose inhibition in autophagy-deficient PDACs, regardless of IKKα status, causes nearly complete tumor regression.

In some embodiments, the inhibitor of macropinocytosis upregulation is selected from 5-(N-ethyl-N-isopropyl) amiloride (EIPA), 3-methylsulphonyl-4-piperidinobenzoyl) guanidine methanesulphonate (HOE-694), amiloride and amiloride derivatives, eganelisib, IPI-549, MBQ-167, wortmannin, LP1-106, XRK3F2, or LY294002. Macropinocytosis occurs at basal rates and spontaneously in many cells, or it is dramatically induced by receptor tyrosine kinase (RTK) activation or by oncogenes such as Ras and v-Src. (Liu et al., Front. Pharmacol. 11:408 (2020)). In cancer cells, macropinocytosis serves as a nutrient uptake pathway by which extracellular protein is internalized and degraded to supply amino acids that support cellular growth. Macropinocytosis is normally regulated by key regulators of actin polymerization, membrane phospholipids, phospholipid kinases and phosphatases. In some embodiments, the regulator of macropinocytosis are members of the Ras superfamily of small guanosine triphosphatases (GTPases) selected from Ras, Rac, Cdc42, Arf6, or Rab5. In some embodiment, the inhibitor of macropinocytosis upregulation is a dual Rac and Cdc42 inhibitor. In some embodiments, the dual Rac and Cdc42 inhibitor is MBQ-167.

In some embodiments, the membrane phospholipids that regulate macropinocytosis are phosphatidylinositol (PI), PI4P, PI5P, $PI(4,5)P_2$, and $PI(3,4,5)P_3$. In some embodiments, the phospholipid kinases comprises phosphoinositide 3-kinase (PI3K). In some embodiments, the class IA PI3K comprises a heterodimer composed of a p110 catalytic subunit with three variants ($\alpha$, $\beta$, or $\delta$) and a p85 regulatory subunit with five variants (p85α, p55α, p50α, p85β, and p55γ). The p110 catalytic subunits are encoded by Pik3ca, Pik3cb, and Pik3cd genes; and the regulatory subunits are encoded by Pik3r1, Pik3r2, and Pik3r3. In some embodiments, the class IB PI3K comprises a heterodimer composed of a p110γ catalytic subunit encoded by the Pik3cg gene; and a p101 regulatory subunit encoded by the Pik3r5 gene. In some embodiments, the inhibitor of macropinocytosis upregulation is a PI3K inhibitor. In some embodiments, the PI3K inhibitor is wortmannin, LY294002, eganelisib, IPI-549 or its derivatives. In some embodiments, the inhibitor of macropinocytosis upregulation is an inhibitor of the p110γ catalytic subunit of P3K. In some embodiments, the inhibitor of the p110γ catalytic subunit of PI3K is IPI-549 or its derivatives.

Macropinocytosis is also regulated by conditions that acidify the cell cytosol such as addition of $NH^+4$, or inhibition of Na/W exchangers (NHEs). (Recouvreux et al., Front. Endocrinol. 8:261 (2017)). In some embodiments, inhibition of NHEs is selective for macropinocytosis and does not affect other endocytic pathways or vesicle trafficking. In some embodiments, the inhibitor of NHE is amiloride and its analogs. In some embodiments, the analogs of amiloride comprise 5-(N-ethyl-N-isopropyl) amiloride (EIPA), 3-methylsulphonyl-4-piperidinobenzoyl) guanidine methanesulphonate (HOE-694). In some embodiments, the inhibitor of macropinocytosis upregulation is 5-(N-ethyl-N-isopropyl) amiloride. In some embodiments, the inhibitor of macropinocytosis upregulation is 3-methylsulphonyl-4-piperidinobenzoyl) guanidine methanesulphonate or IPI-549. In some embodiments, amiloride and its analogs inhibit sodium-proton exchangers, sodium-calcium exchangers, and sodium channels. (Koivusalo et al., J. Cell Biol. 188 (4): 547-563 (2010)). In some embodiments, the inhibitor of macropinocytosis upregulation is an inhibitor of an ion channel selected from a sodium-proton exchanger, a sodium-calcium exchanger, or a sodium channel.

In some embodiments, the inhibitor of NRF2 is ML385 or Brusatol. NRF2 serves as the central transcriptional activator of the MP program and its nuclear accumulation in PDAC correlates with increased expression of critical MP proteins. In some embodiments, the master regulator linking autophagy inhibition to MP activation is NRF2. Although NRF2 maintains proteostasis in autophagy-deficient cells by inducing proteasome subunits (Towers et al., 2019), its role in MP was not known. In some embodiments, by stimulating MP, NRF2 allowed autophagy-inhibited cancer cells to meet their energetic demands through lysosomal, rather than proteasomal, degradation of external proteins, such as albumin or ECM components. In some embodiments, concurrent autophagy and MP blockade effectively cuts off the cancer cell's energy supply and triggers rapid tumor regression.

In some embodiments, the inhibitor of macropinocytosis upregulation is an inhibitor of activity or expression of one or more proteins selected from of NRF2, PIK3CG, CDC42, PAK1, SLC9A1, SNX5, SDC1, NHE1, p110α, p110γ, CDC42, EGFR or EGF. Cellular oxidative and electrophilic stress trigger a protective response in mammals regulated by NRF2 (nuclear factor (erythroid-derived) 2-like; NFE2L2) binding to DNA-regulatory sequences near stress-responsive genes (antioxidant response elements (AREs). The p62/SQSTM1-KEAP1-NRF2 module regulates autophagy. In response to stimuli, NRF2 dissociates from KEAP1, translocates to the nucleus and dimerizes with other bZIP proteins such as small Maf proteins to form a transactivation complex that binds to antioxidant response elements (AREs). Nuclear NRF2 binds to the promoters of multiple genes including NHE1, SDC1, CDC42 and PIK3CG, and stimulates their transcription independently of oncogenic RAS-RAF signaling. As shown herein, NRF2, PIK3CG, CDC42, PAK1, SLC9A1, SNX5, SDC1, NHE1, p110α, p110γ, CDC42, EGFR and EGF are key MP-related genes. Accordingly, in some embodiments, the inhibitor of macropinocytosis upregulation is an inhibitor of EGFR activity or expression. In some embodiments, the inhibitor of EGFR is selected from erlotinib, gefitinib, lapatinib, cetuximab, osimertinib, neratinib, panitumumab, vandetanib, necitumumab, or dacomitinib. In some embodiments, the inhibitor of macropinocytosis upregulation is an inhibitor of p62 activity or expression. In some embodiments, an inhibitor of p62 activity or expression is LP1-106 or XRK3F2.

Autophagy to MP Switch as a Therapeutic Target

In another aspect, the disclosure provides a method of treating cancer in a subject. The method comprises, or alternatively consists essentially of, or yet further consists of administering to the subject a combination of an inhibitor of macropinocytosis upregulation and an autophagy inhibitor, thereby treating cancer in the subject. The administration can be sequential or concurrent. An effective amount is administered, as can be determined by the treating veterinarian or physician.

In some embodiments, autophagy is a mean for maintaining cellular function and homeostasis by handling damaged organelles and misfolded proteins. Autophagy is also a way of recirculating cellular content into new building blocks (Boya et al., Nat. Cell. Biol. 15: 713-720 (2013)). Autophagy is critical for the maintenance of cell viability under stress condition. In some embodiments, autophagy is a cellular response to stressful conditions comprising, or consisting essentially of, or yet further consisting of nutrient deprivation, acidosis, hypoxia and drug treatment. Starvation and other threats to cellular homeostasis strongly induce autophagy to acquire nutrients by recycling non-essential material or to eliminate harmful material.

In some embodiments, autophagy is measured using a lipidated LC3 protein, which redistribute into autophagic puncta inside the autophagosome. In some embodiments, autophagy inhibition is a means to potentiate cancer drugs and/or resensitize drug resistant tumors (Nagelkerke et al., Semin. Cancer Biol. 31:99-105 (2014). Most advanced tumors show a high upregulation of autophagic flux (Leone et al. Trends in Endocrin. Metab. 24; 209-217 (2013)).

Cancer that can be treated by inhibiting autophagy pathway including, but are not limited to, triple negative breast cancer, pancreatic cancer, leukemia, melanoma and lung cancer. In some embodiment, autophagy is highly activated in pancreatic ductal adenocarcinoma (PDAC) cells and autophagy requirement for tumor maintenance is well-established. The cancer can be present in a mammal, such as a human patient.

In some embodiments, macropinocytosis is an alternative nutrient procurement pathway used by cancer cells to obtain nutrient from the environment. In some embodiments, the other pathways comprise, or consist essentially of, or yet further consist of: (1) uptake via a cell membrane protein such as an amino acid or glucose transport channel, or transporter, (2) low-density lipoprotein (LDL) import via LDL receptors, or autophagy.

In some embodiments, the cancer is breast cancer, triple negative breast cancer, non-small-cell lung cancer, pancreatic cancer, leukemia, melanoma, colorectal cancer, bladder cancer, lung cancer, or pancreatic ductal adenocarcinoma (PDAC). The cancer can be present in a mammal, such as a human patient.

In some embodiments, the cancer is PDAC. PDAC is characterized by four dominant genetic alterations (KRAS gain of function and TP53, CDKN2A and SMAD4 inactivation) and almost always are initiated by KRAS mutations[7]. Yet, KRAS mutations alone, give rise to low-grade pancreatic intraepithelial neoplasia (PanIN) that rarely progresses to cancer. The progression from low-grade PanIN to invasive PDAC remains poorly understood, but PDAC risk is elevated in the setting of certain environmental and lifestyle factors, including tobacco smoking and excessive alcohol consumption and also in the context of obesity, type-2 diabetes, chronic pancreatitis and old age[11, 12]. Many of these factors interfere with either the initiation or the completion of autophagy[13]. As in humans, mice expressing an oncogenic $Kras^{G12D}$ allele in pancreatic epithelial cells (PEC), hereafter termed $Kras^{G12D/PEC}$, rarely progress to overt PDAC without pancreatic injury or stress to the background tissue[14]. A considerable fraction (25%) of human PDACs are IKKα-deficient and display signs of defective autophagy. In some embodiments, the cancer cell is a mammalian cell such as a human cell, a primate cell or a non-human cell.

In some embodiments, the autophagy inhibitor is selected from ULK1 inhibitors, Vps34 inhibitors, Bcl2 inhibitor, PI3K inhibitor, vacuolar type H(+)-ATPase inhibitors, lysosome inhibitors, Ikkα inhibitors, or autophagy flux inhibitors. In some embodiments, the ULK1 inhibitor comprises MRT68921 dihydrochloride, ULK-100, ULK-101, DCC-3116, or SBI-0206965. In some embodiments, the VPS34 inhibitor comprises SAR405, Vps34-inhibitor 1 (Vps34-IN1; PIK-III), or 3-methyladenine (3-MA). In some embodiments, the Bcl2 inhibitor comprises ABT-737. In some embodiments, the PI3K inhibitor comprises 3-Methyladenine (3-MA), and LY294002. In some embodiments, the vacuolar type H(+)-ATPase inhibitors comprises bafilomycin A1 (Baf A1). In some embodiments, lysosome inhibitor comprises Chloroquine (CQ), hydroxychloroquine (HCQ), obatoclax, or Quinacrine. In some embodiments, the Ikkα inhibitors comprises SU1261. In some embodiments, the autophagy flux inhibitor comprises Clarithromycin, 4-Acetylantroquinonol B, antroquinonol, or Epigallocatechin gallate (EGCG). In some embodiments, the autophagy inhibitor is selected from 3-Methyladenine (3-MA), LY294002, Bafilomycin A1 (Baf A1), chloroquine (CQ), hydroxychloroquine (HCQ), ABT-737, obatoclax, clarithromycin, resveratrol, quinacrine, 4-Acetylantroquinonol B, antroquinonol, epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, or Vps34 inhibitors.

In some embodiments, the autophagy inhibitor is an inhibitor of ULK1. In some embodiment, ULK1 inhibitors are among some of the more promising and potent autophagy inhibitors contemplated by the present disclosure (Chaikuad et al., 2019; Egan et al., 2015; Martin et al., 2018). In some embodiments, the autophagy inhibitor is MRT68921 dihydrochloride, ULK-100, ULK-101, DCC-3116, or SBI-0206965. In some embodiments, the autophagy inhibitor is a lysosomal acidification inhibitor such as chloroquine and hydroxychloroquine. In some embodiments, most lysosomal enzymes function only under acidic pH optima, which makes their function reliant on efficient acidification of the lysosomes. The pH of lysosome is below 4.5 (pH<4.5). The correct acidification (pH<4.5) is critical for lysosomal proteolytic activity. Poor lysosomal acidification is the primary cause of impaired autophagy in numerous diseases that are not apparently related to autophagy protein.

In some embodiments, the autophagy inhibitor is an IKKα downregulator, such as SU1261. Although PEC-specific Atg7 ablation enhanced formation of advanced PanIN3 lesions, further progression was blocked due to tumor suppressor p53 accumulation[15]. In contrast, PEC-specific ablation of Ikkα, whose product IκB kinase α (IKKα) maintains autophagic flux through an unknown mechanism[18], led to appearance of aggressive and metastatic PDAC[16]. How IKKα-deficient PDACs survive despite insufficient autophagy and whether IKKα downregulation occurs in human disease was previously unknown. As demonstrated herein, a considerable fraction (25%) of human PDACs are IKKα-deficient and display signs of defective autophagy. Moreover, IKKα-deficient mouse and human PDACs switch to and depend on an alternative pathway for obtaining amino acid and other nutrients using the macropinocytosis (MP) pathway. This pathway was previously shown to be stimulated following KRAS activation[19]. Importantly, genetic or pharmacological autophagy disruption strongly enhances MP, whose inhibition in autophagy-deficient PDACs, regardless of IKKα status, causes nearly complete tumor regression.

In some embodiments, the inhibitor of macropinocytosis upregulation is selected from 5-(N-ethyl-N-isopropyl) amiloride (EIPA), 3-methylsulphonyl-4-piperidinobenzoyl) guanidine methanesulphonate (HOE-694), amiloride and amiloride derivatives, eganelisib, IPI-549, MBQ-167, wortmannin, LP1-106, XRK3F2, or LY294002. Macropinocytosis occurs at basal rates and spontaneously in many cells, or it is dramatically induced by receptor tyrosine kinase (RTK) activation or by oncogenes such as Ras and v-Src. (Liu et al., Front. Pharmacol. 11:408 (2020)). In cancer cells, macropinocytosis serves as a nutrient uptake pathway by which extracellular protein is internalized and degraded to supply amino acids that support cellular growth. Macropinocytosis is normally regulated by key regulators of actin polymerization, membrane phospholipids, phospholipid kinases and phosphatases. In some embodiments, the regulator of macropinocytosis are members of the Ras superfamily of small guanosine triphosphatases (GTPases) selected from Ras, Rac, Cdc42, Arf6, or Rab5. In some embodiment, the inhibitor of macropinocytosis upregulation is a dual Rac and Cdc42 inhibitor. In some embodiments, the dual Rac and Cdc42 inhibitor is MBQ-167.

In some embodiments, the membrane phospholipids that regulate macropinocytosis are phosphatidylinositol (PI), PI4P, PI5P, PI(4,5)P$_2$, and PI(3,4,5)P$_3$. In some embodiments, the phospholipid kinases comprises phosphoinositide 3-kinase (PI3K). In some embodiments, the class IA PI3K comprises a heterodimer composed of a p110 catalytic subunit with three variants ($\alpha$, $\beta$, or $\delta$) and a p85 regulatory subunit with five variants (p85α, p55α, p50α, p85β, and p55γ). The p110 catalytic subunits are encoded by Pik3ca, Pik3cb, and Pik3cd genes; and the regulatory subunits are encoded by Pik3r1, Pik3r2, and Pik3r3. In some embodiments, the class IB PI3K comprises a heterodimer composed of a p110γ catalytic subunit encoded by the Pik3cg gene; and a p101 regulatory subunit encoded by the Pik3r5 gene. In some embodiments, the inhibitor of macropinocytosis upregulation is a PI3K inhibitor. In some embodiments, the PI3K inhibitor is wortmannin, LY294002, eganelisib, IPI-549 or its derivatives. In some embodiments, the inhibitor of macropinocytosis upregulation is an inhibitor of the p110γ catalytic subunit of P3K. In some embodiments, the inhibitor of the p110γ catalytic subunit of PI3K is IPI-549 or its derivatives.

Macropinocytosis is also regulated by conditions that acidify the cell cytosol such as addition of $NH^+4$, or inhibition of $Na^+/H^+$ exchangers (NHEs). (Recouvreux et al., Front. Endocrinol. 8:261 (2017)). In some embodiments, inhibition of NHEs is selective for macropinocytosis and does not affect other endocytic pathways or vesicle trafficking. In some embodiments, the inhibitor of NHE is amiloride or its analogs. In some embodiments, the analogs of amiloride comprise 5-(N-ethyl-N-isopropyl) amiloride (EIPA), or 3-methylsulphonyl-4-piperidinobenzoyl) guanidine methanesulphonate (HOE-694). In some embodiments, the inhibitor of macropinocytosis upregulation is 5-(N-ethyl-N-isopropyl) amiloride. In some embodiments, the inhibitor of macropinocytosis upregulation is 3-methylsulphonyl-4-piperidinobenzoyl) guanidine methanesulphonate or IPI-549. In some embodiments, amiloride and its analogs inhibit sodium-proton exchangers, sodium-calcium exchangers, and sodium channels (Koivusalo et al., J. Cell Biol. 188 (4): 547-563 (2010)). In some embodiments, the inhibitor of macropinocytosis upregulation is an inhibitor of an ion channel selected from a sodium-proton exchanger, a sodium-calcium exchanger, or a sodium channel.

In some embodiments, the inhibitor of NRF2 is ML385 or Brusatol. NRF2 serves as the central transcriptional activator of the MP program and its nuclear accumulation in PDAC correlates with increased expression of critical MP proteins. In some embodiments, the master regulator linking autophagy inhibition to MP activation is NRF2. Although NRF2 maintains proteostasis in autophagy-deficient cells by inducing proteasome subunits (Towers et al., 2019), its role in MP was not known. In some embodiments, by stimulating MP, NRF2 allowed autophagy-inhibited cancer cells to meet their energetic demands through lysosomal, rather than proteasomal, degradation of external proteins, such as albumin or ECM components. In some embodiments, concurrent autophagy and MP blockade effectively cuts off the cancer cell's energy supply and triggers rapid tumor regression.

In some embodiments, the inhibitor of macropinocytosis upregulation is an inhibitor of activity or expression of one or more proteins selected from NRF2, PIK3CG, CDC42, PAK1, SLC9A1, SNX5, SDC1, NHE1, p110α, p110γ, CDC42, EGFR or EGF. Cellular oxidative and electrophilic stress trigger a protective response in mammals regulated by NRF2 (nuclear factor (erythroid-derived) 2-like; NFE2L2) binding to DNA-regulatory sequences near stress-responsive genes (antioxidant response elements (AREs). The p62/SQSTM1-KEAP1-NRF2 module regulates autophagy. In response to stimuli, NRF2 dissociates from KEAP1, translocates to the nucleus and dimerizes with other bZIP proteins such as small Maf proteins to form a transactivation complex that binds to antioxidant response elements (AREs). Nuclear NRF2 binds to the promoters of multiple genes including NHE1, SDC1, CDC42 and PIK3CG, and stimulates their transcription independently of oncogenic RAS-RAF signaling. As shown herein, NRF2, PIK3CG, CDC42, PAK1, SLC9A1, SNX5, SDC1, NHE1, p110α, p110γ, CDC42, EGFR and EGF are key MP-related genes. Accordingly, in some embodiments, the inhibitor of macropinocytosis upregulation is an inhibitor of EGFR activity or expression. In some embodiments, the inhibitor of EGFR is selected from erlotinib, gefitinib, lapatinib, cetuximab, osimertinib, neratinib, panitumumab, vandetanib, necitumumab, or dacomitinib. In some embodiments, the inhibitor of macropinocytosis upregulation is an inhibitor of p62 activity or expression. In some embodiments, an inhibitor of p62 activity or expression is LP1-106 or XRK3F2.

A Combination of Autophagy and MP Inhibitors Composition

In one aspect, the present disclosure provides a composition comprising, or alternatively consisting essentially of, or yet further consisting of a combination of an inhibitor of macropinocytosis upregulation and an autophagy inhibitor. In some embodiments, the composition is for the treatment of cancer in a subject in need thereof. In some embodiments, the composition is for inducing cell death of a cancer cell.

In some embodiments, autophagy is a mean for maintaining cellular function and homeostasis by handling damaged organelles and misfolded proteins. Autophagy is also a way of recirculating cellular content into new building blocks (Boya et al., *Nat. Cell. Biol.* 15: 713-720 (2013)). Autophagy is critical for the maintenance of cell viability under stress condition. In some embodiments, autophagy is a cellular response to stressful conditions comprising, or consisting essentially of, or yet further consisting of nutrient deprivation, acidosis, hypoxia and drug treatment. Starvation and other threats to cellular homeostasis strongly induce autophagy to acquire nutrients by recycling non-essential material or to eliminate harmful material.

In some embodiments, autophagy is measured using a lipidated LC3 protein, which redistribute into autophagic puncta inside the autophagosome. In some embodiments, autophagy inhibition is a means to potentiate cancer drugs and/or resensitize drug resistant tumors (Nagelkerke et al., *Semin. Cancer Biol.* 31:99-105 (2014). Most advanced tumors show a high upregulation of autophagic flux (Leone et al. Trends in Endocrin. Metab. 24; 209-217 (2013)).

Cancer that can be treated by inhibiting autophagy pathway including, but are not limited to, triple negative breast cancer, pancreatic cancer, leukemia, melanoma and lung cancer. In some embodiment, autophagy is highly activated in pancreatic ductal adenocarcinoma (PDAC) cells and autophagy requirement for tumor maintenance is well-established. The cancer can be present in a mammal, such as a human patient.

In some embodiments, macropinocytosis is an alternative nutrient procurement pathway used by cancer cells to obtain nutrient from the environment. In some embodiments, the other pathways comprise, or consist essentially of, or yet further consist of: (1) uptake via a cell membrane protein such as an amino acid or glucose transport channel, or transporter, (2) low-density lipoprotein (LDL) import via LDL receptors, or autophagy.

In some embodiments, the cancer is breast cancer, triple negative breast cancer, non-small-cell lung cancer, pancreatic cancer, leukemia, melanoma, colorectal cancer, bladder cancer, lung cancer, or pancreatic ductal adenocarcinoma (PDAC). The cancer can be present in a mammal, such as a human patient.

In some embodiments, the cancer is PDAC. PDAC is characterized by four dominant genetic alterations (KRAS gain of function and TP53, CDKN2A and SMAD4 inactivation) and almost always are initiated by KRAS mutations[7]. Yet, KRAS mutations alone, give rise to low-grade pancreatic intraepithelial neoplasia (PanIN) that rarely progresses to cancer. The progression from low-grade PanIN to invasive PDAC remains poorly understood, but PDAC risk is elevated in the setting of certain environmental and lifestyle factors, including tobacco smoking and excessive alcohol consumption and also in the context of obesity, type-2 diabetes, chronic pancreatitis and old age[11, 12]. Many of these factors interfere with either the initiation or the completion of autophagy[13]. As in humans, mice expressing an oncogenic $Kras^{G12D}$ allele in pancreatic epithelial cells (PEC), hereafter termed $Kras^{G12D/PEC}$, rarely progress to overt PDAC without pancreatic injury or stress to the background tissue[14]. A considerable fraction (25%) of human PDACs are IKKα-deficient and display signs of defective autophagy. In some embodiments, the cancer cell is a mammalian cell such as a human cell, a primate cell or a non-human cell.

In some embodiments, the autophagy inhibitor is selected from ULK1 inhibitors, Vps34 inhibitors, Bcl2 inhibitor, PI3K inhibitor, vacuolar type H(+)-ATPase inhibitors, lysosome inhibitors, Ikkα inhibitors, or autophagy flux inhibitors. In some embodiments, the ULK1 inhibitor comprises MRT68921 dihydrochloride, ULK-100, ULK-101, DCC-3116, or SBI-0206965. In some embodiments, the VPS34 inhibitor comprises SAR405, Vps34-inhibitor 1 (Vps34-IN1; PIK-III), or 3-methyladenine (3-MA). In some embodiments, the Bcl2 inhibitor comprises ABT-737. In some embodiments, the PI3K inhibitor comprises 3-Methyladenine (3-MA), and LY294002. In some embodiments, the vacuolar type H(+)-ATPase inhibitors comprises bafilomycin A1 (Baf A1). In some embodiments, lysosome inhibitor comprises Chloroquine (CQ), hydroxychloroquine (HCQ), obatoclax, or Quinacrine. In some embodiments, the Ikkα inhibitors comprises SU1261. In some embodiments, the autophagy flux inhibitor comprises Clarithromycin, 4-Acetylantroquinonol B, antroquinonol, or Epigallocatechin gallate (EGCG). In some embodiments, the autophagy inhibitor is selected from 3-Methyladenine (3-MA), LY294002, Bafilomycin A1 (Baf A1), chloroquine (CQ), hydroxychloroquine (HCQ), ABT-737, obatoclax, clarithromycin, resveratrol, quinacrine, 4-Acetylantroquinonol B, antroquinonol, epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, or Vps34 inhibitors.

In some embodiments, the autophagy inhibitor is an inhibitor of ULK1. In some embodiment, ULK1 inhibitors are among some of the more promising and potent autophagy inhibitors contemplated by the present disclosure (Chaikuad et al., 2019; Egan et al., 2015; Martin et al., 2018). In some embodiments, the autophagy inhibitor is MRT68921 dihydrochloride, ULK-100, ULK-101, DCC-3116, or SBI-0206965. In some embodiments, the autophagy inhibitor is a lysosomal acidification inhibitor such as chloroquine and hydroxychloroquine. In some embodiments, most lysosomal enzymes function only under acidic pH optima, which makes their function reliant on efficient acidification of the lysosomes. The pH of lysosome is below 4.5 (pH<4.5). The correct acidification (pH<4.5) is critical for lysosomal proteolytic activity. Poor lysosomal acidification is the primary cause of impaired autophagy in numerous diseases that are not apparently related to autophagy protein.

In some embodiments, the autophagy inhibitor is an IKKα downregulator, such as SU1261. Although PEC-specific Atg7 ablation enhanced formation of advanced PanIN3 lesions, further progression was blocked due to tumor suppressor p53 accumulation[15]. In contrast, PEC-specific ablation of Ikkα, whose product IκB kinase α (IKKα) maintains autophagic flux through an unknown mechanism[18], led to appearance of aggressive and metastatic PDAC[16]. How IKKα-deficient PDACs survive despite insufficient autophagy and whether IKKα downregulation occurs in human disease was previously unknown. As demonstrated herein, a considerable fraction (25%) of human PDACs are IKKα-deficient and display signs of defective autophagy. Moreover, IKKα-deficient mouse and human PDACs switch to and depend on an alternative pathway for obtaining amino acid and other nutrients using the macropinocytosis (MP) pathway. This pathway was previously shown to be stimulated following KRAS activation[19]. Importantly, genetic or pharmacological autophagy disruption strongly enhances MP, whose inhibition in autophagy-deficient PDACs, regardless of IKKα status, causes nearly complete tumor regression.

In some embodiments, the inhibitor of macropinocytosis upregulation is selected from 5-(N-ethyl-N-isopropyl) amiloride (EIPA), 3-methylsulphonyl-4-piperidinobenzoyl) guanidine methanesulphonate (HOE-694), amiloride and amiloride derivatives, eganelisib, IPI-549, MBQ-167, wortmannin, LP1-106, XRK3F2, or LY294002. Macropinocytosis occurs at basal rates and spontaneously in many cells, or it is dramatically induced by receptor tyrosine kinase (RTK) activation or by oncogenes such as Ras and v-Src. (Liu et al., Front. Pharmacol. 11:408 (2020)). In cancer cells, macropinocytosis serves as a nutrient uptake pathway by which extracellular protein is internalized and degraded to supply amino acids that support cellular growth. Macropinocytosis is normally regulated by key regulators of actin polymerization, membrane phospholipids, phospholipid kinases and phosphatases. In some embodiments, the regulator of macropinocytosis are members of the Ras superfamily of small guanosine triphosphatases (GTPases) selected from Ras, Rac, Cdc42, Arf6, or Rab5. In some embodiment, the inhibitor of macropinocytosis upregulation is a dual Rac and Cdc42 inhibitor. In some embodiments, the dual Rac and Cdc42 inhibitor is MBQ-167.

In some embodiments, the membrane phospholipids that regulate macropinocytosis are phosphatidylinositol (PI), PI4P, PI5P, PI(4,5)$P_2$, and PI(3,4,5)$P_3$. In some embodiments, the phospholipid kinases comprises phosphoinositide 3-kinase (PI3K). In some embodiments, the class IA PI3K comprises a heterodimer composed of a p110 catalytic subunit with three variants (α, β, or δ) and a p85 regulatory subunit with five variants (p85a, p55α, p50α, p85β, and p55γ). The p110 catalytic subunits are encoded by Pik3ca, Pik3cb, and Pik3cd genes; and the regulatory subunits are encoded by Pik3r1, Pik3r2, and Pik3r3. In some embodiments, the class IB PI3K comprises a heterodimer composed of a p110γ catalytic subunit encoded by the Pik3cg gene; and a p101 regulatory subunit encoded by the Pik3r5 gene. In some embodiments, the inhibitor of macropinocytosis upregulation is a PI3K inhibitor. In some embodiments, the PI3K inhibitor is wortmannin, LY294002, eganelisib, IPI-549 or its derivatives. In some embodiments, the inhibitor of macropinocytosis upregulation is an inhibitor of the p110γ catalytic subunit of P3K. In some embodiments, the inhibitor of the p110γ catalytic subunit of PI3K is IPI-549 or its derivatives.

Macropinocytosis is also regulated by conditions that acidify the cell cytosol such as addition of $NH^+4$, or inhibition of $Na^+/H^+$ exchangers (NHEs). (Recouvreux et al., Front. Endocrinol. 8:261 (2017)). In some embodiments, inhibition of NHEs is selective for macropinocytosis and does not affect other endocytic pathways or vesicle trafficking. In some embodiments, the inhibitor of NHE is amiloride or its analogs. In some embodiments, the analogs of amiloride comprise 5-(N-ethyl-N-isopropyl) amiloride (EIPA), or 3-methylsulphonyl-4-piperidinobenzoyl) guanidine methanesulphonate (HOE-694). In some embodiments, the inhibitor of macropinocytosis upregulation is 5-(N-ethyl-N-isopropyl) amiloride. In some embodiments, the inhibitor of macropinocytosis upregulation is 3-methylsulphonyl-4-piperidinobenzoyl) guanidine methanesulphonate or IPI-549. In some embodiments, amiloride and its analogs inhibit sodium-proton exchangers, sodium-calcium exchangers, and sodium channels (Koivusalo et al., *J. Cell Biol.* 188 (4): 547-563 (2010)). In some embodiments, the inhibitor of macropinocytosis upregulation is an inhibitor of an ion channel selected from a sodium-proton exchanger, a sodium-calcium exchanger, or a sodium channel.

In some embodiments, the inhibitor of NRF2 is ML385 or Brusatol. NRF2 serves as the central transcriptional activator of the MP program and its nuclear accumulation in PDAC correlates with increased expression of critical MP proteins. In some embodiments, the master regulator linking autophagy inhibition to MP activation is NRF2. Although NRF2 maintains proteostasis in autophagy-deficient cells by inducing proteasome subunits (Towers et al., 2019), its role in MP was not known. In some embodiments, by stimulating MP, NRF2 allowed autophagy-inhibited cancer cells to meet their energetic demands through lysosomal, rather than proteasomal, degradation of external proteins, such as albumin or ECM components. In some embodiments, concurrent autophagy and MP blockade effectively cuts off the cancer cell's energy supply and triggers rapid tumor regression.

In some embodiments, the inhibitor of macropinocytosis upregulation is an inhibitor of activity or expression of one or more proteins selected from NRF2, PIK3CG, CDC42, PAK1, SLC9A1, SNX5, SDC1, NHE1, p110c, p110γ, CDC42, EGFR or EGF. Cellular oxidative and electrophilic stress trigger a protective response in mammals regulated by NRF2 (nuclear factor (erythroid-derived) 2-like; NFE2L2) binding to DNA-regulatory sequences near stress-responsive genes (antioxidant response elements (AREs). The p62/SQSTM1-KEAP1-NRF2 module regulates autophagy. In response to stimuli, NRF2 dissociates from KEAP1, translocates to the nucleus and dimerizes with other bZIP proteins such as small Maf proteins to form a transactivation complex that binds to antioxidant response elements (AREs). Nuclear NRF2 binds to the promoters of multiple genes including NHE1, SDC1, CDC42 and PIK3CG, and stimulates their transcription independently of oncogenic RAS-RAF signaling. As shown herein, NRF2, PIK3CG, CDC42, PAK1, SLC9A1, SNX5, SDC1, NHE1, p110α, p110γ, CDC42, EGFR and EGF are key MP-related genes. Accordingly, in some embodiments, the inhibitor of macropinocytosis upregulation is an inhibitor of EGFR activity or expression. In some embodiments, the inhibitor of EGFR is selected from erlotinib, gefitinib, lapatinib, cetuximab, osimertinib, neratinib, panitumumab, vandetanib, necitumumab, or dacomitinib. In some embodiments, the inhibitor of macropinocytosis upregulation is an inhibitor of p62 activity or expression. In some embodiments, an inhibitor of p62 activity or expression is LP1-106 or XRK3F2.

In some embodiments, the composition comprises, or alternatively consists essentially of, or yet further consists of: (1) an inhibitor of macropinocytosis upregulation selected from 5-(N-ethyl-N-isopropyl)amiloride (EIPA), 3-methylsulphonyl-4-piperidinobenzoyl)guanidine methanesulphonate (HOE-694), amiloride and amiloride derivatives, eganelisib, IPI-549, MBQ-167, wortmannin, LP1-106, XRK3F2, LY294002, an inhibitor of activity or expression of one or more proteins of NRF2, PIK3CG, CDC42, PAK1, SLC9A1, SNX5, SDC1, NHE1, p110α, p110γ, CDC42, EGFR, EGF, ML385, brusatol, or a combination thereof; and (2) the autophagy inhibitor is selected from 3-Methyladenine (3-MA), LY294002, bafilomycin A1 (Baf A1), chloroquine (CQ), hydroxychloroquine (HCQ), ABT-737, obatoclax, clarithromycin, resveratrol, ruinacrine, 4-acetylantroquinonol B, antroquinonol, epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, or Vps34 inhibitors. In some embodiments, the composition comprises an amiloride or its derivatives and ULK1 inhibitors. In some embodiments, the composition comprises an amiloride or its derivatives and an anti-Vsps34 antibody.

Compositions

In one embodiment, this disclosure relates to a composition comprising a combination of compounds as described herein and a carrier. In another embodiment, this disclosure relates to a pharmaceutical composition comprising a combination of compounds as described herein and a pharmaceutically acceptable carrier. In another embodiment, this disclosure relates to a pharmaceutical composition comprising an effective amount or a therapeutically effective amount of a combination of compounds as described herein and a pharmaceutically acceptable carrier.

In some embodiments, the composition, including pharmaceutical compositions comprises, consists essentially of, or consists of a combination of an inhibitor of macropinocytosis upregulation, an autophagy inhibitor, and other therapeutic agents. Compositions contemplated by the present disclosure can be manufactured by means of conventional mixing, dissolving, granulating, dragee-making levigating, emulsifying, encapsulating, entrapping, or lyophilization processes. The compositions can be formulated in conventional manner using one or more physiologically acceptable carriers, diluents, excipients, or auxiliaries which facilitate processing of the combinations of compounds provided herein into preparations which can be used pharmaceutically.

In some embodiments, the pharmaceutical composition and formulations described herein are administered to a subject by multiple administration routes, including but not limited to, parenteral, oral, buccal, rectal, sublingual, or transdermal administration routes in one aspect, to carry out the methods as disclosed herein. In some cases, parenteral administration comprise, or consists essentially of, or yet further consists of, s intravenous, subcutaneous, intramuscular, intracerebral, intranasal, intra-arterial, intra-articular, intradermal, intravitreal, intraosseous infusion, intraperitoneal, or intrathecal administration. In some instances, the pharmaceutical composition is formulated for local administration. In other instances, the pharmaceutical composition is formulated for systemic administration. In some embodiments, the pharmaceutical formulations include, but are not limited to, lyophilized formulations, aqueous liquid dispersions, self-emulsifying dispersions, solid solutions, liposomal dispersions, aerosols, solid dosage forms, powders, immediate release formulations, controlled release formulations, fast melt formulations, tablets, capsules, pills, delayed release formulations, extended release formulations, pulsatile release formulations, multiparticulate formulations (e.g., nanoparticle formulations), and mixed immediate and controlled release formulations.

In some embodiments, the pharmaceutical formulations include a carrier or carrier materials selected on the basis of compatibility with the composition disclosed herein, and the release profile properties of the desired dosage form. Exemplary carrier materials include, e.g., binders, suspending agents, disintegration agents, filling agents, surfactants, solubilizers, stabilizers, lubricants, wetting agents, diluents, and the like. Pharmaceutically compatible carrier materials include, but are not limited to, acacia, gelatin, colloidal silicon dioxide, calcium glycerophosphate, calcium lactate, maltodextrin, glycerine, magnesium silicate, polyvinylpyrrollidone (PVP), cholesterol, cholesterol esters, sodium caseinate, soy lecithin, taurocholic acid, phosphotidylcholine, sodium chloride, tricalcium phosphate, dipotassium phosphate, cellulose and cellulose conjugates, sugars sodium stearoyl lactylate, carrageenan, monoglyceride, diglyceride, pregelatinized starch, and the like. See, e.g., Remington: The Science and Practice of Pharmacy, Nineteenth Ed (Easton, Pa.: Mack Publishing Company, 1995), Hoover, John E., Remington's Pharmaceutical Sciences, Mack Publishing Co., Easton, Pennsylvania 1975, Liberman, H. A. and Lachman, L., Eds., Pharmaceutical Dosage Forms, Marcel Decker, New York, N.Y., 1980, and Pharmaceutical Dosage Forms and Drug Delivery Systems, Seventh Ed. (Lippincott Williams & Wilkins 1999). In some instances, the pharmaceutical formulations further include pH adjusting agents or buffering agents which include acids such as acetic, boric, citric, lactic, phosphoric and hydrochloric acids, bases such as sodium hydroxide, sodium phosphate, sodium borate, sodium citrate, sodium acetate, sodium lactate and tris-hydroxymethylaminomethane, and buffers such as citrate/dextrose, sodium bicarbonate and ammonium chloride. Such acids, bases and buffers are included in an amount required to maintain pH of the composition in an acceptable range. In some instances, the pharmaceutical formulation includes one or more salts in an amount required to bring osmolality of the composition into an acceptable range. Such salts include those having sodium, potassium or ammonium cations and chloride, citrate, ascorbate, borate, phosphate, bicarbonate, sulfate, thiosulfate or bisulfite anions, suitable salts include sodium chloride, potassium chloride, sodium thiosulfate, sodium bisulfite and ammonium sulfate. In some embodiments, the pharmaceutical formulations include, but are not limited to, sugars like trehalose, sucrose, mannitol, maltose, glucose, or salts like potassium phosphate, sodium citrate, ammonium sulfate and/or other agents such as heparin to increase the solubility and in vivo stability of polypeptides.

In some instances, the pharmaceutical formulations further include diluent which are used to stabilize compounds because they can provide a more stable environment. Salts dissolved in buffered solutions (which also can provide pH control or maintenance) are utilized as diluents in the art, including, but not limited to a phosphate buffered saline solution. In certain instances, diluents increase bulk of the composition to facilitate compression or create sufficient bulk for homogenous blend for capsule filling. Such compounds can include e.g., lactose, starch, mannitol, sorbitol, dextrose, microcrystalline cellulose such as AVICEL®, dibasic calcium phosphate, dicalcium phosphate dihydrate, tricalcium phosphate, calcium phosphate, anhydrous lactose, spray-dried lactose, pregelatinized starch, compressible sugar, such as Di-PAC® (Amstar), mannitol, hydroxypropylmethylcellulose, hydroxypropylmethylcellulose acetate stearate, sucrose-based diluents, confectioner's sugar, monobasic calcium sulfate monohydrate, calcium sulfate dihydrate, calcium lactate trihydrate, dextrates, hydrolyzed cereal solids, amylose, powdered cellulose, calcium carbonate, glycine, kaolin, mannitol, sodium chloride, inositol, bentonite, and the like.

In some cases, the pharmaceutical formulations include disintegration agents or disintegrants to facilitate the breakup or disintegration of a substance. The term "disintegrate" include both the dissolution and dispersion of the dosage form when contacted with gastrointestinal fluid. Examples of disintegration agents include a starch, e.g., a natural starch such as corn starch or potato starch, a pregelatinized starch such as National 1551 or AMIJEL®, or sodium starch glycolate such as PROMOGEL® or EXPLOTAB®, a cellulose such as a wood product, methylcrystalline cellulose, e.g., AVICEL®, AVICEL® PH101, AVICEL®PH102, AVICEL® PH105, ELCEMA® P100, EMCOCEL®, VIVACEL®, MING TIA®, and SOLKA-FLOC®, methylcellulose, croscarmellose, or a cross-linked cellulose, such as cross-linked sodium carboxymethylcellulose (AC-DI-SOL®), cross-linked carboxymethylcellulose, or cross-linked croscarmellose, a cross-linked starch such as sodium starch glycolate, a cross-linked polymer such as crospovidone, a cross-linked polyvinylpyrrolidone, alginate such as alginic acid or a salt of alginic acid such as sodium alginate, a clay such as VEEGUM® HV (magnesium aluminum silicate), a gum such as agar, guar, locust bean, Karaya, pectin, or tragacanth, sodium starch glycolate, bentonite, a natural sponge, a surfactant, a resin such as a cation-exchange resin, citrus pulp, sodium lauryl sulfate, sodium lauryl sulfate in combination starch, and the like.

In some instances, the pharmaceutical formulations include filling agents such as lactose, calcium carbonate, calcium phosphate, dibasic calcium phosphate, calcium sulfate, microcrystalline cellulose, cellulose powder, dextrose, dextrates, dextran, starches, pregelatinized starch, sucrose, xylitol, lactitol, mannitol, sorbitol, sodium chloride, polyethylene glycol, and the like. Lubricants and glidants are also optionally included in the pharmaceutical formulations described herein for preventing, reducing or inhibiting adhesion or friction of materials.

Exemplary lubricants include, e.g., stearic acid, calcium hydroxide, talc, sodium stearyl fumerate, a hydrocarbon such as mineral oil, or hydrogenated vegetable oil such as hydrogenated soybean oil (STEROTEX®), higher fatty acids and their alkali-metal and alkaline earth metal salts, such as aluminum, calcium, magnesium, zinc, stearic acid, sodium stearates, glycerol, talc, waxes, STEAROWET®, boric acid, sodium benzoate, sodium acetate, sodium chloride, leucine, a polyethylene glycol (e.g., PEG-4000) or a methoxypolyethylene glycol such as CARBOWAX™, sodium oleate, sodium benzoate, glyceryl behenate, polyethylene glycol, magnesium or sodium lauryl sulfate, colloidal silica such as SYLOID™, CAB-O-SIL®, a starch such as corn starch, silicone oil, a surfactant, and the like. Plasticizers include compounds used to soften the microencapsulation material or film coatings to make them less brittle. Suitable plasticizers include, e.g., polyethylene glycols such as PEG 300, PEG 400, PEG 600, PEG 1450, PEG 3350, and PEG 800, stearic acid, propylene glycol, oleic acid, triethyl cellulose and triacetin. Plasticizers can also function as dispersing agents or wetting agents.

Solubilizers include compounds such as triacetin, triethyl citrate, ethyl oleate, ethyl caprylate, sodium lauryl sulfate, sodium doccusate, vitamin E TPGS, dimethylacetamide, N-methylpyrrolidone, N-hydroxyethylpyrrolidone, polyvinylpyrrolidone, hydroxypropylmethyl cellulose, hydroxypropyl cyclodextrins, ethanol, n-butanol, isopropyl alcohol, cholesterol, bile salts, polyethylene glycol 200-600, glycofurol, transcutol, propylene glycol, and dimethyl isosorbide and the like. Stabilizers include compounds such as any antioxidation agents, buffers, acids, preservatives and the like. Exemplary stabilizers include L-arginine hydrochloride, tromethamine, albumin (human), citric acid, benzyl alcohol, phenol, disodium biphosphate dehydrate, propylene glycol, metacresol or m-cresol, zinc acetate, polysorbate-20 or TWEEN® 20, or trometamol.

Suspending agents include compounds such as polyvinylpyrrolidone, e.g., polyvinylpyrrolidone K12, polyvinylpyrrolidone K17, polyvinylpyrrolidone K25, or polyvinylpyrrolidone K30, vinyl pyrrolidone/vinyl acetate copolymer (S630), polyethylene glycol, e.g., the polyethylene glycol can have a molecular weight of about 300 to about 6000, or about 3350 to about 4000, or about 7000 to about 5400, sodium carboxymethylcellulose, methylcellulose, hydroxypropylmethylcellulose, hydroxymethylcellulose acetate stearate, polysorbate-80, hydroxyethylcellulose, sodium alginate, gums, such as, e.g., gum tragacanth and gum acacia, guar gum, xanthans, including xanthan gum, sugars, cellulosics, such as, e.g., sodium carboxymethylcellulose, methylcellulose, sodium carboxymethylcellulose, hydroxypropylmethylcellulose, hydroxyethylcellulose, polysorbate-80, sodium alginate, polyethoxylated sorbitan monolaurate, polyethoxylated sorbitan monolaurate, povidone and the like.

Surfactants include compounds such as sodium lauryl sulfate, sodium docusate, Tween 60 or 80, triacetin, vitamin E TPGS, sorbitan monooleate, polyoxyethylene sorbitan monooleate, polysorbates, polaxomers, bile salts, glyceryl monostearate, copolymers of ethylene oxide and propylene oxide, e.g., PLURONIC® (BASF), and the like. Additional surfactants include polyoxyethylene fatty acid glycerides and vegetable oils, e.g., polyoxyethylene (60) hydrogenated castor oil, and polyoxyethylene alkyl ethers and alkylphenyl ethers, e.g., octoxynol 10, octoxynol 40. Sometimes, surfactants is included to enhance physical stability or for other purposes.

Viscosity enhancing agents include, e.g., methyl cellulose, xanthan gum, carboxymethyl cellulose, hydroxypropyl cellulose, hydroxypropylmethyl cellulose, hydroxypropylmethyl cellulose acetate stearate, hydroxypropylmethyl cellulose phthalate, carbomer, polyvinyl alcohol, alginates, acacia, chitosans and combinations thereof. Wetting agents include compounds such as oleic acid, glyceryl monostearate, sorbitan monooleate, sorbitan monolaurate, triethanolamine oleate, polyoxyethylene sorbitan monooleate, polyoxyethylene sorbitan monolaurate, sodium docusate, sodium oleate, sodium lauryl sulfate, sodium doccusate, triacetin, Tween 80, vitamin E TPGS, ammonium salts and the like.

The pharmaceutical compositions for the administration of the combinations of compounds can be conveniently presented in dosage unit form and can be prepared by any of the methods well known in the art of pharmacy. The pharmaceutical compositions can be, for example, prepared by uniformly and intimately bringing the compounds provided herein into association with a liquid carrier, a finely divided solid carrier or both, and then, if necessary, shaping the product into the desired formulation. In the pharmaceutical composition, each compound of the combination provided herein is included in an amount sufficient to produce the desired therapeutic effect. For example, pharmaceutical compositions of the present technology may take a form suitable for virtually any mode of administration, including, for example, topical, ocular, oral, buccal, systemic, nasal, injection, infusion, transdermal, rectal, and vaginal, or a form suitable for administration by inhalation or insufflation.

For topical administration, the combination of compounds can be formulated as solutions, gels, ointments, creams, suspensions, etc., as is well-known in the art. Systemic formulations include those designed for administration by injection (e.g., subcutaneous, intravenous, infusion, intramuscular, intrathecal, or intraperitoneal injection) as well as those designed for transdermal, transmucosal, oral, or pulmonary administration.

Useful injectable preparations include sterile suspensions, solutions, or emulsions of the compounds provided herein in aqueous or oily vehicles. The compositions may also contain formulating agents, such as suspending, stabilizing, and/or dispersing agents. The formulations for injection can be presented in unit dosage form, e.g., in ampules or in multidose containers, and may contain added preservatives. Alternatively, the injectable formulation can be provided in powder form for reconstitution with a suitable vehicle, including but not limited to sterile pyrogen free water, buffer, and dextrose solution, before use. To this end, the combination of compounds provided herein can be dried by any art-known technique, such as lyophilization, and reconstituted prior to use.

For transmucosal administration, penetrants appropriate to the barrier to be permeated are used in the formulation. Such penetrants are known in the art. For oral administration, the pharmaceutical compositions may take the form of, for example, lozenges, tablets, or capsules prepared by conventional means with pharmaceutically acceptable excipients such as binding agents (e.g., pregelatinised maize starch, polyvinylpyrrolidone, or hydroxypropyl methylcellulose); fillers (e.g., lactose, microcrystalline cellulose, or calcium hydrogen phosphate); lubricants (e.g., magnesium stearate, talc, or silica); disintegrants (e.g., potato starch or sodium starch glycolate); or wetting agents (e.g., sodium lauryl sulfate). The tablets can be coated by methods well known in the art with, for example, sugars, films, or enteric coatings.

Compositions intended for oral use can be prepared according to any method known to the art for the manufacture of pharmaceutical compositions, and such compositions may contain one or more agents selected from the group consisting of sweetening agents, flavoring agents, coloring agents, and preserving agents in order to provide pharmaceutically elegant and palatable preparations. Tablets contain the combination of compounds provided herein in admixture with non-toxic pharmaceutically acceptable excipients, which are suitable for the manufacture of tablets. These excipients can be for example, inert diluents, such as calcium carbonate, sodium carbonate, lactose, calcium phosphate or sodium phosphate; granulating and disintegrating agents (e.g., corn starch or alginic acid); binding agents (e.g. starch, gelatin, or acacia); and lubricating agents (e.g., magnesium stearate, stearic acid, or talc). The tablets can be left uncoated or they can be coated by known techniques to delay disintegration and absorption in the gastrointestinal tract and thereby provide a sustained action over a longer period. For example, a time delay material such as glyceryl monostearate or glyceryl distearate can be employed. They may also be coated by the techniques well known to the skilled artisan. The pharmaceutical compositions of the present technology may also be in the form of oil-in-water emulsions.

Liquid preparations for oral administration may take the form of, for example, elixirs, solutions, syrups, or suspensions, or they can be presented as a dry product for constitution with water or other suitable vehicle before use. Such liquid preparations can be prepared by conventional means with pharmaceutically acceptable additives such as suspending agents (e.g., sorbitol syrup, cellulose derivatives, or hydrogenated edible fats); emulsifying agents (e.g., lecithin, or acacia); non-aqueous vehicles (e.g., almond oil, oily esters, ethyl alcohol, Cremophore™, or fractionated vegetable oils); and preservatives (e.g., methyl or propyl-p-hydroxybenzoates or sorbic acid). The preparations may also contain buffer salts, preservatives, flavoring, coloring, and sweetening agents as appropriate.

Kits

One aspect of the present disclosure provides a kit comprising a composition of the present invention and instructions for use. In some embodiments, one or more compositions disclosed herein are contained in a kit. In some embodiments, the kit comprises, consists essentially of, or consists of the one or more compositions disclosed herein and instructions for their use.

As used herein, a kit or article of manufacture described herein include a carrier, package, or container that is compartmentalized to receive one or more containers such as vials, tubes, and the like, each of the container(s) comprising, or consisting essentially of, or yet further consisting of, one of the separate elements to be used in a method described herein. Suitable containers include, for example, bottles, vials, syringes, and test tubes. In one embodiment, the containers are formed from a variety of materials such as glass or plastic.

The articles of manufacture provided herein contain packaging materials. Examples of pharmaceutical packaging materials include, but are not limited to, blister packs, bottles, tubes, bags, containers, bottles, and any packaging material suitable for a selected formulation and intended mode of administration and treatment.

A kit typically includes labels listing contents and/or instructions for use, and package inserts with instructions for use. A set of instructions will also typically be included.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

In some embodiments, the methods provide near complete tumor regression. Likewise, the disclosure provides for use of the combination of an inhibitor of macropinocytosis upregulation and an autophagy inhibitor in the treatment of PDAC. In some embodiments, autophagy inhibitors include, but are not limited to, inhibitors to the MAP kinases, JNK1, ERK and p38. In some embodiments, the autophagy inhibitor is a lysosomal acidification inhibitor such as chloroquine. In some embodiments, the autophagy inhibitor is an IKKα downregulator. In some embodiments, the inhibitor of macropinocytosis upregulation is an inhibitor of activity or expression one or more proteins selected from NRF2, PIK3CG, CDC42, PAK1, SLC9A1, SNX5, SDC1, NHE1, p110α, p110γ, CDC42 or EGFR or EGF.

At this point, it is not clear at what point during PDAC evolution and by what mechanism(s) IKKα expression is lost. Loss of gene expression in cancer can occur through either genetic or epigenetic mechanisms. Whether it occurs during chronic pancreatitis or in a single premalignant PanIN lesion, IKKα loss results in p62 accumulation and activation of NRF2, which induces MDM2 and activates Notch, both of which increase the proliferative capacity of IKKα-deficient PDAC[16, 34]. Although mouse studies had clearly established the pro-tumorigenic effect of IKKα loss[16], these results could not be reconciled with the observation that autophagy is needed for PDAC survival[17]. It was also not clear how IKKα loss interferes with the completion of autophagy. As demonstrated herein, by bridging LC3-II and STX17, IKKα facilitates the completion of autophagy and enhances autophagosome-lysosome fusion. Importantly, both IKKα- and ATG7-deficient tumors switch-on MP to compensate for the loss of autophagy.

Until now, most attempts at targeting autophagy in PDAC and other cancers were based on use of lysosomal acidification inhibitors, such as CQ, rather than more specific and potent inhibitors of autophagy initiation[3, 35]. Given that lysosomal degradation releases AA from proteins that are consumed via either autophagy or MP19, drugs such as CQ probably have broader specificity than more specific autophagy inhibitors. Nonetheless, CQ and related drugs have not shown much clinical benefit on their own, unless combined with MEK inhibitors[36, 37]. However, the efficacy of this combination and its durability need to be evaluated in later phase, larger clinical trials. The results provided herein suggest that any inhibitor of autophagy, especially highly specific inhibitors that target ULK1/238 and ATG539, would lead to rapid development of resistance due to upregulation of MP. Although EIPA is a suitable test compound, its IC50 is probably too high40, suggesting that future efforts should be directed at developing much more effective MP inhibitors.

The following examples are intended to illustrate but not limit the invention.

EXAMPLES

Example 1: Material and Methods

Antibodies. Guinea pig anti-p62 polyclonal antibody (GP62-C, Progen), rabbit anti-NRF2 polyclonal antibody (ABclonal, A11159), rabbit-anti NQO1 monoclonal antibody (CST, 62262), mouse anti-IKKα monoclonal antibody (Invitrogen, MA5-16157), mouse anti-actin monoclonal antibody (Sigma, A4700), rabbit anti-GFP polyclonal antibody (Molecular Probes, A-11122), mouse anti-Lamp-1 monoclonal antibody (Santa Cruz, sc-20011), chicken anti-GFP/YFP/CFP polyclonal antibody (Abcam ab13970), mouse anti-VAMP-8 monoclonal antibody (Santa Cruz, sc166820), mouse anti-Flag monoclonal antibody (Sigma, F3165), rabbit anti-Flag polyclonal antibody (Sigma, F7425), rabbit anti-STX17 polyclonal antibody (Proteintech, 17815-1-AP; GeneTex, GTX130212), mouse anti-LC3 monoclonal antibody (Cosmo Bio, CTB-LC3-2-IC), rabbit anti-LC3B polyclonal antibody (CST, 2775), rabbit anti-E-Cadherin monoclonal antibody (CST, 3195), rabbit anti-CD138 antibody (ThermoFisher, 36-2900), mouse anti-NHE-1 monoclonal antibody (Santa Cruz, sc-136239), rabbit anti-PI3 Kinase p110a monoclonal antibody (CST, 4249), rabbit anti-PI3 Kinase p110γ monoclonal antibody (CST, 5405), rabbit anti-EGFR monoclonal antibody (CST, 4267), rabbit anti-CDC42 polyclonal antibody (ThermoFisher, PA1-092), mouse anti-SNX5 monoclonal antibody (Santa Cruz, sc-515215), mouse anti-Myc monoclonal antibody (Abcam, Ab-32), mouse anti-HSP90 monoclonal antibody (Santa Cruz, sc-13119), rabbit anti-α-Amylase polyclonal antibody (Sigma, A8273), goat anti-cytokeratin 19 polyclonal antibody (Santa Cruz, sc-33111), rabbit anti-SOX9 polyclonal antibody (Santa Cruz, sc-20095), mouse anti-cytokeratin 18 monoclonal antibody (GeneTex, GTX105624), HRP goat anti-chicken IgY antibody (Santa Cruz, sc-2428), HRP goat anti-rabbit IgG antibody (CST, 7074), HRP horse anti-mouse IgG antibody (CST, 7076), HRP streptavidin (Pharmingen, 554066), Biotin goat anti-mouse IgG (Pharmingen, 553999), Biotin goat anti-rabbit IgG (Pharmingen, 550338), Biotin mouse anti-goat IgG (Santa Cruz, sc-2489). Alexa 594-, Alexa 647-, and Alexa 488-conjugated secondary antibodies were used: donkey anti-mouse IgG, donkey anti-rabbit IgG, goat anti-chicken IgY (Molecular Probes, Invitrogen).

Cell culture. All cell lines were incubated at 37° C. in a humidified chamber with 5% $CO_2$ in medium supplemented with 10% fetal bovine serum (FBS) (Gibco), penicillin (100 mg/ml) and streptomycin (100 mg/ml). MIA PaCa-2 and UN-KC-6141 cells were maintained in DMEM (Invitrogen); BxPC-3 cells were maintained in RPMI (Gibco) supplemented with 1 mM sodium pyruvate (Corning). In some embodiments, All cells were incubated at 37° C. in a humidified chamber with 5% C02. MIA PaCa-2, PANC-1, COLO 357/FG, 1356E (primary human PDAC) and UN-KC-6141 cells were maintained in DMEM (Invitrogen) supplemented with 10% fetal bovine serum (FBS) (Gibco). 1444, 1305 and 1334 primary human PDAC cells, BxPC-3, AsPC-1, H1299, H358, A549, H838, and H1435 cells were maintained in RPMI (Gibco) supplemented with 200/FBS (1444, 1305, 1334) or 10% FBS and 1 mM sodium pyruvate (Corning). All media were supplemented with penicillin (100 mg/ml) and streptomycin (100 mg/ml).

Autophagy Induction. Starvation was performed as described previously (Chang et al., 2015). For starvation, cells were incubated in starvation medium (20 mM HEPES pH 7.4, 140 mM NaCl, 1 mM $CaC_2$, 1 mM $MgCl_2$, and 1% BSA) for 1.5 or 2 hrs. For glucose starvation, cells were washed three times with PBS and incubated in glucose-free DMEM containing 10% dialyzed FBS for 4 hrs.

Plasmids. IKKα-Flag was made by cloning human IKKα cDNA (GenBank: AF012890.1) into pCDH-CMV-MCS-EF1-Puro vector using EcoRI and NotI. NRF2-Myc or NRF2-Flag was made by cloning the human NRF2 cDNA into pCDH-CMV-MCS-EF1-Puro vector using NheI and NotI. Site-directed mutagenesis (IKKα LIR mutants or NRF2 E79Q) was performed using QuikChange II XL (Agilent Technologies) according to manufacturer's instructions. For pGL3 promoter plasmids, NHE1, SDC1, CDC42, EGF, or PIK3CG promoter regions (−1000 to +100 relative to the transcriptional start site) and NHE1 (−523 ARE: 5'-TGACAGCGC-3'), SDC1 (− 755 ARE: 5'-TGAGGAGC-3'), CDC42 (−911 ARE: 5'-TGACAGAAGC-3'), EGF (−20 ARE: 5'-TGACTCAGC-3') or PIK3CG (+80 ARE: 5'-TGA-TAAAGC-3') ARE deletion mutants was inserted into pGL3, made by Sangon Biotech (Shanghai, China).

LentiCRISPR v2-Blast-IKKα, lentiCRISPR v2-Puro-IKKα and lentiCRISPR v2-Puro-p62 were constructed by cloning the target cDNA sequences of IKKα/CHUK and SQSTM1 into lentiCRISPR v2-Blast vector and lentiCRISPR v2-puro vector, respectively using BsmBI. pLKO.1-blast-Ikkα was made by cloning the target Ikkα/Chuk cDNA sequence into pLKO.1-blast vector using AgeI and EcoRI. In some embodiments, lentiCRISPR v2-Blast-IKKα and lentiCRISPR v2-puro-p62 were constructed by cloning the target cDNA sequences of CHUK (ACGTCTGTCTGTACCAGCAT; SEQ ID NO: 1) and SQSTM1 (CAATGTGATCTGCGATGGCT; SEQ ID NO: 2) into lentiCRISPR v2-Blast vector and lentiCRISPR v2-puro vector, respectively using BsmBI. LentiCRISPR v2-Blast-ATG7 was a gift from Dr. Sina Ghaemmaghami, pLKO.1-blast-Ikka was made by cloning the target cDNA sequence of Chuk (GCAGCAATGTTAAGTCTTCTT; SEQ ID NO: 3) into pLKO.1-blast vector using AgeI and EcoRI.

Stable cell line construction. To generate lentiviral particles, HEK293T cells were transfected with above vectors (7.5 μg), pSPAX2 (3.75 μg) and pMD2.G (3.75 μg) DNAs. The next day, the medium was exchanged for fresh antibiotic-free DMEM plus 20% FBS. After 2 d, MIA PaCa-2 or KC6141 cells were transduced by combining 1 ml of viral particle-containing medium with 8 μg/ml polybrene (Santa Cruz). The cells were fed 8 hrs later with fresh medium and selection was initiated 48 hrs after transduction using 1.25 mg/ml puromycin (Sigma) or 10 μg/ml blasticidin (Santa Cruz).

In some embodiments, to generate lentiviral particles, HEK293T cells were transfected with the above LentiCRISPR v2 or pLKO.1 or pHAGE vectors (7.5 μg), pSPAX2 (3.75 μg) and pMD2.G (3.75 μg) or pCDH-CMV-MCS-EF1-Puro vector (7.5 μg), pCMVDeltaR, (3.75 μg), and VSV-G (3.75 μg) DNAs. The next day, the medium was exchanged to fresh antibiotic-free DMEM or RPMI plus 20% FBS. After 2 days, the virus particle-containing medium were harvested and filtered and stored in −80° C. MIA PaCa-2, COLO 357/FG, 1334, BxPC3, or KC6141 cells were transduced by combining 1 ml of viral particle-containing medium with 8 μg/ml polybrene. The cells were fed 8 hrs later with fresh medium and selection was initiated 48 hrs after transduction using 1.25 mg/ml puromycin or 10 μg/ml blasticidin. IKKα KD MIA PaCa-2 cell was constructed previously (Todoric et al., 2017). For GFP-LC3-stable WT and IKKα KD or IKKα$^\Delta$ MIA PaCa-2 cells, WT and IKKα KD or IKKα$^\Delta$ MIA PaCa-2 cells were transduced by combining 1 ml of GFP-LC3 viral particle-containing medium with 8 μg/ml polybrene and then were selected as above.

Mice. Female homozygous BALB/c Nu/Nu nude mice and C57BL/6 mice were obtained at 6 weeks of age from Charles River Laboratories and The Jackson Laboratory, respectively. B6.FVB-Tg (Pdx1-cre) 6Tuv/J (termed Pdx1-Cre) and B6.129S4-Krastm4Tyj/J (LSL-Kras$^{G12D}$) breeding pairs were obtained from The Jackson Laboratory. Ikkα$^{F/F}$, p62$^{F/F}$ and B6.129X1-Nfe2l2tm1Ywk/J (Nrf2$^{-/-}$) were generous gifts from Boehringer Ingelheim (Ingelheim am Rhein, Germany), Dr. Jorge Moscat at Sanford Burnham Prebys Medical Discovery Institute (La Jolla, CA) and Dr. David A. Tuveson at Cold Spring Harbor Laboratory (Cold Spring Harbor, NY), respectively and were previously described[41, 42, 43]. Pdx1-Cre, LSL-Kras$^{G12D}$, Ikkα$^{F/F}$, p62$^{F/F}$ and Nrf2$^{-/-}$ mice were interbred as needed to obtain the compound mutants Pdx1-Cre; LSL-Kras$^{G12D}$ (termed Kras$^{G12D}$), Pdx1-Cre; Ikkα$^{F/F}$; LSL-Kras$^{G12D}$ (termed Kras$^{G12D}$;Ikkα$^{\Delta pan}$), Pdx1-Cre;Ikkα$^{F/F}$;p62$^{F/F}$. LSL-Kras$^{G12D}$ (termed Kras$^{G12D}$;Ikkα$^\Delta$/p62$^{\Delta pan}$) Pdx1-Cre; Ikkα$^{F/F}$;Nrf2$^{-/-}$;LSL-Kras$^{G12D}$ (termed Kras$^{G12D}$;Ikkα$^{\Delta pan}$; Nrf2$^{-/-}$). Age- and sex-matched male and female mice of each genotype were generated as littermates for use in experiments in which different genotypes were compared. For xenograft studies, female mice were randomly allocated to different groups after cell injections. All mice were maintained in filter-topped cages on autoclaved food and water. The number of mice per experiment and their age are indicated in the figure legends.

To evaluate the effects of MP on tumor growth in the autochthonous model, Kras$^{G12D}$;Ikkα$^{\Delta pan}$ mice, at 4 weeks of age, were treated with vehicle or 10 mg/kg EIPA (Sigma) by intraperitoneal injection every other day for 1 month. After that, surgically removed pancreata were weighed and used for further analysis. To evaluate the effects of MP on heterotopic xenografts, female homozygous BALB/c Nu/Nu nude mice were injected subcutaneously (s.c.) in both flanks at 7 weeks of age with $10^6$ parental and IKKα KO MIA PaCa-2 cells mixed at a 1:1 dilution with BD Matrigel (BD Biosciences) in a total volume of 100 μl. Mice were treated with EIPA (7.5 mg/kg) for 15 days when tumors attained an average volume of 50-100 mm$^3$. As a control, animals treated with vehicle (DMSO in PBS) were used. Volumes (1/2×(width$^2$×length)) of s.c. tumors were calculated on the basis of measurements using digital calipers after 15 days of treatment. To evaluate the combination effects of autophagy and MP inhibition on tumor growth, C57BL/6 mice were injected s.c. at 7 weeks of age with $10^7$ KC6141 cells in a total volume of 100 μl. Mice were treated with vehicle, EIPA (7.5 mg/kg), MRT68921 (10 mg/kg, MCE), or EIPA and MRT68921 for 21 days when tumors attained an average volume of 100 mm$^3$. Tumor volumes were calculated as above.

In some embodiments, female homozygous NU/NU nude mice and C57BL/6 mice were obtained at 6 weeks of age from Charles River Laboratories and The Jackson Laboratory, respectively. B6.FVB-Tg (Pdx1-cre) 6Tuv/J (termed Pdx1-Cre) and B6.129S4-Krastm4Tyj/J (LSL-Kras$^{G12D}$) breeding pairs were obtained from The Jackson Laboratory. Ikkα$^{F/F}$, p62$^{F/F}$ and B6.129X1-Nfe2l2tm1Ywk/J (Nrf2$^{-/-}$) were provided by Boehringer Ingelheim (Ingelheim am Rhein, Germany), J. M. at Sanford Burnham Prebys Medical Discovery Institute (La Jolla, CA) and Dr. David A. Tuveson at Cold Spring Harbor Laboratory (Cold Spring Harbor, NY), respectively and were previously described (Chan et al., 1996; Liu et al., 2008; Müller et al., 2013). Pdx1-Cre, LSL-Kras$^{G12D}$, Ikkα$^{F/F}$, p62$^{F/F}$ and Nrf2$^{-/-}$ mice were interbred as needed to obtain the compound mutants Pdx1-Cre; LSL-Kras$^{G12D}$ (termed Kras$^{G12D}$), Pdx1-Cre;Ikkα$^{F/F}$;LSL-Kras$^{G12D}$ (termed Kras$^{G12D}$; Ikkα$^{\Delta PEC}$), Pdx1-Cre;Ikkα$^{F/F}$; p62$^{F/F}$;LSL-Kras$^{G12D}$ (termed Kras$^{G12D}$;Ikkα$^\Delta$/p62$^{\Delta PEC}$) Pdx1-Cre;Ikkα$^{F/F}$;Nrf2$^{-/-}$;LSL-Kras$^{G12D}$ (termed Kras$^{G12D}$;Ikkα$^{\Delta PEC}$;Nrf2$^{-/-}$). Age- and sex-matched (except where indicated otherwise) male and female mice of each genotype were generated as littermates for use in experiments in which different genotypes were compared. For xenograft studies, female mice were randomly allocated to different treatment groups after cell injections. All mice were maintained in filter-topped cages on autoclaved food and water, and experiments were performed in accordance with UCSD Institutional Animal Care and Use Committee and NIH guidelines and regulations on age and gender-matched littermates. Animal Protocol S00218 was approved by the UCSD Institutional Animal Care and Use Committee. The number of mice per experiment and their age are indicated in the figure legends.

In some embodiments, to evaluate the effects of MP on tumor growth or survival in the autochthonous model, $Kras^{G12D};Ikk\alpha^{\Delta PEC}$ mice, at 4 weeks of age, were treated with vehicle or 10 mg/kg EIPA (Sigma) by i.p. injection every other day for 1 month. After that, surgically removed pancreata were weighed and used for further analysis and other mice were continued to maintain for survival. To evaluate the effects of MP on heterotopic xenografts, female homozygous BALB/c Nu/Nu nude mice were injected subcutaneously (s.c.) in both flanks at 7 weeks of age with $10^6$ parental and $IKK\alpha^{\Delta}$ MIA PaCa-2 cells or 1334 and 1444 cells mixed at a 1:1 dilution with BD Matrigel (BD Biosciences) in a total volume of 100 μl. Mice were treated with vehicle (DMSO in PBS), EIPA (7.5 mg/kg), MRT68921 (10 mg/kg) or MRT68921 and EIPA for 15 days when tumors attained an average volume of 50-100 mm$^3$. Volumes (1/2× (width$^2$×length)) of s.c. tumors were calculated on the basis of measurements using digital calipers after 15 days of treatment. To evaluate the combination effects of autophagy and MP inhibition on tumor growth, C57BL/6 mice were injected s.c. at 7 weeks of age with $10^6$ parental, Ikkα KD, Nhe1 KD or Ikkα+Nhe1 DKD KC6141 cells in a total volume of 100 μl. Mice were treated with or without vehicle, EIPA (7.5 mg/kg), MRT68921 (10 mg/kg), or EIPA and MRT68921 for 21 days when tumors attained an average volume of 50-100 mm$^3$. Tumor volumes were calculated as above.

Orthotopic PDAC Cell Implantation. WT, Cdc42, Pik3cg, Ikkα, Ikkα KD and Cdc42 KD or Ikkα KD and Pik3cg KD KC6141 were orthotopically injected in 3-month-old C57BL/6 mice as described before (Todoric et al., 2017). Briefly, mice were anesthetized with Ketamine/Xylazine (100 mg/kg and 10 mg/kg body weight, respectively). After local shaving and disinfection, a 1.5 cm long longitudinal incision was made into the left upper quadrant of abdomen. The spleen was lifted and 50 μl of cell suspension in ice-cold PBS-Matrigel mixture (equal amounts) was slowly injected into the tail of the pancreas. Successful injection was confirmed by the formation of a liquid bleb at the site of injection with minimal fluid leakage. Following surgery, mice were given buprenorphine subcutaneously at a dose of 0.05-0.1 mg/kg every 4-6 h for 12 h and then every 6-8 h for 3 additional days. Mice were analysed after 20 days. Throughout the experiment, animals were provided with food and water ad libitum and subjected to a 12-hr dark/light cycle.

Isolation of Mouse PECs. PECs were isolated from 2-month-old (MO), 12-MO $Kras^{G12D}$ mice and 2-MO or 3-MO $Kras^{G12D};IKK\alpha^{\Delta PEC}$, $Kras^{G12D};Ikk\alpha^{\Delta}/p62^{\Delta PEC}$, $Kras^{G12D};Ikk\alpha^{\Delta PEC};Nrf2^{-/-}$ mice using the EasySep™ Kit (STEMCELL Technologies) according to the manufacturer's instruction. In brief, pancreata were collected and minced in small pieces of 1-3 mm$^3$ with disposable scalpels followed by centrifugation for 2 min at 450×g and 4° C. Supernatants were aspirated and discarded to remove cell fragments and blood cells. 10 mL of digestion buffer (1 mg/ml collagenase type V in DMEM/F12) were added and incubated in a 37° C. hybridization oven for 20-30 min with gentle rotation until no clumps remained. Digested tissues were pelleted by centrifugation at 1000 rpm for 8 min. Accutase (Innovative Cell Technologies, San Diego, CA) was used to dissociate the digested tissues to obtain mostly single cells. Then the mouse epithelial cell enrichment EasySep™ kit was used to isolate epithelial cells by sequentially adding the cocktail of Biotinylated E-Cadherin, EasySep™ Biotin Selection cocktail, EasySep™ Magnetic Nanoparticles, and then cells were incubated with the magnet. The enriched epithelial cells were counted and used for extraction of RNA or protein.

Human Samples. PDAC patient derived xenografts (PDXs) were developed and provided by Dr. Andrew M. Lowy using IRB: 090401 under an IACUC approved animal protocol AM.Lowy-S09158.

Human Specimens and Primary Human PDAC cells. PDAC patient derived xenografts (PDXs) and primary human PDAC cells were developed and provided by A.M.L. using IRB: 090401 under an IACUC approved animal protocol AM.Lowy-S09158. 1334 cells were previously described (Strnadel et al., 2017) and 1305 and 1444 cells were first generated for this project. Briefly, surgically resected pancreatic cancer tissue was directly transplanted in NSG mice for in vivo expansion of viable tumor cells. Following xenograft formation, tumors were harvested, minced, placed in 8% FBS containing RPMI with collagenase IV (0.5 mg/ml, Sigma) in a tube and incubated at 37° C. for 60 min with vortex every 10 min. The dissociated suspension was passed through a 70 μm cell strainer to obtain single cells and washed with culture medium. Cell aggregates retained on top of the filter were put in a separate dish. Isolated cells and aggregates were grown in RPMI medium containing 20% FBS. Purity of the epithelial culture was assessed by flow cytometry with FITC labelled human specific EpCAM antibody staining. For selective trypsinization, cultures were washed twice with PBS, followed by 2-3 min incubation with 0.05% Trypsin/0.02% EDTA solution at 37° C. Detached cells were gently washed away with 5% serum containing medium and selective removal of fibroblasts was repeated once cells reached confluence.

IKKα, p62, NRF2, NQO1, CDC42, NHE1 and SDC1 protein expression in 100 human PDAC specimens were analyzed and are shown in FIG. 4A and Figure S5B. LC3, LAMP1, ULK1 and TFE3 protein expression in 15 IKKα$^{low}$ and 15 IKKα$^{high}$ human PDAC specimens are shown in FIG. 4B. Pancreatic tissues were acquired from patients who were diagnosed with PDAC between June 2017 and May 2020 at The Affiliated Drum Tower Hospital of Nanjing University Medical School (Nanjing, Jiangsu, China). All patients received a standardized pancreatic duodenectomy and 30 tumor tissues were larger than 4 cm (length or width or height). Paraffin embedded tissues were processed by pathologist after surgical operations and confirmed as tumor for further research. The study was approved by the Institutional Ethics Committee of The Affiliated Drum Tower Hospital with IRB #2018-289-01. Informed consent for tissue analysis was obtained before surgery. All research was performed in compliance with government policies and the Helsinki declaration.

TCGA Data. Raw data for 177 human PDACs were downloaded from The Cancer Genome Atlas. Scatter plots in Figure S5A were generated by nonparametric Spearman correlation analysis.

Cell imaging. Immunostaining was performed as described[44]. Cells were cultured on coverslips and fixed in 4% PFA for 10 min at room temperature. After washing twice in PBS, cells were incubated in PBS containing 10% FBS to block nonspecific sites of antibody adsorption. The cells were then incubated with the appropriate primary antibodies (diluted 1:100) and secondary antibodies (diluted 1:500) in PBS containing 10% FBS with or without 0.1% saponin. For cell macropinosome visualization, 24 hrs after seeding, the cells were serum starved for 18 hrs. Macropinosomes were marked using a high-molecular-mass (70 KD) TMR-Dextran (Invitrogen)-uptake assay, wherein TMR-DEX was added to serum-free medium at a final concentration of 1 mg/ml for 30 min at 37° C. At the end of the incubation period, the cells were rinsed five times in cold PBS and immediately fixed in 4% PFA. For tissue macropinosome visualization[45], fresh pancreata were cut into pieces with an approximate 5-mm cuboidal shape. A tissue section was placed in a 24-well plate and injected 150 μL of 10 mg/ml TMR-DEX solution directly into the tissue piece. Another 250 μL of diluted TMR-DEX solution were added to the well to immerse the tissue section. The plate was incubated in the dark for 15 min at room temperature. Then the tissue section was rinsed twice in PBS before embedding in O.C.T. compound in a prelabeled cryomold. Specimens were frozen on dry ice and stored at −80° C. for further processing. Immunostaining was performed as described above. Images were captured using a TCS SPE Leica confocal microscope (Leica, Germany).

In some embodiments, Immunostaining was performed as described (Su et al., 2017). Cells were cultured on coverslips and fixed in 4% PFA for 10 min at room temperature or methanol for 10 min at −20° C. After washing twice in PBS, cells were incubated in PBS containing 10% FBS to block nonspecific sites of antibody adsorption. The cells were then incubated with the appropriate primary antibodies (diluted 1:100) and secondary antibodies (diluted 1:500) in PBS containing 10% FBS with or without 0.1% saponin. For cell macropinosome visualization, 24 hrs after seeding, the cells were serum starved for 18 hrs. Macropinosomes were marked using a high-molecular-mass (70 KDa) TMR-DEX (Invitrogen)-uptake assay, wherein TMR-DEX was added to serum-free medium at a final concentration of 1 mg/ml for 30 min at 37° C. At the end of the incubation period, the cells were rinsed five times in cold PBS and immediately fixed in 4% PFA. For tissue macropinosome visualization (Lee et al., 2019), fresh pancreata were cut into pieces with an approximate 5-mm cuboidal shape. Tissue fragments were placed in a 24-well plate and injected with 150 μL of 10 mg/ml TMR-DEX solution. Another 250 μL of diluted TMR-DEX solution were added to the well to immerse the tissue fragment. The plate was incubated in the dark for 15 min at room temperature. Then the tissue fragments were rinsed twice in PBS before embedding in O.C.T. compound in a prelabeled cryomold. Specimens were frozen on dry ice and stored at −80° C. for further processing. Immunostaining was performed as described above. Images were captured using a TCS SPE Leica confocal microscope (Leica, Germany).

Proximity Ligation Assay. In vivo IKKα and LC3 interaction was detected by in situ PLA kit. Briefly, WT and IKKα KD MIA Paca-2 cells were fixed with methanol for 10 minutes at −20° C. Cells were then incubated in PBS containing 10% FBS to block nonspecific sites of antibody adsorption followed by incubation with rabbit anti-LC3 and mouse anti-IKKα (diluted 1:100), incubation with the PLA probes (anti mouse and anti-rabbit IgG antibodies conjugated with oligo nucleotides), ligation and amplification according to the manufacturer's instructions. Images were captured as above.

Immunoblot and immunoprecipitation. Cells were harvested and lysed in RIPA buffer (50 mM Tris-HCl, pH 7.4, 150 mM NaCl, 1% Triton X-100, 1% Na deoxycholate, 0.1% SDS, 1 mM EDTA) supplemented with complete protease inhibitor cocktail. Proteins were resolved on SDS-polyacrylamide gels, and then transferred to a polyvinylidene difluoride membrane. After blocking with 5% (w/v) fat free milk, the membrane was stained with the corresponding primary antibodies followed by incubation with the appropriate secondary HRP-conjugated antibodies, and development with ECL. Immunoreactive bands were detected by automatic X-ray film processor or KwikQuant Imager.

For immunoprecipitation, cells were lysed in Nonidet P-40 (NP-40) lysis buffer (20 mM Tris-HCl, pH 7.5, 1% NP-40, 137 mM NaCl, 1 mM $MgCl_2$, 1 mM $CaCl_2$), 10% glycerol) supplemented with complete protease inhibitor cocktail. Then immunoprecipitation was performed using the indicated antibodies. Generally, 2 mg of antibody were added to 1 mL of cell lysate and incubated at 4° C. overnight. After addition of protein A/G-magnetic beads, incubation was continued for 2 hrs, and then immunocomplexes were washed five times using lysis buffer, resolved by SDS-PAGE, and analyzed by immunoblot.

Chromatin Immunoprecipitation (ChIP). Cells were crosslinked with 1% formaldehyde for 10 min and the reaction was stopped with 0.125 M glycine for 5 min. ChIP assay was performed as described previously (Xiao et al., 2013). Cells were lysed and sonicated on ice to generate DNA fragments with an average length of 200-800 bp. After pre-clearing, 1% of each sample was saved as input fraction. IP was performed using antibodies specifically recognizing NRF2 (CST, 12721). DNA was eluted and purified from complexes, followed by PCR amplification of the target promoters or genomic loci using primers for human

```
NHE1:
                              (SEQ ID NO: 110)
5'-TCTCAGCCTGGGCTC-3'
and (SEQ ID NO: 111)
5'-CTATCCCTATCCTGC-3';

(SEQ ID NO: 112)
5'-TCCTTCCTCTTCCTACG-3',
and (SEQ ID NO: 113)
5'-CAGCTGCAGCTCCT-3';

(SEQ ID NO: 114)
5'-TACTGTCTCTACTTAAC-3',
and (SEQ ID NO: 115)
5'-GTGAGGTTCTCTGTAT-3';

SDC1:
                              (SEQ ID NO: 116)
5'-CTTAGGAGCGGGCCG-3'
and (SEQ ID NO: 117)
5'-TCGGCTCGGATTCGG-3';

(SEQ ID NO: 118)
5'-TTTCTTGCAGCCCTTCCGTG-3'
and (SEQ ID NO: 119)
5'-CTTCAACCGACGGGCAAACA-3';
```

```
                              (SEQ ID NO: 120)
5'-CAGCTTTTTGAACTGAGGCCC-3'
and (SEQ ID NO: 121)
5'-CCTTAGTTTAAACAGCTGCACCC-3';

CDC42
                              (SEQ ID NO: 122)
5'-TCGCCGGGACGTCGAGATTGCAG-3'
and (SEQ ID NO: 123)
5'-CTTATCTCTACCTACACCCAGTG-3';

(SEQ ID NO: 124)
5'-GGACACTGGGTGTAGGTAGAG-3'
and (SEQ ID NO: 125)
5'-CCATTTTGCAGAGAAGACGGA-3';

PIK3CG:
                              (SEQ ID NO: 126)
5'-TAGGCCCCAAATGCTCTGAA-3'
and (SEQ ID NO: 127)
5'-GCCACAGTATTAGGTATCCTATTAGG-3';

(SEQ ID NO: 128)
5'-TGCTCAGTCTCATACTCCTACC-3'
and (SEQ ID NO: 129)
5'-AAACCTACCCAGTGTGCGTC-3';

(SEQ ID NO: 130)
5'-GAGCCCCAGAAAAGCGGAAG-3'
and (SEQ ID NO: 131)
5'-TATTCCGAGTCAGACCCCACA-3';

EGF:
                              (SEQ ID NO: 132)
5'-CATTCCTCTGTGCTGG-3'
and (SEQ ID NO: 133)
5'-CCTGAGGCCAAATGAAG-3';

(SEQ ID NO: 134)
5'-ACAGAGGCTCACTCAAG-3'
and (SEQ ID NO: 135)
5'-AAGGAAGAACTGATG-3'.

PDGFB:
                              (SEQ ID NO: 136)
5'-TGGCCTTGGCTCTGG-3'
and (SEQ ID NO: 137)
5'-GACGCGGGAGCTGG-3';

(SEQ ID NO: 138)
5'-AACCCGGGGCTGAGGGAGATAG-3'
and (SEQ ID NO: 139)
5'-AGCTGGGTCCGAGTCTCCTCC-3';

SNX5:
                              (SEQ ID NO: 140)
5'-CAGTTAGAGGCAGGGAGTACC-3'
and (SEQ ID NO: 141)
5'-GACACTCTCCCAGCAAGACG-3';

(SEQ ID NO: 142)
5'-TCCTGAGCTGCCTGCAAATG-3'
and (SEQ ID NO: 143)
5'-GCTCTGTCCAAACATGTCGAA-3';

PAK1:
                              (SEQ ID NO: 144)
5'-GCAGGTACCTGTAGTC-3'
and (SEQ ID NO: 145)
5'-GAAGAATGCTAGGTG-3';

(SEQ ID NO: 146)
5'-GTACCTAGTACATAATAG-3'
and (SEQ ID NO: 147)
5'-GCCTCCCAAGTAGCTG-3'.
```

Luciferase Assay. The Dual Luciferase assay was performed as described previously (Todoric et al., 2017). pGL3-NHE1, pGL3-SDC1, pGL3-PIK3CG, pGL3-CDC42 or pGL3-EGF WT or ARE$^\Delta$ reporter plasmids and pRL-TK plasmids (Promega) were co-transfected with or without NRF2(E79Q) expression vector into MIA PaCa-2 cells. 24 h after transfection, the cells were seeded to a 96-well plate. The activity of both Firefly and *Renilla* luciferases was determined 48 h after transfection with the dual luciferase reporter assay system (Promega Promega E1910) with a luminometer FilterMax F5 Multi-Mode Microplate Reader (Molecular Devices). Results are expressed as fold change and represent the mean±SEM of 3 independent experiments.

Real-time PCR analysis. Total RNA and DNA were extracted using an All Prep DNA/RNA Mini Kit (Qiagen). RNA was reverse transcribed using a Superscript VILO cDNA synthesis kit (Invitrogen). Real-time PCR (RT-PCR) was performed as described[16]. Relative expression levels of target genes were normalized against the level of 18s rRNA expression. Fold difference (as relative mRNA expression) was calculated by the comparative CT method ($2^{Ct(18s\ rRNA\text{-}gene\ of\ interest)}$). Primer sequences obtained from the NIH Primer-BLAST (ncbi.nlm.nih.gov/tools/primer-blast/index.cgi?LINK_LOC=BlastHome) are as follows:

```
Pik3ca F:
                              (SEQ ID NO: 4)
5'-GGACTGTGTGGGTCTCATCG-3';

Pik3ca R:
                              (SEQ ID NO: 5)
5'-TCTCGCCCTTGTTCTTGTCC-3';

Pik3cg F:
                              (SEQ ID NO: 6)
5'-CTCTGGACCTGTGCCTTCTG-3';

Pik3cg R:
                              (SEQ ID NO: 7)
5'-ATCTTTGAATGCCCCCGTGT-3';

Rac1 F:
                              (SEQ ID NO: 8)
5'-CTACCCGCAGACAGACGTG-3';

Rac1 R:
                              (SEQ ID NO: 9)
5'-AGATCAAGCTTCGTCCCCAC-3';
```

Cde42 F:
(SEQ ID NO: 10)
5'-GAGACTGCTGAAAAGCTGGCG-3';

Cde42 R:
(SEQ ID NO: 11)
5'-GGCTCTTCTTCGGTTCTGGAGG-3';

Pak1 F:
(SEQ ID NO: 12)
5'-CTTCCGGGACTTTCTGCAATG-3';

Pak1 R:
(SEQ ID NO: 13)
5'-GTCAGGCTAGAGAGGGGCTT-3';

Nhe1 F:
(SEQ ID NO: 14)
5'-TCATGAAGATAGGTTTCCATGTGAT-3';

Nhe1 R:
(SEQ ID NO: 15)
5'-CGTCTGATTGCAGGAAGGGG-3';

Arf6 F:
(SEQ ID NO: 16)
5'-CGTGGAGACGGTGACTTACA-3';

Arf6 R:
(SEQ ID NO: 17)
5'-GGTGTAGTAATGCCGCCAGA-3';

Sdc1 F:
(SEQ ID NO: 18)
5'-TCTGGCTCTGGCTCTGCG-3';

Sdc1 R:
(SEQ ID NO: 19)
5'-GCCGTGACAAAGTATCTGGC-3';

Snx5 F:
(SEQ ID NO: 20)
5'-ACTGACAGAGCTCCTCCGAT-3';

Snx5 R:
(SEQ ID NO: 21)
5'-TTAACCGGGCCTTGTCCAAA-3';

Rab5 F:
(SEQ ID NO: 22)
5'-ACAGCTGGTCAAGAACGGTA-3';

Rab5 R:
(SEQ ID NO: 23)
5'-GCTCTCGCAAAGGATTCCTCA-3';

Rab7 F:
(SEQ ID NO: 24)
5'-GGAGCGGACTTTCTGACCAA-3';

Rab7 R:
(SEQ ID NO: 25)
5'-GCCACACCAAGAGACTGGAA-3';

Sept6 F:
(SEQ ID NO: 26)
5'-GCTTCAACATCCTGTGCGTG-3';

Sept6 R:
(SEQ ID NO: 27)
5'-GTTTCAACCCCACGTTGCTC-3';

Egfr F:
(SEQ ID NO: 28)
5'-ACCTCTCCCGGTCAGAGATG-3';

Egfr R:
(SEQ ID NO: 29)
5'-CTTGTGCCTTGGCAGACTTTC-3';

Egfr F:
(SEQ ID NO: 30)
5'-TTCTCACAAGGAAAGAGCATCTC-3';

Egf R:
(SEQ ID NO: 31)
5'-GTCCTGTCCCGTTAAGGAAAAC-3';

Epgn F:
(SEQ ID NO: 32)
5'-CTCCTAGCACAGCACAGCAG-3';

Epgn R:
(SEQ ID NO: 33)
5'-GCTTCAGCTCATGGTGGAAT-3';

Areg F:
(SEQ ID NO: 34)
5'-ACAGCGAGGATGACAAGGAC-3';

Areg R:
(SEQ ID NO: 35)
5'-GATGCCAATAGCTGCGAGGA-3';

Hbegf F:
(SEQ ID NO: 36)
5'-CTCTTGCAAATGCCTCCCTG-3';

Hbegf R:
(SEQ ID NO: 37)
5'-CAAGAAGACAGACGGACGACA-3';

Pdgfa F:
(SEQ ID NO: 38)
5'-CAGTGTCAAGGTGGCCAAAG-3';

Pdgfa R:
(SEQ ID NO: 39)
5'-CACCTCACATCTGTCTCCTC-3';

Pdgfb F:
(SEQ ID NO: 40)
5'-CTGCTACCTGCGTCTGGTC-3';

Pdgfb R:
(SEQ ID NO: 41)
5'-GAGTGTGCTCGGGTCATGTT-3';

m18s F:
(SEQ ID NO: 42)
5'-AGCCCCTGCCCTTTGTACACA-3';

m18s R:
(SEQ ID NO: 43)
5'-CGATCCGAGGGCCTCACTA-3';

PIK3CA F:
(SEQ ID NO: 44)
5'-GGTTTGGCCTGCTTTTGGAG-3';

PIK3CA R:
(SEQ ID NO: 45)
5'-CCATTGCCTCGACTTGCCTA-3';

PIK3CG F:
(SEQ ID NO: 46)
5'-AGGAGGTGCTGTGGAATGTG-3';

PIK3CG R:
(SEQ ID NO: 47)
5'-TTGGACTCAGAACTGGGGGA-3';

RAC1 F:
(SEQ ID NO: 48)
5'-AAAACCGGTGAATCTGGGCT-3';

RAC1 R:
(SEQ ID NO: 49)
5'-AAGAACACATCTGTTTGCGGA-3';

-continued

CDC42 F:
(SEQ ID NO: 50)
5'-ACGACCGCTGAGTTATCCAC-3';

CDC42 R:
(SEQ ID NO: 51)
5'-TCTCAGGCACCCACTTTTCT-3';

PAK1 F:
(SEQ ID NO: 52)
5'-GTCACAGGGGAGTTTACGGG-3';

PAK1 R:
(SEQ ID NO: 53)
5'-GCCTGCGGGTTTTTCTTCTG-3';

NHE1 F:
(SEQ ID NO: 54)
5'-TTCCCTTCCTTACTCGTGGTG-3';

NHE1 R:
(SEQ ID NO: 55)
5'-AATCGAGCGTTCTCGTGGT-3';

ARF6 F:
(SEQ ID NO: 56)
5'-CAACGTGGAGACGGTGACTT-3';

ARF6 R:
(SEQ ID NO: 57)
5'-TCCCAGTGTAGTAATGCCGC-3';

PSD4 F:
(SEQ ID NO: 58)
5'-CAACCTTGGGCCTCTCTCAG-3';

PSD4 R:
(SEQ ID NO: 59)
5'-GTCCACCCTCCCTCTCATCT-3';

SDC1 F:
(SEQ ID NO: 60)
5'-CAGGAAAGAGGTGCTGGGAG-3';

SDC1 R:
(SEQ ID NO: 61)
5'-GCTGCCTTCGTCCTTCTTCT-3';

SNX5 F:
(SEQ ID NO: 62)
5'-ACTGGGAGAAGGTGAAGGGT-3';

SNX5 R:
(SEQ ID NO: 63)
5'-ACAGGGTGAGAAGAAAGCCG-3';

RAB5 F:
(SEQ ID NO: 64)
5'-TACTTCTGGGAGAGTCCGCT-3';

RAB5 R:
(SEQ ID NO: 65)
5'-TTTGGGTTAGAAAAGCAGCCC-3';

RAB7 F:
(SEQ ID NO: 66)
5'-GGTTCCAGTCTCTCGGTGTG-3';

RAB7 R:
(SEQ ID NO: 67)
5'-GAATGTGTTGGGGGCAGTCA-3';

SEPT2 F:
(SEQ ID NO: 68)
5'-AGCCCTTAGATGTGGCGTTT-3';

SEPT2 R:
(SEQ ID NO: 69)
5'-TCCTTTTCTTCAGCCGCTCC-3';

-continued

SEPT6 F:
(SEQ ID NO: 70)
5'-GGCTTTGGGGACCAGATCAA-3';

SEPT6 R:
(SEQ ID NO: 71)
5'-TCGGGAGTCATGGTAGGTGT-3';

EGFR F:
(SEQ ID NO: 72)
5'-CGCAGTTGGGCACTTTTGAA-3';

EGFR R:
(SEQ ID NO: 73)
5'-GGACATAACCAGCCACCTCC-3';

EGF F:
(SEQ ID NO: 74)
5'-GAGATGTGAGGAGTCGCAGG-3';

EGF R:
(SEQ ID NO: 75)
5'-GGTTGCATTGACCCATCTGC-3';

EPGN F:
(SEQ ID NO: 76)
5'-CCCAGCAAGCTGACAACATAG-3';

EPGN R:
(SEQ ID NO: 77)
5'-TTCAATTTTAGACACCTTTCTCCAG-3';

AREG F:
(SEQ ID NO: 78)
5'-TCGCTCTTGATACTCGGCTC-3';

AREG R:
(SEQ ID NO: 79)
5'-AATGGTTCACGCTTCCCAGA-3';

HBEGF F:
(SEQ ID NO: 80)
5'-GGTGGTGCTGAAGCTCTTTC-3';

HBEGF R:
(SEQ ID NO: 81)
5'-AGCTGGTCCGTGGATACAGT-3';

EREG F:
(SEQ ID NO: 82)
5'-ACGTGTGGCTCAAGTGTCAA-3';

EREG R:
(SEQ ID NO: 83)
5'-AGTGTTCACATCGGACACCA-3';

BTC F:
(SEQ ID NO: 84)
5'-CCTTGCCCTGGGTCTAGTG-3';

BTC R:
(SEQ ID NO: 85)
5'-CCACAGAGGAGGCCATTAGT-3';

TGFA F:
(SEQ ID NO: 86)
5'-CCTGTTCGCTCTGGGTATTGT-3';

TGFA R:
(SEQ ID NO: 87)
5'-GTGGGAATCTGGGCAGTCAT-3';

PDGFRA F:
(SEQ ID NO: 88)
5'-TGTGGAGAATCTGCTGCCTG-3';

PDGFRA R:
(SEQ ID NO: 89)
5'-CCTCCCAGTCCTTCAGCTTG-3';

-continued

PDGFRB F:
(SEQ ID NO: 90)
5'-TGGCCCTCAAAGGCGAG-3';

PDGFRB R:
(SEQ ID NO: 91)
5'-GAGCAGGTCAGAACGAAGGT-3';

PDGFA F:
(SEQ ID NO: 92)
5'-CACTAAGCATGTGCCCGAGA-3';

PDGFA R:
(SEQ ID NO: 93)
5'-AGATCAGGAAGTTGGCGGAC-3';

PDGFB F:
(SEQ ID NO: 94)
5'-TCCTGTCTCTCTGCTGCTAC-3';

PDGFB R:
(SEQ ID NO: 95)
5'-ATCAAAGGAGCGGATCGAGT-3';

PDGFC F:
(SEQ ID NO: 96)
5'-GACTCAGGCGGAATCCAACC-3';

PDGFC R:
(SEQ ID NO: 97)
5'-ATGAGGAAACCTTGGGCTGT-3';

PDGFD F:
(SEQ ID NO: 98)
5'-GCACCGGCTCATCTTTGTCT-3';

PDGFD R:
(SEQ ID NO: 99)
5'-GATTGCTCTCATCTCGCCTG-3';

CHUK F:
(SEQ ID NO: 100)
5'-GCTGCCCCGACTTCAGCAG-3';

CHUK R:
(SEQ ID NO: 101)
5'-ACTATTGCCCTGTTCCTCATTTGCCTCA-3';

NQO1 F:
(SEQ ID NO: 102)
5'-CTGGAGTGCAGTGGTGTGATC-3';

NQO1 R:
(SEQ ID NO: 103)
5'-AGGCAGGAGAATTGCTGGAAC-3';

h18s F:
(SEQ ID NO: 104)
5'-GGACACGGACAGGATTGACAG-3';

h18s R:
(SEQ ID NO: 105)
5'-CAACTAAGAACGGCCATGCAC-3';

TUBB1 F:
(SEQ ID NO: 106)
5'-TTGGCCAGATCTTTAGACCAGACAAC-3';

TUBB1 R:
(SEQ ID NO: 107)
5'-CCGTACCACATCCAGGACAGAATC-3';

ACTB F:
(SEQ ID NO: 108)
5'-TCACCCACACTGTGCCCATCTAC-3';

ACTB R:
(SEQ ID NO: 109)
5'-GGAACCGCTCATTGCCAATG-3'.

Extracellular Matrix (ECM) Preparation. Skin fibroblasts were seeded on 6/12/96-well plates. One day after plating, cells were switched into DMEM (with pyruvate) with 10% dialysed FBS supplemented with or without 500 µM $^3$H-proline and 100 µM Vitamin C. Cells were cultured for 6 days with media renewal every 24 h. After six days, skin fibroblasts were removed by washing in 1 ml or 500 µl or 100 µl per well PBS with 0.5% (v/v) Triton X-100 and 20 mM $NH_4OH$. ECM was washed five times with PBS before plating KC6141 cells. The following day, KC6141 cells were switched into the indicated medium for 24 or 72 hrs.

Metabolite Extraction. Cells grown on 12-well plate were rinsed with 1 ml cold saline and quenched with 250 µl cold methanol. 100 µl of cold water containing 1 µg norvaline was added, cell lysate was collected, and 250 µl of chloroform was added to each sample. After extraction the aqueous phase was collected and evaporated under nitrogen.

Gas Chromatography/Mass Spectrometry (GC/MS) Analysis. Dried polar metabolites were dissolved in 2% methoxyamine hydrochloride in pyridine (Thermo) and held at 37° C. for 1.5 h. After dissolution and reaction, tert-butyldimethylsilyl derivatization was initiated by adding 30 ml N-methyl-N-(tertbutyldimethylsilyl) trifluoroacetamide and 1% tert-butyldimethylchlorosilane (Regis) and incubating at 37° C. for 1 h. GC/MS analysis was performed using an Agilent 6890 GC equipped with a 30m DB-35MS capillary column connected to an Agilent 5975B MS operating under electron impact ionization at 70 eV. One microlitre of sample was injected in splitless mode at 270° C., using helium as the carrier gas at a flow rate of 1 ml/min. For measurement of amino acids, the GC oven temperature was held at 100° C. for 3 min and increased to 300° C. at 3.5° C./min. The MS source and quadrupole were held at 23° C. and 150° C., respectively, and the detector was run in scanning mode, recording ion abundance in the range of 100-605 m/z. Mole percent enrichments of stable isotopes in metabolite pools were determined by integrating the appropriate ion fragments (Cordes and Metallo, 2019) and correcting for natural isotope abundance as previously described (Kumar et al., 2020).

Cell viability assay. Cell viability was determined with Cell Counting Kit-8 assay (CCK-8 assay kit, Glpbio). Cells were plated in 96-well plates at a density of 3000 cells (MIA PaCa-2) or 1500 cells (KC6141) per well and incubated overnight prior to treatment. EIPA (10 µM), MRT68921 (600 nM) or erlotinib (2 µM, Sigma) were added to the wells for 72 and 96 hrs. Next, 10 µL of CCK-8 was added to each well. The optical density was read at 450 nm using a microplate reader (FilterMax F5, Molecular Devices, USA) at day 0, 1, 2, 3, and 4. For glutamine-deprivation assays, cells in 96-well plates were rinsed briefly in PBS and incubated in the 0.2 mM glutamine. Glutamine-free DMEM medium was supplemented with 0.2 mM glutamine in the presence of 10% dialysed FBS and 25 mM HEPES. For some conditions, the medium was supplemented with a final concentration of 2% BSA (Fraction V, fatty-acid-, nuclease and protease-free, Calbiochem). For all experiments, media were replaced every 24 hrs. Viable cell counts were obtained using CCK-8 assay described as above.

In some embodiments, cells were plated in 96-well plates coated with or without ECM at a density of 3000 cells (MIA PaCa-2, 1444, 1305, COLO 357/FG) or 1500 cells (KC6141) per well and incubated overnight prior to treatment. EIPA (10.5 µM), IPI549 (600 nM), MBQ-167 (500 nM), MRT68921 (600 nM) or erlotinib (2 µM, Sigma), ML385 (10 µM, Sigma), HCQ (10 µM or 80 µM) or their combinations were added to the wells for 24, 72 or 96 hrs. Next, 10 µL of CCK-8 was added to each well. The optical density was read at 450 nm using a microplate reader (FilterMax F5, Molecular Devices, USA) at day 0, 1, 2, 3, and 4. For glutamine-deprivation assays, cells in 96-well plates were rinsed briefly in PBS and incubated in the 0.2 mM glutamine. Glutamine-free DMEM medium was supplemented with 0.2 mM glutamine in the presence of 10% dialyzed FBS and 25 mM HEPES. For glucose-deprivation assays, cells in 96-well plates were rinsed briefly in PBS and incubated in the 0.5 mM glucose. Glucose-free DMEM medium was supplemented with 0.5 mM glucose in the presence of 10% dialyzed FBS and 25 mM HEPES. For some conditions, the medium was supplemented with a final concentration of 2% BSA (Fraction V, fatty-acid-, nuclease and protease-free, Calbiochem). For all experiments, media were replaced every 24 hrs. Viable cell counts were obtained using CCK-8 assay described as above.

Luminescence ATP Detection Assay. Intracellular ATP level was determined with luminescence ATP detection assay system (PerkinElmer) according to manufacturer's protocol. Briefly, KC6141 cells were grown on 96-well plates coated with or without ECM in the presence of 100 µl 0.5 mM glucose medium with or without EIPA (10.5 µM), MBQ-167 (500 nM), MRT68921 (600 nM) or their combinations for 24 hrs. 50 µl mammalian cell lysis solution was added and shaken for 5 minutes. Next, 50 µl substrate solution was added and shaken for five minutes. Finally, plate was adapted in dark for 10 minutes and luminescence was measured.

L-Amino Acid Assay. Total amount of free L-amino acids (except for glycine) were measured by L-Amino Acid Assay Kit (Colorimetric) (antibodies) according to manufacturer's protocol. Briefly, KC6141 cells were grown on 6-well plates coated with or without ECM and treated as above. The cells were resuspended at $10^6$ cells/mL 1× Assay Buffer and were homogenized on ice and then centrifuged to remove debris. 50 µL of each L-Alanine standard or cell lysis was added into wells of a 96-well microtiter plate. Then 50 µL of Reaction Mix was added to each well. The well contents were mixed thoroughly and incubated for 90 minutes at 37° C. protected from light. The plate was read with a spectrophotometric microplate reader in the 540-570 nm range. The concentration of L-Amino Acids was calculated within samples by comparing the sample OD to the standard curve.

NADPH/NADP Measurement. NADPH and NADP measurement was performed using NADP/NADPH-Glo™ Assays (Promega #G9081) according to manufacturer's protocol. Briefly, KC6141 cells were grown on 96-well plates coated with ECM and treated as above. Then medium was removed and replaced with 50 µl of PBS and 50 µl of base solution with 1% DTAB. The plate was briefly mixed to ensure homogeneity and cell lysis. 50 µl of each sample was removed to an empty well for acid treatment. 25 µl per well of 0.4N HCl was added into these samples. All samples were incubated for 15 minutes at 60° C. and then equilibrated for 10 minutes at room temperature. 25 µl of 0.5M Trizma® base was added into each well of acid-treated cells to neutralize the acid. 50 µl of HCl/Trizma® solution was added to each well containing base-treated samples. Then 100 µl of NADP/NADPH-Glo™ Detection Reagent was added into each well and incubated for 30 minutes at room temperature. Luminescence was recorded using a luminometer.

Immunohistochemistry. Pancreata were dissected and fixed in 4% paraformaldehyde in PBS and embedded in paraffin. 5 mm sections were prepared and stained with hematoxylin and eosin (H&E). Immunohistochemistry (IHC) was performed as follows: after xylene de-paraffinization and rehydrated through graded ethanol, antigen retrieval was performed for 20 min at 100° C. with 0.1% sodium citrate buffer (pH 6.0). Following quenching of endogenous peroxidase activity with 3% $H_2O_2$ and blocking of nonspecific binding with 5% bovine serum albumin buffer, sections were incubated overnight at 4° C. with the appropriate primary antibodies followed by incubation with 1:200 biotinylated secondary antibodies for 30 min and 1:500 streptavidin-HRP for 30 min. Bound peroxidase was visualized by 1-10 min incubation in a 3, 3'-diaminobenzidine (DAB) solution (Vector Laboratories, SK-4100). Slides were photographed on an upright light/fluorescent Imager A2 microscope with AxioVision Release 4.5 software (Zeiss, German).

Figures 17A, 17B:
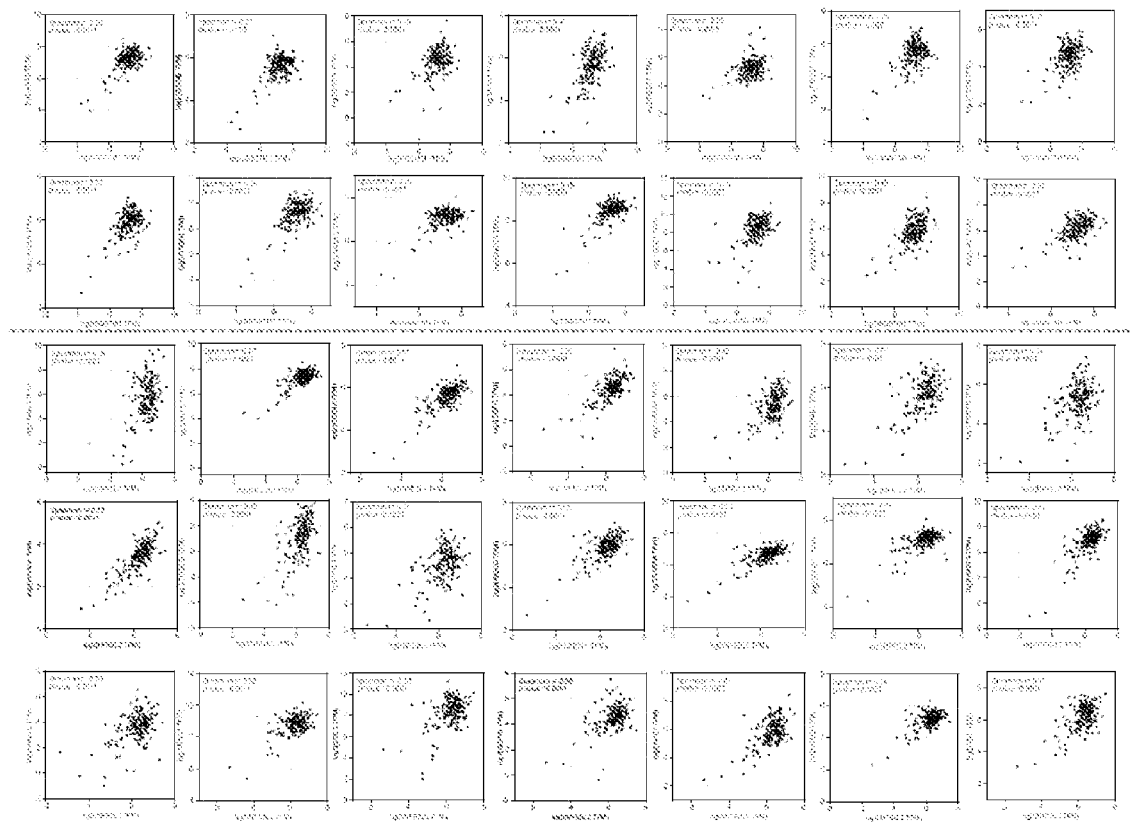
Figure 18A:
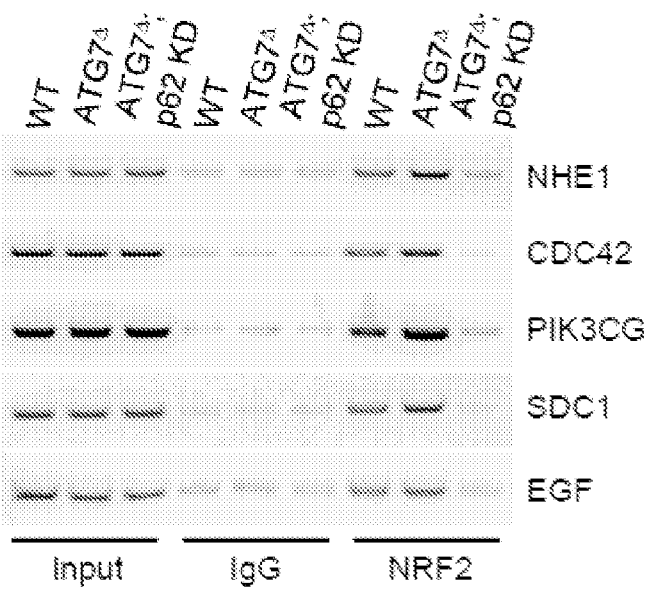
FIGS. 18A-18N show that NRF2 controlled MP in response to autophagy deficiency, oxidative stress and hypoxia.
Figure 18B:
FIGS. 18B-18F show the quantification of the PCR-amplified promoter DNA fragments of FIG. 18A illustrating the enhanced recruitment of NRF2 to the NHE1 promoter (FIG. 18B), CDC42 promoter (FIG. 18C), PIK3CG promoter (FIG. 18D), SDC1 promoter (FIG. 18E), EGF promoter (FIG. 18F).
Figure 18B:
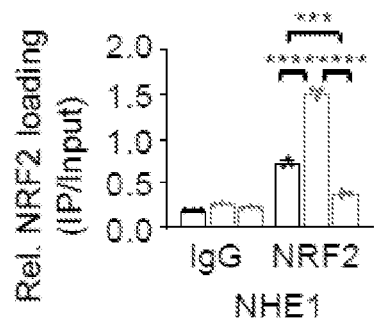
Figure 18C:
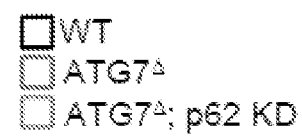
Figure 18C:
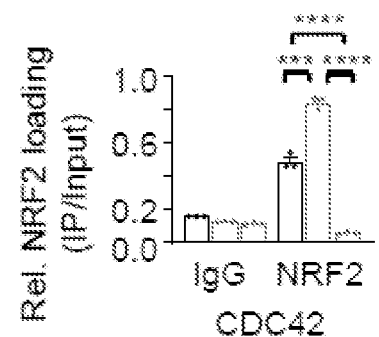
Figure 18D:
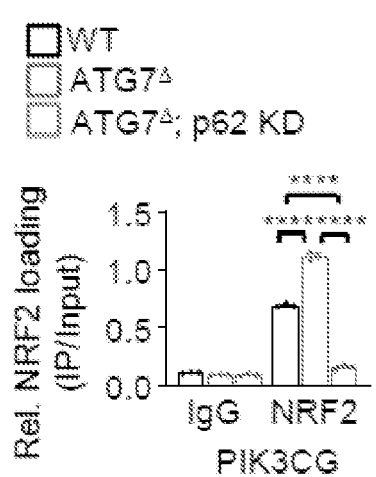
Figure 18E:
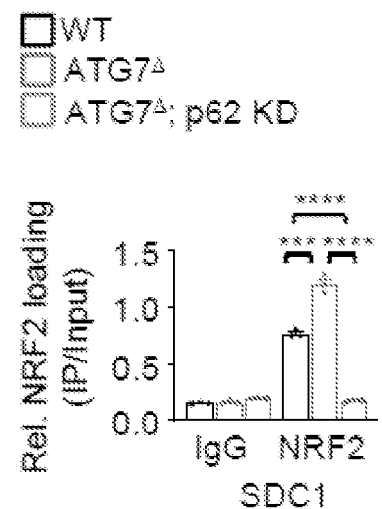
Figure 18F:
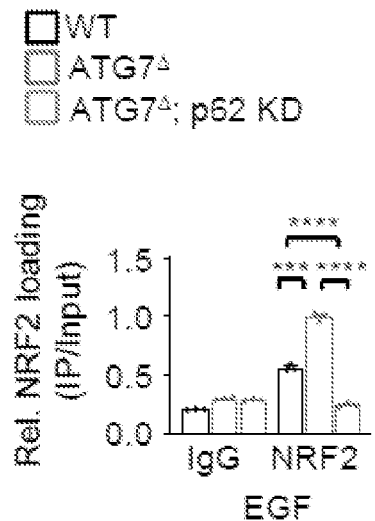
Figure 18G:
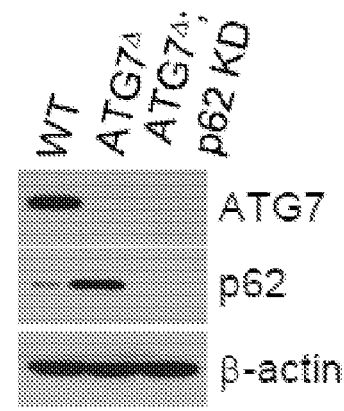
FIG. 18G shows an immunoblot analysis illustrating the expression of ATG7 and p62 WT, ATG7$^\Delta$, and ATG7$^\Delta$;p62 KD MIA PaCa-2 cells of FIG. 18A.
Figure 18H:
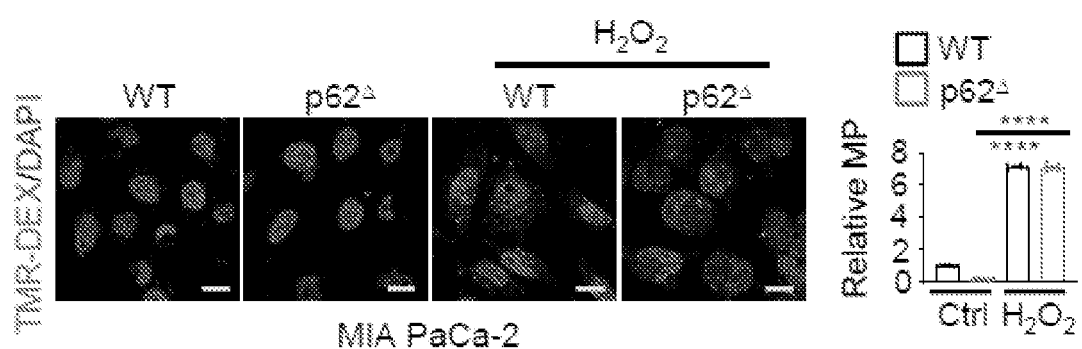
FIG. 18H shows an immunofluorescence staining and quantification illustrating the localization and relative levels of macropinosomes (TMR-DEX) in WT and p62$^\Delta$ MIA PaCa-2 cells treated with hydrogen peroxide ($H_2O_2$); the quantification shows that $H_2O_2$ treatment enhanced the relative levels of macropinosomes when compared to untreated control.
Figure 18I:
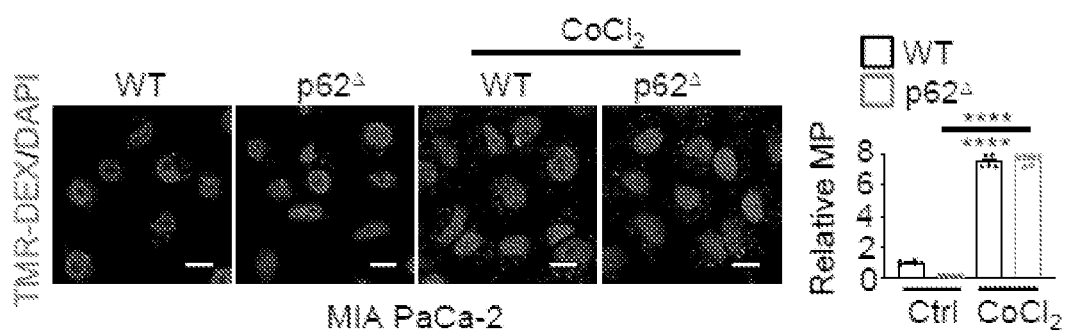
FIG. 18I shows an immunofluorescence staining and quantification illustrating the localization and relative levels of macropinosomes (TMR-DEX) in WT and p62$^\Delta$ MIA PaCa-2 cells treated with Cobalt (II) chloride ($CoCl_2$); the quantification shows that $CoCl_2$ treatment enhanced the relative levels of macropinosomes when compared to untreated control.
Figure 18J:
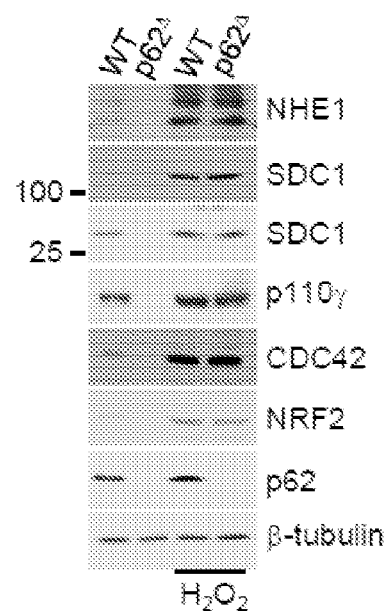
FIG. 18J shows an immunoblot analysis illustrating the expression of MP-related proteins in WT and p62$^\Delta$ MIA PaCa-2 cells treated with $H_2O_2$ of FIG. 18H.
Figure 18K:
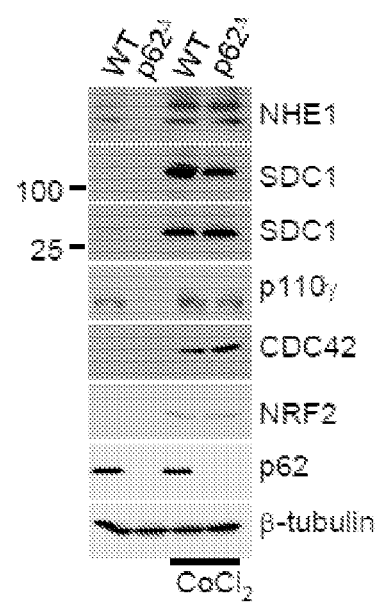
FIG. 18K shows an immunoblot analysis illustrating the expression of MP-related proteins in WT and p62$^\Delta$ MIA PaCa-2 cells treated with $CoCl_2$ of FIG. 18I.
Figure 18L:
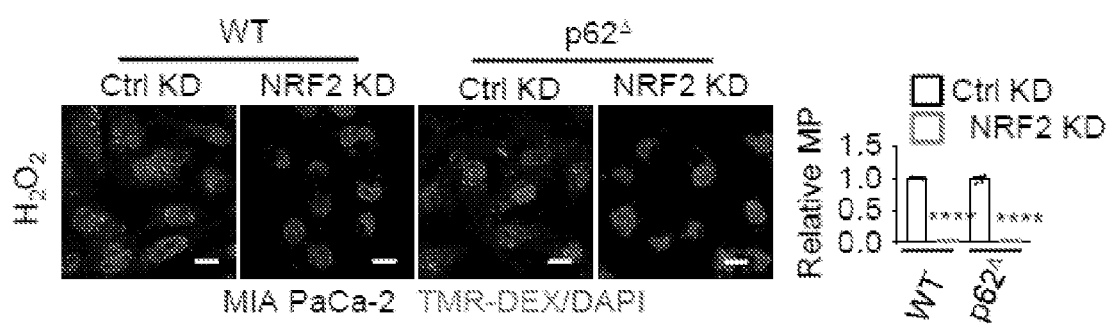
FIG. 18L shows an immunofluorescence staining and quantification illustrating the localization and relative levels of macropinosomes (TMR-DEX) in WT, p62A MIA PaCa-2 cells, in the presence (control KD) or absence of NRF2 (NRF2 KD) and treated with $H_2O_2$; NRF2 KD suppressed the stimulatory effect of $H_2O_2$ on macropinosomes.
Figure 18M:
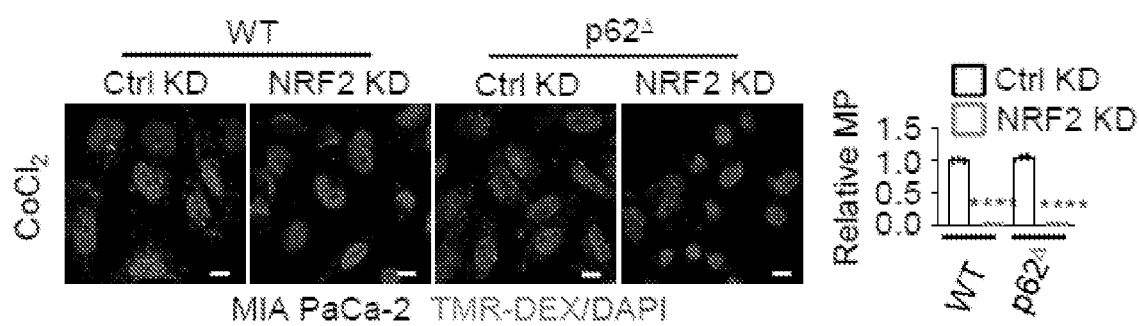
FIG. 18M shows an immunofluorescence staining and quantification illustrating the localization and relative levels of macropinosomes (TMR-DEX) in WT, p62$^\Delta$ MIA PaCa-2 cells, in the presence (control KD) or absence of NRF2 (NRF2 KD) and treated with $CoCl_2$.
Figure 18N:
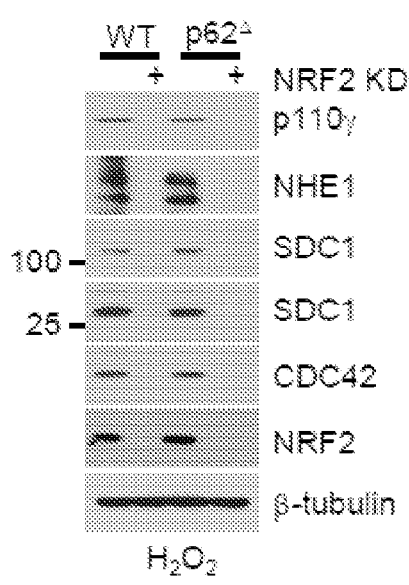
Figure 18O:
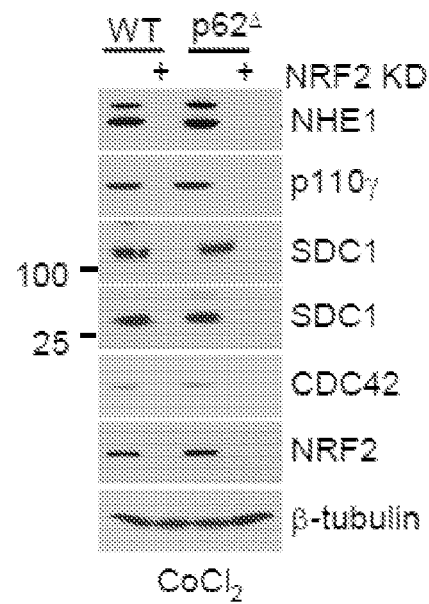
FIG. 18O shows an immunoblot analysis illustrating the expression of MP-related proteins in WT, p62$^\Delta$ MIA PaCa-2 cells of FIG. 18M.

IHC Scoring. A modified labeling score (H score) which is calculated by using percentage of positive stained cancer cells and their intensity per tissue core as before (Todoric et al., 2017). Intensity of stain was determined by dominant staining and was divided into four categories (0, negative; 1, weak; 2, moderate; 3, strong). By multiplying staining intensity and percentage of positive stained tumor cells ranged from 0 to 100%, H score got a range of 0-300. Cores with overall scores of 0-5, 5-100, 101-200, 201-300 were classified as negative, weak, intermediate and strong expression level. Complete absence of staining or less than 5% of cancer cells stained faintly were thought to be negative (H-score, 0-5). Negative and weak were viewed as low expression level and intermediate and strong were viewed as high expression level. For cases with tumors with two satisfactory cores, the results were averaged; for cases with tumors with one poor-quality spot, results were based on the interpretable core. Based on this evaluation system, Spearman correlation analysis or Chi-square test was used to estimate the association between IKKα, p62, NRF2, and MP-related proteins staining intensities. The number of evaluated cases for each different staining in PDAC tissues and the scoring summary is indicated (FIG. 17B).

Quantification and statistics. To quantify the number of LC3 puncta, a total of 30 cells were recorded and analyzed using the LAS X measurement program on the TCS SPE Leica. Macropinosomes were quantified by using the 'Analyze Particles' feature in ImageJ (National Institutes of Health). Macropinocytic uptake index was computed by determining the total macropinosome area in relation to the total cell area for each field and then by determining the average across all the fields (at least 6 fields). These measurements were done on randomly-selected fields of view. Two-tailed unpaired Student's t test was performed for statistical analysis using GraphPad Prism software. All data are presented as Mean±SEM (*$p<0.001$, $p<0.01$, *$p<0.05$).

In some embodiments, to quantify LC3 puncta or LC3-LAMP1 co-localization, a total of 30 cells were recorded and analyzed using the LAS X measurement program on the TCS SPE Leica. Macropinosomes were quantified by using the 'Analyze Particles' feature in Image J (National Institutes of Health). LC3 puncta in human PDAC specimens or macropinocytic uptake index (Commisso et al., 2014) was computed by determining the total LC3 puncta or macropinosome area in relation to the cytoplasmic area or total cell area for each field and then by determining the average across all the fields (at least 6 fields). These measurements were done on randomly-selected fields of view. Two-tailed unpaired Student's t test was performed for statistical analysis using GraphPad Prism software. Data are presented as mean±SEM. Kaplan-Meier survival curves were analyzed by log rank test. Statistical correlation between p62 or NRF2 and MP-related mRNA expression in human PDAC was determined by nonparametric spearman correlation analysis. (**$p<0.0001$, *$p<0.001$, **$p<0.01$, *$p<0.05$).

Example 2: IKKα is Absent in a Fraction of Human PDACs

PEC-specific ablation of IKKα reduces autophagic flux and enhances PanIN to PDAC progression in $Kras^{G12D}$ mice[16]. To determine whether IKKα expression is altered in human PDAC, 12 patient-derived xenografts (PDXs) were analyzed by immunoblotting (IB). As shown in FIG. 1A, 25% of the specimens showed little or no IKKα expression. IKKα-deficient tumors also showed marked accumulation of the autophagy adaptor p62, suggesting they are autophagy-deficient.

Example 3: IKKα is Needed for Autophagosome-Lysosome Fusion

Figure 1E:
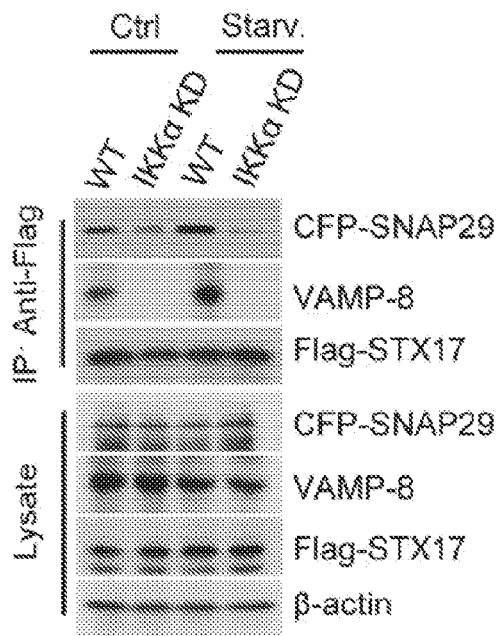
Figure 1F:
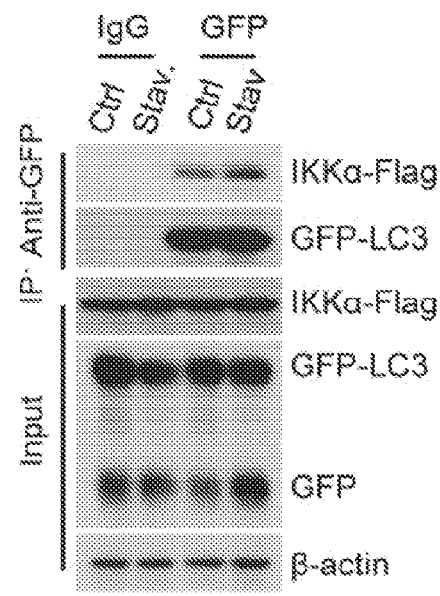
Figure 1G:
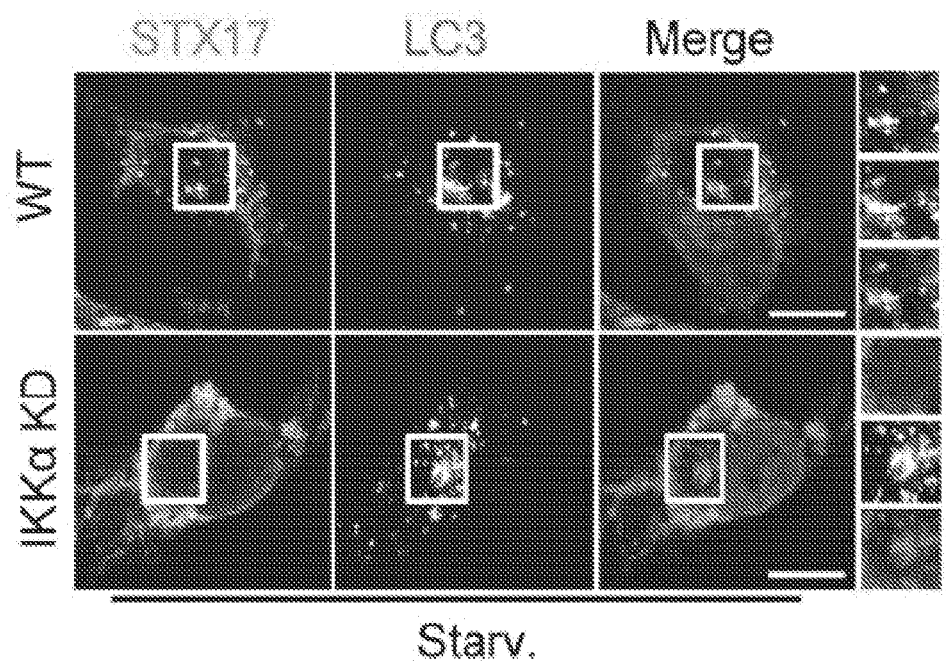

To directly determine whether IKKα controls autophagy in human PDAC, IKKα was knocked down (KD) in MIA PaCa-2 cells and stably transduced them with a GFP-LC3 reporter. IKKα-deficient cells showed reduced GFP-LC3 cleavage under basal conditions and after glucose starvation (FIG. 1B). IKKα-deficient cells also displayed more LC3 puncta, lipidated LC3-II and p62, both under fed and starved conditions (FIG. 1C and FIGS. 1J-1M), indicating defective autophagic degradation. This was confirmed by treatment with the lysosome inhibitor chloroquine (CQ), which did not increase p62 and LC3-II in IKKα-deficient cells (FIGS. 1K and 1M).

To investigate whether defective autophagic degradation in IKKα-deficient PDAC cells was due to a block in autophagosome-lysosome fusion, cells were transfected with GFP-mCherry-tagged LC3 plasmid and then placed in nutrient-deficient medium. Under non-lysosomal and neutral pH, both GFP and mCherry are highly fluorescent. However, the low pH in the lysosome lumen quenches the GFP signal, but not the mCherry signal. Using this approach, it was found that in parental cells, most puncta lost the GFP signal and retained the mCherry signal (FIG. 1N). However, in IKKα-deficient cells, GFP quenching was significantly diminished as indicated by retention of both the mCherry and GFP signals (FIG. 1N), implying defective fusion. This was further confirmed by the dramatically reduced GFP-LC3 and Lamp1 colocalization in IKKα-KD cells shown in FIG. 1D.

Autophagosome-lysosome fusion is mediated by soluble N-ethylmaleimide-sensitive factor attachment protein receptor (SNARE) complex formation, which involves syntaxin 17 (STX17) recruitment to autophagosomes. STX17 then bridges SNAP29 on autophagosomes with VAMP8 on lysosomes to drive the fusion process[20]. To examine IKKα involvement in this process, SNARE complex formation was assessed in WT and IKKα-knock down (IKKα-KD) MIA PaCa-2 cells. As shown in FIG. 1E, IKKα deficiency dramatically inhibited STX17-SNAP29-VAMP8 complex formation both under fed and starved conditions.

To determine how IKKα regulates SNARE complex formation, IKKα-LC3 interaction was assessed because IKKα contains potential LC3 interaction motifs (LIR motifs) (FIG. 1O) that are present in LC3-interacting proteins[21, 22]. As shown in FIGS. 1F and 1P, IKKα interacted with LC3 and this interaction was enhanced by starvation. However, IKKβ did not interact with LC3 (FIG. 1P), supporting an earlier finding that IKKβ does not have a critical role in the maintenance of pancreatic homeostasis[18].

Since LC3-II recruits STX17 to autophagosomes[23], and the mechanism by which IKKα regulates STX17 subcellular localization was assessed. In particular, STX17-LC3 co-localization was examined in starved parental and IKKα-KD MIA PaCa-2 cells. As shown in FIG. 1G, IKKα KD prevented STX17-autophagosome localization. IKKα KD also abolished the association of STX17 with LC3 both under fed and starved conditions (FIG. 1H).

Figures 1H, 1I:
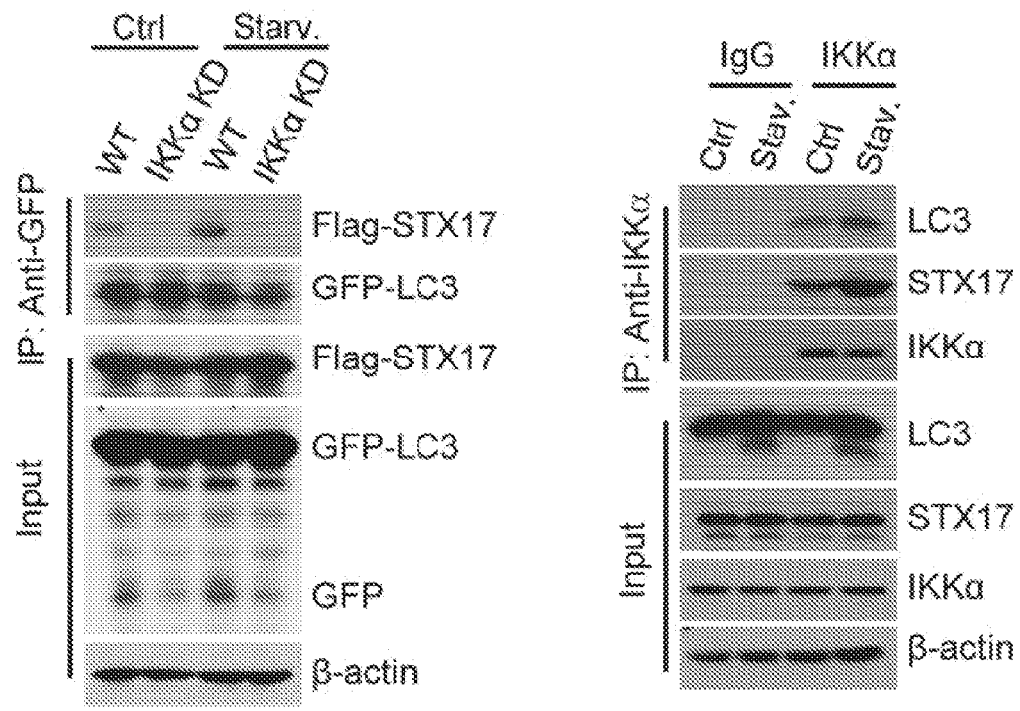
Figure 1J:
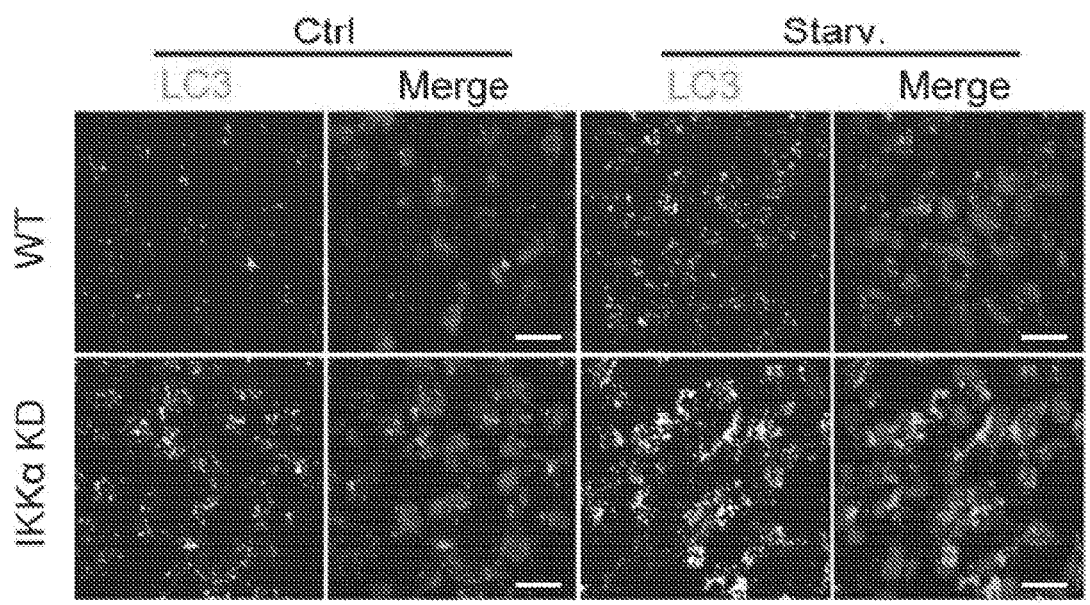
Figure 1K:
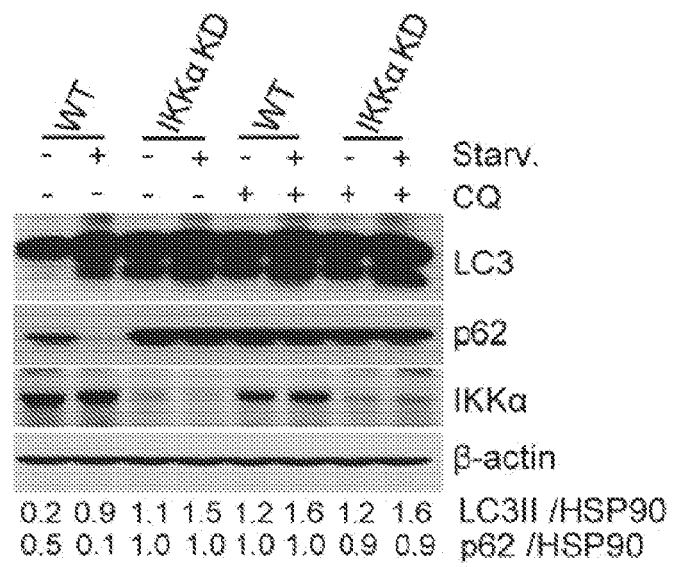
Figure 1L:
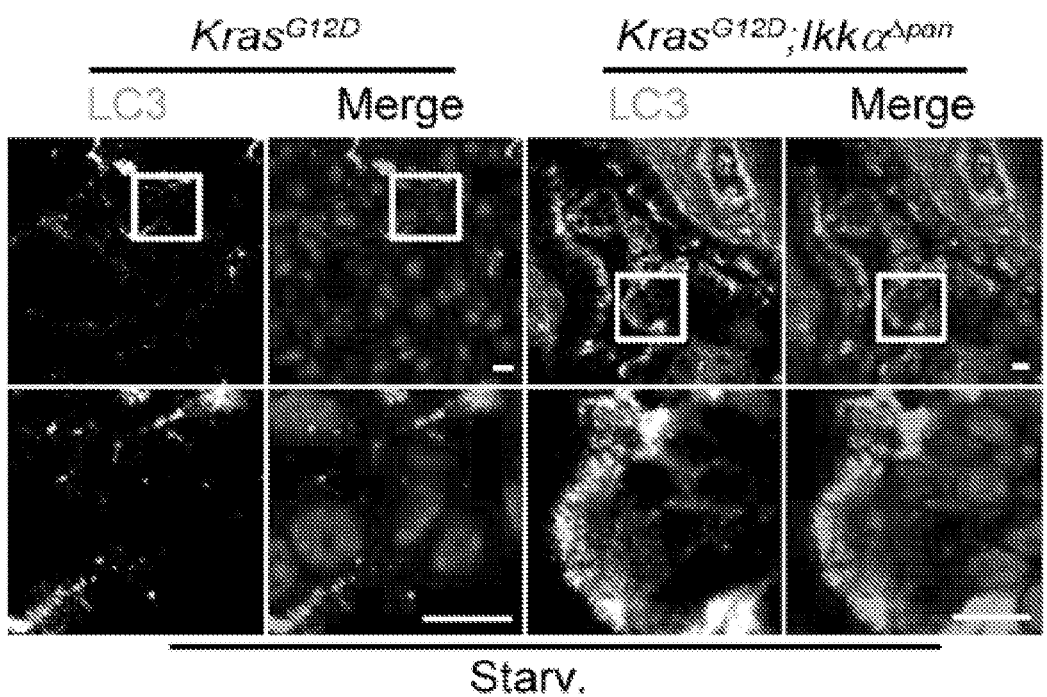
Figure 1M:
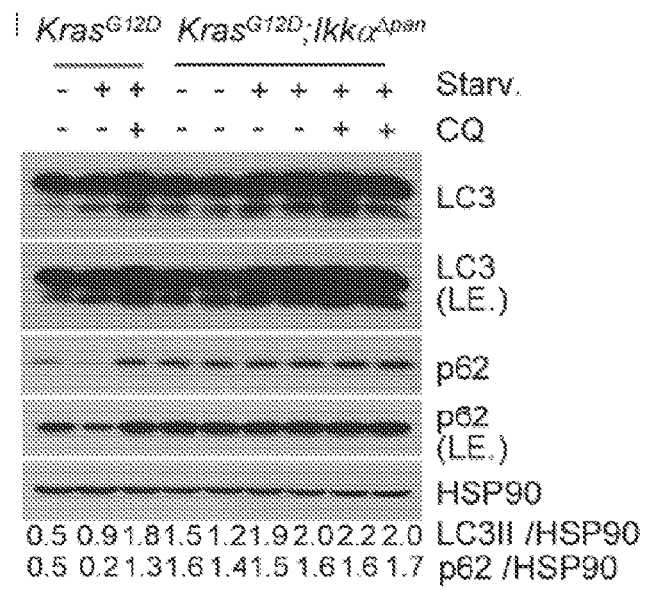
Figure 1N:
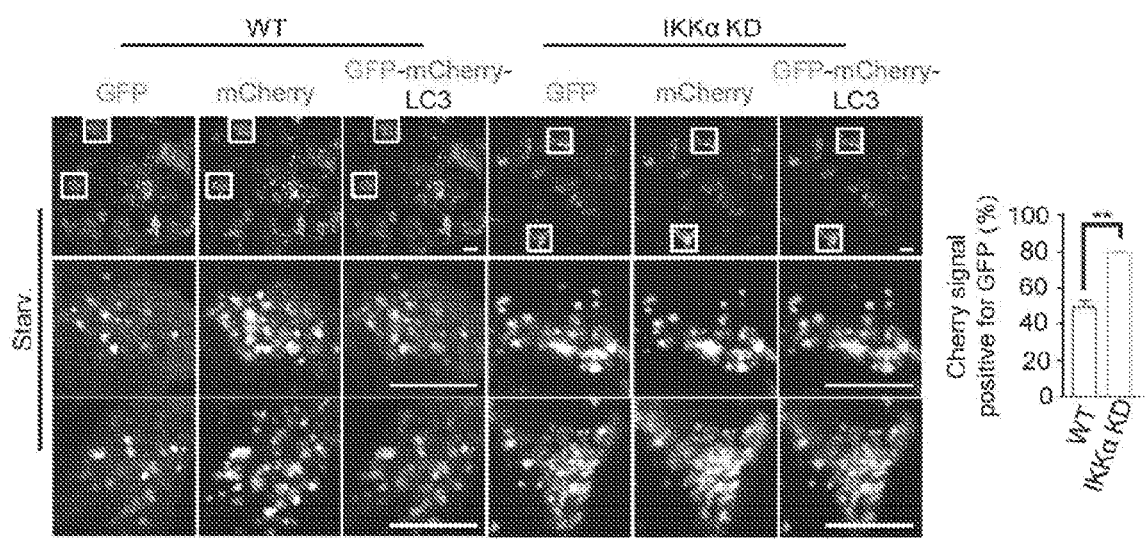

Moreover, LC3 and STX17 co-immunoprecipitated with IKKα and this interaction of LC3 and STX17 was enhanced by starvation (FIG. 1I). FIG. 1Q also showed that IKKα directly localized to autophagosomes under starvation conditions. However, the amounts IKKα that was associated with autophagosomes were not high potentially due to the transient nature of the SNARE-induced fusion process. Together, these results suggested that IKKα downregulation interfered with autophagic flux in vitro and in vivo. These results also showed that IKKα facilitated autophagosome-lysosome fusion by interacting with LC3 and STX17.

Example 4: IKKα Loss Upregulates Micropinocytosis

Figure 2A:
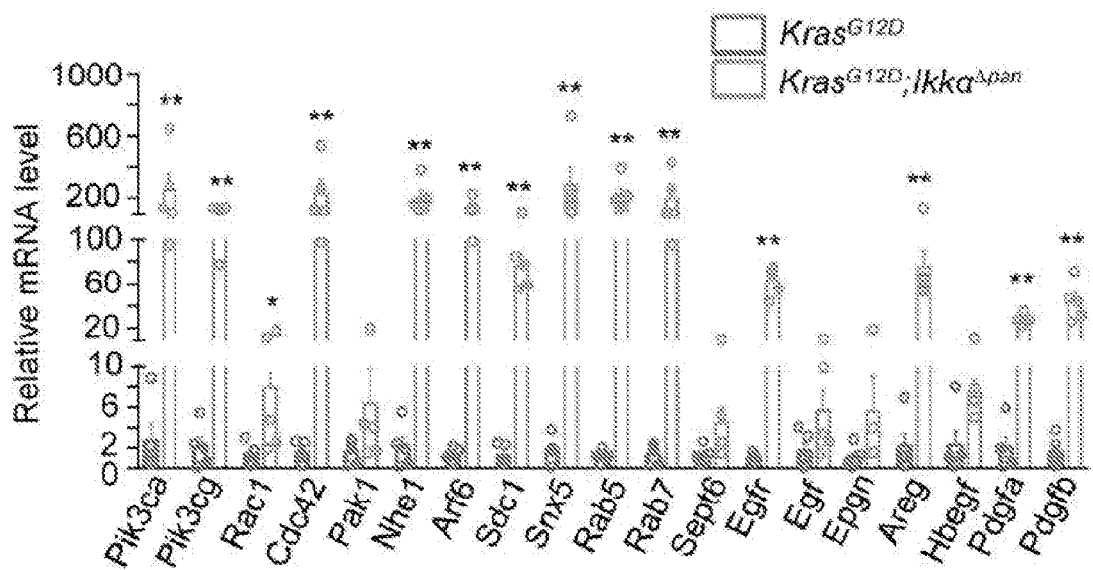
FIGS. 2A-2D are graphical and pictorial images showing IKKα deficiency causes upregulation of MP.
Figure 2B:
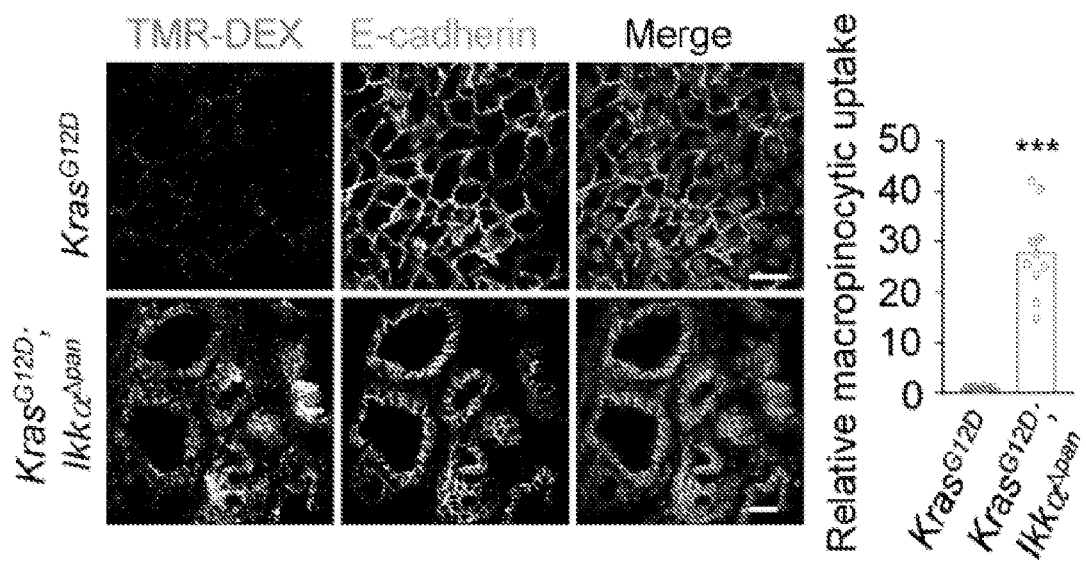
Figure 2C:
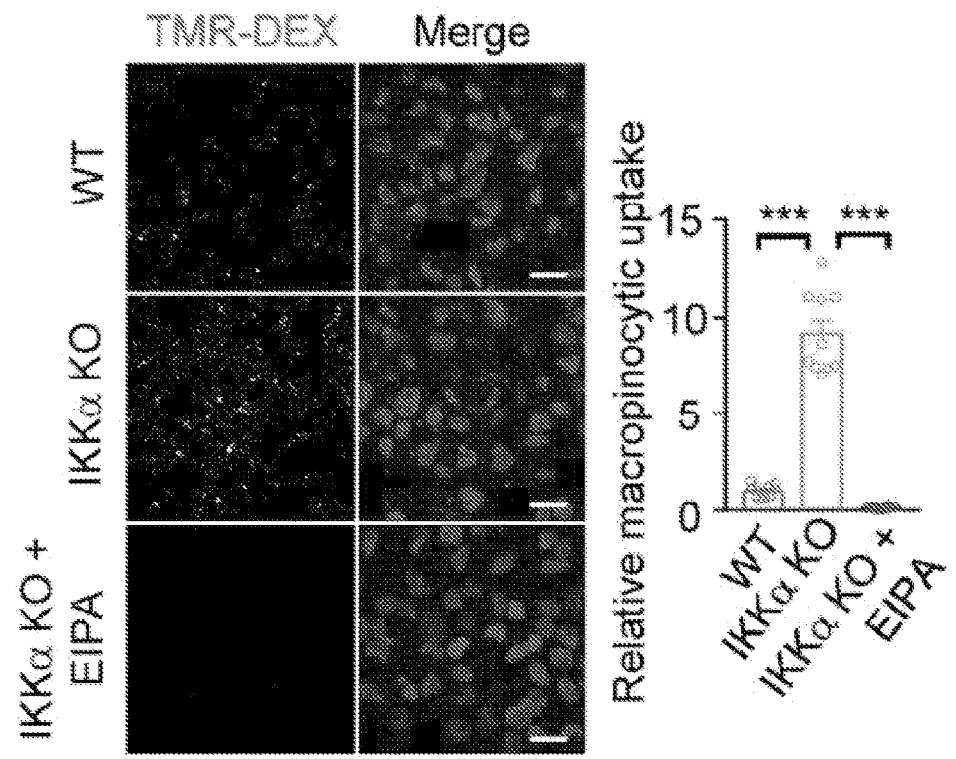
Figure 2D:
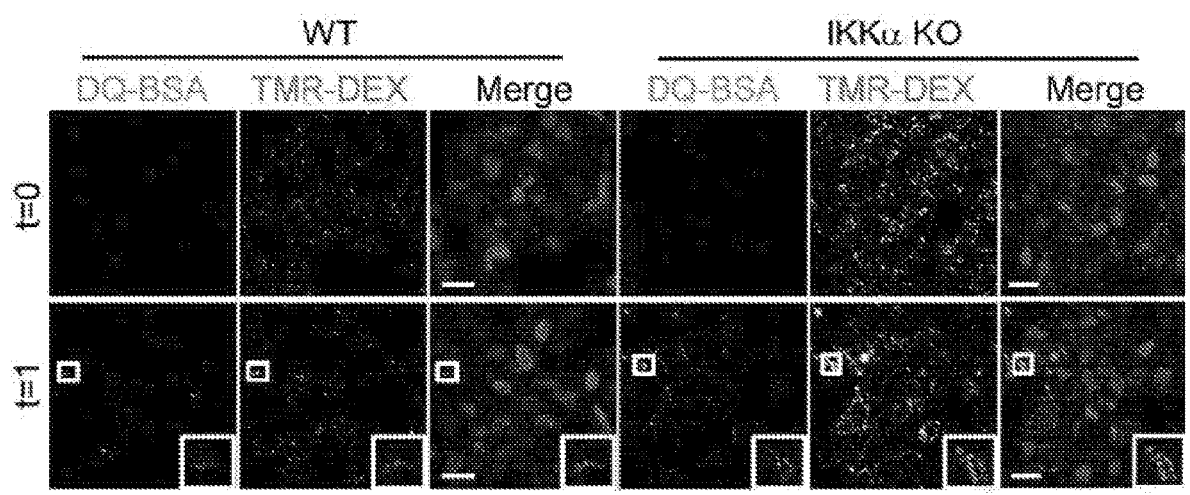
Figure 2E:
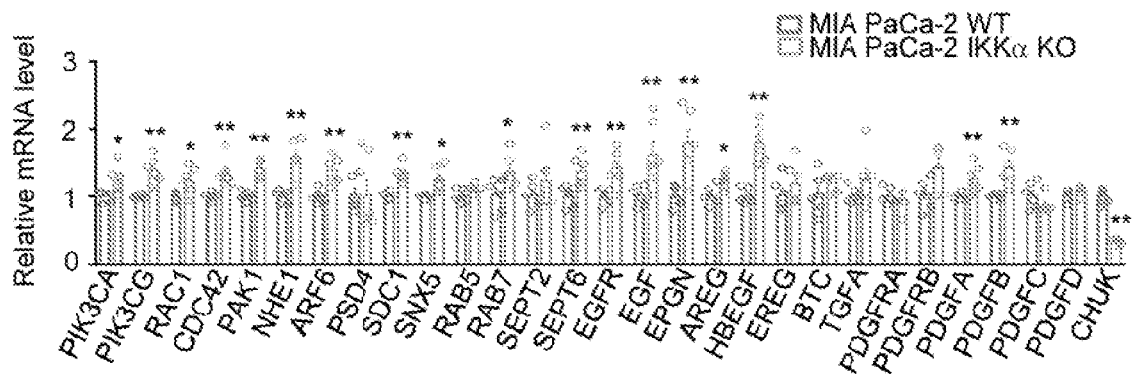
FIGS. 2E-2H are graphical and pictorial diagrams showing that macropinocytosis is upregulated in IKKα-deficient PDAC.
Figure 2F:
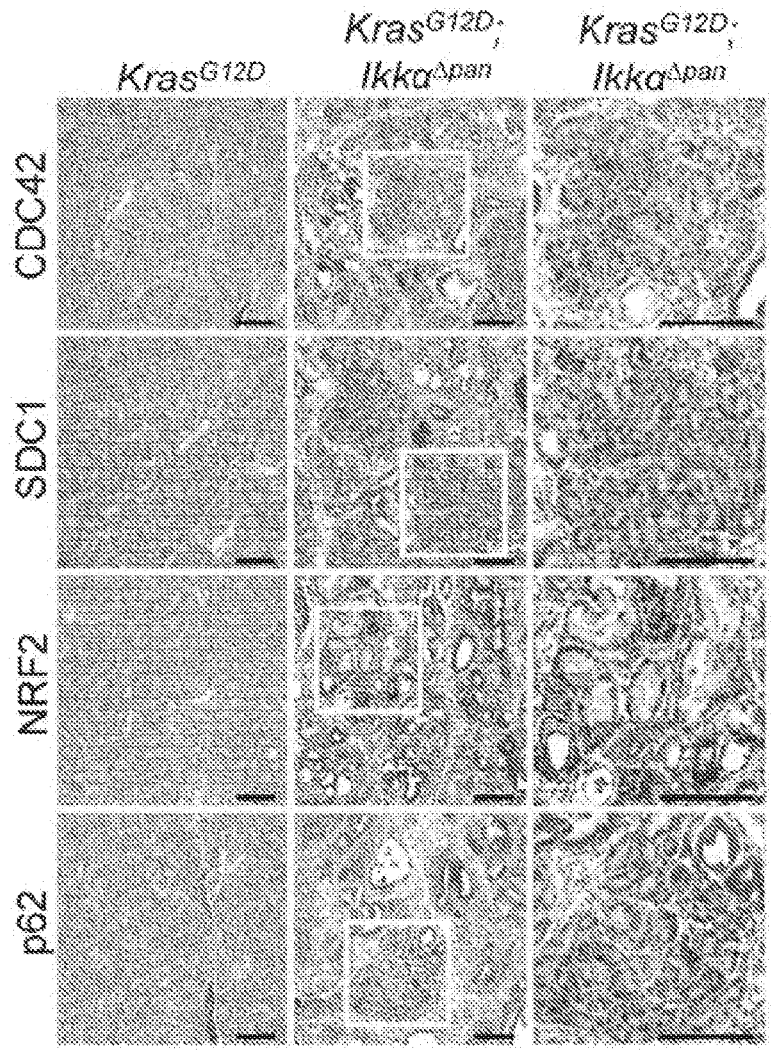
Figure 2G:
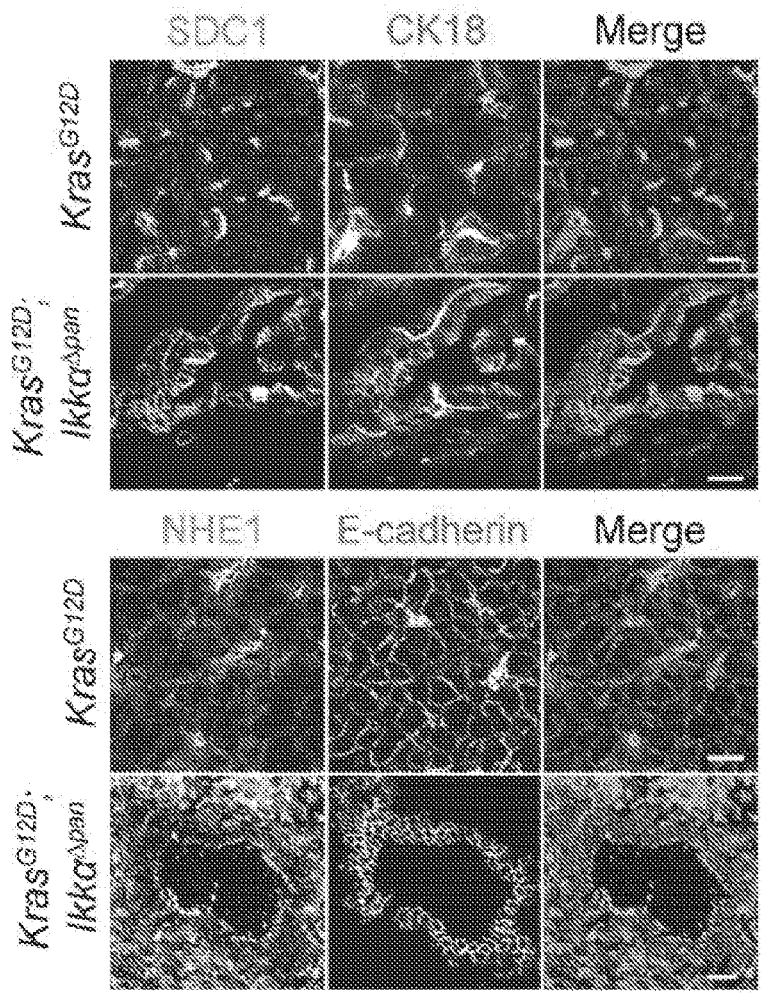

Autophagy promotes tumor growth and survival by supporting cellular metabolism, sustaining AA pools in pancreatic cancer[8, 10]. The mechanism by which IKKα-deficient PDACs form and survive despite defective autophagy was assessed. Because, macropinocytosis (MP) provides an alternative nutrient supply and survival pathway through ingestion and digestion of extracellular proteins[19, 24], the role of MP was evaluated. As shown in FIG. 2A, Ikkα-null $Kras^{G12D/PEC}$ pancreata showed dramatic (several hundred-fold) upregulation of MP-related genes. Ikkα-null $Kras^{G12D/PEC}$ pancreata also exhibited higher MP rates when compared to $Kras^{G12D}$/PE pancreata (FIG. 2B). MP was measured by evaluating the uptake of tetramethylrhodamine-labeled high-molecular-mass dextran (TMR-DEX), which is an established MP marker[25]. In addition, several EGF and PDGF family member mRNAs, including Egf; Ereg, Areg, Hbegf, Pdgf-a and Pdgf-b were upregulated. Similar results were observed in IKKα-ablated MIA PaCa-2 cells (FIGS. 2C and 2E). To confirm that TMR-DEX labeling in PDAC cells reflected MP, PDAC cells were treated with 5-(N-ethyl-N-isopropyl) amiloride (EIPA). As shown in FIG. 2C, EIPA blocks macropinosome formation in PDAC cells[19, 26]. IKKα-ablated pancreata also showed upregulation of p62, NRF2, CDC42, and elevated syndecan 1 (SDC1) (FIG. 2F). As shown in FIG. 2G, the cell surface localization of the $Na^+/H^+$ exchanger 1 (NHE1) was also disrupted in IKKα-ablated pancreata. NHE1 is the target for EIPA. These results implicated the higher activity of the small GTPase RAC1, which is controlled by SDC1[26] and NHE1[27] and has a crucial role in formation of initial membrane ruffles and MP[28].

Figure 2H:
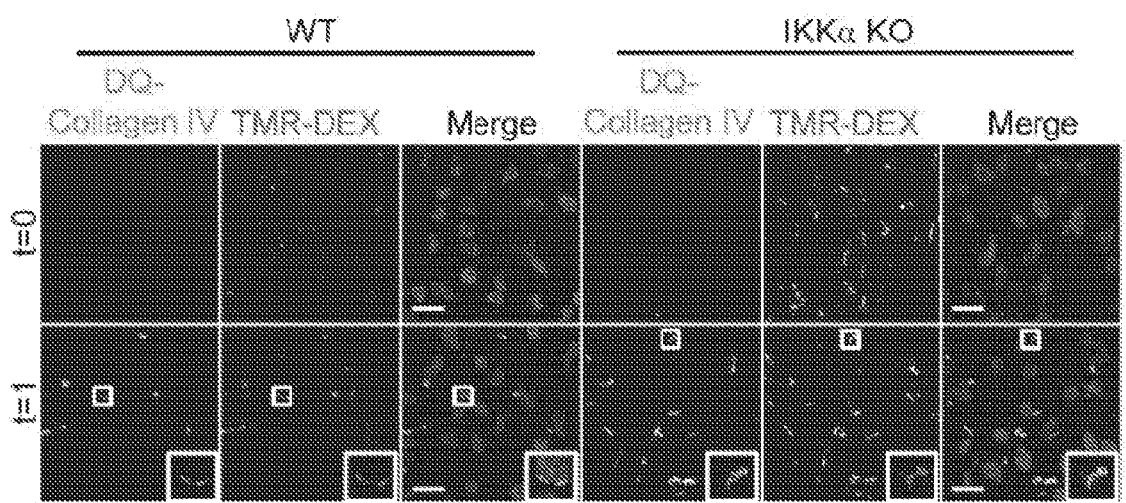

Macropinosomes that engulf internalized proteins, such as albumin, and their fusion to lysosomes and subsequent degradation can provide amino acid that sustain tumor cell bioenergetics and macromolecular synthesis[24]. To determine whether albumin internalized via MP is indeed degraded, WT and IKKα-deficient MIA PaCa-2 cells were co-incubated with a self-quenched BODIPY-dye-conjugated BSA (DQ-BSA), a dye that emits a bright fluorescent signal only after proteolytic digestion. As shown in FIG. 2D, there were no appreciable differences in DQ-BSA fluorescence within macropinosomes of IKKα-sufficient and -deficient MIA PaCa-2 cells which were immediately fixed following a 30-min incubation with DQ-BSA and TMR-DEX. However, in IKKα-ablated cells that were incubated with DQ-BSA and TMR-DEX for 30 min followed by a 1 hour chase without any indicator, more DQ-BSA fluorescence in TMR-positive macropinosomes was observed (FIG. 2D). Similar results were obtained using DQ-Collagen IV (FIG. 2H), corresponding to the main collagen in human PDAC29. These experiments confirmed that IKKα deficiency results in upregulation of MP.

Figure 3A:
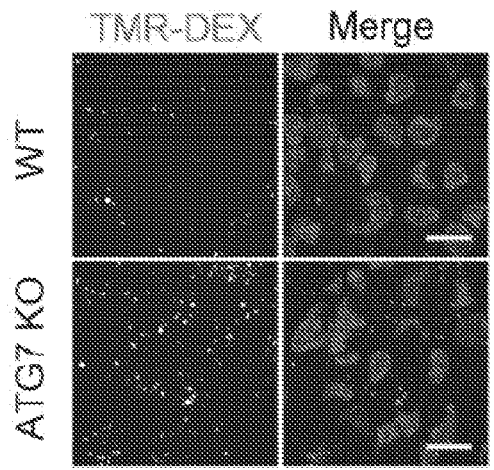
FIGS. 3A-3J are pictorial diagrams showing that the Autophagy-to-MP switch depends on p62-induced NRF2 activation.
Figure 3C:
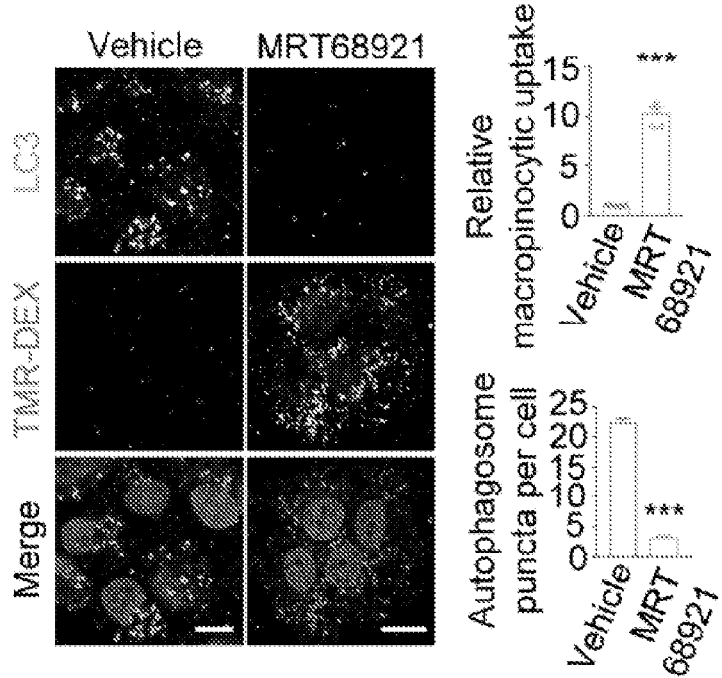
Figure 3B:
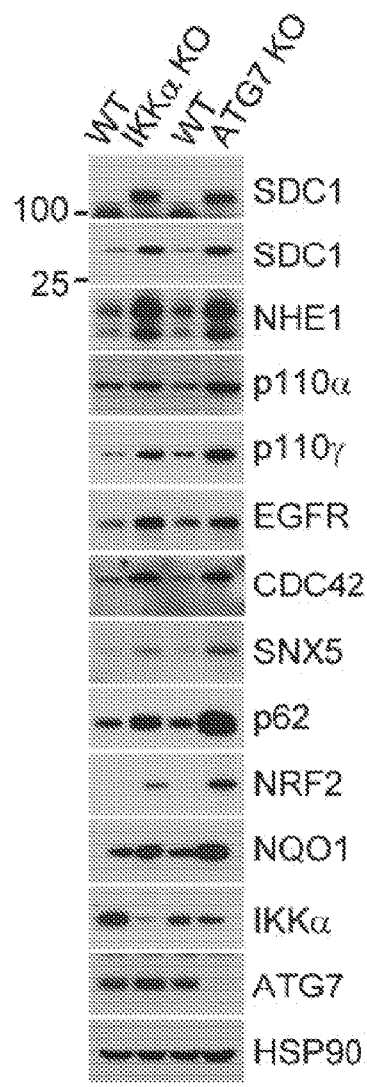
Figure 3D:
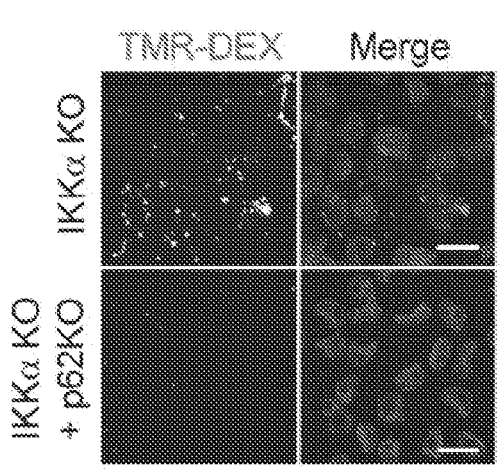

Example 5: The Autophagy to Macropinocytosis Switch Depends on p62-Mediated NRF2 Activation ATG7 ablation in MIA PaCa-2 cells also increased TMR-DEX uptake and MP-related gene expression (FIGS. 3A, 3K and 3L). Like IKKα ablation, ATG7 ablation also induced p62 accumulation and NRF2 activation along with the upregulation of key MP proteins, including syndican-1 (SDC1), NHE1, phosphatidylinositol-4,5-bisphosphate 3-kinase catalytic subunit alpha (PIP3K; p110α), PIP3K gamma isoform (p110γ), Cell division control protein 42 (CDC42) and epidermal growth factor receptor (EGFR) (FIG. 3B). Similar results were observed in MIA PaCa-2 cells treated with the ULK1/2 inhibitor MRT68921, which showed more macropinosomes and less autophagosomes (FIG. 3C), indicating that autophagy deficiency upregulates MP.

Figure 3E:
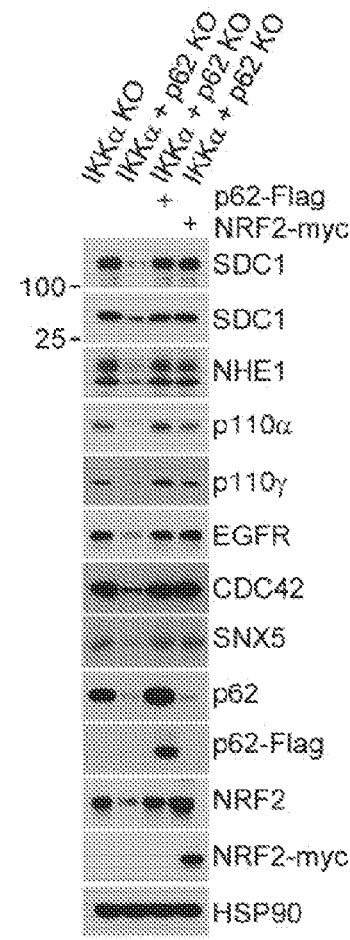
Figure 3F:
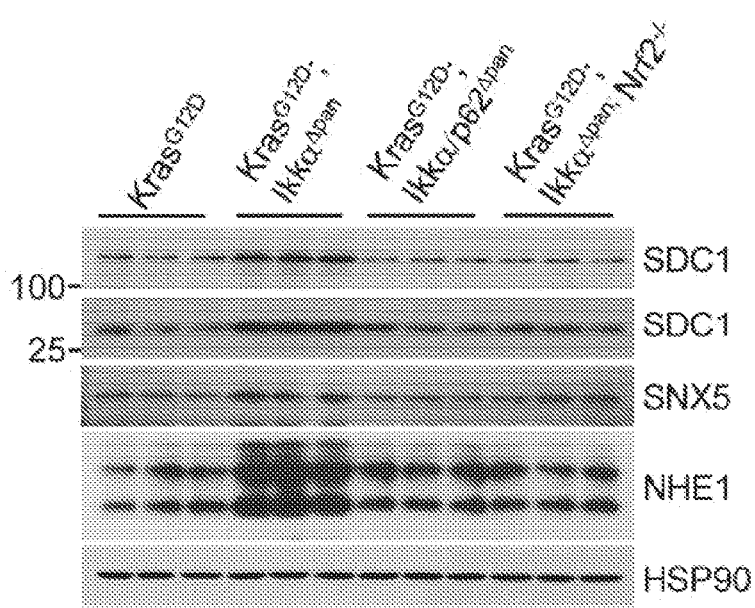

To determine whether p62 accumulation and the nuclear factor erythroid 2-related factor 2 (NRF2) activation in autophagy-deficient cells are linked to MP upregulation, both IKKα and p62 were knocked out (DKO) in MIA PaCa-2 cells. p62 ablation reversed the increase in MP activity as well as MIP-related gene and protein expression in IKKα-deficient cells (FIGS. 3D, 3E, 3M and 3N). p62 or NRF2 re-expression rescued MP-related protein induction in DKO cells (FIG. 3E). Conversely, p62 or NRF2 ablation inhibited MP-related protein induction in Ikkα null $Kras^{G12D/PEC}$ pancreata (FIG. 3F).

Figure 3G:
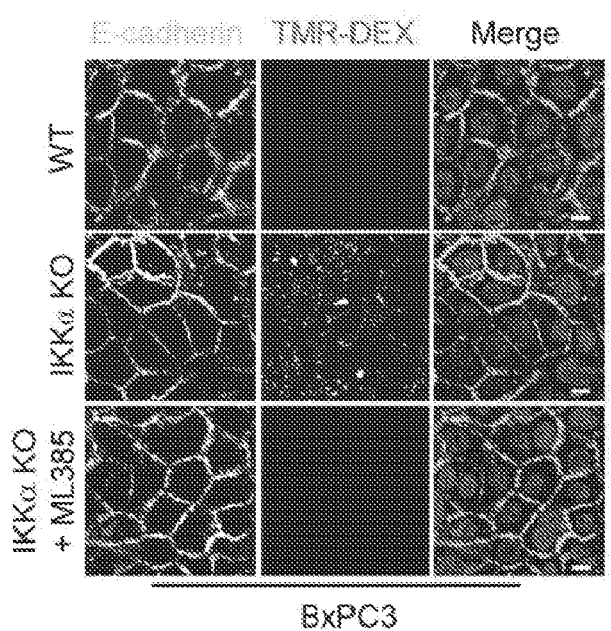
Figure 3H:
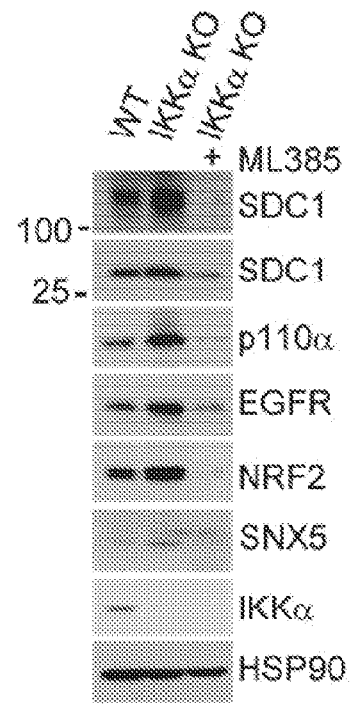
Figure 3I:
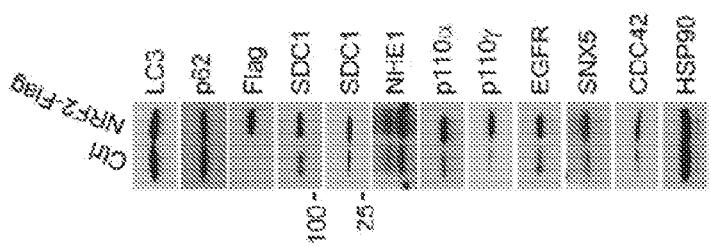
Figure 3J:
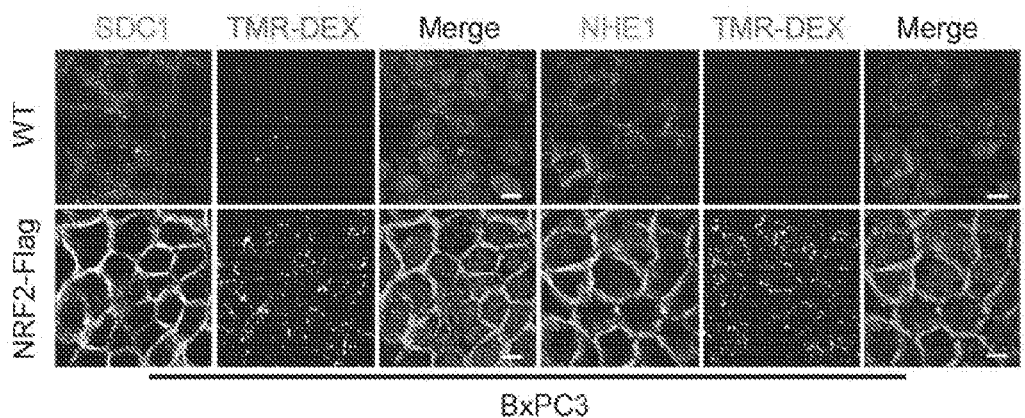
Figure 3P:
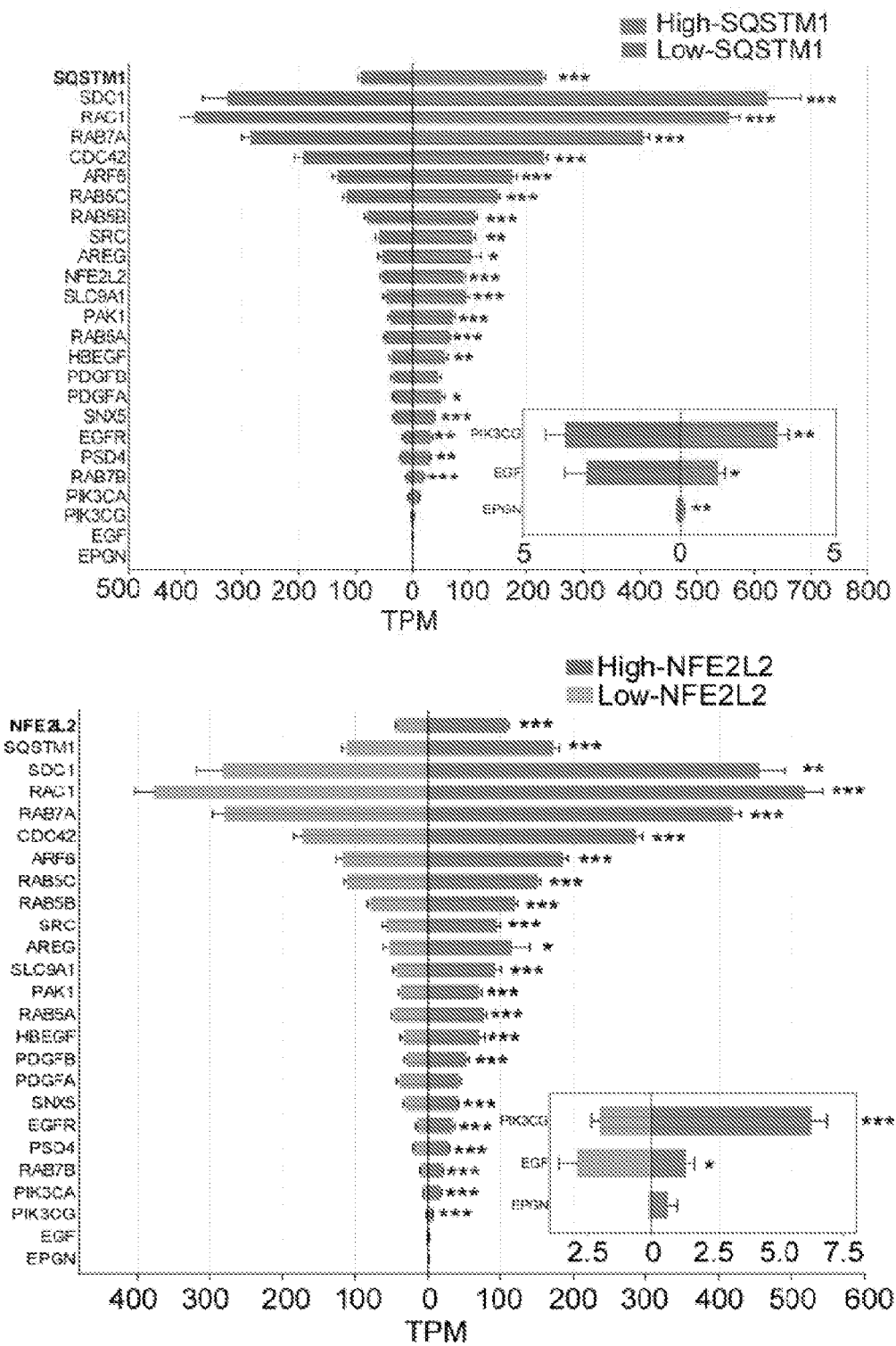

In contrast, NRF2 overexpression upregulated MP-related and growth factor gene expression even in autophagy-competent cells (FIG. 3O). As shown in FIG. 3P, RNA-sequencing (RNA-seq) data from 170 PDAC patients in The Cancer Genome Atlas (TCGA), divided into p62/NRF2-high and p62/NRF2-low groups revealed a significant positive correlation between MP-related and growth factor genes and SQSTM1 and NFE2L2-mRNA expression. These results further supported a role for the p62-NRF2 axis in upregulating MP.

Oncogenic Ras proteins stimulate MP[19]. To determine whether the p62-NRF2 axis can upregulate MP without oncogenic KRAS, MP was examined in BxPC3 cells, which express WT KRAS. IKKα ablation increased TMR-DEX uptake and MP-related protein expression, while the NRF2 inhibitor ML385 blocked this effect (FIGS. 3G and 3H). Conversely, NRF2 overexpression upregulated MP-related protein expression and SDC1 and NHE1 cell surface localization in BxPC3 cells (FIGS. 3I and 3J), indicating that the p62-NRF2 axis can upregulate MP protein expression even without oncogenic KRAS.

Given that either IKKα or ATG7 ablation resulted in diminished autophagy along with p62-dependent NRF2 activation (FIG. 3B), the possibility that many, if not all, MP-related genes that are upregulated in autophagy-deficient cells are directly activated by NRF2 was considered. As shown in FIG. 3Q, in silico analysis confirmed the existence of putative NRF2 binding sites in the promoter regions of numerous MP-related genes, including, but not limited to phosphatidylinositol-4,5-bisphosphate 3-kinase catalytic subunit gamma (PIK3CG), CDC42, PAK1, solute carrier family 9 member A1 (SLC9A1), Syntaxin 5(SNX5), and EGF. SLC9AI encodes $Na^+/H^+$ antiporter that plays an essential role in a central role in regulating pH homeostasis and is involved in tumor growth.

Example 6. MP Inhibition in Autophagy-Compromised Tumor Induces Regression

To evaluate the effect of MP on growth of autophagy-compromised cancers, WT and IKKα KO or ATG7 KO MIA PaCa-2 cells were treated with EIPA. Loss of IKKα or ATG7 enhanced MIA PaCa-2 cell proliferation, and this effect was abrogated by EIPA. Moreover, IKKα- or ATG7-deficient MIA PaCa-2 cells were much more sensitive to EIPA as measured by the CCK-8 assay (FIGS. 4A and 4E) indicating that loss of autophagy enhances dependence on MP. Increased sensitivity to glutamine deprivation is a hallmark of cancer cells that express oncogenic Ras[30]. Consistent with this phenotype, it was found that parental and IKKα KO MIA PaCa-2 cells exhibited decreased proliferation at the setting of sub-physiological glutamine, but the effect on IKKα-deficient cells was much more substantial (FIG. 4B). This effect, however, was reversed in the presence of physiological amounts of albumin.

Albumin supplementation of low glutamine media enhanced proliferation of both WT and IKKα KO MIA PaCa-2 and more importantly, restored rapid proliferation in IKKα KO MIA PaCa-2 cells. This effect that was completely abrogated by EIPA (FIG. 4C). This observation provided additional support for the critical role of MP in supporting the growth and survival of autophagy-compromised PDAC.

To determine whether concurrent inhibition of autophagy and MP is more effective than either one alone, KC6141 mouse PDAC cells were treated with the ULK1/2 inhibitor MRT68921, EIPA, or MRT68921 and EIPA. As shown in FIG. 4D, concurrent treatment of KC6141 mouse PDAC cells with MRT68921 and EIPA resulted in synergistic growth inhibition. Similar results were observed when treatment with MRT68921 and erlotinib, an EGFR inhibitor were combined (FIG. 4F). The results of FIG. 4F also showed that EGFR signaling activated MP[31]. In addition, in IKKα KD KC6141 cells, erlotinib alone had a similar inhibitory effect on cell growth as the two inhibitors together, while the effect of MRT68921 alone was limited (FIG. 4F). These results further supported a role for IKKα in termination of autophagy and suggested that combined inhibition of autophagy and MP resulted in profound inhibition of cancer cell growth.

Figure 5A:
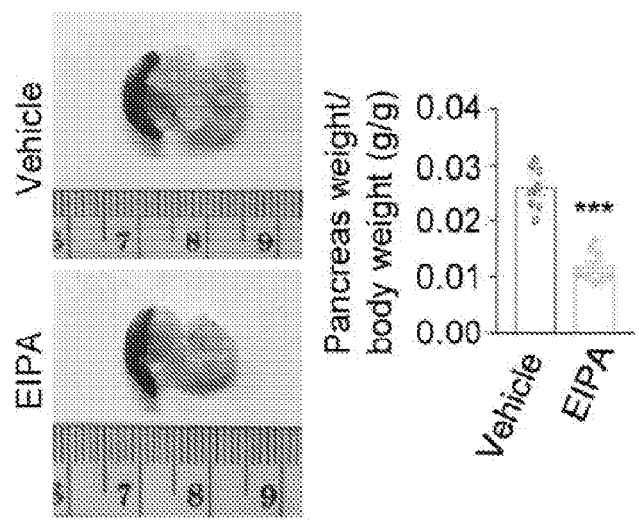
FIGS. 5A-5E are pictorial and graphical diagrams showing that MP Inhibition in autophagy-compromised PDAC induces strong tumor regression.
Figures 5B, 5C:
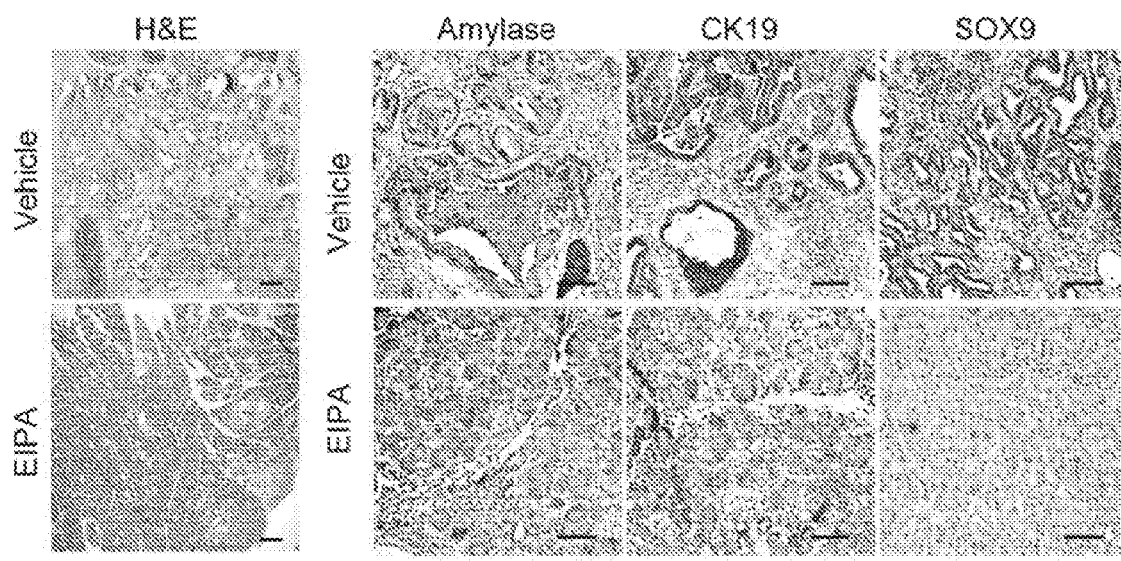

To extend these in vitro findings to in vivo PDAC settings, the role of MP in the autochthonous $Ikk\alpha^{\Delta PEC}/Kras^{G12D/PE\ C}$ PDAC model and in mice bearing transplanted tumors was evaluated. PEC-specific IKKα ablation in $Kras^{G12D/PEC}$ mice greatly accelerates malignant progression, such that all mice show aggressive PDAC by 2 months of age, succumbing to tumor progression by 6 months with evident hepatic metastases[16]. Accordingly, $Ikk\alpha^{\Delta PEC}/Kras^{G12D/PEC}$ mice were treated with EIPA or vehicle for 1 month, starting at 1 month of age. As shown in FIG. 5A, EIPA administration markedly reduced pancreatic weight (a measure of tumor growth). EIPA also inhibited acinar-to-ductal metaplasia (ADM) and advanced pancreatic intraepithelial neoplasia (PanIN) formation, and preserved the normal pancreatic parenchyma (FIG. 5B), an effect accompanied by decreased MP (FIG. 4G). Immunohistochemistry analysis confirmed that EIPA prevented acinar cell loss, as indicated by the upregulation of amylase, and downregulated ductal (CK19) and progenitor (SOX9) markers (FIG. 5C).

Figure 5D:
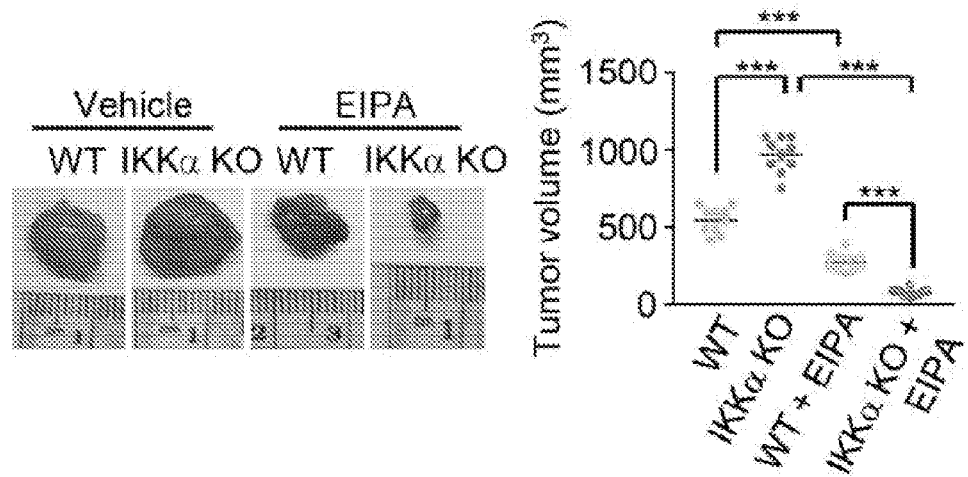

In fact, histological analysis revealed very little residual cancer tissue in EIPA-treated mice, indicating that MP inhibition in autophagy-compromised PDAC prevented progression and induced tumor regression. Immunocompromised mice bearing parental and IKKα KO MIA PaCa-2 heterotopic tumors were treated with EIPA or vehicle for 15 days. EIPA administration commenced when tumors attained an average volume of 50-100 mm³. Tumors derived from IKKα KO MIA PaCa-2 cells were considerably larger than those formed by parental MIA PaCa-2 cells in the vehicle group. Although EIPA administration reduced tumor size in both groups, and EIPA administration strongly inhibited IKKα-deficient tumors (FIG. 5D). These results showed that the growth of autophagy-compromised tumors is more dependent on MP.

Figure 5E:
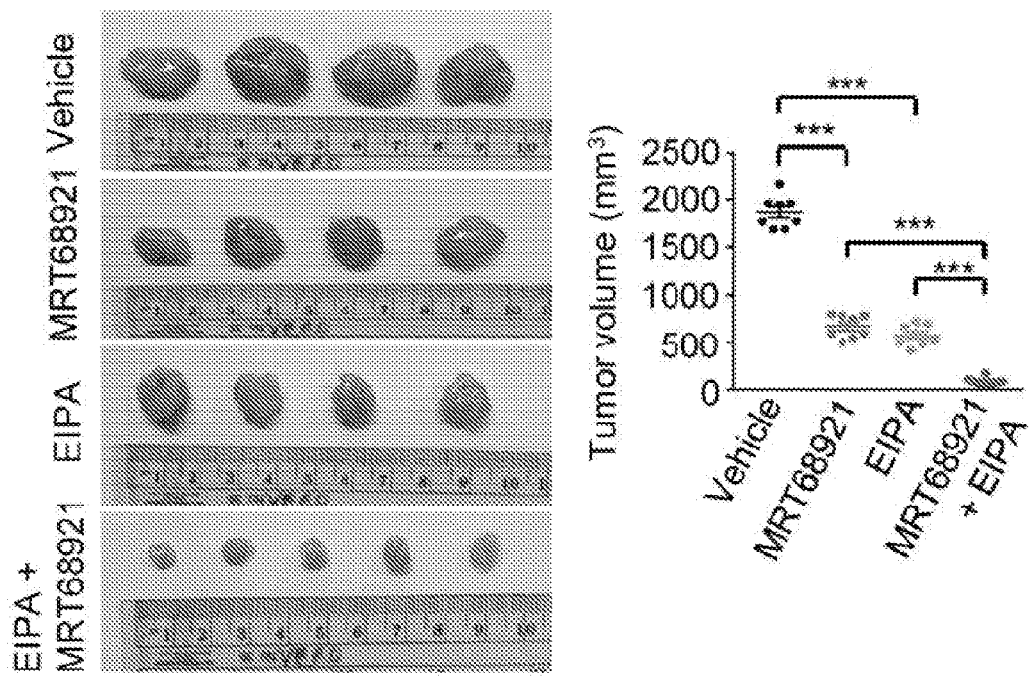

In another experiment, C57BL/6 mice bearing KC6141-derived tumors were treated with vehicle, MRT68921, EIPA, or MRT68921 and EIPA for 3 weeks. Drug administration started when tumors reached 100 mm³. As shown in FIG. 5E, MRT68921 or EIPA treatment alone had a small effect on tumor growth, but the combination of MRT68921 and EIPA markedly reduced tumor growth.

Example 7: IKKα Controls Autophagosome-Lysosome Fusion in Human PDAC

Figure 13A:
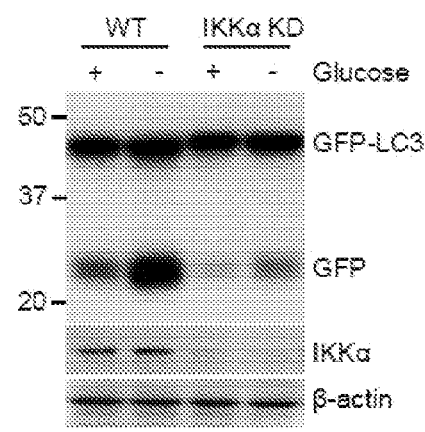
FIG. 13A-13K show that IKKα supports autophagosome-lysosome fusion to control autophagic flux.
Figure 13B:
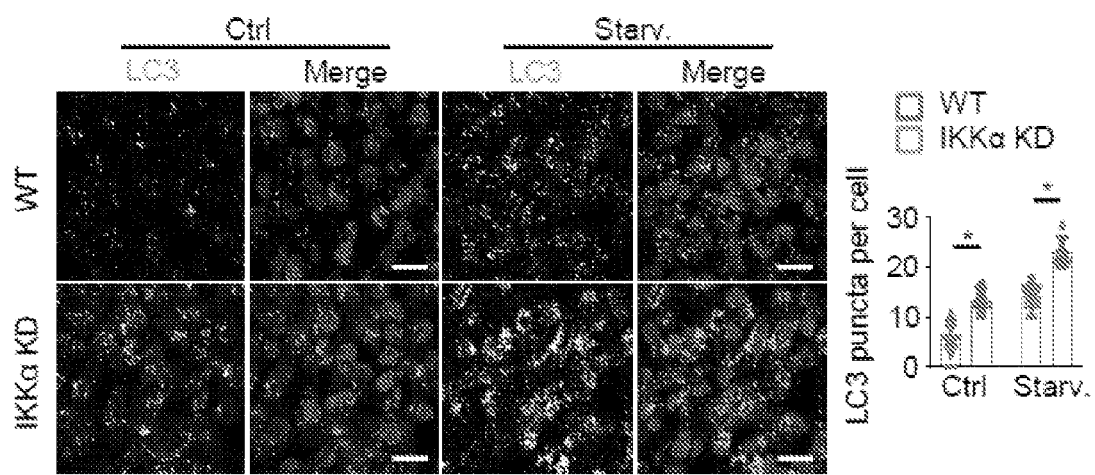
Figure 13C:
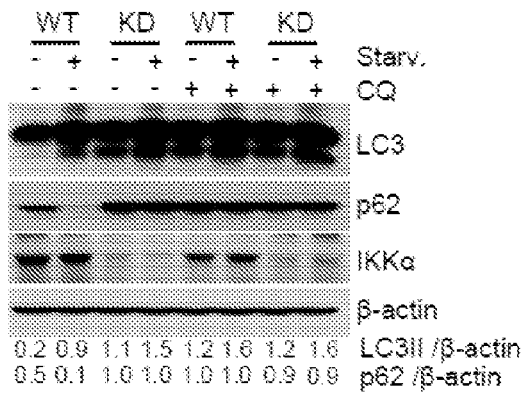
Figure 13D:
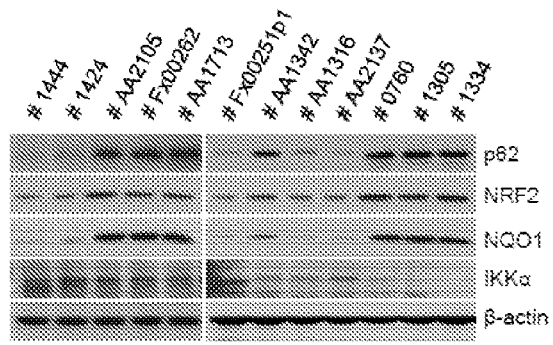
Figure 13E:
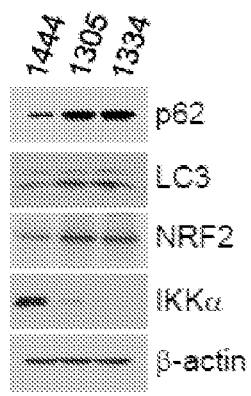
Figure 13F:
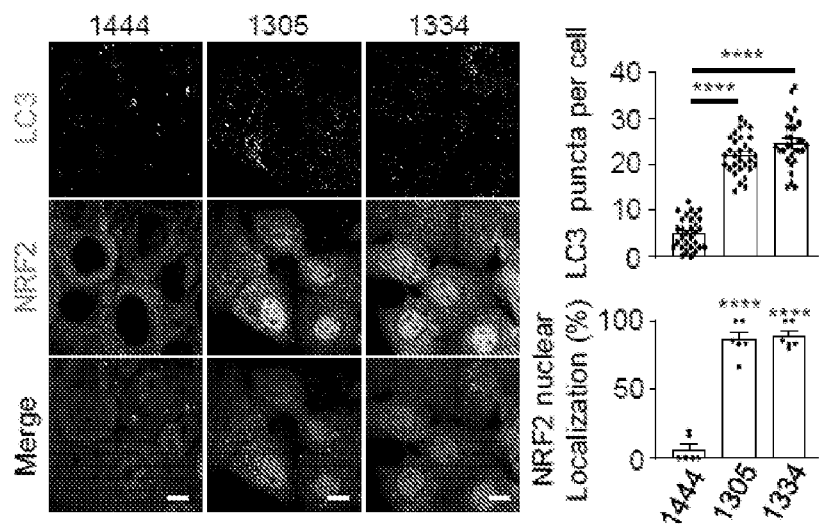
Figure 13G:
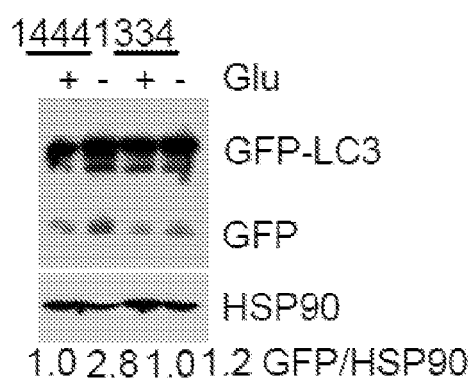
Figure 13H:
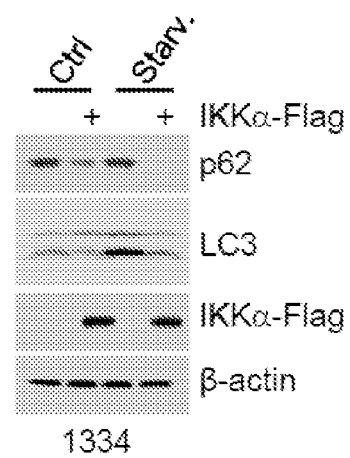
Figure 13I:
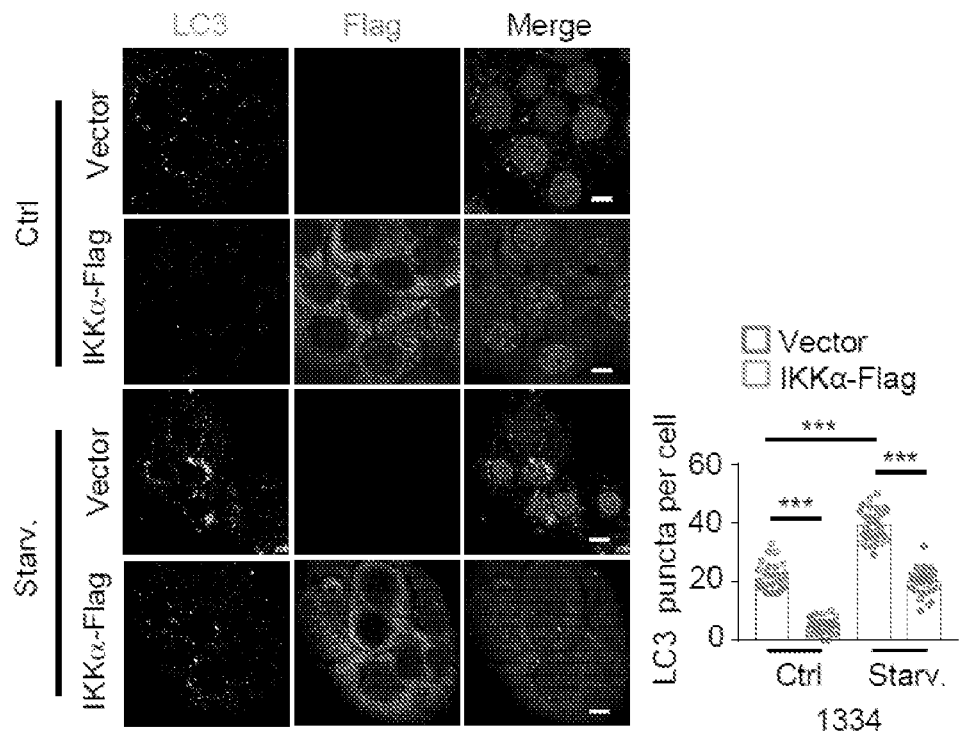
Figure 13J:
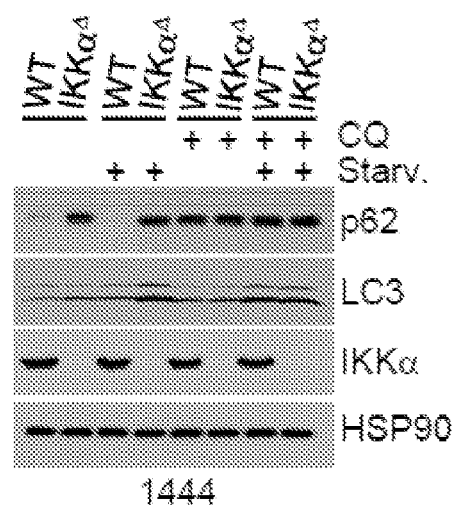

IKKα ablation in mouse pancreatic epithelial cells (PEC) impairs autophagy termination (Li et al., 2013) and accelerates progression of $Kras^{G12D}$ initiated PDAC (Todoric et al., 2017). To determine whether low IKKα expression reduces autophagic flux in human PDAC and how PDAC cells with low autophagic flux survive under stringent conditions, IKKα gene was silenced (KD) in MIA PaCa-2 human PDAC cells and used three additional PDAC cultures generated from patient derived xenografts (PDX) that greatly differ in IKKα expression. IKKα-KD MIA PaCa-2 cells showed reduced GFP-LC3 reporter cleavage before and after glucose starvation and displayed more LC3 puncta, lipidated LC3-II and p62 (FIGS. 13A-13C), confirming proper initiation but defective degradation. Accordingly, CQ treatment failed to increase p62 and LC3-II in these cells (FIG. 13C). Immunoblot (IB) analysis of human PDAC PDXs showed that low IKKα specimens had high p62 and NRF2 (FIG. 13D). To confirm these results, 2D cultures from these PDXs were prepared including using 1444 cells, 1305 cell, and 1334 cells. As shown in FIGS. 13E-13F, 1444 cells expressed high IKKα and low p62, LC3-II, LC3 puncta and nuclear NRF2; and 1305 and 1334, expressed low IKKα and high p62, LC3-II, LC3 puncta and nuclear NRF2. $IKK\alpha^{low}$ cells showed reduced GFP-LC3 cleavage (FIG. 13G). IKKα introduction into 1334 cells or IKKα ablation (A) in 1444 cells showed that low IKKα tightly correlated with reduced autophagic degradation (FIGS. 13H-13J).

Figure 6A:
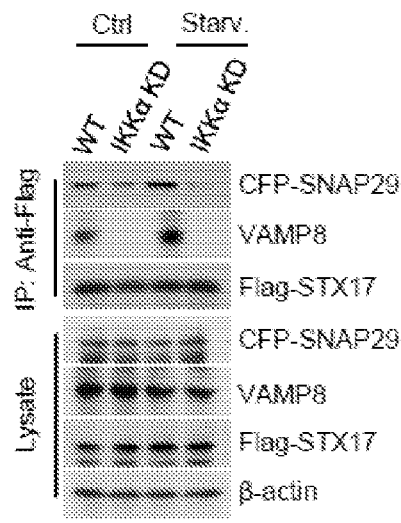
Figure 6B:
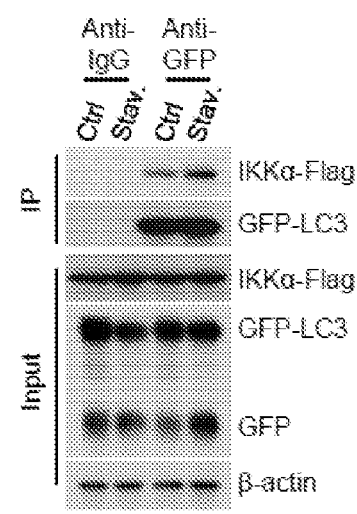
Figure 6C:
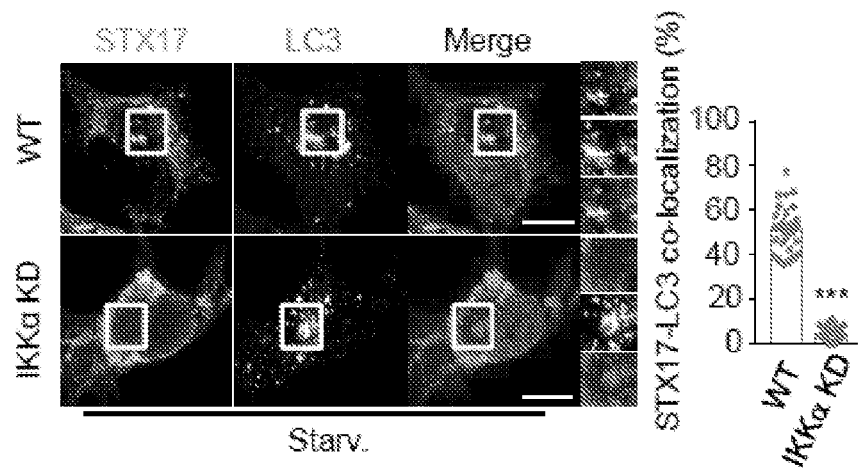
Figure 6D:
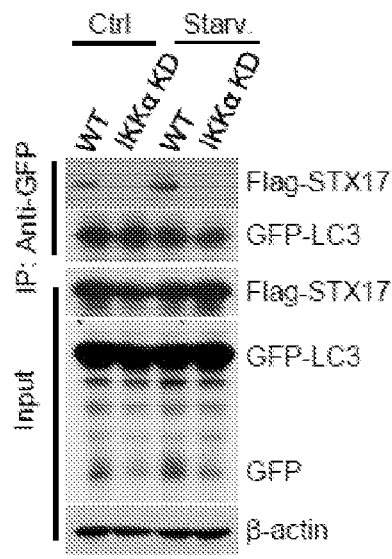
Figure 6E:
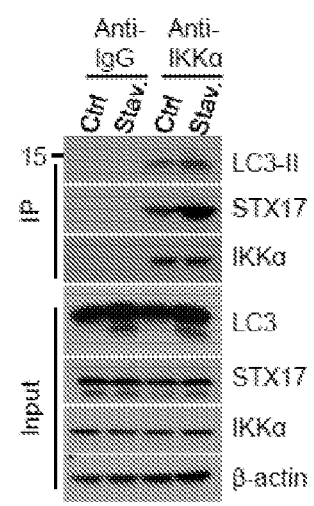
Figure 6F:
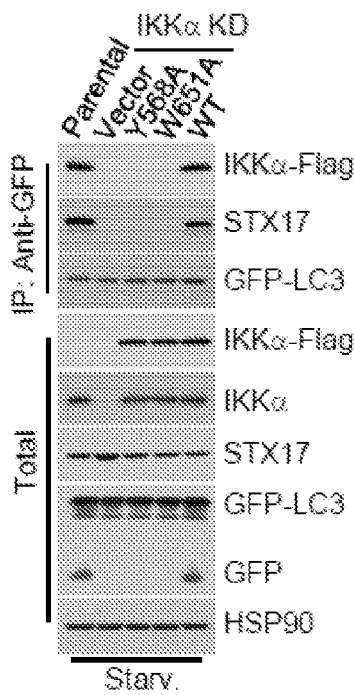
Figure 13K:
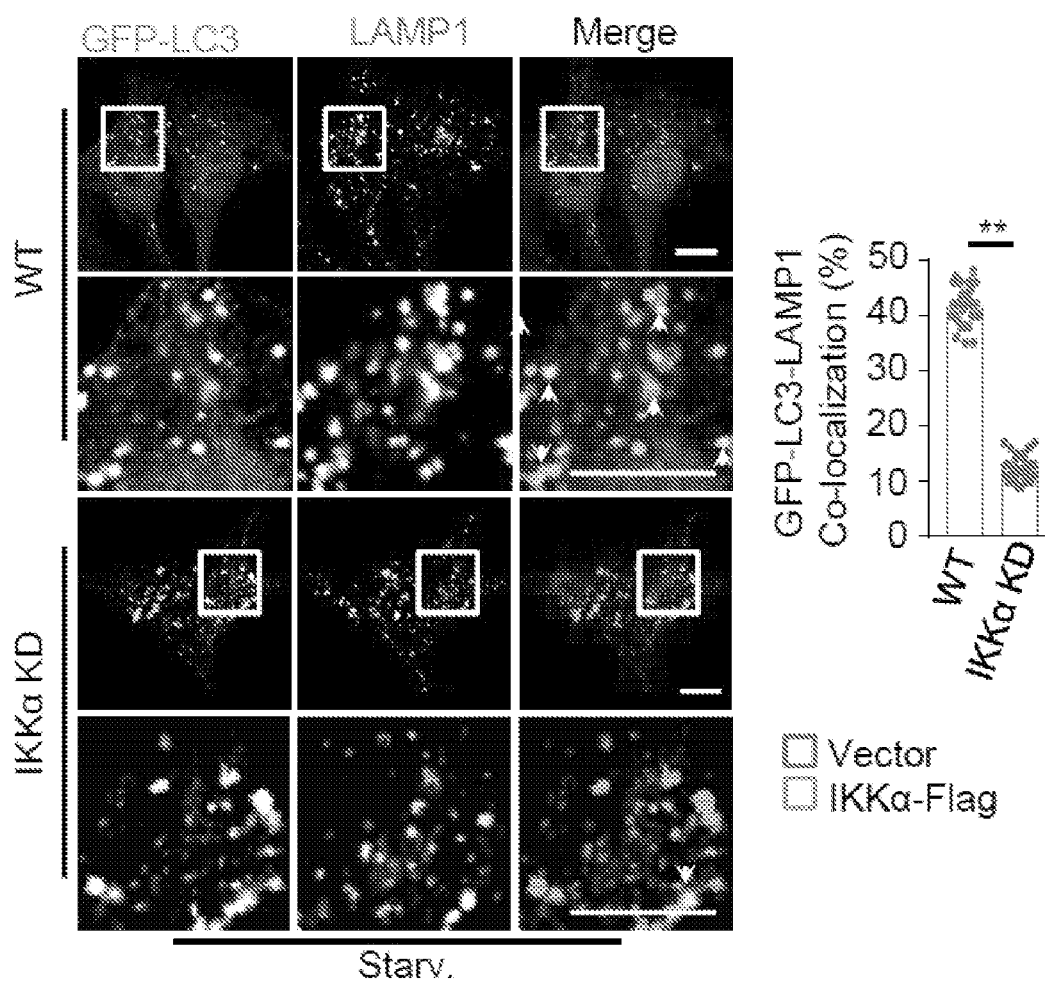
Figure 14E:
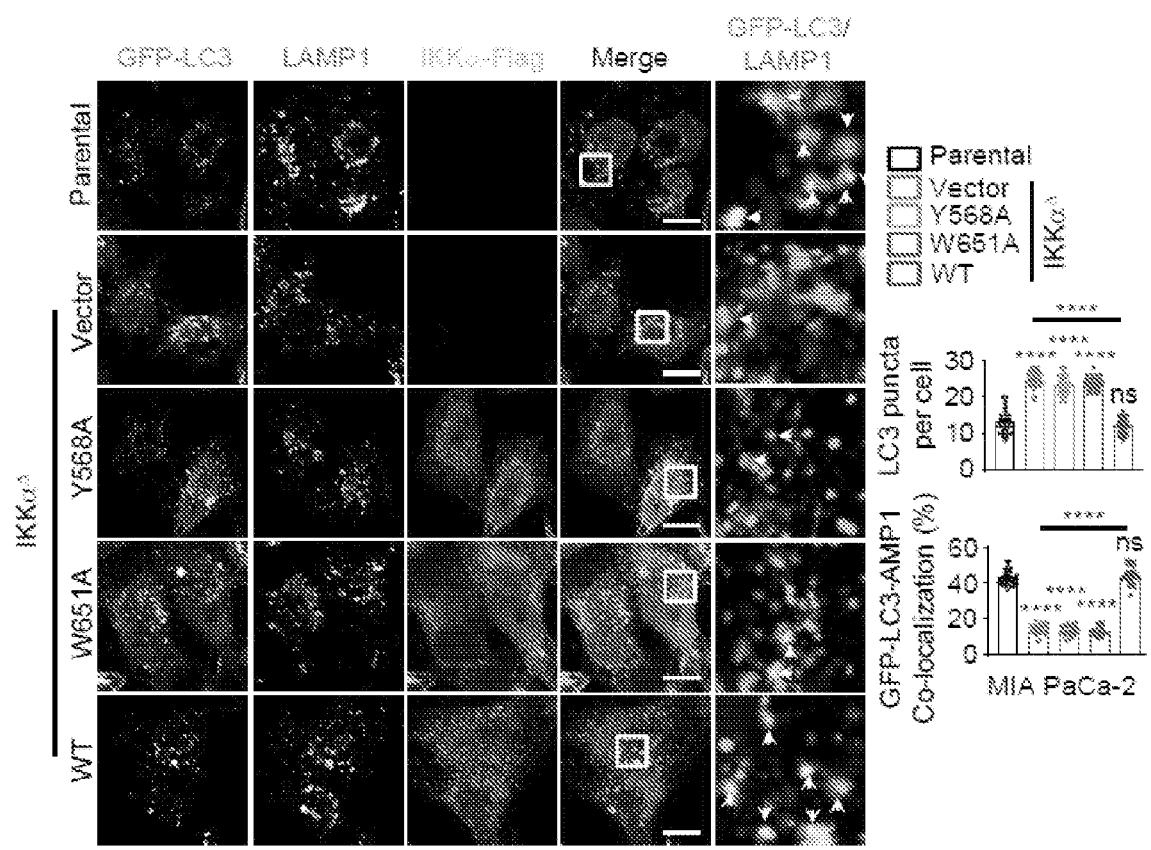
Figure 14F:
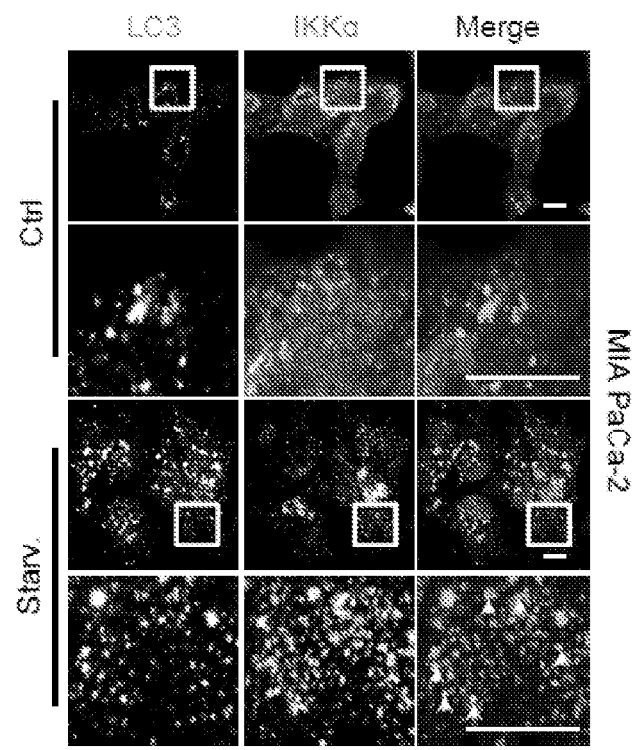
Figure 14G:
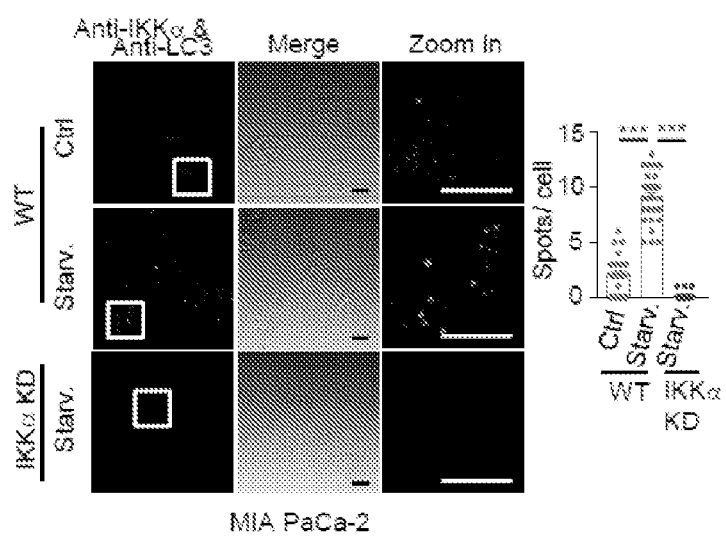
Figure 14H:
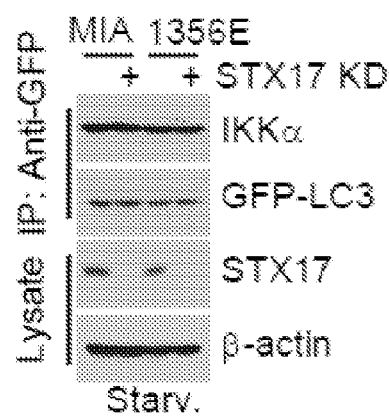
Figure 14I:
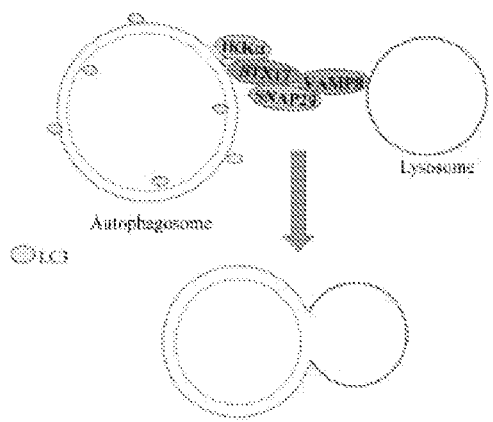

Supporting an effect on autophagosome-lysosome fusion, LC3-LAMP1 co-localization was diminished in IKKα-KD cells (FIG. 13K). Autophagosome-lysosome fusion is mediated by soluble N-ethylmaleimide-sensitive factor attachment protein receptor (SNARE) complex, composed of syntaxin 17 (STX17), which binds SNAP29 on autophagosomes and VAMP8 on lysosomes (Itakura et al., 2012). As shown in FIG. 6A, IKKα KD dramatically inhibited SNAP29:STX17:VAMP8 complex formation before and after starvation. IKKα harbored several LC3 interaction (LIR) motifs that facilitated its interaction with LC3 during starvation (FIGS. 6B, 14A and 14B). However, IKKβ, which does not affect pancreatic autophagy (Li et al., 2013), did not associate with LC3. IKKα KD prevented STX17-autophagosome localization and abolished STX17 association with LC3 (Kumar et al., 2018) in fed and starved cells (FIGS. 6C and 6D). Conversely, LC3 and STX17 co-immunoprecipitated (IP) with IKKα, especially during starvation (FIG. 6E). Y568A and W651A substitutions within two of the IKKα LIR motifs abolished LC3 binding and STX17 recruitment (FIG. 14C). Re-expression of wt but not LIR-mutated IKKα in IKKα-deficient cells restored STX17 co-IP with LC3 and SNAP29, VAMP8 co-IP with STX17 and LC3-LAMP1 co-localization (FIGS. 6F, 14D and 14E). IKKα localized to autophagosomes during starvation. Although the amounts were low due to the dynamic nature of the fusion process, in situ proximity ligation supported IKKα:LC3 interaction (FIGS. 14F and 14G), which was STX17 independent (FIG. 14H) and may be direct due to presence of functional LIR motifs in IKKα. Therefore, the results showed that IKKα stabilized the LC3-STX17 interaction, thus facilitating SNARE complex formation (FIG. 14I).

Figure 6G:
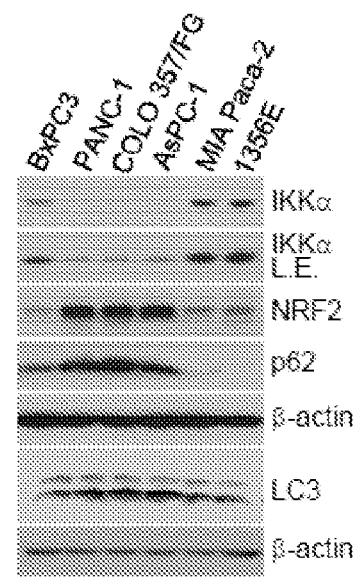
Figure 6H:
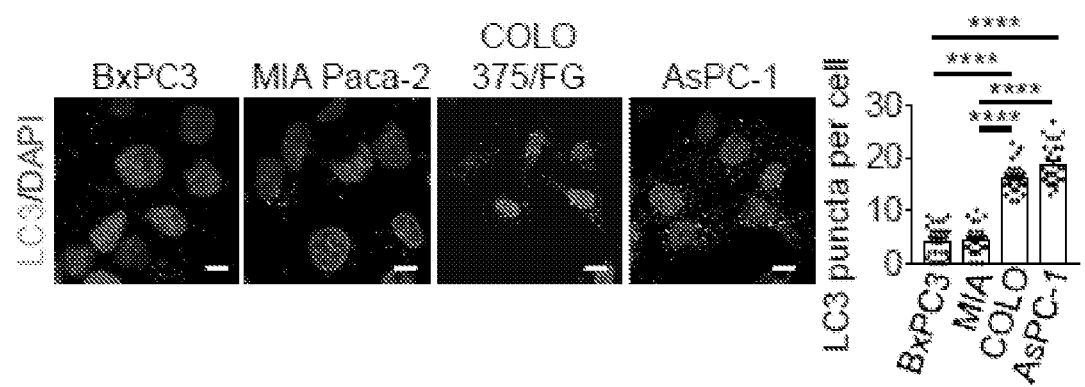
Figure 6I:
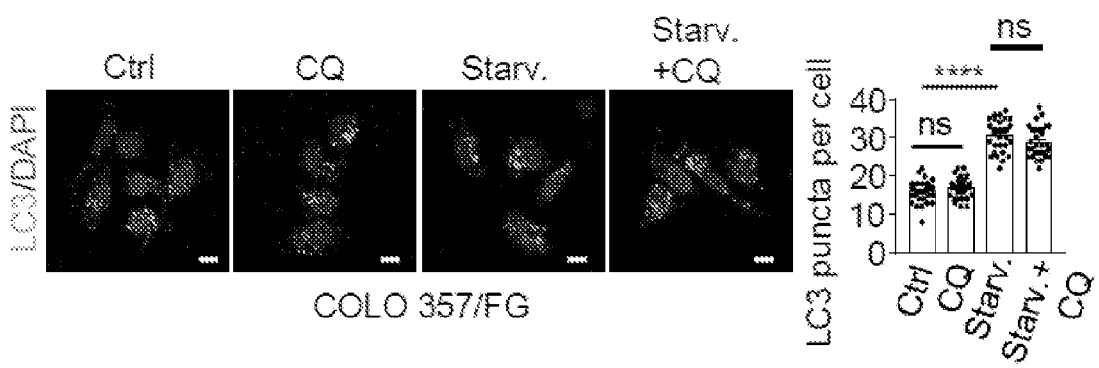
Figure 14J:
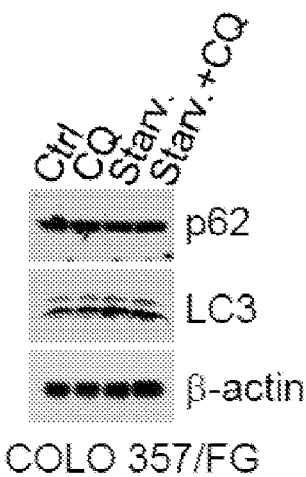
Figure 14K:
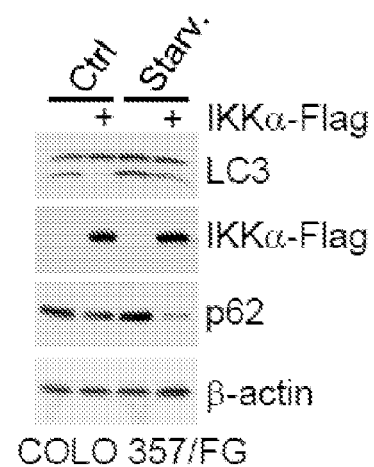

The MIA PaCa-2, BxPC3 and the PDX-derived 1356E cell lines are $IKK\alpha^{high}$, whereas AsPC-1 and COLO-357/FG, isolated from metastatic sites, and PANC-1, from a primary tumor, are $IKK\alpha^{low}$ (FIG. 6G). $IKK\alpha^{low}$ cells showed more p62, NRF2 and LC3 puncta than $IKK\alpha^{high}$ cells (FIGS. 6G and 6H). Starvation increased LC3 puncta and lipidation but did not decrease p62 in $IKK\alpha^{low}$ COLO-357/FG cells, and was not affected by CQ treatment (FIGS. 6I and 14J), suggesting proper initiation but defective degradation in $IKK\alpha^{low}$ cells. Indeed, IKKα transfection into these cells reduced both p62 and LC3-II (FIG. 14K).

Example 8: Compromised Autophagy Stimulates Macropinocytosis

Figure 7A:
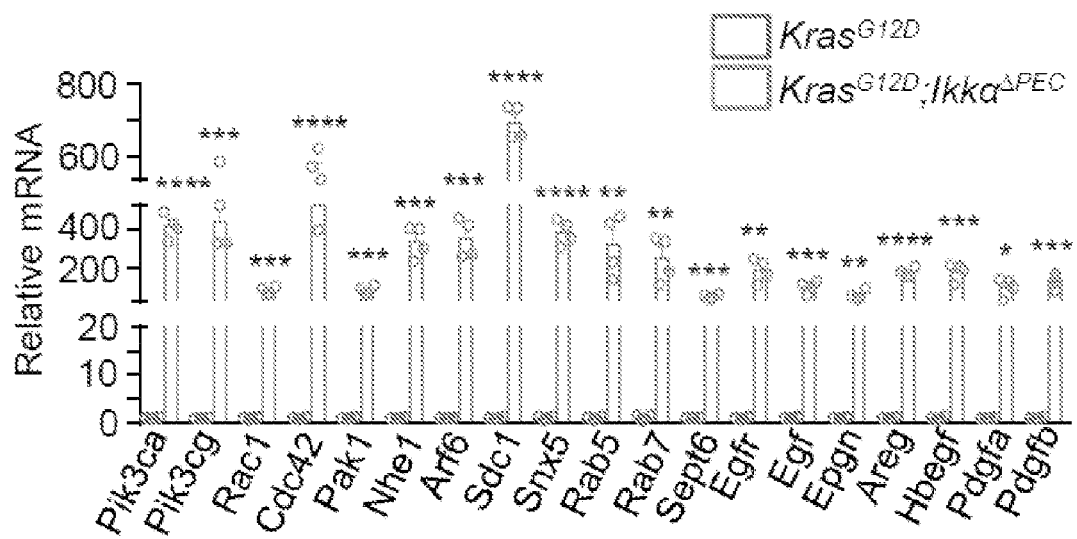
FIGS. 7A-7I show that IKKα deficiency upregulates macropinocytosis (MP).
Figure 7B:
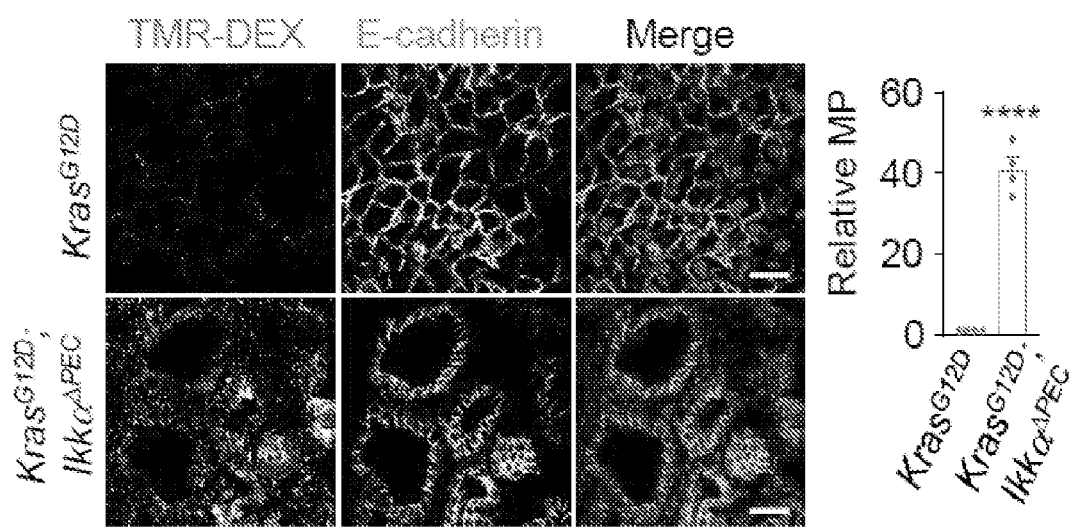
Figure 7C:
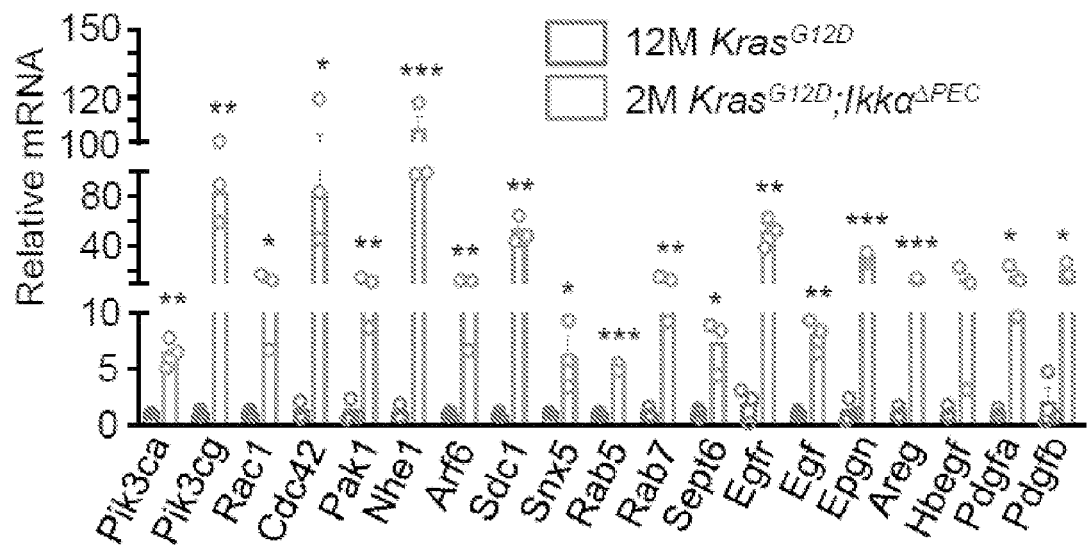
Figure 7D:
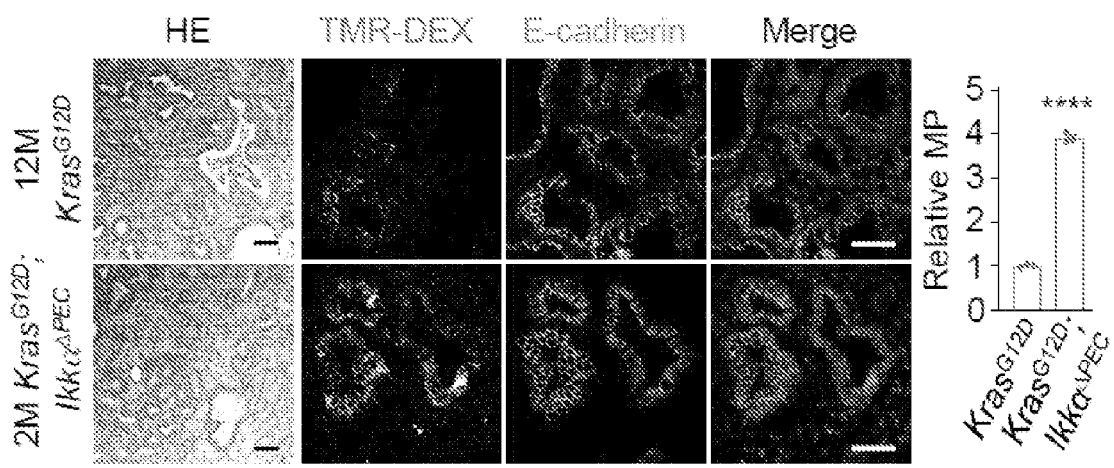
Figure 7E:
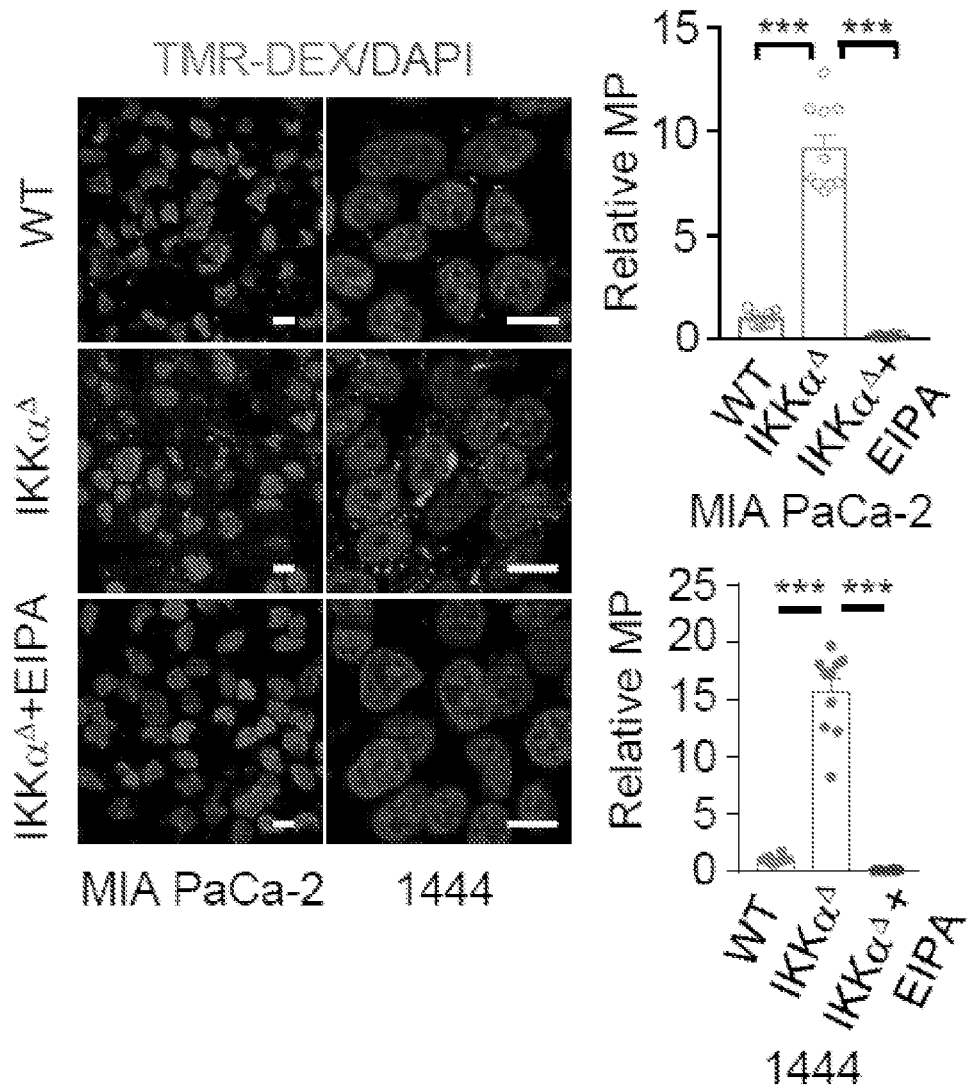
Figure 7F:
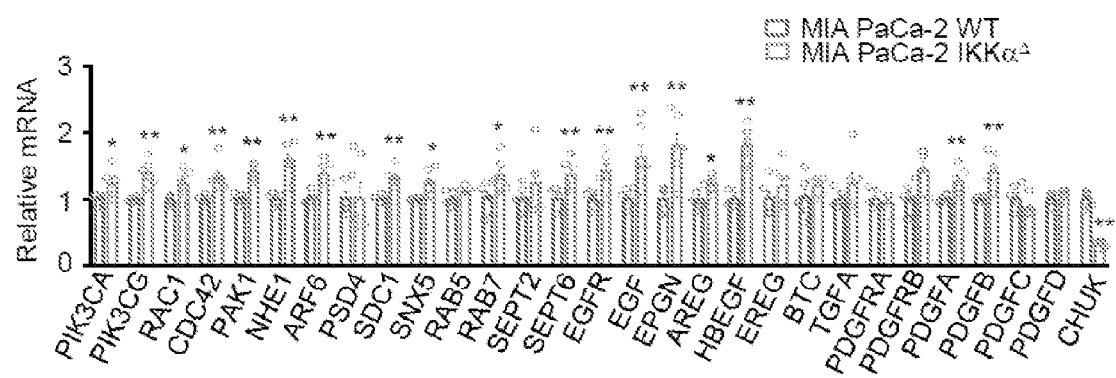
Figure 7G:
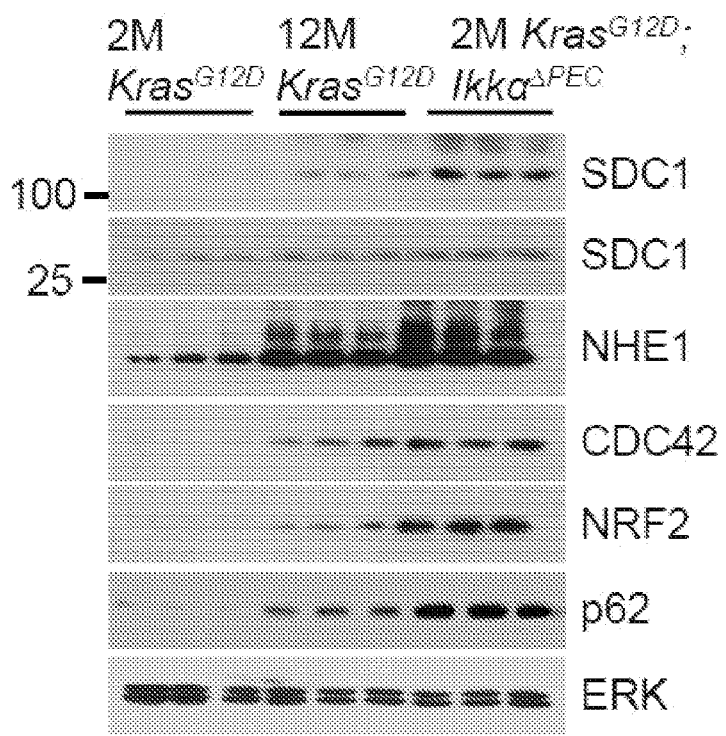
Figure 7H:
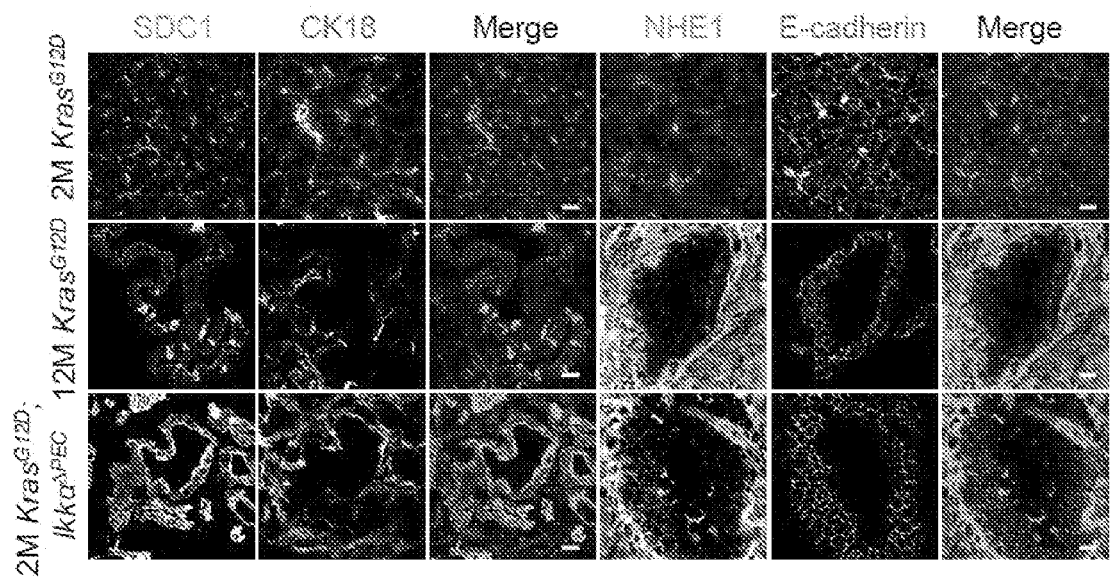

The mechanism by which human PDAC cells with low autophagic flux survive under stringent conditions was further investigated. MP that are activated by the oncogenic KRAS, provides an alternative nutrient procurement pathway through which cancer cells take up extracellular material (Palm, 2019; Recouvreux and Commisso, 2017). As shown in FIGS. 7A-7D, isolated Ikkα-null $Kras^{G12D/PEC}$ and intact pancreata showed dramatic upregulation of numerous MP-related genes, including MP-stimulating growth factors and receptors, and exhibited higher MP rates than young or old $Kras^{G12D/PEC}$ counterparts with similar tumor burden. MP formation was measured by detecting tetramethylrhodamine-labeled high-molecular-mass dextran (TMR-DEX) uptake. $IKK\alpha^\Delta$ MIA PaCa-2 and 1444 cells behaved similarly (FIGS. 7E and 7F). TMR-DEX labeling was inhibited by 5-(N-ethyl-N-isopropyl) amiloride (EIPA), a tool compound that blocks macropinosome formation (Ivanov, 2008). Ikkα-null $Kras^{G12D/PEC}$ PEC and pancreata expressed more MP-related proteins and had more surface-localized syndecan 1 (SDC1) and Na⁺/H⁺ exchanger 1 (NHE1, the target for EIPA) than young or old $Kras^{G12D/PEC}$ counterparts (FIGS. 7G and 7H), suggesting higher SDC1-controlled RAC1 activity.

Figure 7I:
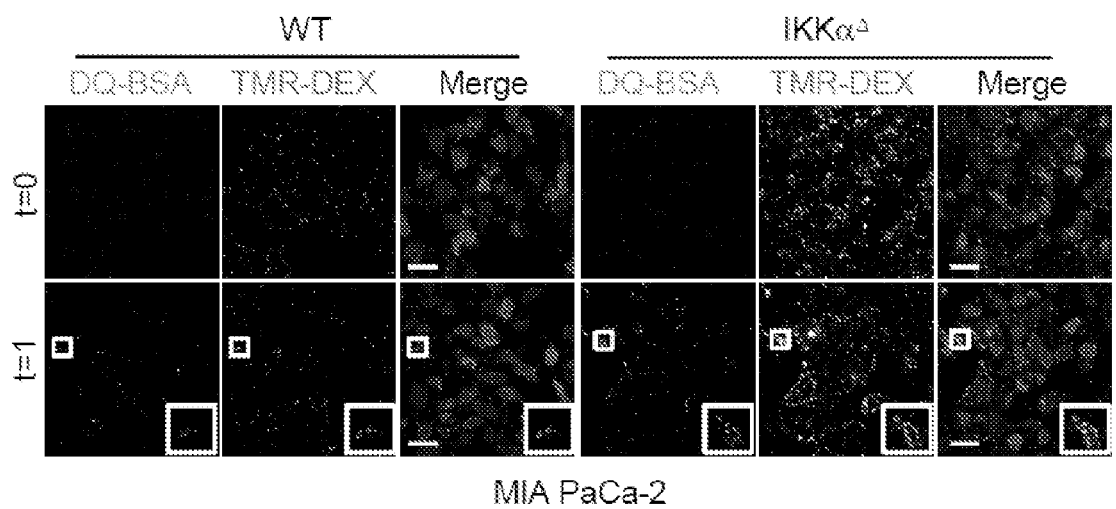

To determine whether MP-internalized albumin is lysosomally degraded, WT and IKKα-deficient cells were co-incubated with a self-quenched BODIPY-conjugated BSA (DQ-BSA) which fluoresces after proteolytic digestion. There were no appreciable differences between IKKα-sufficient and -deficient MIA PaCa-2 cells that were immediately fixed following a 30-min incubation with DQ-BSA and TMR-DEX (FIG. 7I). However, after a 1 hr chase without indicators, IKKα$^Δ$ cells exhibited more DQ-BSA fluorescence in TMR-positive vesicles.

Example 9: The Autophagy to MP Switch Depends on NRF2

Figure 8A:
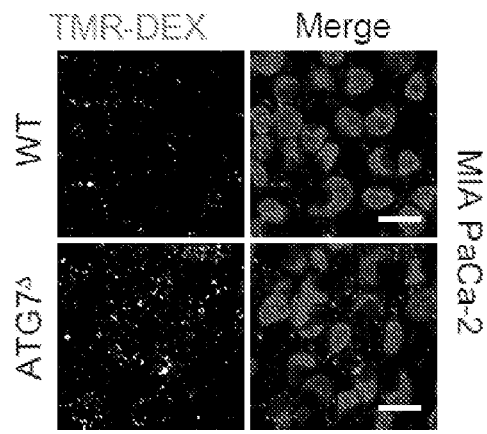
FIGS. 8A-8O show that the switch from autophagy to macropinocytosis (MP) requires p62-mediated NRF2 Activation.
Figure 8B:
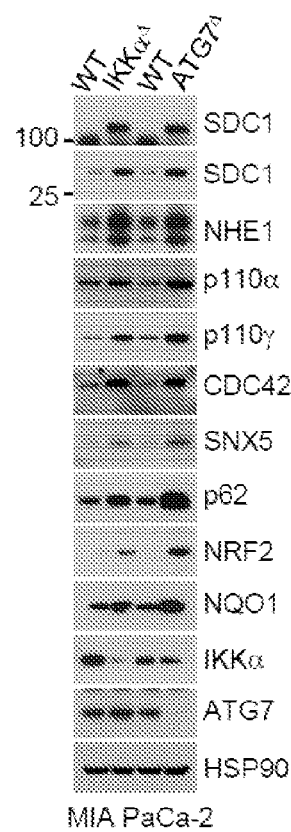
FIG. 8B shows an immunoblot analysis illustrating the expression of MP-related proteins in WT, ATG7$^Δ$ and IKKα$^Δ$ MIA PaCa-2 cells.
Figure 8C:
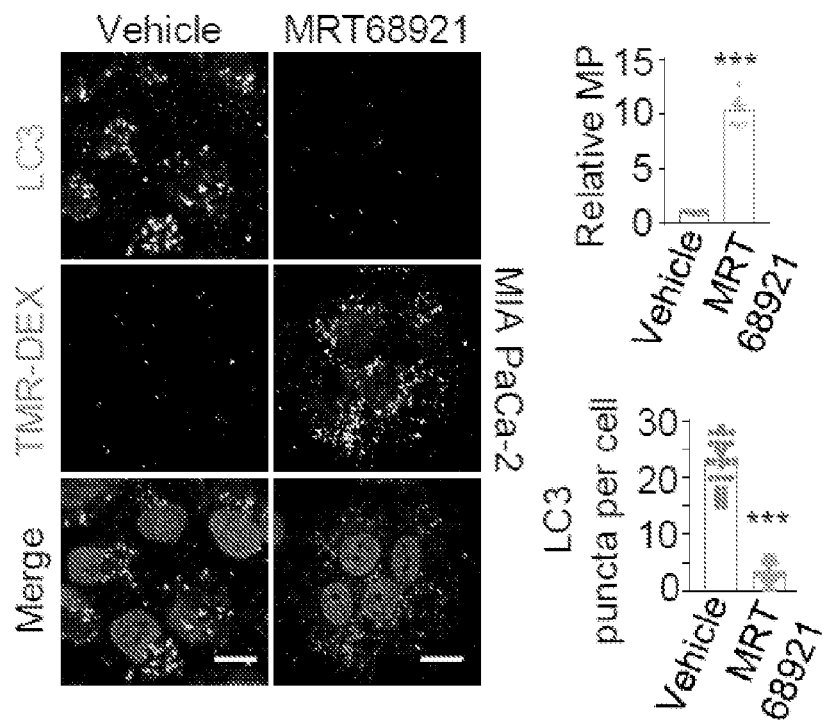
FIG. 8C shows an immunofluorescence staining and quantification illustrating the colocalization of autophagosomes (LC3) and macropinosomes (TMR-DEX) in MIA PaCa-2 cells in the presence and absence (+/−) of MRT68921. Bar graphs illustrating immunofluorescence staining quantifications show that the relative macropinocytic uptake was enhanced by MRT68921 (mean±SEM (n=7)), while autophagosome puncta per cell were significantly abolished by MRT68921 (mean t SEM (n=30)). Scale bar, 10 μm. Statistical significance was determined by a 2-tailed t-test; *p<0.001, p<0.0001.
Figure 8D:
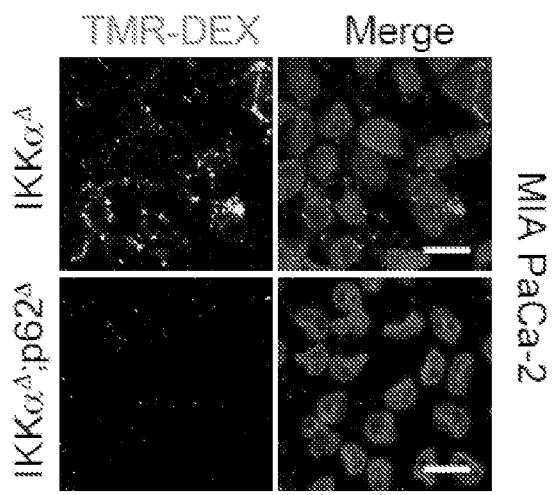
FIG. 8E shows an immunoblot analysis illustrating the expression of MP-related proteins in IKKα$^Δ$ MIA PaCa-2 cells, IKKα$^Δ$;p62$^Δ$ MIA PaCa-2 cells and IKKα$^Δ$; p62$^Δ$ MIA PaCa-2 cells transfected with exogenous p62 or NRF2.
FIG. 8F shows an immunofluorescence staining and quantification illustrating macropinosome in IKKα$^Δ$ and IKKα$^Δ$;NRF2 KD MIA PaCa-2 cells; and the quantification shows that macropinosomes are significantly suppressed in IKKα$^Δ$;NRF2 KD MIA PaCa-2 cells. Scale bar, 10 μm. Mean±SEM (n=10). Statistical significance was determined by a 2-tailed t-test; *p<0.001, ****p<0.0001.
FIG. 8G shows an immunoblot analysis illustrating the expression of MP-related proteins in WT, IKKα$^Δ$, IKKα$^Δ$;NRF2 KD (knock down), and IKKα$^Δ$;NRF2 KD MIA PaCa-2 cells transfected with an exogenous NRF2 (E79Q) variant.
FIG. 8H shows an immunoblot analysis illustrating the expression of MP-related proteins in PEC isolated from 12-month-old (12M) Kras$^{G12D}$, 3-month-old (3M) Kras$^{G12D}$;Ikkα$^Δ$ PEC, 3-month-old (3M) Kras$^{G12D}$;Ikkα/p62$^{ΔPEC}$, and 3-month-old (3M) Kras$^{G12D}$;Ikkα$^{ΔPEC}$;Nfe2/2$^{−/−}$ mice (n=2-3).
FIG. 8I shows an immunofluorescence staining and quantification illustrating the presence of MP in pancreata isolated from 3-month-old (3M) Kras$^{G12D}$;Ikkα$^{ΔPEC}$, 3-month-old (3M) Kras$^{G12D}$;Ikkα/p62$^{ΔPEC}$, and 3-month-old (3M) Kras$^{G12D}$;Ikkα$^{ΔPEC}$;Nfe2/2$^{−/−}$ mice. Scale bar, 20 μm. Mean±SEM (n=4 mice); the immunofluorescence staining quantification shows that macropinosomes are significantly suppressed in 3M Kras$^{G12D}$;Ikkα/p62$^{ΔPEC}$, and 3M Kras$^{G12D}$;Ikkα$^{ΔPEC}$;Nfe2/2$^{−/−}$ mice when compared to 3M Kras$^{G12D}$;Ikkα$^{ΔPEC}$ Statistical significance was determined by a 2-tailed t-test; *p<0.001, **p<0.0001.
FIG. 8J shows an immunofluorescence staining illustrating the presence of macropinosomes in WT and IKKα$^Δ$ MIA PaCa-2 cells in the absence (+/−) of K-Ras (KRAS KD), and in the presence NRF2 (E79Q)-Myc and the absence of K-Ras (KRAS KD and NRF2(E79Q)). Scale bar, 10 μm.
FIG. 8K shows an immunoblot analysis illustrating the expression of MP-related proteins in the MIA PaCa-2 cells of FIG. 8J, in particular, WT and IKKα$^Δ$ MIA PaCa-2 cells in the absence (+/−) of K-Ras (KRAS KD), and in the presence NRF2 (E79Q)-Myc and the absence of K-Ras (KRAS KD and NRF2(E79Q)). Scale bar, 10 μm.
FIG. 8L shows an immunofluorescence staining illustrating the presence of macropinosomes in WT and NRF2(E79Q)-Myc-overexpressing (OE) BxPC3 cells treated with or without (+/−) 100 nM trametinib. Scale bar, 10 μm.
FIG. 8M shows an immunoblot analysis illustrating the expression of MP-related proteins in the BxPC3 cells of FIG. 8L, in particular, in WT and NRF2(E79Q)-Myc-overexpressing (OE) BxPC3 cells treated with and without (+/−) 100 nM trametinib. Scale bar, 10 μm.
FIG. 8N shows an immunofluorescence staining illustrating the presence of macropinosomes in WT and NRF2 (E79Q)-Myc-overexpressing (OE) MIA PaCa-2 cells treated with and without (+/−) 600 nM IPI549. Scale bar, 10 μm.
Figure 8E:
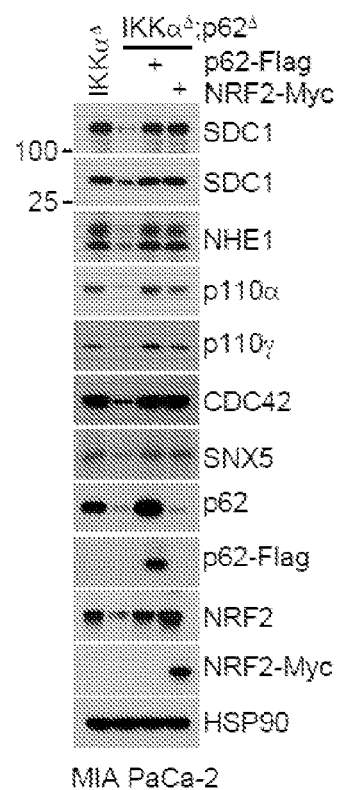
Figure 8F:
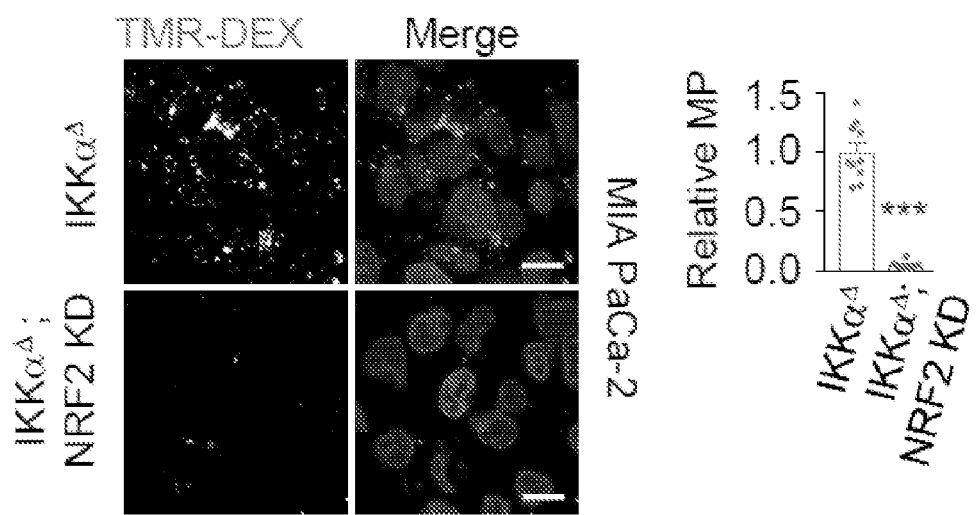
Figure 8G:
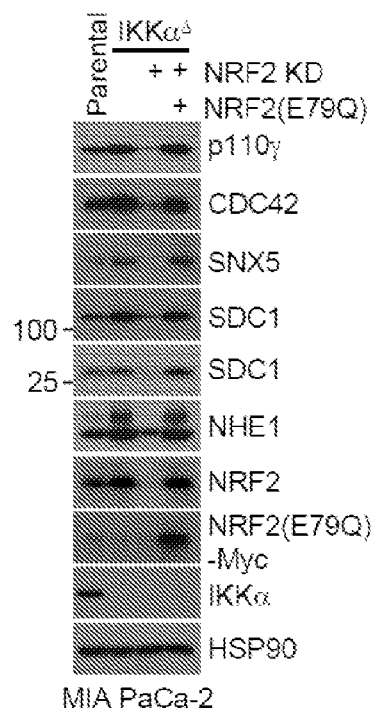
Figure 8H:
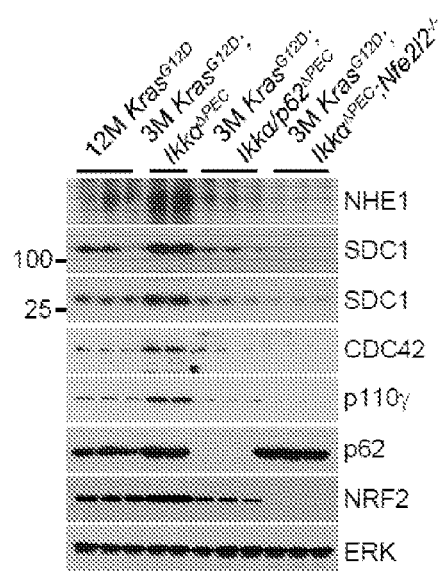
Figure 8I:
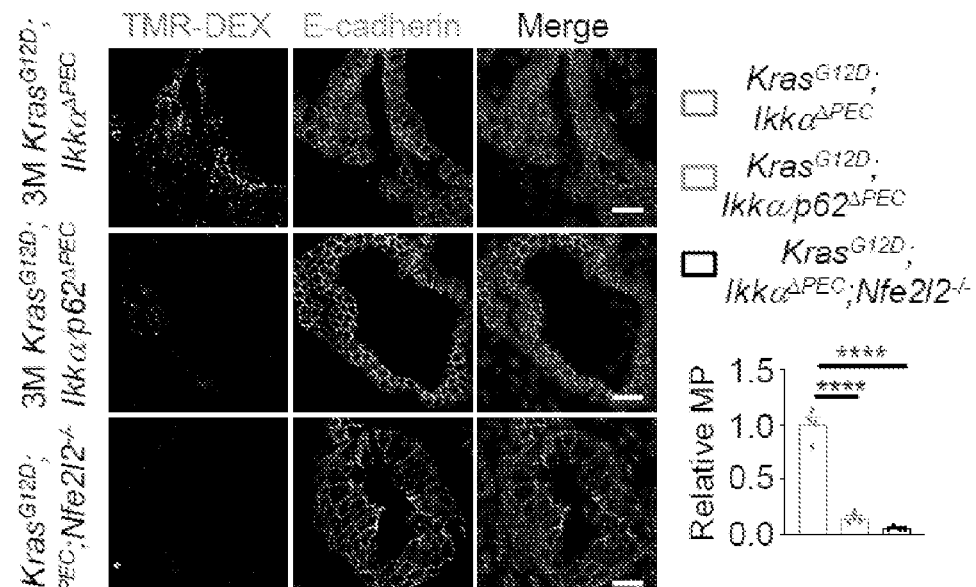
Figure 15A:
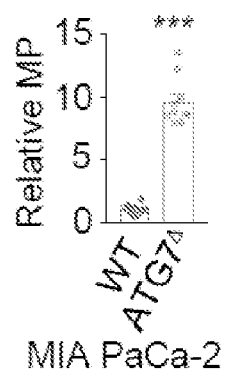
FIGS. 15A-15N show that ATG7, STX17 or IKKα ablations upregulate MP via the p62-NRF2 Axis.
Figure 15B:
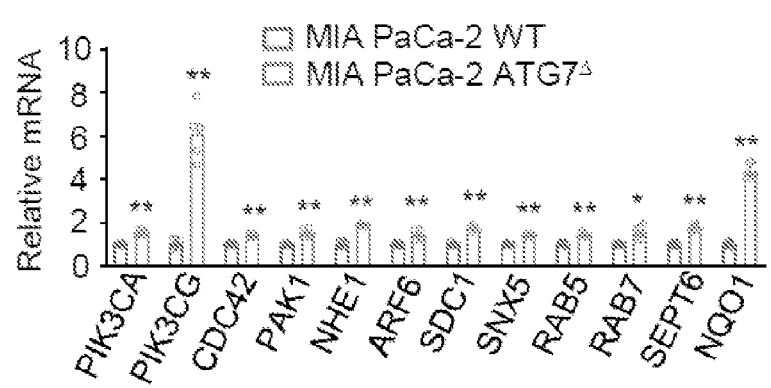
FIG. 15B shows a bar graph of a qRT-PCR analysis illustrating the relative mRNA levels of MP-related genes in WT and ATG7$^\Delta$ MIA PaCa-2 cells.
Figure 15C:
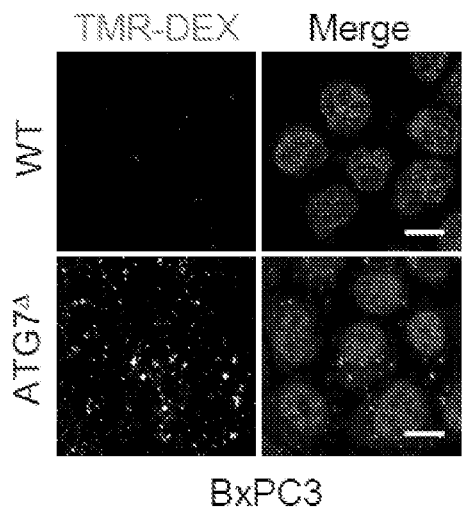
FIG. 15C shows an immunofluorescence staining illustrating MP presence using TMR-DEX in WT and ATG7e BxPC3 cells. Scale bar, 10 μm.
Figure 15D:
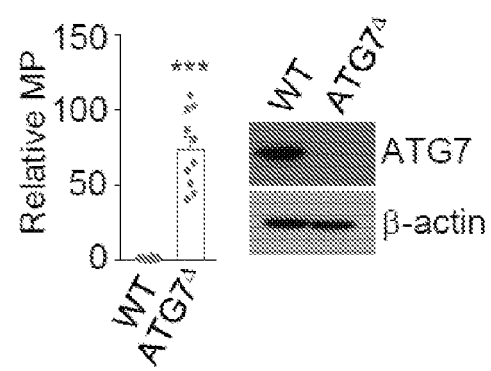
FIG. 15D shows the quantification of the immunofluorescence staining of FIG. 15C, and an immunoblot analysis showing the expression of ATG7 in parental and ATG7$^\Delta$ BxPC3 cells of FIG. 15C.
Figure 15E:
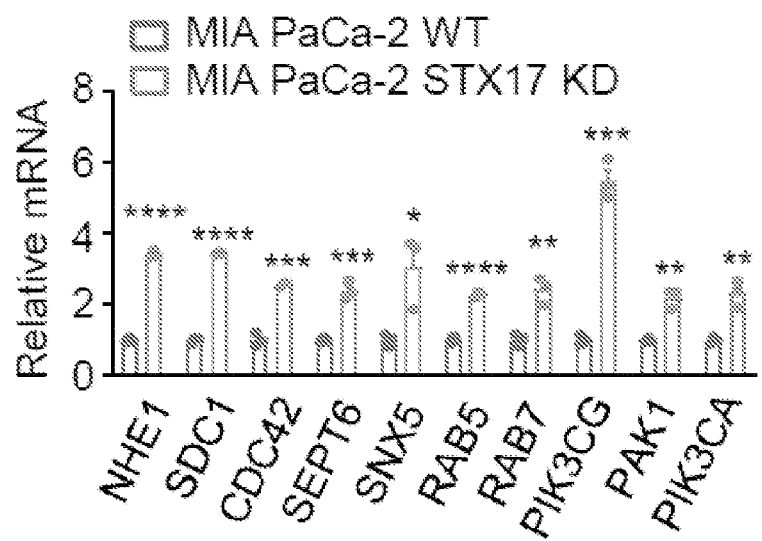
FIG. 15E shows a bar graph of a qRT-PCR analysis illustrating the relative mRNA levels of MP-related genes in WT and STX17 KD MIA PaCa-2 cells.
Figure 15F:
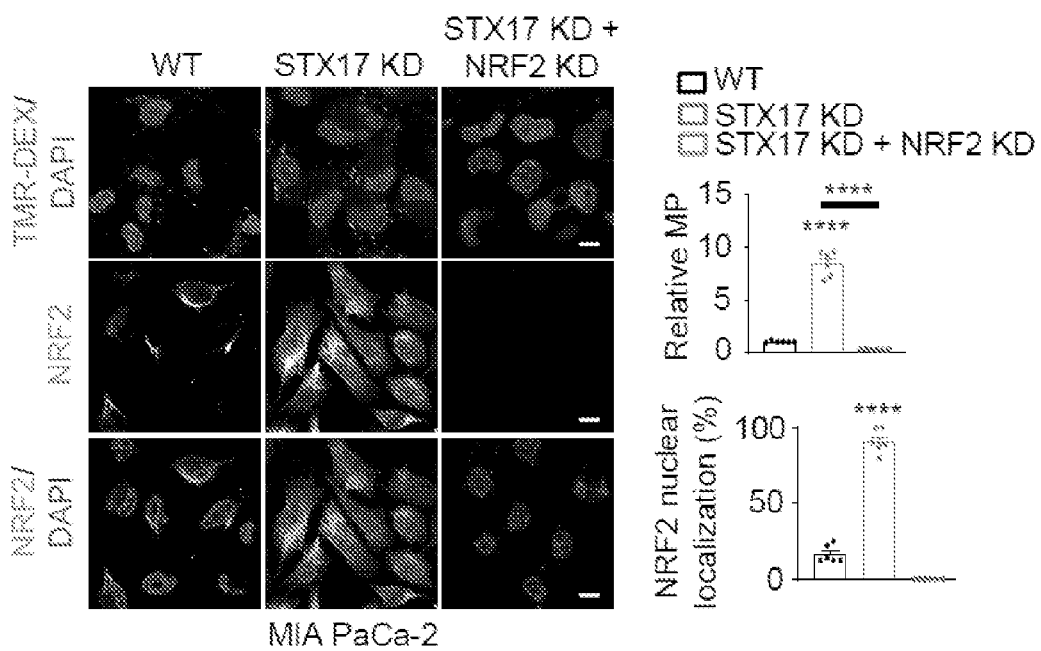
FIG. 15F shows an immunofluorescence staining and quantification illustrating the localization of MP (TMR-DEX) and NRF2 nuclear localization in WT, STX17 KD and STX17;NRF2 double KD MIA PaCa-2 cells; the quantification shows that the relative MP level and NRF2 nuclear localization are enhanced in STX17 KD cells and suppressed in the STX17;NRF2 double KD cells. Scale bar, 10 μm.
Figure 15G:
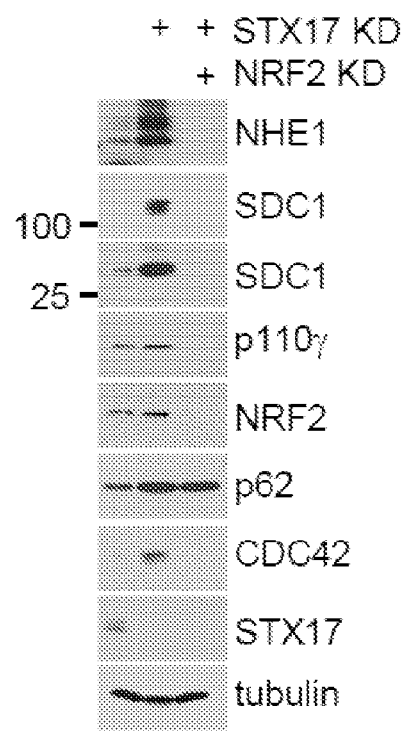
FIG. 15G shows an immunoblot analysis illustrating the expression of MP-related proteins in WT, STX17 KD and STX17;NRF2 double KD MIA PaCa-2 cells.
Figure 15H:
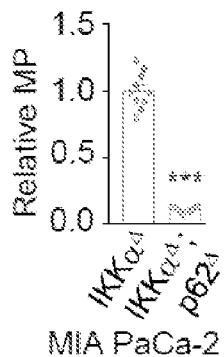
FIG. 15H shows a bar graph illustrating the quantification of MP using TMR-DEX in IKKα$^\Delta$ and IKKα$^\Delta$;p62$^\Delta$ (DKO) MIA PaCa-2 cells.
Figure 15I:
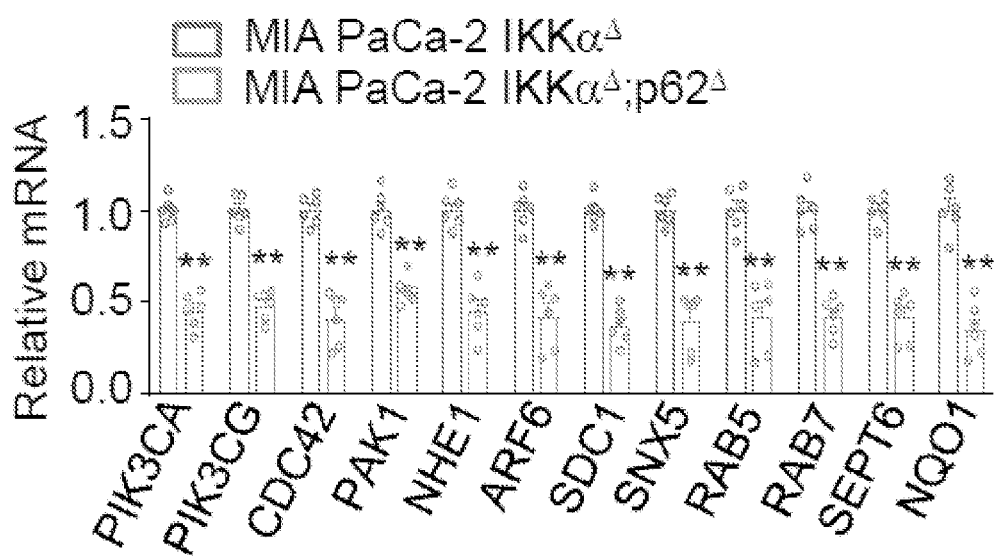
FIG. 15I shows a bar graph of a qRT-PCR analysis illustrating the relative mRNA levels of MP-related genes in IKKα$^\Delta$ and IKKα$^\Delta$; p62A MIA PaCa-2 cells.
Figure 15J:
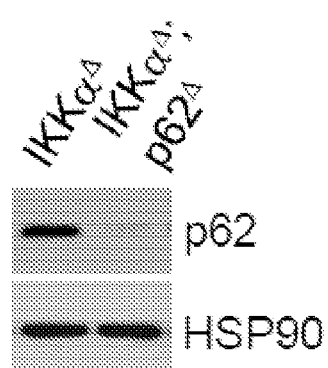
FIG. 15J shows an immunoblot analysis illustrating the expression of p62 in IKKα$^\Delta$ and IKKα$^\Delta$; p62$^\Delta$ MIA PaCa-2 cells of FIG. 15I.
Figure 15K:
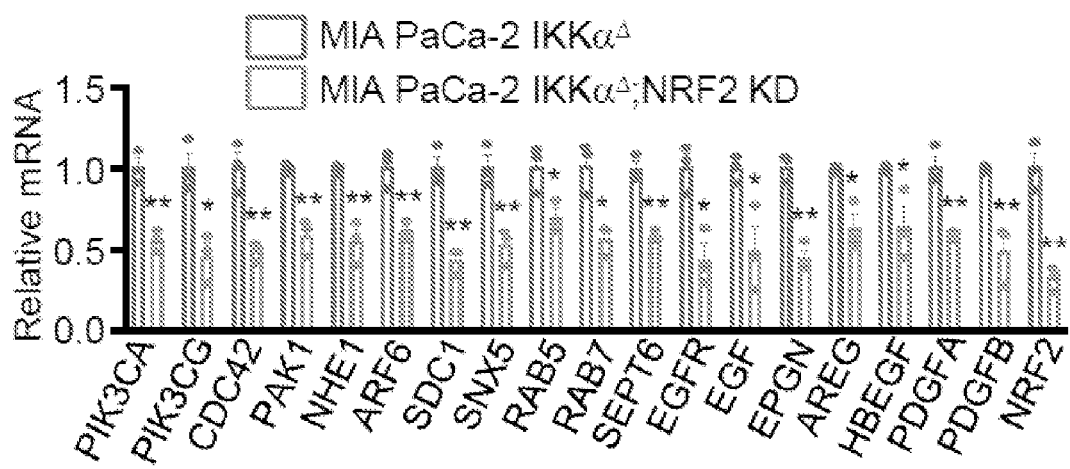
FIG. 15K shows a bar graph of a qRT-PCR analysis illustrating the relative mRNA levels of MP-related genes in IKKα$^\Delta$ and IKKα$^\Delta$;NRF2 KD MIA PaCa-2 cells.
Figure 15L:
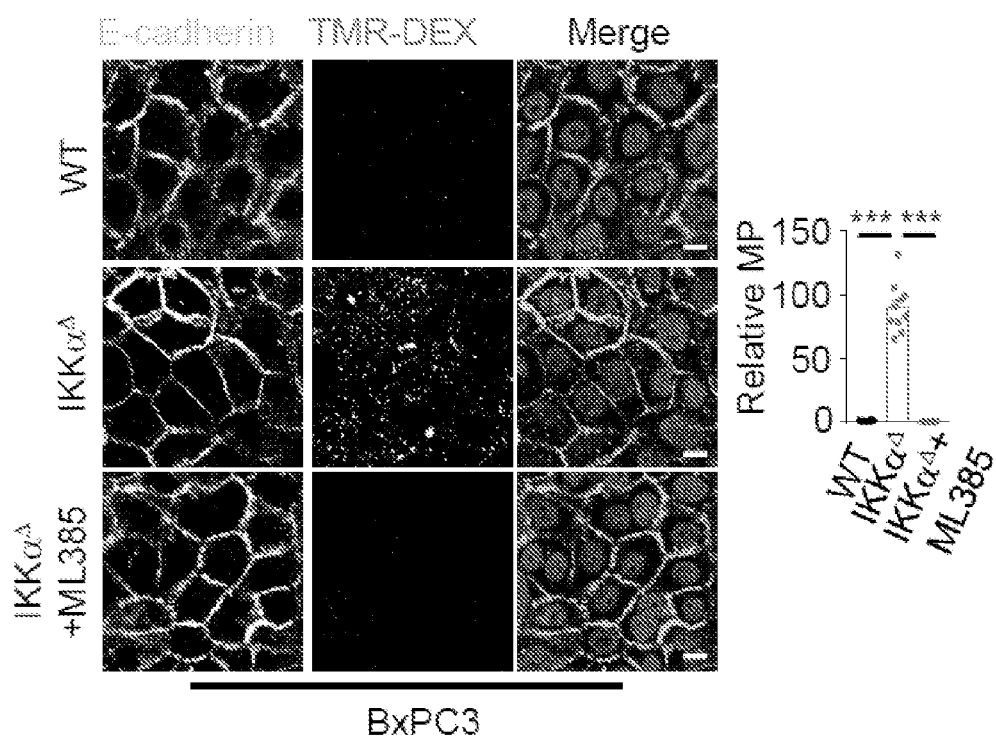
FIG. 15L shows an immunofluorescence staining and quantification illustrating the colocalization of MP (TMR-DEX) with E-cadherin (carcinoma cell marker) in WT and IKKα$^\Delta$ BxPC3 cells treated with the NRF2 inhibitor ML385 (10 μM) for 24 hrs. Scale bar, 10 μm.
Figure 15M:
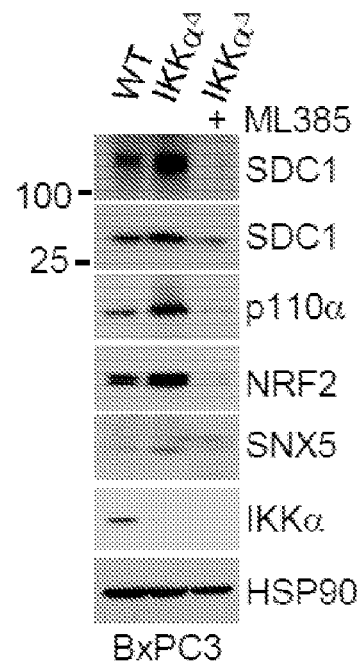
FIG. 15M shows an immunoblot analysis of levels of MP-related in proteins in the cells of FIG. 15L.
Figure 15N:
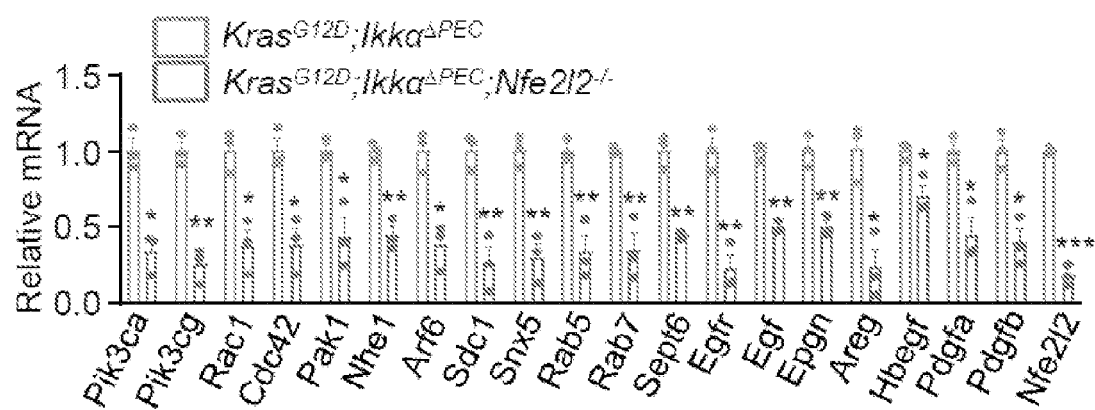

ATG7$^Δ$ or STX17 KD MIA PaCa-2 and BxPC3 cells also showed increased TMR-DEX uptake and MP-related mRNA expression (FIGS. 8A and 15A-15G). ATG7 or STX17 ablation induced p62 accumulation and upregulated NRF2 and several key MP proteins: SDC1, NHE1, p110α, p110γ, CDC42 and/or SNX5 (FIGS. 8B and 15GF). The ULK1/2 inhibitor MRT68921 increased macropinosomes and reduced autophagosomes (FIG. 8C). p62 or NRF2 ablation/inhibition in IKKα$^Δ$ or STX17 KD MIA PaCa-2 or BxPC3 cells prevented the increase in MP-related mRNAs, proteins and activity, whereas their re-expression restored MP-related protein expression (FIGS. 8D-8G and 15G-15M). Similar results were obtained in IKKα$^Δ$ Kras$^{G12D/PEC}$ PEC (FIGS. 8H, 831 and 15N). MP activity and related proteins were higher in IKKα$^{low}$;NRF29$^{high}$ than IKKα$^{high}$; NRF2$^{low}$ cells (FIGS. 16A-16D). IKKα overexpression or NRF2 KD in COLO-357/FG cells reduced NRF2 nuclear localization, MP activity and protein expression, whereas NRF2 transfection upregulated MP-related mRNAs and proteins, increased their surface localization and stimulated MP (FIGS. 16E-16J). Oncogenic KRAS, which stimulates MP, increases NRF2-encoding NFE2L2 mRNA expression via a RAF-MEK-ERK-Jun cascade (DeNicola et al., 2011).

Figure 8J:
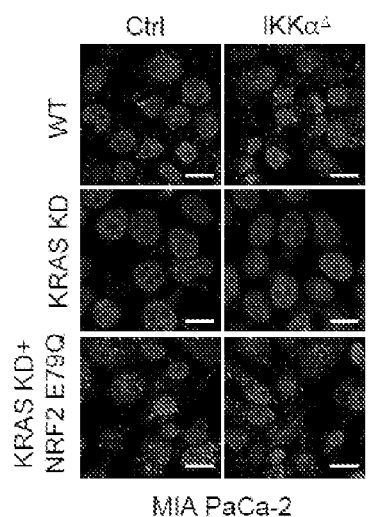
Figure 8K:
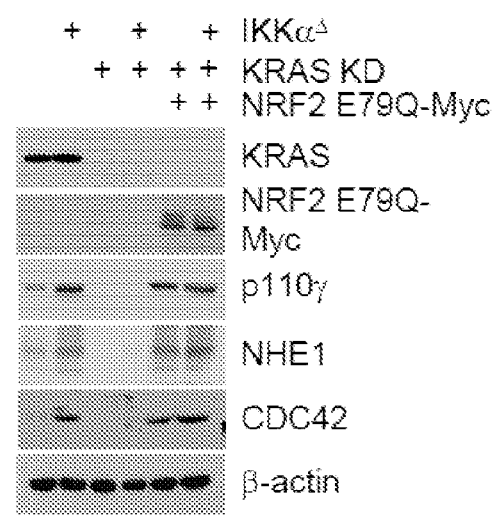
Figure 8L:
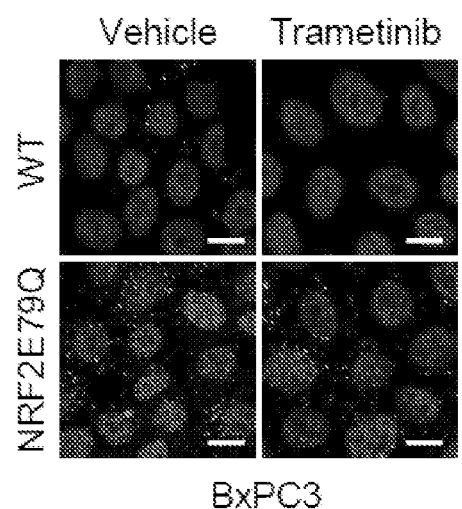
Figure 8M:
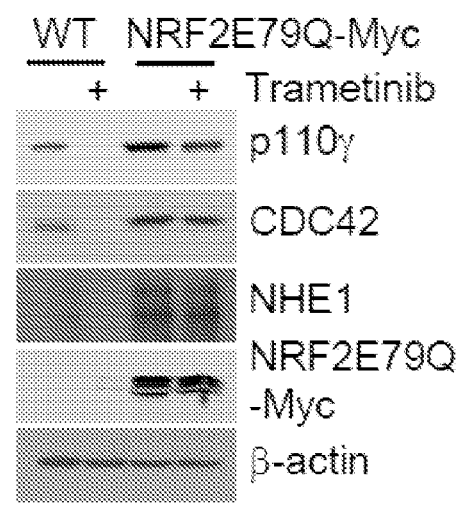
Figure 8N:
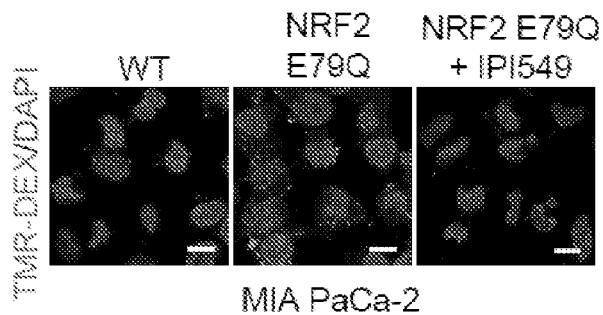
Figure 8O:
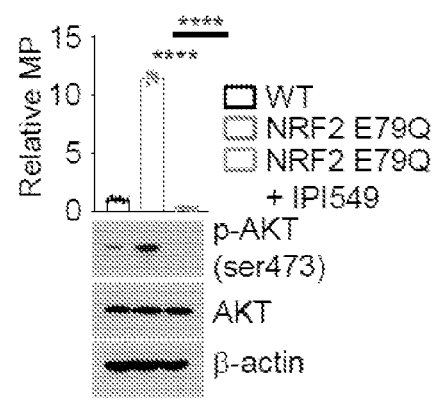
Figure 16A:
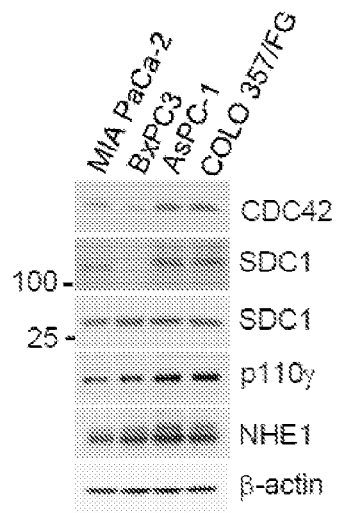
Figure 16B:
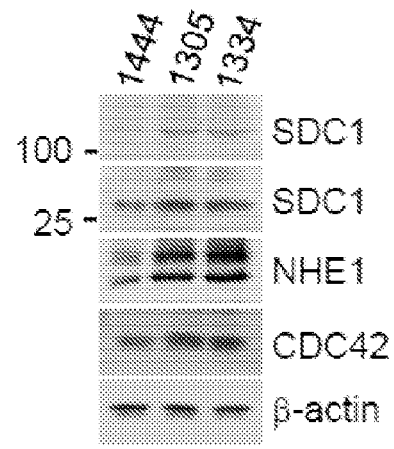
Figure 16C:
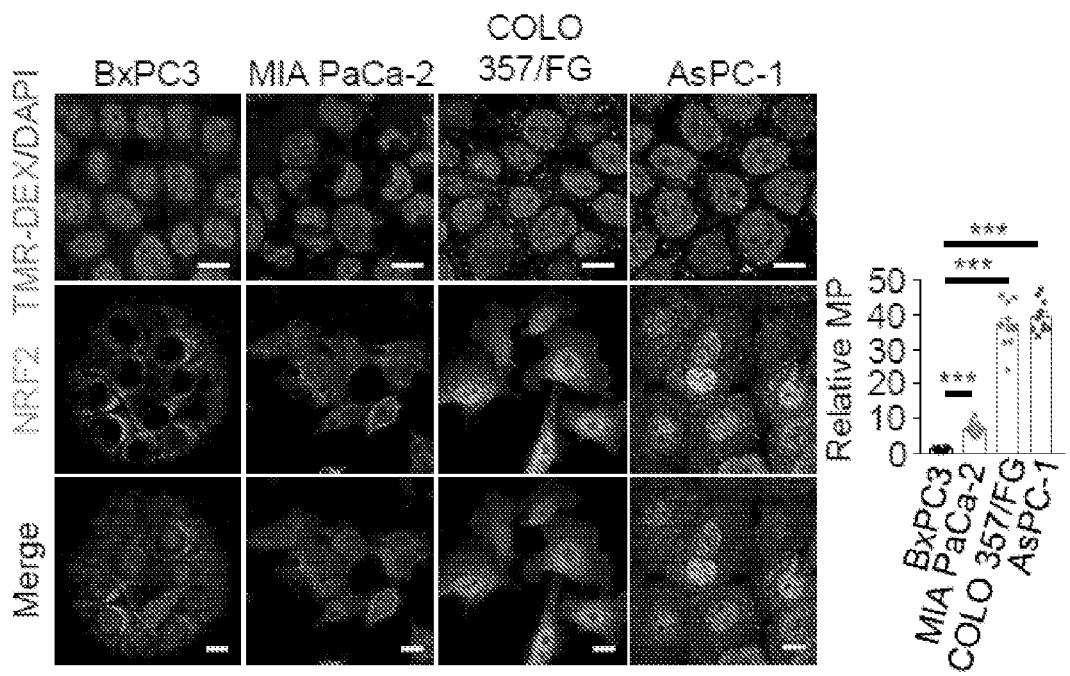
FIG. 16C shows an immunofluorescence staining and quantification illustrating the localization of macropinosome (TMR-DEX) and NRF2 in the human PDAC cell lines of FIG. 16A; the quantification shows that MP activity was significantly higher in COLO 357/FG and AsPC-1 cell lines when compared to BxPC3 and MIA PaCa-2 cells. (n=6) are mean±SEM. Statistical significance was determined by a 2-tailed t-test; *$p<0.05$, $p<0.01$, *$p<0.001$. Scale bar, 10 μm.
Figure 16D:
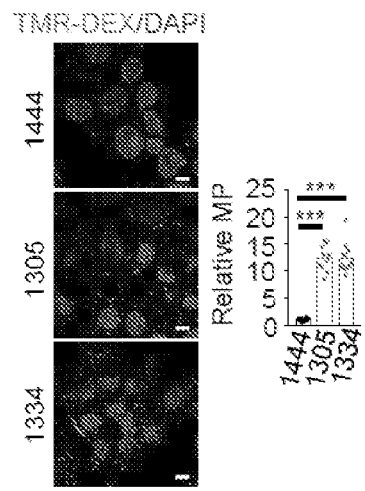
FIG. 16D shows an immunofluorescence staining and quantification illustrating the localization of macropinosome (TMR-DEX) in primary human PDAC cells 1334, 1305, and 1444; and the quantification shows that the relative levels of macropinosome are higher in 1305 and 1334 cells when compared to 1444 cells. (n=6) are mean±SEM. Statistical significance was determined by a 2-tailed t-test; *$p<0.05$, $p<0.01$, *$p<0.001$. Scale bar, 10 μm.
Figure 16E:
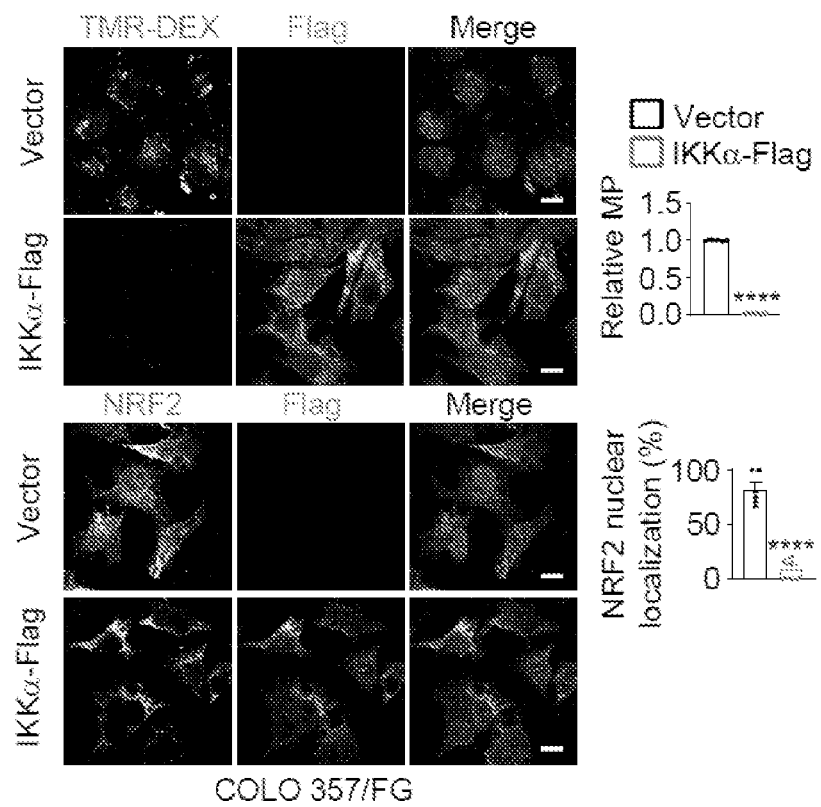
FIG. 16E shows an immunofluorescence staining and quantification illustrating the localization of macropinosome (TMR-DEX; top) and NRF2 nuclear (bottom) localization in COLO 357/FG cells transfected with a vector or IKKα$^\Delta$; the quantifications shows that IKKα expression suppressed the relative number of macropinosomes and NRF2 nuclear localization. (n=6) are mean±SEM. Statistical significance was determined by a 2-tailed t-test; *$p<0.05$, $p<0.01$, *$p<0.001$.
Figure 16F:
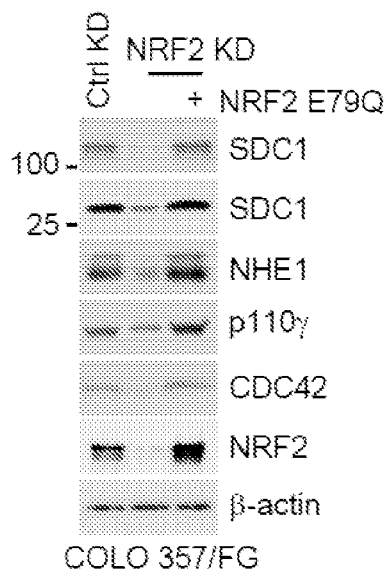
FIG. 16F shows an immunoblot analysis illustrating the expression of MP-related proteins in WT, NRF2-KD, and NRF2-KD COLO 357/FG cells transfected with a NRF2(E79Q) variant.
Figure 16G:
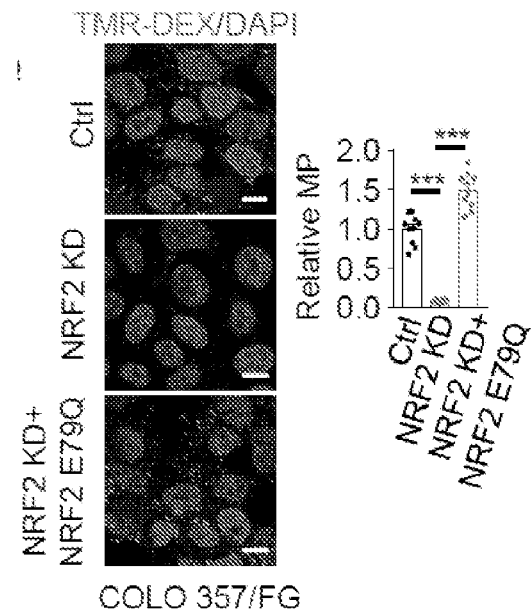
FIG. 16G shows an immunofluorescence staining and quantification illustrating the localization of macropinosome (TMR-DEX) in the COLO 357/FG cells of FIG. 16F. Scale bar, 10 μm. (n=6) are mean±SEM. Statistical significance was determined by a 2-tailed t-test; *$p<0.05$, $p<0.01$, *$p<0.001$.
Figure 16H:
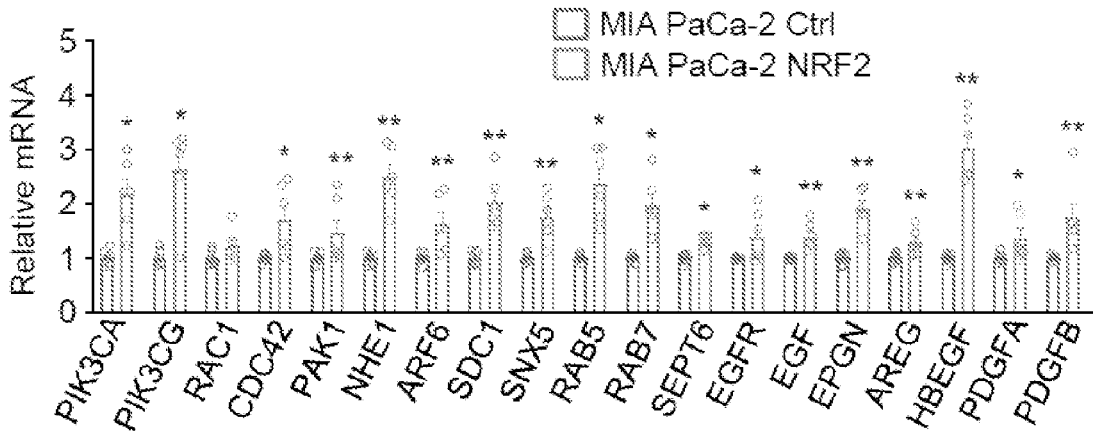
FIG. 16H shows a bar graph illustrating the quantification of a qRT-PCR analysis of the mRNA levels of MP-related genes MIA PaCa-2 cells transfected with NRF2. (n=6) are mean±SEM. Statistical significance was determined by a 2-tailed t-test; *$p<0.05$, $p<0.01$, *$p<0.001$.
Figure 16I:
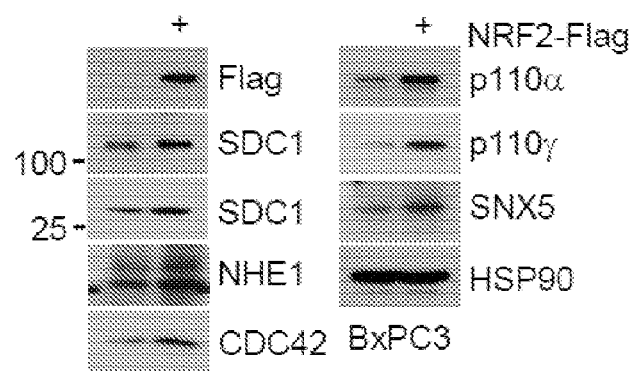
FIG. 16I shows an immunoblot analysis illustrating the expression of MP-related proteins in BxPC3 cells transfected NRF2.
Figure 16J:
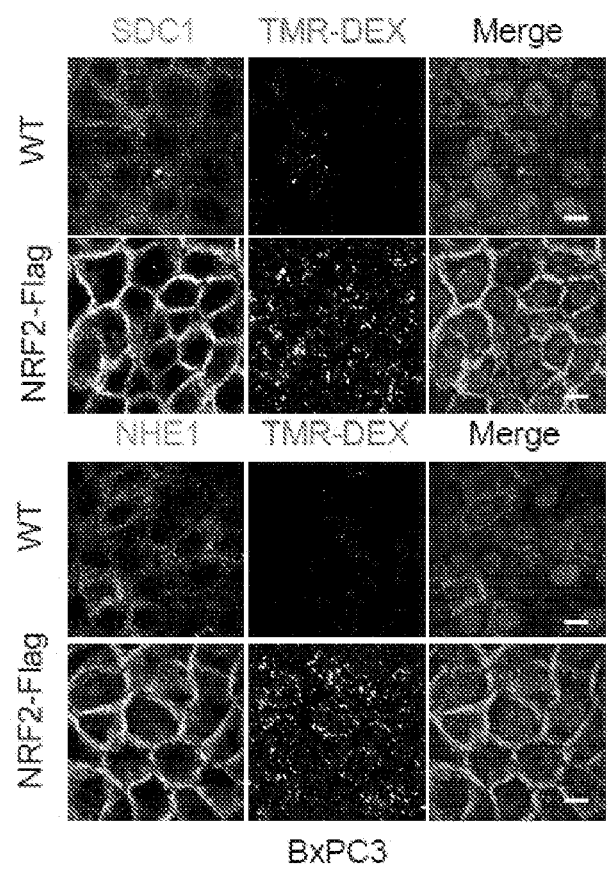
FIG. 16J shows an immunofluorescence staining illustrating the localization of macropinosomes (TMR-DEX; top) and SDC1, and macropinosomes and NHE1 localization in the cells of FIG. 16I. Scale bar, 10 sm.
Figure 16K:
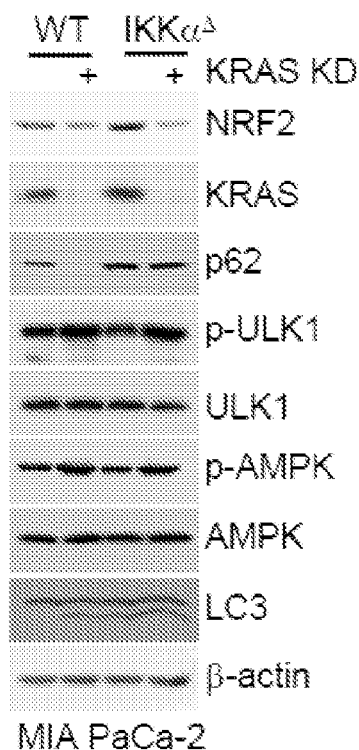
FIG. 16K shows an immunoblot analysis illustrating the expression of MP-related proteins in WT and IKKα$^\Delta$ MIA PaCa-2 cells transfected with KRAS KD.
Figure 16M:
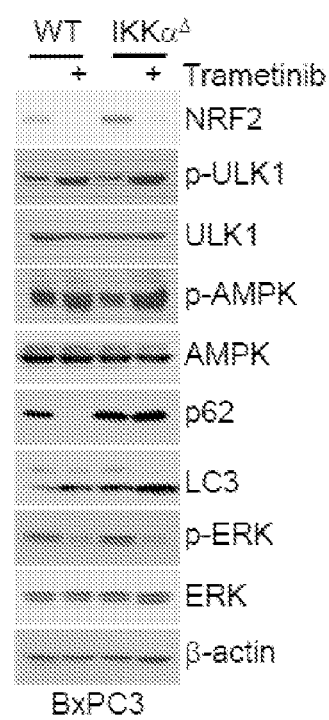
FIG. 16M shows an immunoblot analysis illustrating the expression of MP-related proteins in the cells of FIG. 16L.
Figure 16L:
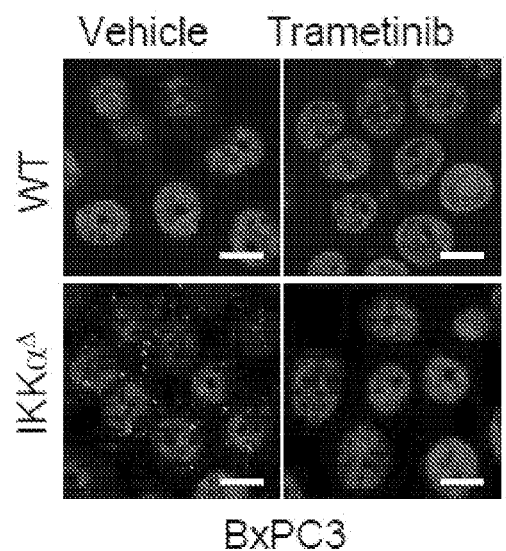
FIG. 16L shows an immunofluorescence staining illustrating the localization of macropinosomes in WT and IKKα$^\Delta$ BxPC3 cells treated with the MEK inhibitor trametinib.

Accordingly, KRAS ablation diminished MP and NRF2 expression in parental and IKKα$^Δ$ MIA PaCa-2 cells (FIGS. 8J and 16K). Similar results were observed in MEK inhibitor (trametinib) treated-BxPC3 cells expressing WT KRAS and mutant RAF (FIGS. 16L and 16M). Neither KRAS KD nor trametinib inhibited MP activity and protein expression in MIA PaCa-2 and BxPC3 cells overexpressing KEAP1-resistant NRF2(E79Q) (FIGS. 8J-8M), suggesting that NRF2 upregulates MP independently of RAS-RAF signaling. p110γ inhibition diminished MP activity in NRF2 (E79Q) overexpressing cells supporting an important role for p110γ induction in NRF2-stimulated MP (FIGS. 8N-O). Curiously, KRAS ablation and MEK inhibition activated AMPK and ULK1 in parental and IKKα$^Δ$ cells but down-regulated p62 only in parental cells (FIGS. 16K and 16M), suggesting that MEK inhibition stimulates autophagy initiation.

Figure 9A:
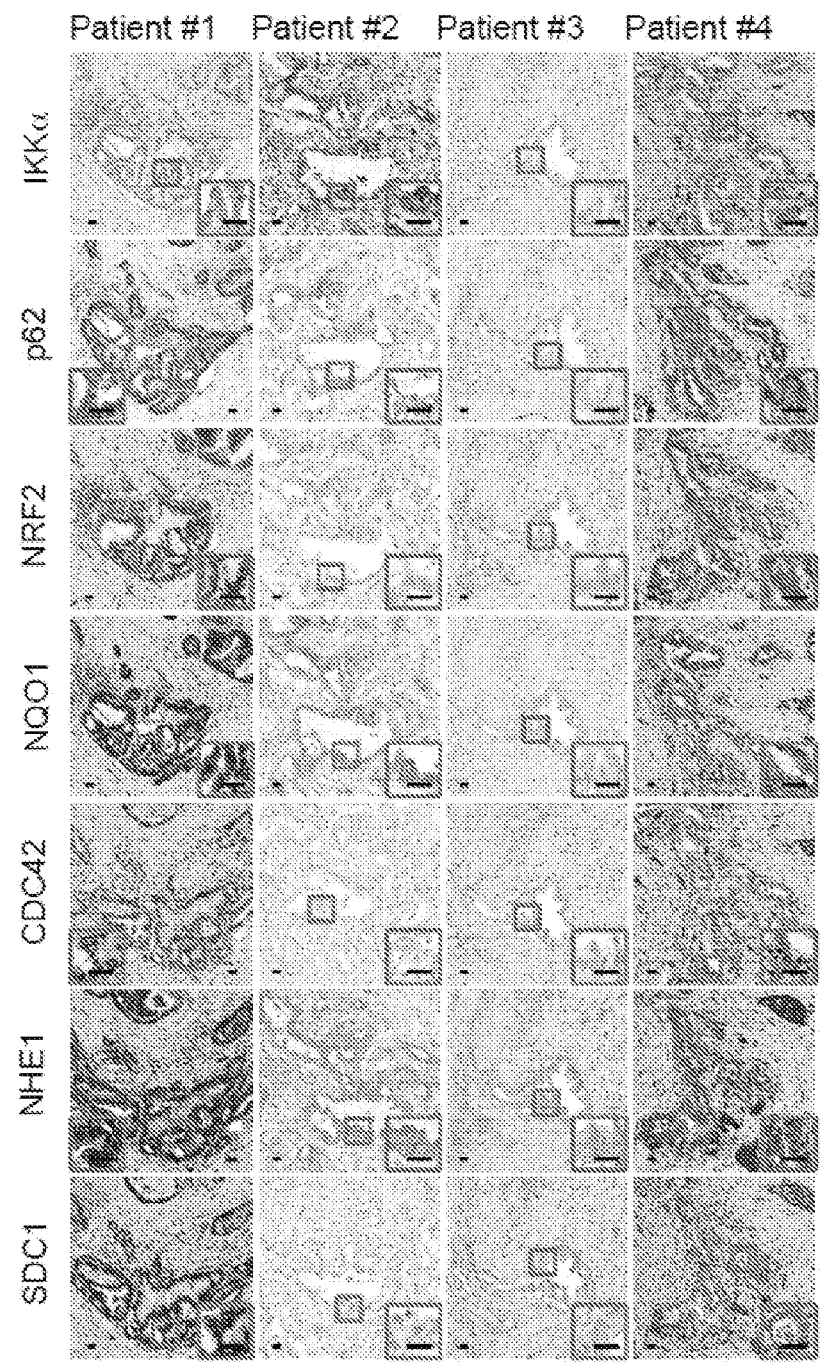
FIGS. 9A-D show that MP is upregulated in human PDAC cells expressing NRF2$^{high}$.
Figure 9B:
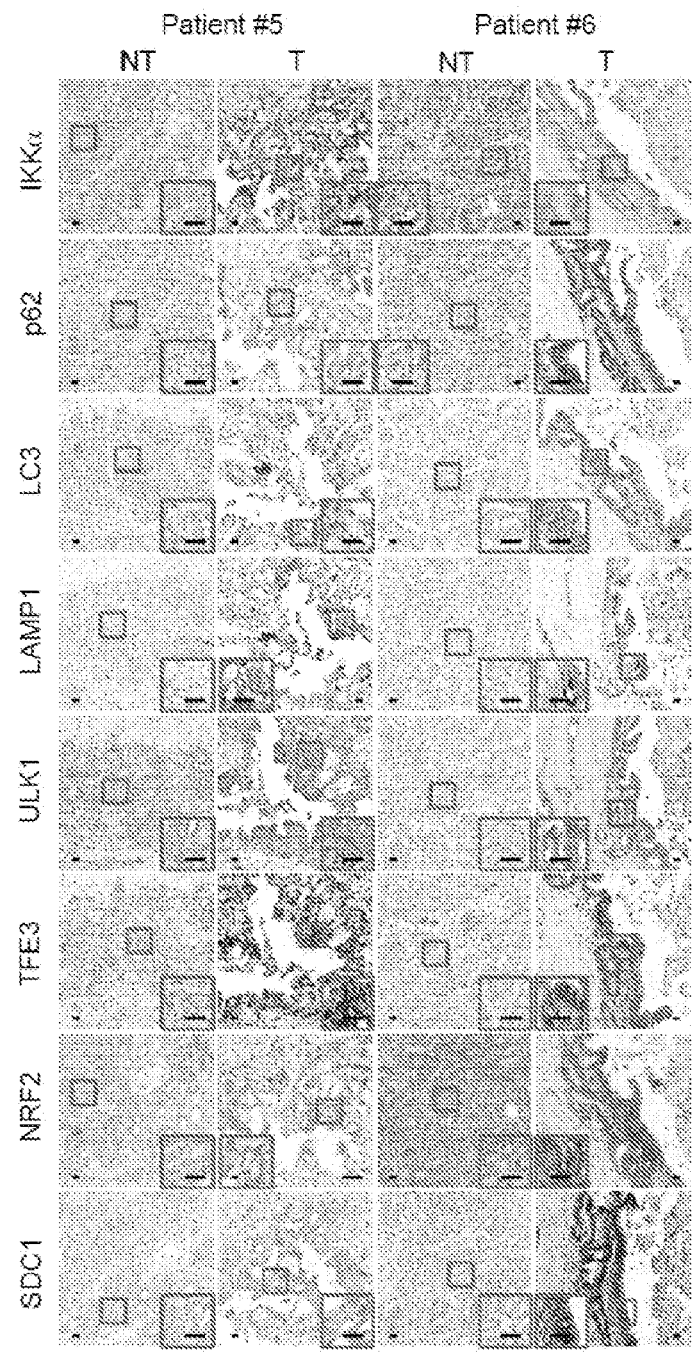
Figure 9C:
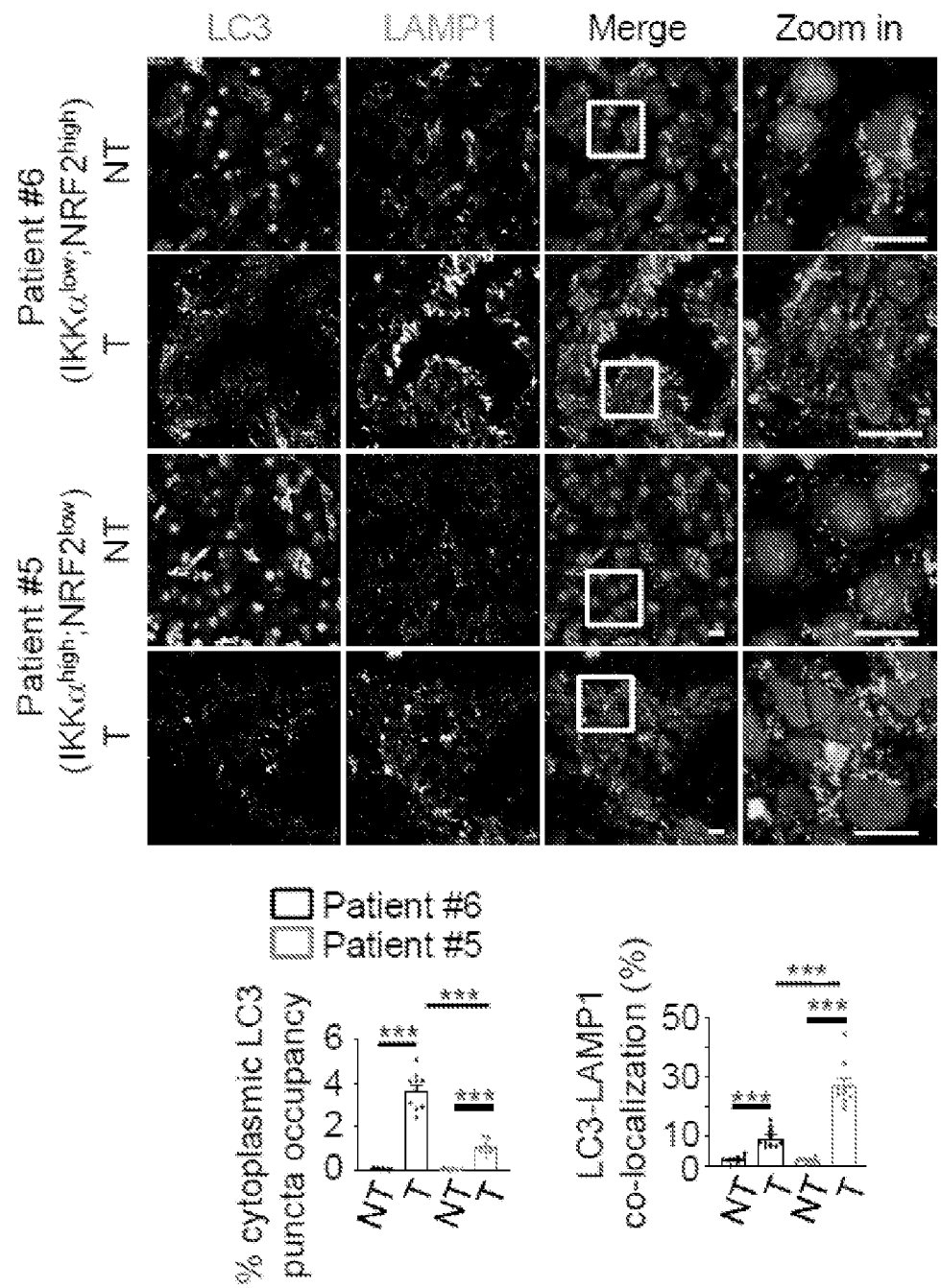
Figure 9D:
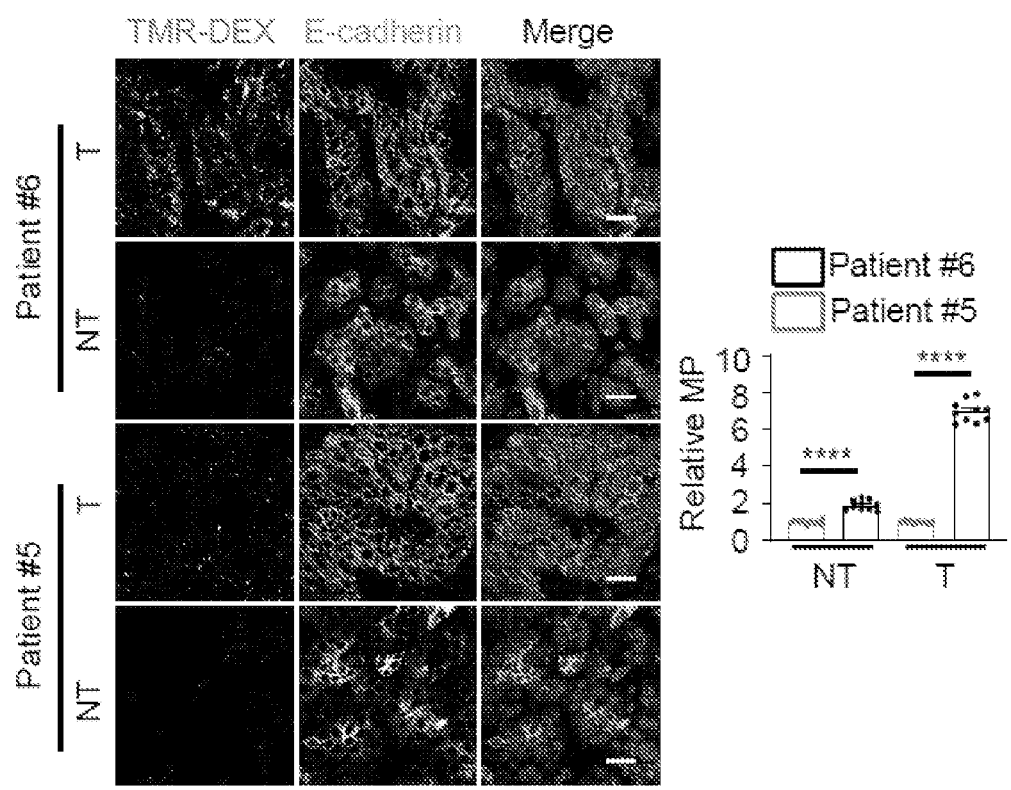

Examination of RNAseq data from 177 PDAC patients, revealed a significant positive correlation between MP-related and SQSTM1 or NFE2L2 mRNAs (FIG. 17A). Similar results were obtained by IHC analysis of human PDAC specimens, 31% (31/100) of which were IKKα$^{low}$ with 25 of them showing high p62 and NRF2 (FIGS. 9A, and 17B-17E). Most IKKα$^{low}$;p62$^{high}$;NRF2$^{high}$ tumors showed elevated NHE1 (76%; FIG. 17E), SDC1 (76%; FIG. 17D) and CDC42 (80%; FIG. 17C). However, as found in PDXs, some IKKα$^{high}$ tumors had high NRF2, which still correlated with elevated MP-related proteins, especially CDC42, NHE1 and SDC1 (R=0.33, p=0.0008; R=0.3070, p=0.0019; R=0.3005, p=0.0024) (FIG. 9A), supporting an IKKα-independent link between NRF2 and MP-related gene expression. As reported (Perera et al., 2015), PDAC tissue contained more ULK1, LC3, LAMP1 and TFE3 than non-tumor tissue, suggesting higher basal autophagy (FIG. 9B). Overall, p62, LC3 and MP-related proteins were higher in IKKα$^{low}$ than IKKα$^{normal}$ or IKKα$^{high}$ PDAC, suggesting defective autophagic degradation, confirmed by increased LC3 puncta and reduced LC3-LAMP1 co-localization (FIG. 9C). A freshly resected IKKα$^{low}$;NRF2$^{high}$ tumor showed higher MP activity than an IKKα$^{high}$;NRF2$^{low}$ tumor (FIG. 9D).

Figure 10A:
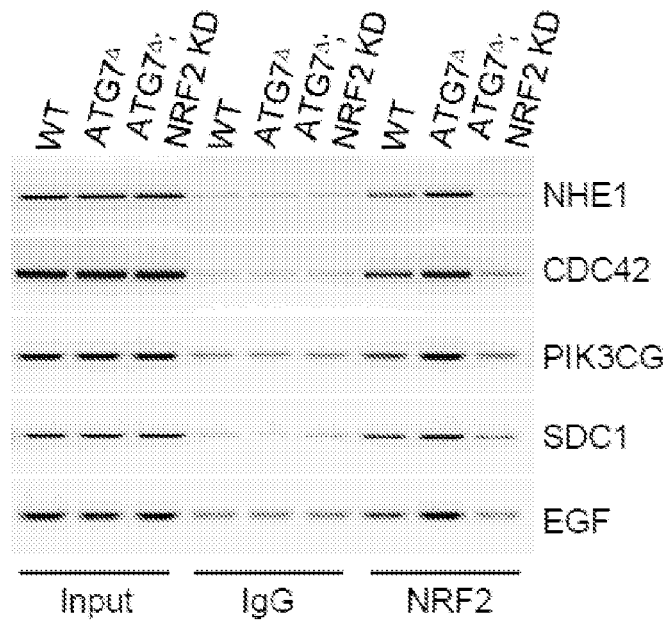
FIGS. 10A-10K show that NRF2 transcriptionally controls MP.
Figure 10B:
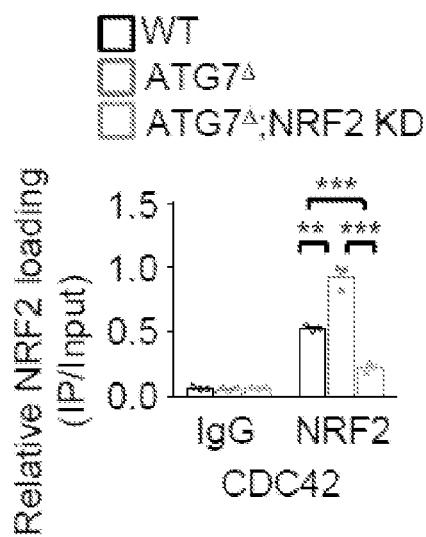
Figure 10C:
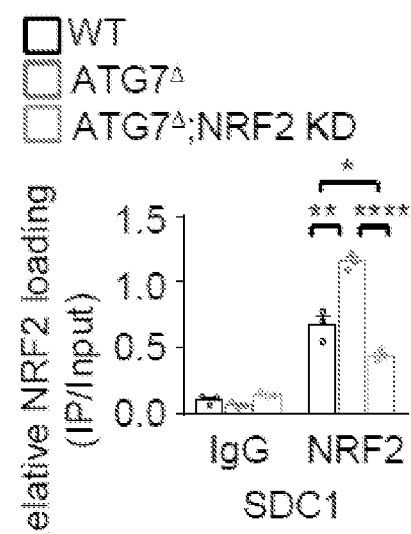
Figure 10D:
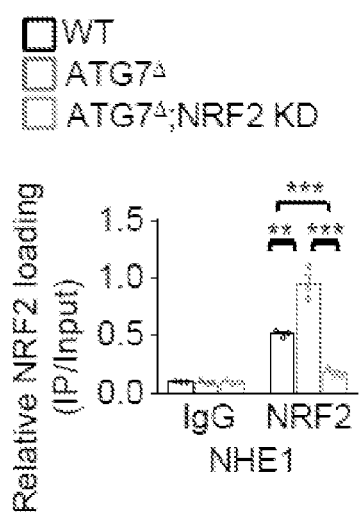
Figure 10E:
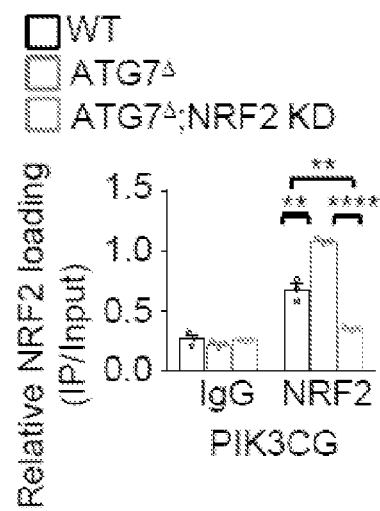
Figure 10F:
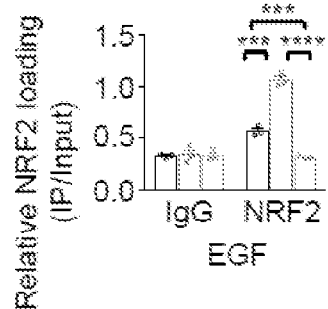
Figure 10G:
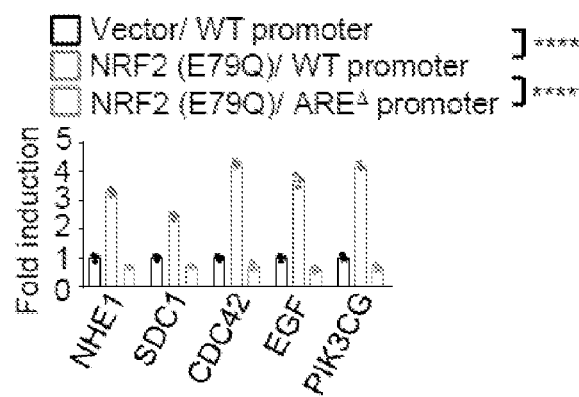
Figure 10H:
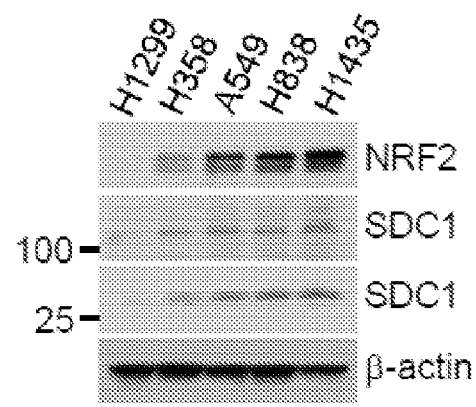
Figure 10I:
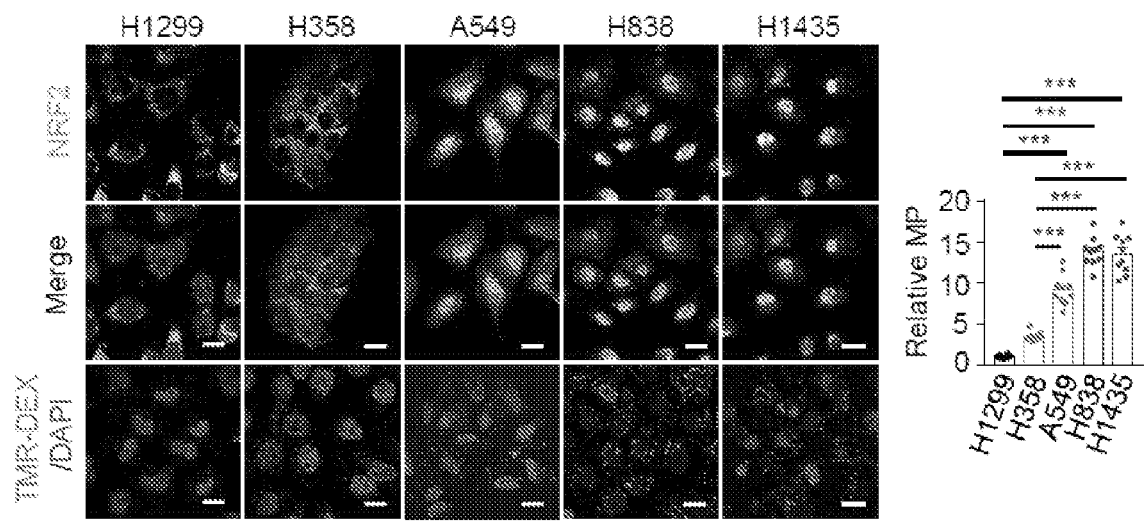
Figure 10J:
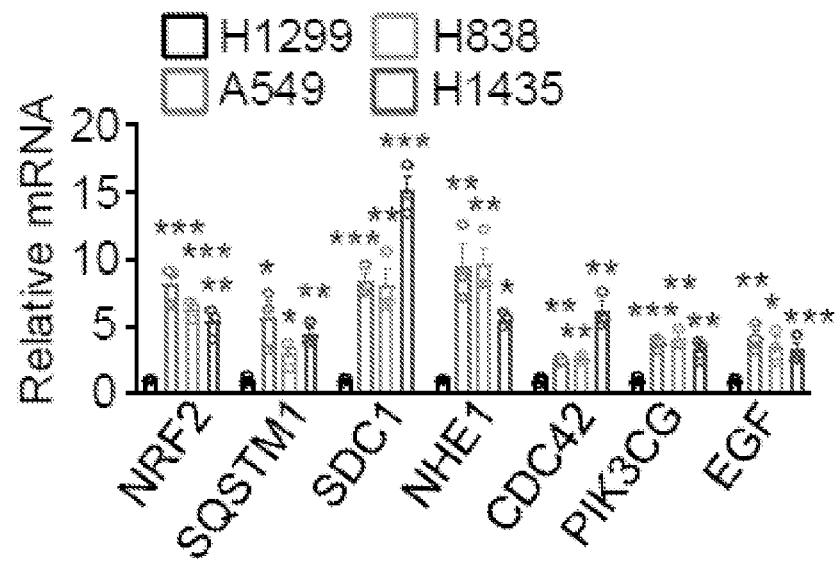
Figure 10K:
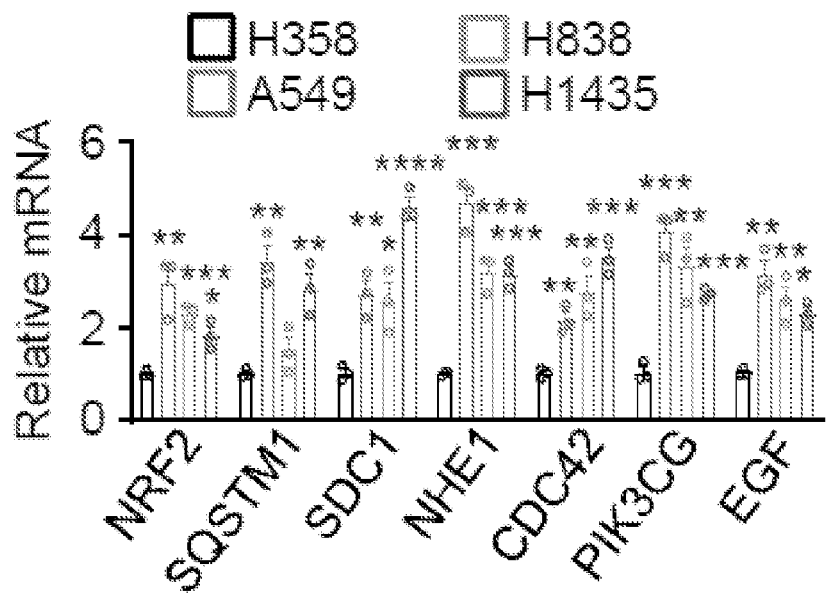

In silico analysis revealed putative NRF2 binding sites in the promoter regions of numerous MP genes (FIG. 17F). Targeted chromatin immunoprecipitation (ChIP) confirmed that NRF2 was recruited to the NHE1, SDC1, CDC42, PIK3CG and EGF promoters and this was enhanced by autophagy disruption and blocked by NRF2 or p62 KD (FIGS. 10A-10F, 18A-18B). Moreover, NRF2 activated the promoters of these genes in an ARE-dependent manner (FIG. 10GB). Genetic mutations and copy number variations affecting the KEAP1-NRF2 module occur in 25-30% of lung cancers (Cloer et al., 2019). Lung cancer cell lines with KEAP1 mutations (A549, H838, H1435) showed higher NRF2 expression, nuclear localization and MP-related gene expression and MP rates than KEAP1 non-mutated (H1299 and H358) cells (FIGS. 10H-10K5E). Oxidative stress induced by $H_2O_2$ and hypoxia induced by $CoCl_2$ also induced higher MP activity and MP-related protein expression in WT and p62$^Δ$ MIA PaCa-2 cells but not in NRF2 KD cells (FIGS. 18H-18OJ). These results suggested that any trigger that leads to NRF2 activation stimulated MP. Tumor hypoxia may therefore account for NRF2 activation and MP upregulation in IKKα$^{high}$ PDACs.

Figure 11A:
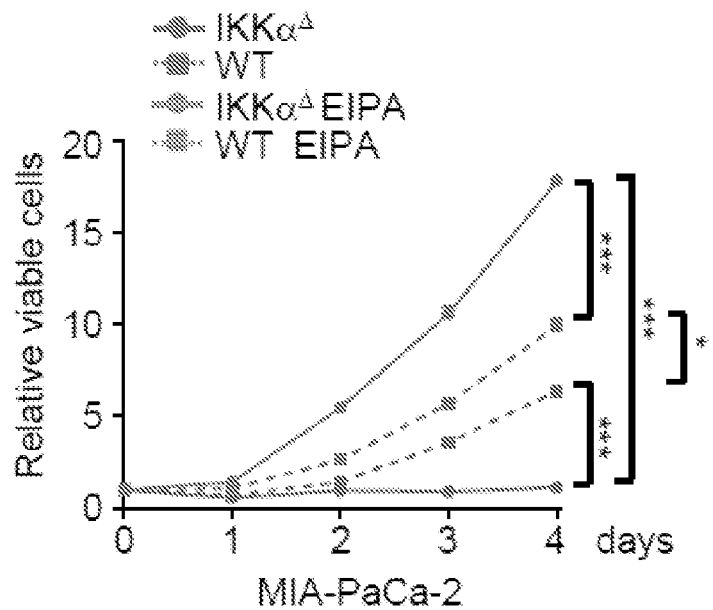
FIG. 11A-11K show the effect of macropinocytosis (MP) and autophagy inhibitors on PDAC cell growth and TCA Metabolism.
Figure 11B:
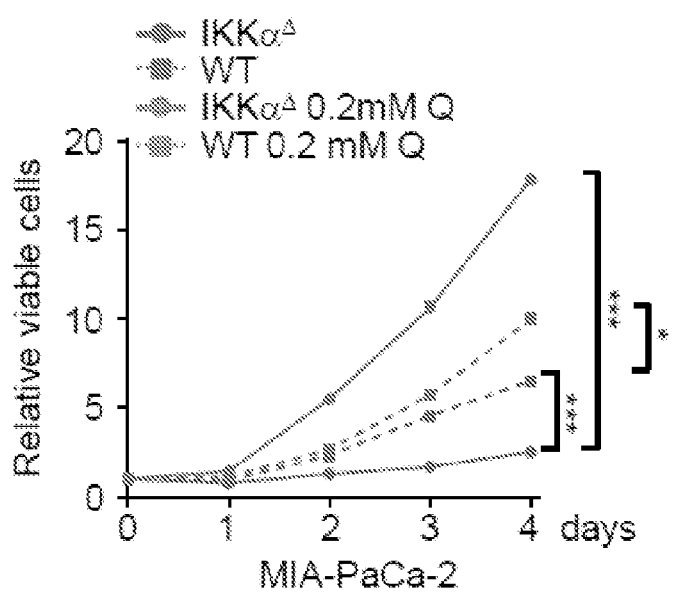
Figure 11C:
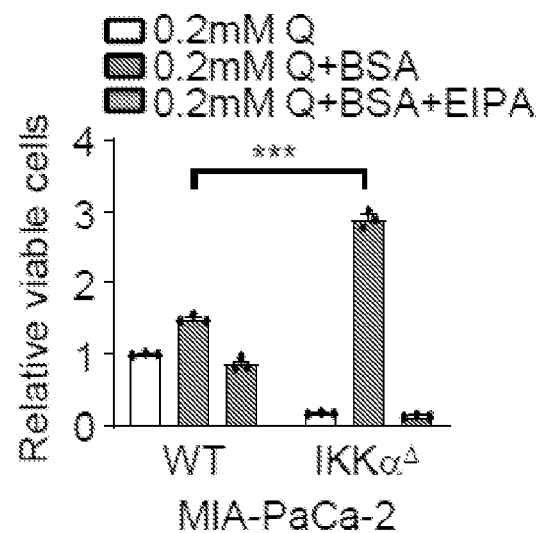
Figure 11D:
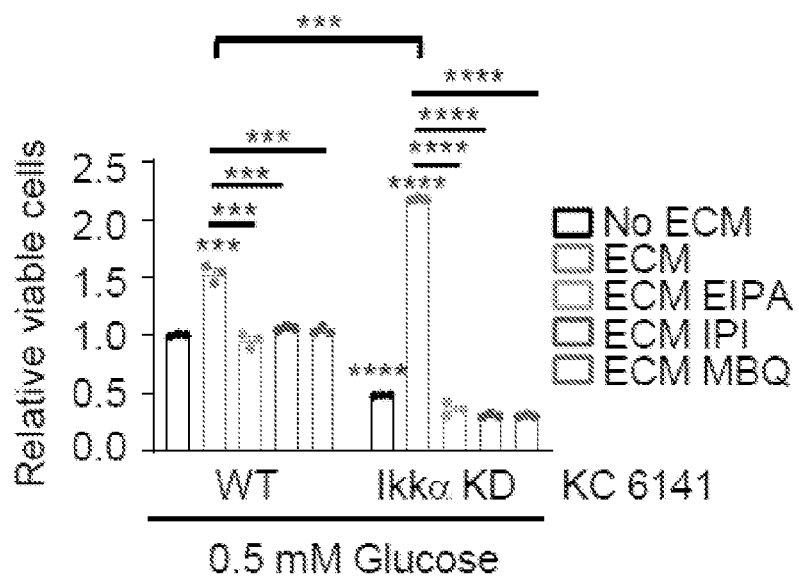
Figure 11E:
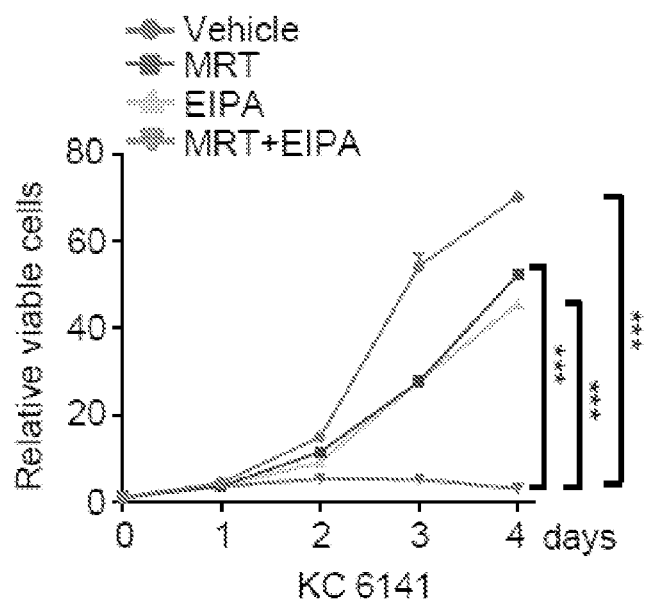
Figure 11F:
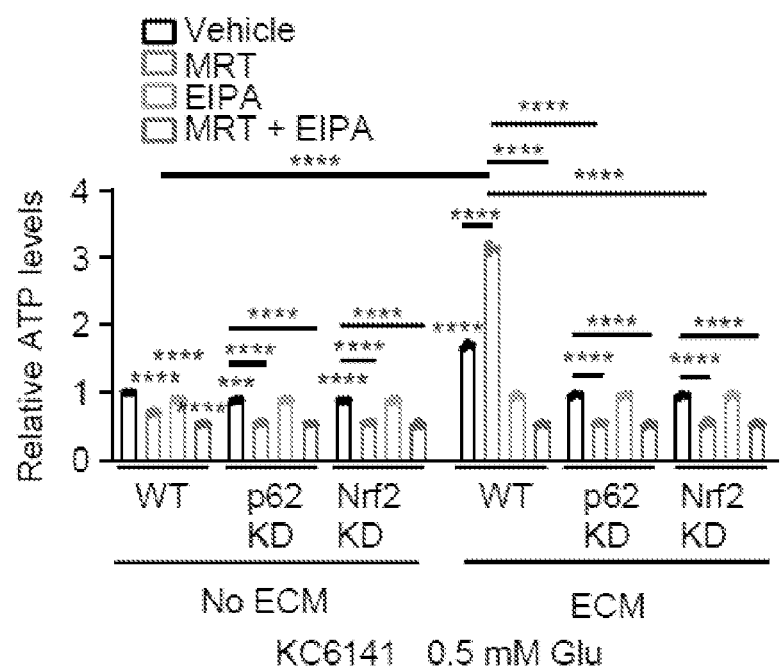
Figure 11G:
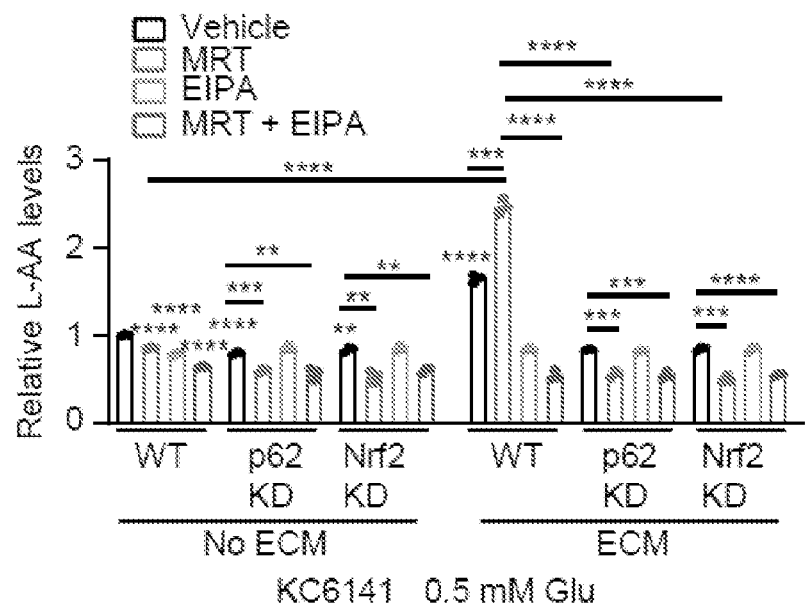
Figure 11H:
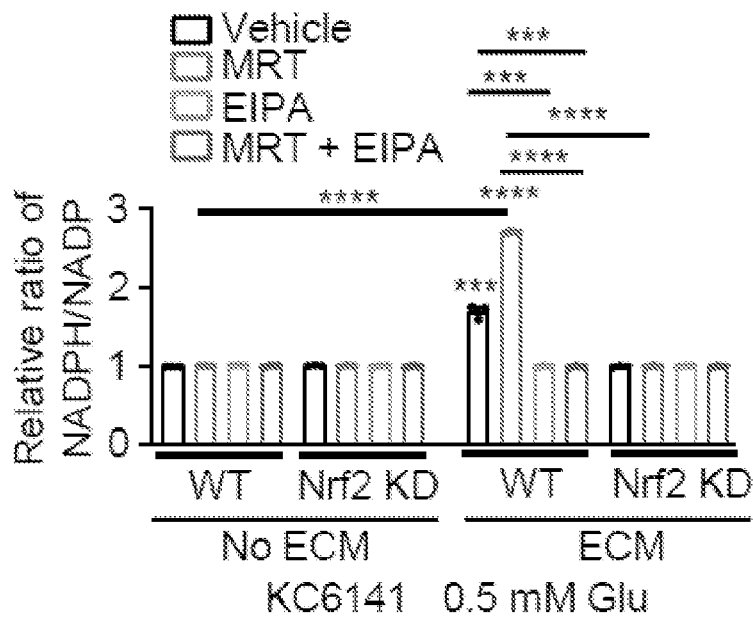
Figure 19A:
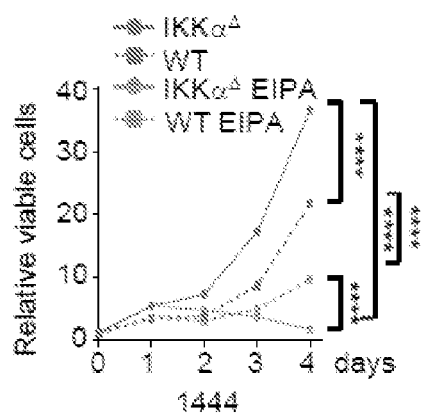
FIGS. 19A-19Q show effects of autophagy and MP inhibitors on PDAC cell growth.
Figure 19B:
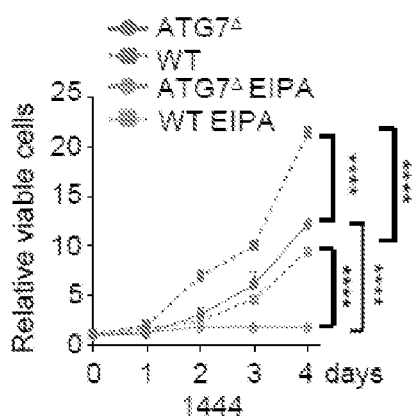
FIG. 19B shows a graph illustrating the suppression of cell viability in WT and ATG7$^\Delta$ 1444 cells that were cultured in complete medium containing the NHE1 inhibitor EIPA (10.5 μM) when compared to control. Total viable cells were measured with the CCK-8 assay after 0, 1, 2, 3 and 4 days. Data are presented relative to the day 0 value.
Figure 19C:
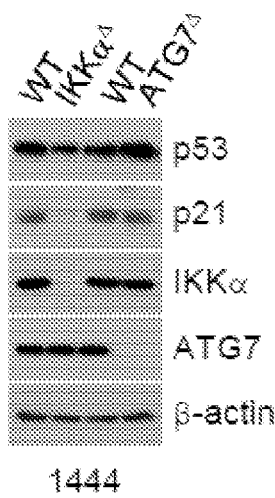
FIG. 19C shows an immunoblot analysis illustrating the expression of p53, p21, IKKα, and ATG7 in the 1444 cells of FIGS. 19A-19B.
Figure 19D:
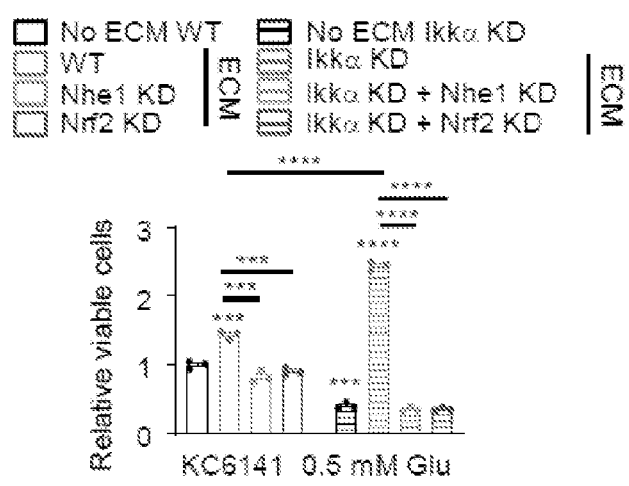
FIG. 19D shows a bar graph illustrating the relative level of cell viability in WT, Nhe1 KD, Nrf2 KD, IKKα KD, IKKα KD; Nhe1 KD, and IKKα KD; Nrf2 KD KC6141 cells grown on plates coated with or without ECM in the presence of 0.5 mM glucose. Total viable cells were measured after 3 days and data are presented relative to the value of WT cells grown without ECM.
Figure 19E:
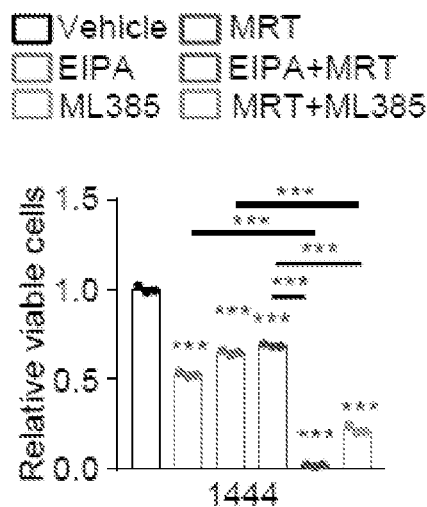
FIG. 19E shows a bar graph illustrating the relative level of cell viability in 1444 cells treated with vehicle, EIPA, ML385, MRT, EIPA and MRT, and MRT and ML385; total viable cells were measured after 3 days and data are presented relative to the vehicle control value.

Example 10: Macropinocytosis Provides an Alternative Amino Acid and eEnergy Source WT, IKKα$^Δ$ or ATG7$^Δ$ MIA PaCa-2 or 1444 cells were treated with EIPA. Whereas IKKα or ATG7 loss enhanced growth of MIA PaCa-2 cells, which are TP53 mutated, IKKα loss increased and ATG7 loss decreased growth of 1444 cells, which harbor functional TP53, whose expression along with p21 was decreased on IKKα loss (FIGS. 11A and 19A-19C), probably due to NRF2-mediated Mdm2 induction (Todoric et al., 2017). Notably, IKKα$^Δ$ and ATG7$^Δ$ cells were highly sensitive to EIPA regardless of their TP53 status. Glutamine dependence is a hallmark of RAS-transformed cells (Gaglio et al., 2009). Congruently, culture in low glutamine slowed parental and IKKα$^Δ$ cell growth, but the effect on IKKα$^Δ$ cells was greater (FIG. 11B), probably because the latter are autophagy deficient. Addition of exogenous albumin or culture on extracellular matrix (ECM) strongly enhanced the growth of nutrient-starved IKKα-deficient cells, whereas the effect on the parental cells was more modest and only albumin-supplemented or ECM-cultured IKKα-deficient cells were highly sensitive to inhibition or ablation of NHE1, PI3Kγ, CDC42, or NRF2 (FIGS. 11C, 6D and 19D). These results suggested that MP compensated for autophagy loss by enhancing extracellular protein uptake, implying that concurrent autophagy and MP blockade should completely inhibit cancer cell growth or survival.

Figure 19F:
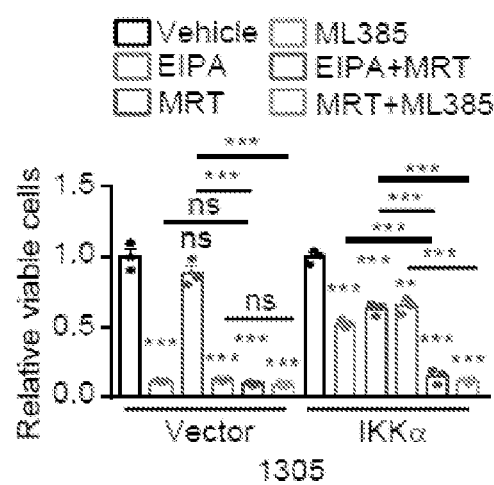
FIG. 19F shows a bar graph illustrating the relative level of cell viability in WT and IKKα transfected 1305 cells treated with the compounds of FIG. 19E. Total viable cells were measured as above.
Figure 19G:
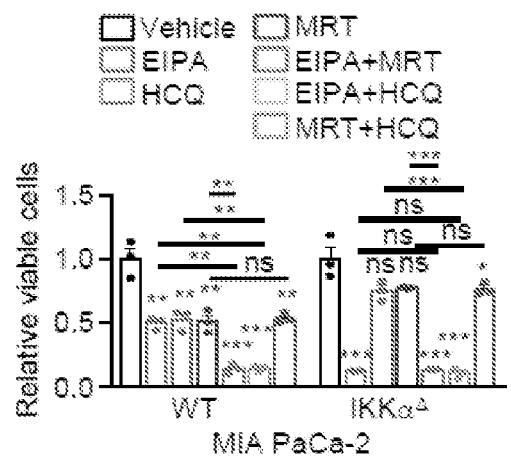
FIG. 19G shows a bar graph illustrating the relative level of cell viability in WT and IKKα$^\Delta$ MIA PaCa-2 cells treated with vehicle, EIPA, hydroxychloroquine (HCQ), MRT, EIPA and MRT, EIPA and HCQ, and MRT and HCQ. Total viable cells were measured as above.
Figure 19H:
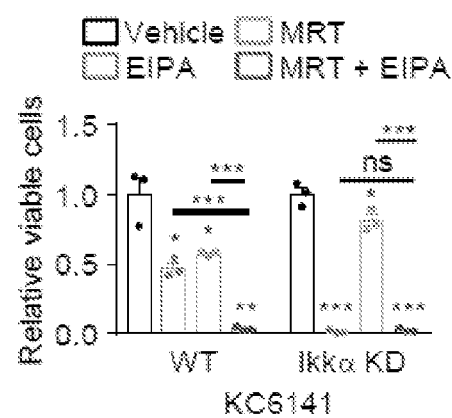
FIG. 19H shows a bar graph illustrating the relative level of cell viability in WT and IKKα-KD KC6141 cells treated with vehicle, EIPA, MRT, MRT and EIPA; total viable cells were measured as above.
Figure 19I:
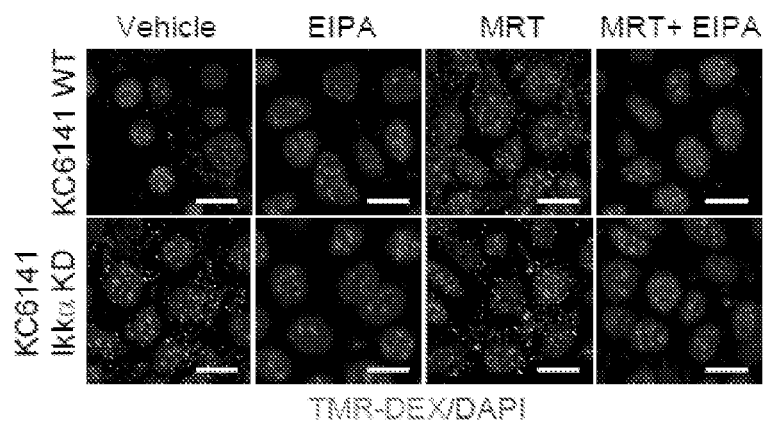
FIG. 19I shows an immunofluorescence staining illustrating the localization of macropinosomes in WT and IKKα-KD KC6141 cells treated with vehicle, EIPA, MRT, MRT and EIPA. Scale bar, 10 μm.
Figure 19J:
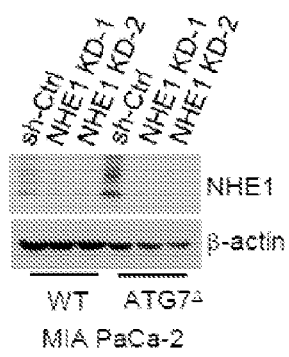
FIG. 19J shows an immunoblot analysis illustrating the expression of NHE1 in WT and ATG7$^\Delta$ MIA PaCa-2 cells lacking of NHE1 (NHE1 KD).
Figure 19K:
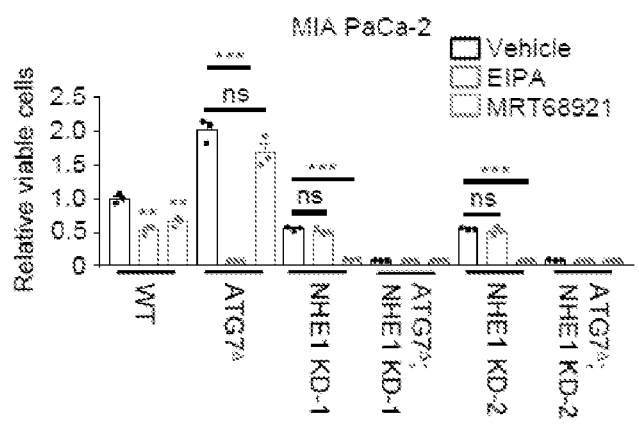
FIG. 19K shows a bar graph illustrating the relative level of cell viability in WT and ATG7A MIA PaCa-2 cells lacking of NHE1(NHE1 KD) of FIG. 19J that were treated with vehicle, EIPA, and MRT68921; total viable cells were measured after 3 days and data are presented relative to the vehicle control values of WT cells.
Figure 19L:
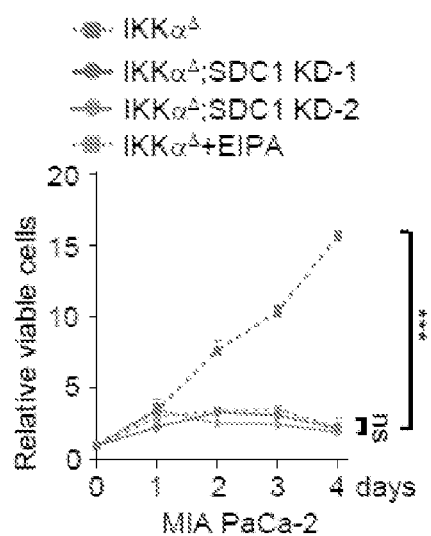
FIG. 19L shows a graph illustrating the suppression of cell viability in IKKα$^\Delta$ MIA PaCa-2 cells lacking the SDC1 gene (SDC1 KD1; SDC1 KD2), or IKKα$^\Delta$ MIA PaCa-2 cells that were cultured in complete medium containing the NHE1 inhibitor EIPA (10.5 μM) when compared to control (IKKα$^\Delta$ MIA PaCa-2 cells); total viable cells were measured as in FIG. 19A.
Figure 19M:
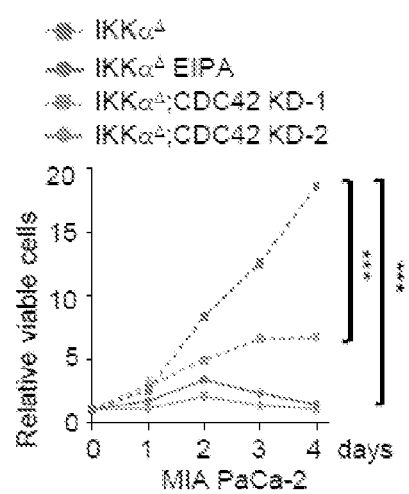
FIG. 19M shows a graph illustrating the suppression of cell viability in IKKα$^\Delta$ MIA PaCa-2 cells lacking the CDC42 gene (CDC42 KD1; CDC42 KD2), or IKKα$^\Delta$ MIA PaCa-2 cells that were cultured in complete medium containing the NHE1 inhibitor EIPA (10.5 μM) when compared to control (IKKα$^\Delta$ MIA PaCa-2 cells); total viable cells were measured as in FIG. 19A.
Figure 19N:
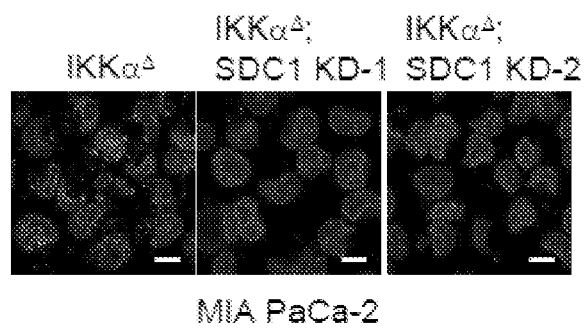
FIG. 19N shows an immunofluorescence staining illustrating the localization of macropinosomes in the IKKα$^\Delta$ MIA PaCa-2 cells lacking the SDC1 gene (SDC1 KD1; SDC1 KD2) of FIG. 19L above.
Figure 19O:
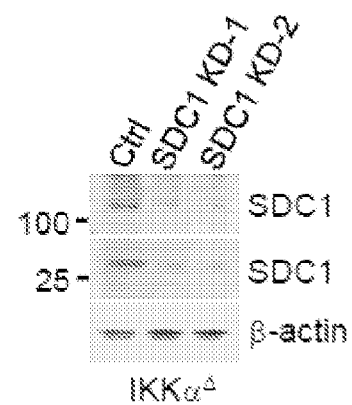
FIG. 19O shows an immunoblot analysis illustrating the expression of SCD1 protein in the IKKα^Δ MIA PaCa-2 cells lacking the SDC1 gene (SDC1 KD1; SDC1 KD2) of FIG. 19N.
Figure 19P:
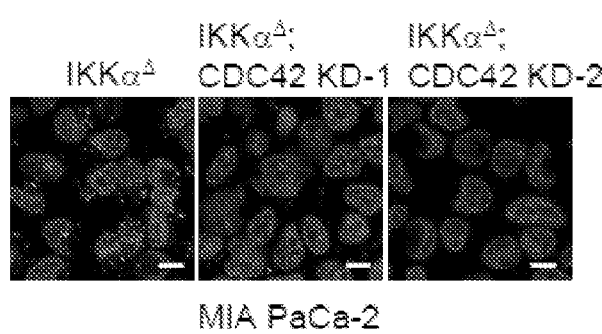
FIG. 19P shows an immunofluorescence staining illustrating the localization of macropinosomes in the IKKα^Δ MIA PaCa-2 cells lacking the CDC42 gene (CDC42 KD1; CDC42 KD2) of FIG. 19M above.
Figure 19Q:
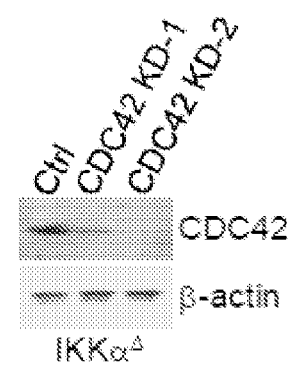

To test this prediction, primary (1444, 1305) and established human (MIA PaCa-2) and mouse (KC6141) PDAC cells were treated with the ULK1/2 inhibitor MRT68921, HCQ, EIPA or the NRF2 inhibitor ML385. Concurrent treatment with MRT68921 or HCQ plus EIPA or ML385 synergistically inhibited cell growth (FIGS. 11E and 19E-19H). As expected EIPA treatment inhibited MP (FIG. 19I). While HCQ synergized with EIPA or ML385, it did not synergize with MRT68921, suggesting that at 10 μM HCQ barely disrupted MP. Since EIPA may have NHE1-independent effects on cell viability, NHE1 was silenced in MIA PaCa-2 cells. This rendered MIA PaCa-2 cells EIPA-insensitive and together with MRT68921 or ATG7 ablation it severely compromised cell viability (FIGS. 19J-19K). Of note, IKKα$^{low}$ 1305 and ATG7$^Δ$ or IKKα-deficient MIA PaCa-2 and KC6141 cells, were very sensitive to EIPA or ML385 alone, but not to MRT68921 or HCQ (FIGS. 19F-19H and 19J). IKKα overexpression rendered 1305 cells more sensitive to autophagy inhibition and resistant to MP or NRF2 inhibition (FIG. 19F). SDC1 or CDC42 KD abrogated IKKα$^Δ$ MIA PaCa-2 cell growth and MP activity (FIG. 19L-19N).

Figure 11I:
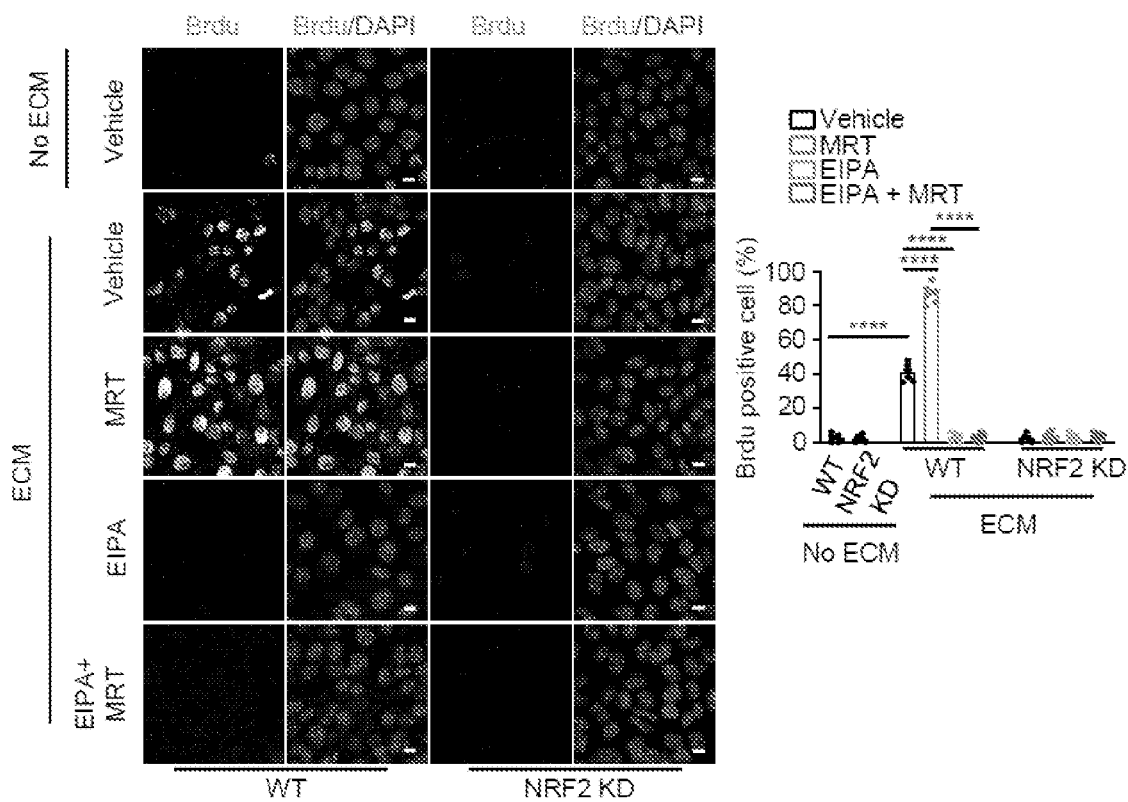
Figure 20A:
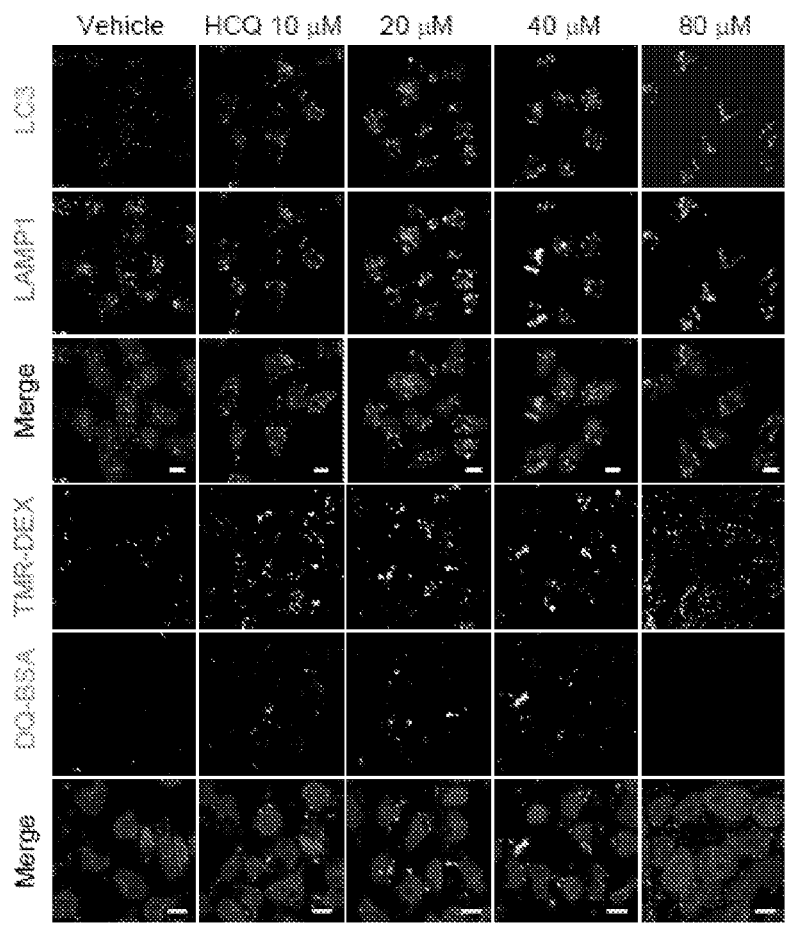
FIGS. 20A-20N show the effect of autophagy and MP inhibition on PDAC cell growth, metabolism and tumor development.
Figure 20B:
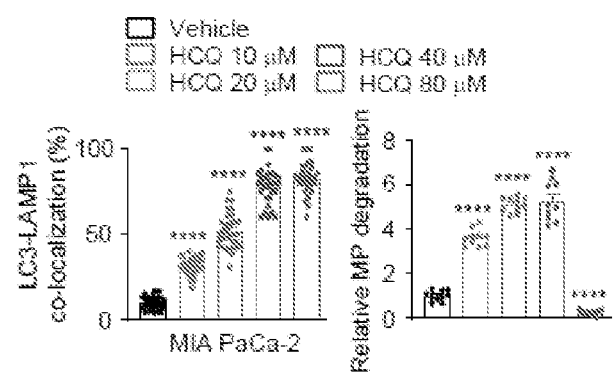
FIG. 20B shows the quantification of the immunofluorescence of FIG. 20A illustrating that HCQ enhanced LC3-LAMP1 colocalization in a concentration-dependent manner, and HCQ induced the degradation of MP at 10 μM, 20 μM, 40 μM, but not at 80 μM.
Figure 20C:
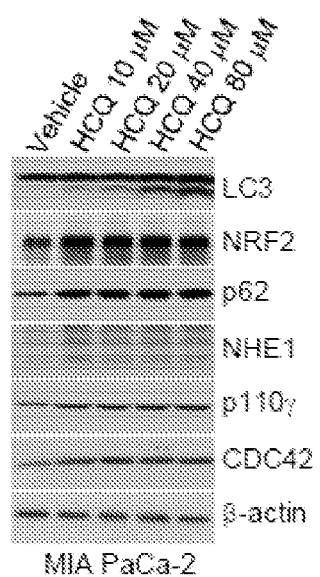
FIG. 20C shows an immunoblot analysis illustrating the expression of MP-related proteins in MIA PaCa-2 cells treated with vehicle, 10 μM, 20 μM, 40 μM, and 80 μM HCQ.
Figure 20D:
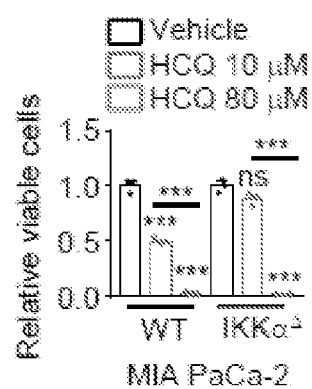
FIG. 20D shows a bar graph illustrating the suppression of cell viability in WT and IKKα^Δ MIA PaCa-2 cells were treated with 10 or 80 μM HCQ. Total viable cells were measured after 3 days and data are presented relative to the vehicle value. Mean±SEM (n=3 independent experiments).
Figure 20E:
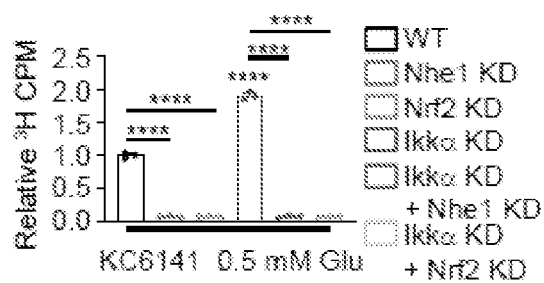
FIG. 20E shows a bar graph illustrating the uptake of $^3$H-proline in WT, Nhe1 KD, Nrf2 KD, Ikkα KD, Ikkα KD; Nhe1 KD, and Ikkα KD; Nrf2 KD KC6141 cells grown on plates coated with $^3$H-proline-labeled ECM in the presence of 0.5 mM glucose (Glu) for 24 hrs. $^3$H uptake was measured by liquid scintillation counting and the data were normalized to cell number and presented as $^3$H CPM relative to WT cells. Mean±SEM (n=3 independent experiments).
Figure 20F:
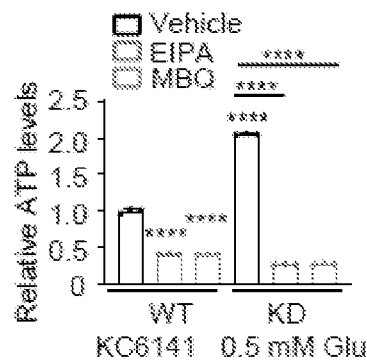
FIG. 20F shows a bar graph illustrating the relative levels of ATP in WT and IKKα-KD KC6141 cells grown on plates coated with ECM in the presence of 0.5 mM Glu and treated with EIPA or MBQ-167 (MBQ) for 24 hrs. Total cellular ATP was measured and data were normalized to cell number and presented relative to untreated WT cells. Mean f SEM (n=3 independent experiments).
Figure 20G:
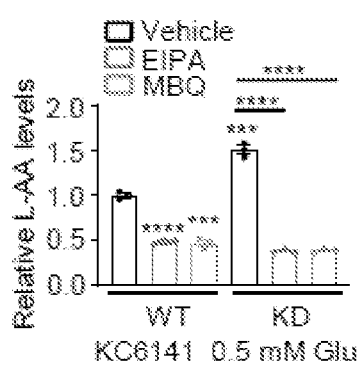
FIG. 20G shows a bar graph illustrating the relative levels of L-amino acids (AA) in WT and IKKα-KD KC6141 cells cultured and treated as in FIG. 20F. Data were normalized and presented as above. Mean±SEM (n=3 independent experiments).
Figure 20H:
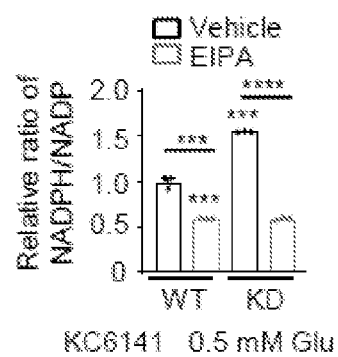
FIG. 20H shows a bar graph illustrating the relative levels of NADPH and NADP in WT and IKKα-KD KC6141 cells grown as in FIG. 20F in the presence of 0.5 mM Glu and treated with EIPA for 24 hrs. Data were normalized to cell number and presented as NADPH to NADP ratio relative to the value of untreated WT cells. Mean±SEM (n=3 independent experiments).

The mechanism by which HCQ preferentially inhibited autophagy relative to MP was also determined. At 10-40 μM HCQ inhibited autophagic degradation to increase LC3-II, p62 and lysosomal LC3 retention, and stimulated MP as indicated by TMR-DEX and DQ-BSA co-localization and MP-related protein expression (FIGS. 20A-20C). HCQ inhibited MP only at 80 μM, the dose that inhibited cell growth (FIG. 20D). The mechanism by which MP compensated for autophagy loss was also assessed. Consistent with earlier reports, KC6141 cells plated on $^3$H-proline-labelled ECM depended on MP for $^3$H-proline uptake. Whereas IKKα ablation enhanced $^3$H uptake, NHE1 or NRF2 ablation inhibited it (FIG. 20E). Importantly, culture on ECM increased cellular ATP (FIGS. 11F and 20F) and amino acid content (FIGS. 11G and 20G), as well as NADPH to NADP ratio (FIGS. 11H and 20H) and BrdU incorporation (FIG. 11I). Increased cellular ATP and amino acid content, as well as NADPH to NADP ratio and BrdU incorporation were further elevated in MRT68921-treated or IKKα-deficient cells and reduced in p62/NRF2 ablated cells or by MP blockade with the CDC42/Rac inhibitor MBQ-167 or EIPA, which was ineffective in p62/NRF2 ablated cells (FIGS. 11F-11I and 20F-20H).

Figure 11J:
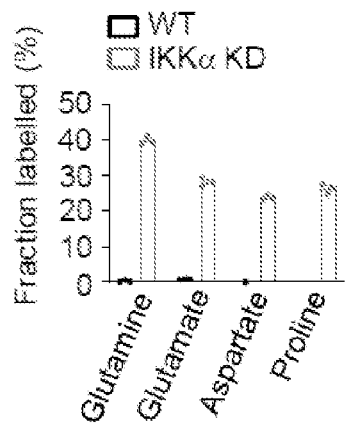
Figure 11K:
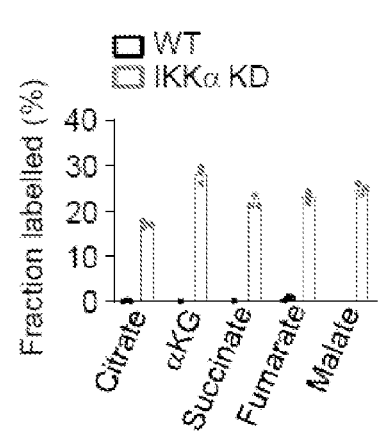

To address the fate of catabolized ECM proteins under nutrient-deprived conditions, parental and IKKα-ablated KC6141 cells were cultured on U-$^{13}$C-glutamine labeled ECM and quantified isotope enrichment in cancer cell metabolites. Consistent with the ability of ECM, which is probably degraded by cancer cell enzymes, to support growth of nutrient-limited cells, a significant ECM-derived isotope enrichment in various glutamine-derived amino acids and TCA cycle intermediates in IKKα ablated cells was detected (FIGS. 11J and 11K). These results suggested that NRF2-activated MP compensated for autophagy loss by supporting nutrient acquisition from ECM components.

Example 10: Dual Autophagy and MP Blockade Trigger Tumor Regression

Figure 12A:
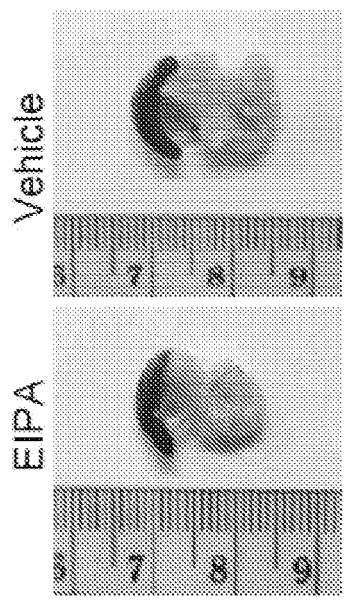
FIG. 12A-12N show MP inhibition in Autophagy-compromised PDAC induces tumor regression.
Figure 12B:
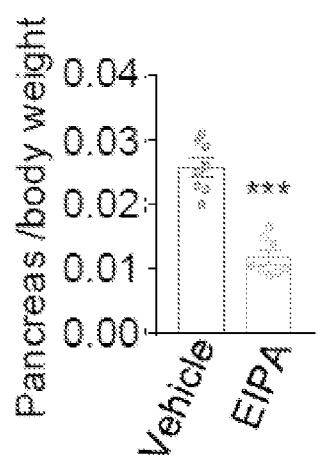
FIG. 12B shows a bar graph quantifying the pancreatic weight of mice treated as in FIG. 12A, and illustrating that EIPA significantly reduced the pancreatic weight. Mean±SEM (n=8).
Figure 12C:
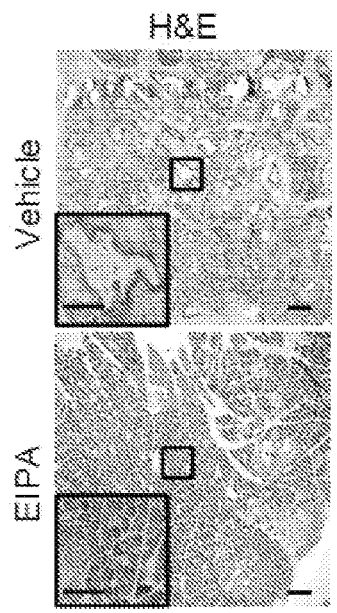
FIG. 12C shows a hematoxylin and eosin (H&E) staining illustrating stained pancreatic sections from mice treated as in FIG. 12A and evaluated at the end of treatment.
Figure 12D:
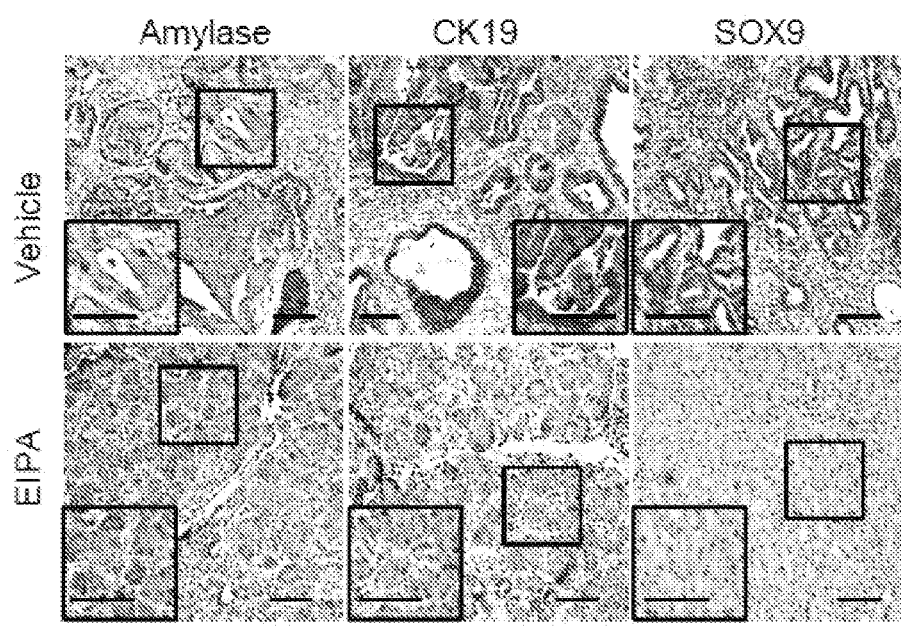
FIG. 12D shows an immunohistochemical (IHC) analysis illustrating the expression of amylase, CD19, and SOX9 in the pancreatic sections from mice treated as in FIG. 12A. Scale bars, 100 µm.
Figure 12E:
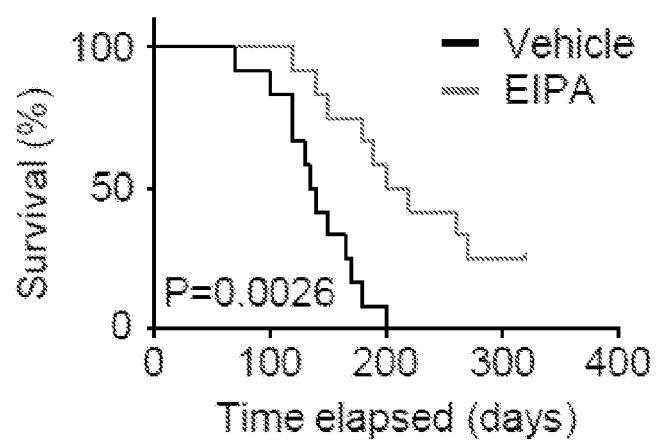
FIG. 12E shows Kaplan-Meier survival curves illustrating that treatment with 10 mg/kg EIPA enhanced the percent survival rate of $Kras^{G12D}$;Ikkα$^{ΔPEC}$ mice when compared to mice treated with vehicle (n=12). Significance was analyzed by log rank test.
Figure 12F:
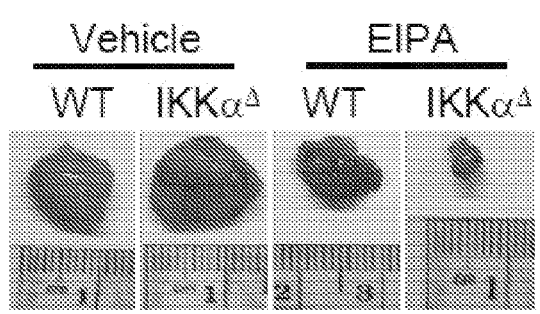
FIG. 12F shows representative images and sizes of WT and IKKα$^Δ$ MIA PaCa-2 tumors s.c. grown in nude mice treated with EIPA or vehicle. Mean±SEM (n=10 mice). Note that IKKα$^Δ$ tumors removed from EIPA-treated mice mainly consisted of the Matrigel Plus plug.
Figure 12G:
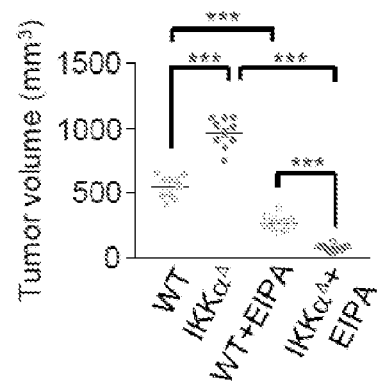
FIG. 12G shows a bar graph quantifying the tumor sizes of FIG. 12F illustrating that EIPA significantly suppressed WT and IKKα MIA PaCa-2 tumors growth.
Figure 12H:
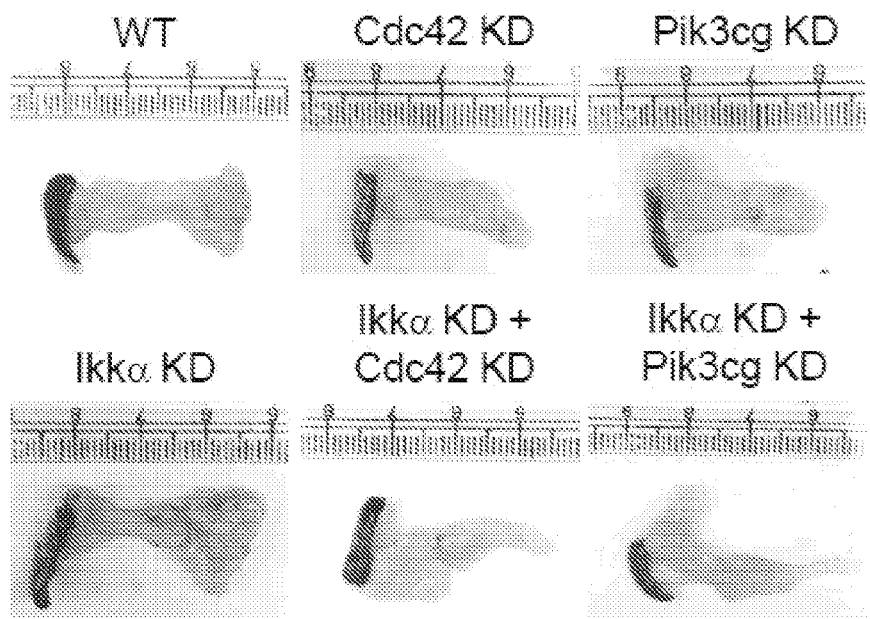
FIG. 12H shows an image illustrating the gross morphology of pancreas isolated from C57BL/6 mice orthotopically transplanted with WT, cdc42 KD, Pik3cg KD, IKKα KD, IKKα and cdc42 KD, and IKKα and Pik3cg KD KC6141 cells.
Figure 12I:
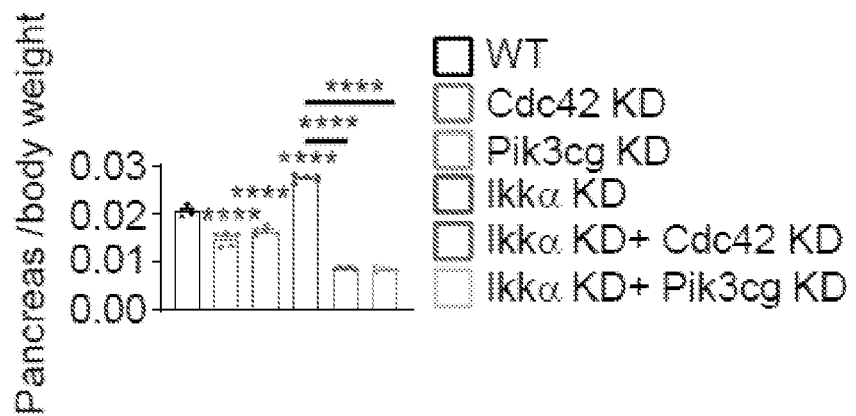
FIG. 12I shows a bar graph quantifying the weight of the pancreas from FIG. 12H. Mean±SEM (n=5 mice).
Figure 12J:
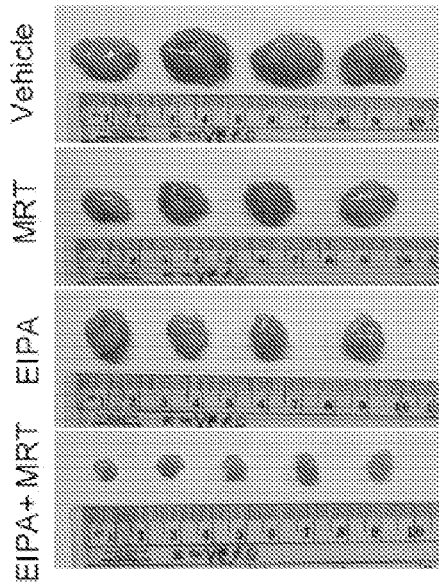
FIG. 12J shows representative images and sizes of dissected KC6141 tumors s.c. grown in C57BL/6 mice treated with vehicle, MRT, EIPA, or MRT and EIPA for 21 days.
Figure 12K:
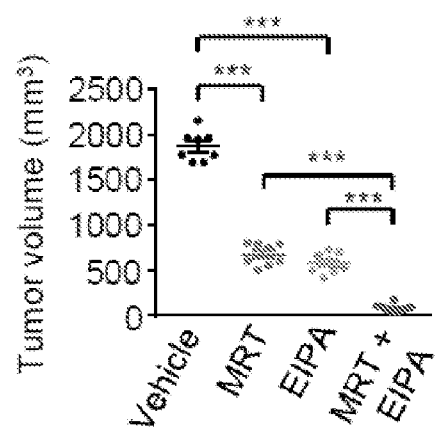
FIG. 12K shows a bar graph quantifying the tumor of sizes of FIG. 12J. Mean±SEM (n=8 mice).
Figure 12L:
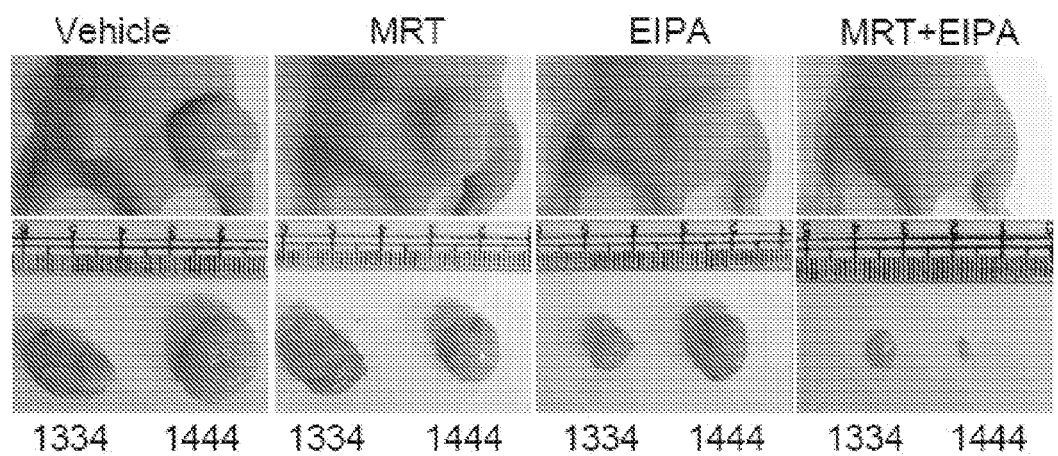
FIG. 12L shows representative images of human PDAC 1334 and 1444 tumors in nude mice treated as in FIG. 12J for 15 days and the sizes of human PDAC 1334 and 1444 tumors s.c. grown in nude mice treated as in FIG. 12J for 15 days.
Figure 12M:
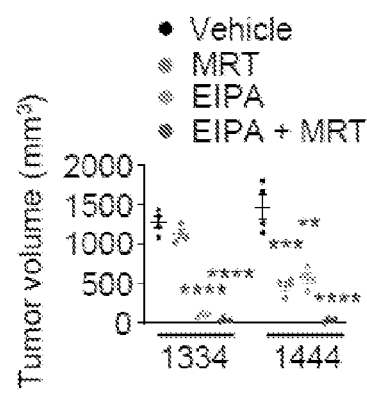
FIG. 12M shows a bar graph quantifying the tumor sizes of FIG. 12L.
Figure 12N:
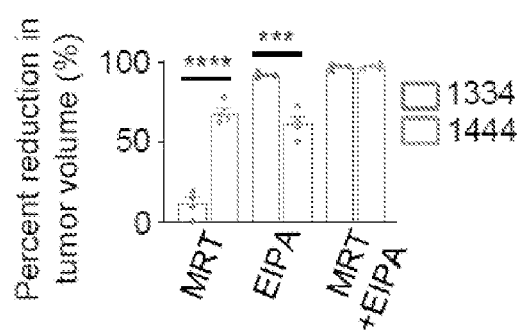
Figure 20I:
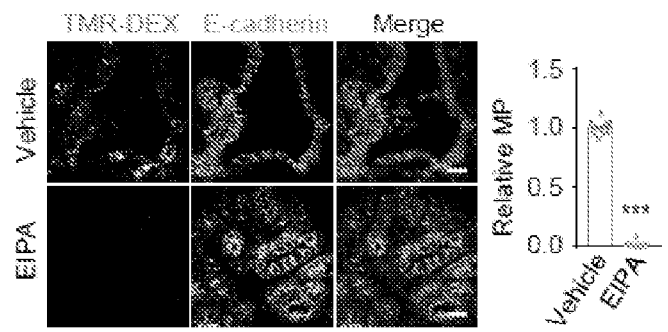
FIG. 20I shows an immunofluorescence staining and quantification illustrating the localization of macropinosomes (TMR-DEX) in TMR-DEX injected pancreata from 8-mo Kras$^{G12D}$;Ikkα$^{Δpan}$ mice treated with vehicle or 10 mg/kg EIPA for 1 month. PDAC and PanIN cells are marked by E-cadherin staining. Scale bar, 20 sm. Mean±SEM (n=10).
Figure 20J:
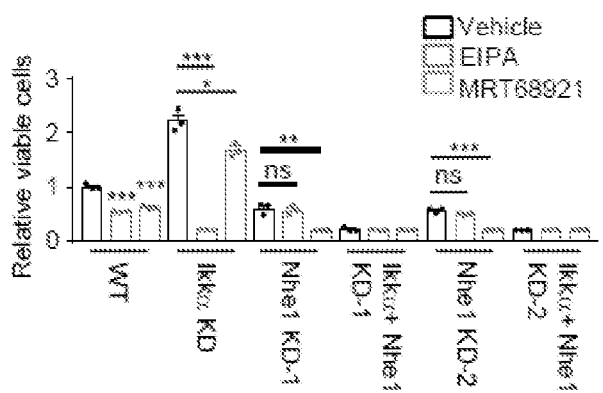
FIG. 20J shows a bar graph illustrating the suppression of cell viability by EIPA and MRT68921 in WT, Ikkα-KD, Nhe1-KD, and Ikkα-KD; Nhe1-KD KC6141 cells when compared to cells treated with vehicle. Total viable cells were measured after 3 days and data are presented relative to the vehicle control values of WT cells. Mean±SEM (n=3 independent experiments).
Figure 20K:
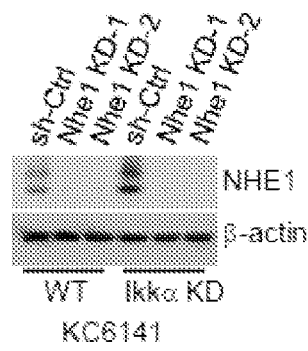
FIG. 20K shows an immunoblot analysis illustrating the expression of NHE1 protein in the WT, Ikkα-KD, Nhe1-KD, and Ikkα-KD; Nhe1-KD KC6141 cells of FIG. 20J.
Figure 20L:
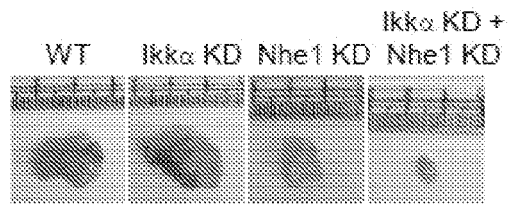
FIG. 20L shows representative images of dissected s.c. tumors generated by WT, IKKα and or NHE1 KD KC6141 cells orthotopically transplanted in C57BL/6 mice. Mean±SEM (n=4).
Figure 20M:
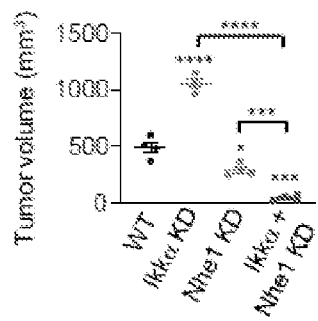
FIG. 20M shows a graph illustrating the sizes and volume of the dissected s.c. tumors of FIG. 20L.
Figure 20N:
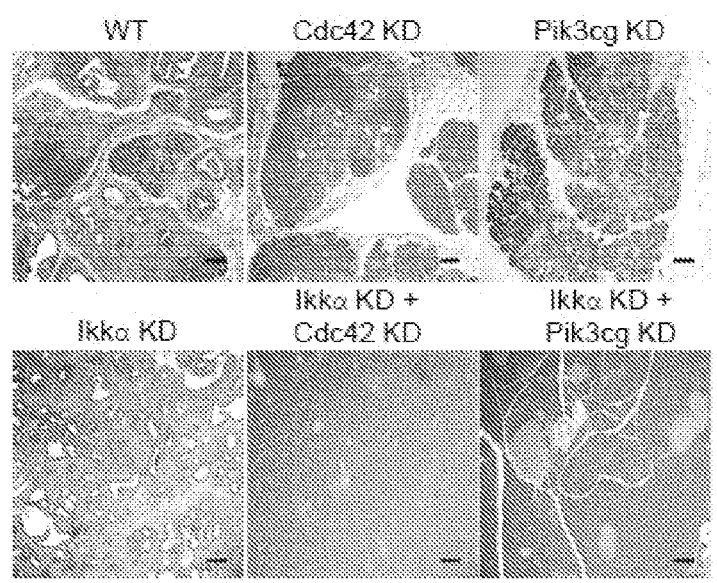

MP requirement for in vivo tumor growth using the autochthonous Ikkα$^{PEC}$/Kras$^{G12D/PEC}$ and different allograft models was evaluated. As shown in FIG. 12One month of EIPA treatment, initiated at 1 month of age, markedly reduced pancreatic weight (a surrogate for tumor burden), inhibited ADM and advanced PanIN formation, and preserved the normal pancreatic parenchyma in Ikkα$^{ΔPEC}$/Kras$^{G12D/PEC}$ mice (FIGS. 12A and 12C), an effect accompanied by decreased MP (FIG. 20I). IHC confirmed that EIPA prevented acinar cell loss, indicated by upregulation of amylase and downregulation of ductal (CK19) and progenitor (SOX9) markers (FIG. 12D). Histological analysis revealed little residual cancer tissue in EIPA-treated mice. Importantly, EIPA treatment substantially extended Ikkα$^{ΔPEC}$/Kras$^{G12D/PEC}$ mouse survival (FIG. 12E). Immunocompromised mice bearing parental and IKKα$^Δ$ MIA PaCa-2 subcutaneous (s.c.) allografts were given EIPA or vehicle for 15 days when tumors were 50-100 mm$^3$ in size. IKKα$^Δ$ tumors were considerably larger than those formed by the parental cells but were more EIPA sensitive (FIGS. 12F-G). IKKα-deficient KC6141 cells, transplanted s.c. or orthotopically, also grew faster and formed larger tumors than the parental cells, but were more sensitive to CDC42, PIK3CG, or NHE1 ablation (FIGS. 12H-12I and 20J-20N). C57BL/6 mice bearing KC6141-derived tumors or Nude mice bearing 1334 and 1444 allografts were treated with vehicle, MRT68921, EIPA, or MRT68921 and EIPA for 3 weeks or 15 days. Whereas MRT68921 or EIPA alone had a small effect on KC6141 or 1444 tumor growth and 1334 tumors were sensitive to EIPA but insensitive to MRT68921, the two agents combined strongly inhibited growth of all tumors (FIGS. 12J-12K and 12L-12N).

TABLE 1

| Key Resources | | |
|---|---|---|
| Reagent or Resource | Source | Identifier |
| Antibodies | | |
| Anti-p62 polyclonal antibody | Progen | Cat# GP62-C; RRID: AB_2687531 |
| Rabbit anti-NRF2 polyclonal antibody | ABclonal | Cat# A11159; RRID: AB_2758436 |
| Rabbit anti-NRF2 monoclonal antibody | Abcam | Cat# ab62352; RRID: AB_944418 |
| Rabbit anti-NRF2 monoclonal antibody | Cell Signaling Technology | Cat# 12721; RRID: AB_2715528 |
| Rabbit anti NQO1 monoclonal antibody | Cell Signaling Technology | Cat# 62262; RRID: AB_2799623 |
| Mouse anti-IKKα monoclonal antibody | Invitrogen | Cat# MA5-16157; RRID: AB_2537676 |
| Rabbit anti-IKKα monoclonal antibody | GeneTex | Cat# GTX62710; RRID: AB_10621122 |
| Mouse anti-actin monoclonal antibody | Sigma | Cat# A4700; RRID: AB_476730 |
| Rabbit anti-GFP polyclonal antibody | Molecular Probes | Cat# A-11122; RRID: AB_221569 |
| Mouse anti-LAMP-1 monoclonal antibody | Santa Cruz | Cat#: sc-20011; RRID: AB_626853 |

TABLE 1-continued

Key Resources

| Reagent or Resource | Source | Identifier |
| --- | --- | --- |
| Rabbit anti-LAMP-1 monoclonal antibody | Abcam | Cat# ab108597 |
| Chicken anti-GFP/YFP/CFP polyclonal antibody | Abcam | Cat# ab13970; RRID: AB_300798 |
| Mouse anti-VAMP-8 monoclonal antibody | Santa Cruz | Cat# sc-166820; RRID: AB_2212959 |
| Mouse anti-Flag monoclonal antibody | Sigma | Cat# F3165; RRID: AB_259529 |
| Rabbit anti-Flag polyclonal antibody | Sigma | Cat# F7425; RRID: AB_439687 |
| Rat anti-HA monoclonal antibody | Roche | Cat# 1867431; RRID: AB_390919 |
| Rabbit anti-STX17 polyclonal antibody | Proteintech | Cat# 17815-1-AP; RRID: AB_2255542 |
| Rabbit anti-STX17 polyclonal antibody | Genetex | Cat# GTX130212 |
| Mouse anti-STX17 monoclonal antibody | CBXS | Cat# CAMAB-S0951-CQ |
| Mouse anti-LC3 monoclonal antibody | Cosmo Bio | Cat# CTB-LC3-2-IC |
| Rabbit anti-LC3B polyclonal antibody | Cell Signaling Technology | Cat# 2775; RRID: AB_915950 |
| Rabbit anti-LC3 polyclonal antibody | CiteAb | Cat# AP1802a; RRID: AB_2137695 |
| Rabbit anti-LC3B polyclonal antibody | NOVUS | Cat# NB100-2220; RRID: AB_10003146 |
| Rabbit anti-E-Cadherin monoclonal antibody | Cell Signaling Technology | Cat# 3195; RRID: AB_2291471 |
| Rabbit anti-CD138 antibody | Thermo Fisher Scientific | Cat# 36-2900; RRID: AB_2533248 |
| Mouse anti-NHE-1 monoclonal antibody | Santa Cruz | Cat# sc-136239; RRID: AB_2191254 |
| Rabbit anti-PI3 Kinase p110α monoclonal antibody | Cell Signaling Technology | Cat# 4249; RRID: AB_2165248 |
| Rabbit anti-PI3 Kinase p110γ monoclonal antibody | Cell Signaling Technology | Cat# 5405; RRID: AB_915950 |
| Rabbit anti-EGFR monoclonal antibody | Cell Signaling Technology | Cat# 4267; RRID: AB_2246311 |
| Rabbit anti-CDC42 polyclonal antibody | Thermo Fisher Scientific | Cat# PA 1-092; RRID: AB_2539858 |
| Mouse anti-SNX5 monoclonal antibody | Santa Cruz | Cat# sc-515215 |
| Mouse anti-Myc monoclonal antibody | Abcam | Cat# Ab-32; RRID: AB_303599 |
| Mouse anti-HSP90 monoclonal antibody | Santa Cruz | Cat# sc-13119; RRID: AB_675659 |
| Rabbit anti-α-Amylase polyclonal antibody | Sigma | Cat# A8273; RRID: AB_258380 |
| Goat anti-cytokeratin 19 polyclonal antibody | Santa Cruz | Cat# sc-33111; RRID: AB_2234419 |
| Rabbit anti-SOX9 Polyclonal antibody | Santa Cruz | Cat# sc-20095; RRID: AB_661282 |
| Mouse anti-cytokeratin 18 monoclonal antibody | GeneTex | Cat# GTX105624; RRID: AB_1950645 |
| Rabbit anti-ERK polyclonal antibody | Cell Signaling Technology | Cat# 9102; RRID: AB_330744 |
| Rabbit anti-pERK polyclonal antibody | Cell Signaling Technology | Cat# 9101S; RRID: AB_331646 |
| Rabbit anti-K-Ras polyclonal antibody | Cell Signaling Technology | Cat# 53270S |
| Mouse anti-K-Ras monoclonal antibody | Santa Cruz | Cat# sc-30; RRID: AB_627865 |
| Rabbit anti-ULK1 monoclonal antibody | Cell Signaling Technology | Cat# 8054; RRID: AB_11178668 |
| Rabbit anti-ULK1 polyclonal antibody | Proteintech | Cat# 20986-1-AP |
| Rabbit anti-pULK1(Ser317) polyclonal antibody | Cell Signaling Technology | Cat# 37762 |
| Rabbit anti-AMPK monoclonal antibody | Cell Signaling Technology | Cat# 5832; RRID: AB_10624867 |
| Rabbit anti-pAMPK monoclonal antibody | Cell Signaling Technology | Cat# 2535; RRID: AB_331250 |
| Rabbit anti-TFE3 monoclonal antibody | Abcam | Cat# ab 179804 |
| Rabbit anti-p53 polyclonal antibody | Cell Signaling Technology | Cat# 9282; RRID: AB_331476 |
| Rabbit anti-p21 monoclonal antibody | Cell Signaling Technology | Cat# 2947; RRID: AB_823586 |

TABLE 1-continued

| Key Resources | | |
|---|---|---|
| Reagent or Resource | Source | Identifier |
| Rabbit anti-ATG7 monoclonal antibody | Cell Signaling Technology | Cat# 8558; RRID: AB_10831194 |
| Rabbit anti-phospho Akt (Ser473) polyclonal antibody | Cell Signaling Technology | Cat# 9271; RRID: AB_329825 |
| Mouse anti-Akt1/2/3 monoclonal antibody | Santa Cruz | Cat# sc-81434; RRID: AB_1118808 |
| Mouse HRP goat anti-chicken IgY antibody | Santa Cruz | Cat# sc-2428; RRID: AB_650514 |
| HRP goat anti-rabbit IgG antibody | Cell Signaling Technology | Cat# 7074; RRID: AB_2099233 |
| HRP horse anti-mouse IgG antibody | Cell Signaling Technology | Cat# 7076; RRID: AB_330924 |
| HRP streptavidin | Pharmingen | Cat# 554066 |
| Biotin goat anti-mouse IgG | Pharmingen | Cat# 553999; RRID: AB_395196 |
| Biotin goat anti-rabbit IgG | Pharmingen | Cat# 550338; RRID: AB_393618 |
| Biotin mouse anti-goat IgG | Santa Cruz | Cat# sc-2489; RRID: AB_628488 |
| Goat anti-Chicken IgY (H + L) Secondary Antibody, Alexa Fluor 488 | Thermo Fisher Scientific | Cat# A-11039; RRID: AB_2534096 |
| Goat anti-Rabbit IgG (H + L) Highly Cross-Adsorbed Secondary Antibody, Alexa Fluor Plus 488 | Thermo Fisher Scientific | Cat# A32731; RRID: AB_2633280 |
| Donkey anti-Mouse IgG (H + L) Highly Cross-Adsorbed Secondary Antibody, Alexa Fluor Plus 594 | Thermo Fisher Scientific | Cat# A32744; RRID: AB_2762826 |
| Goat anti-Mouse IgG (H + L) Highly Cross-Adsorbed Secondary Antibody, Alexa Fluor Plus 488 | Thermo Fisher Scientific | Cat# A32723; RRID: AB_2633275 |
| Goat anti-Rabbit IgG (H + L) Highly Cross-Adsorbed Secondary Antibody, Alexa Fluor Plus 594 | Thermo Fisher Scientific | Cat# A32740; RRID: AB_2762824 |
| Goat anti-Mouse IgG (H + L) Highly Cross-Adsorbed Secondary Antibody, Alexa Fluor 568 | Thermo Fisher Scientific | Cat# A-11031; RRID: AB_144696 |
| Goat anti-Rabbit IgG (H + L) Highly Cross-Adsorbed Secondary Antibody, Alexa Fluor Plus 647 | Thermo Fisher Scientific | Cat# A32733; RRID: AB_2633282 |
| Bacterial and Virus Strains | | |
| Chemically competent One shot Stbl3 | Invitrogen | Cat# C737303 |
| NEB ® Stable Competent E. coli | BioLabs | Cat# C3040I |
| MAX Efficiency ™ DH5α Competent Cells | Thermo Fisher Scientific | Cat# 18258012 |
| Biological Samples | | |
| Human PDAC specimens | The Affiliated Drum Tower Hospital of Nanjing University Medical School | N/A |
| Patient-derived pancreatic cancer xenografts | Moores Cancer Center University of California San Diego | N/A |
| Chemicals, Peptides, and Recombinant Proteins | | |
| Dextran, Tetramethylrhodamine, 70,000 MW, Lysine Fixable | Thermo Fisher Scientific | Cat# D1818 |
| Trametinib | MCE | Cat# HY-10999 |
| 5-(N-Ethyl-N-isopropyl)amiloride (EIPA) | Sigma | Cat# A3085 |
| MRT68921 dihydrochloride | MCE | Cat# HY-100006A |
| ML385 | MCE | Cat# HY-100523 |
| Hydroxychloroquine | Sigma | Cat# H0915 |
| DQ ™ Green BSA | Thermo Fisher Scientific | Cat# D12050 |
| Polybrene | Santa Cruz | Cat# sc-134220 |
| Puromycin (solution) | InvivoGen | Cat# ant-pr-1 |
| Lipofectamine 3000 Transfection Reagent | Thermo Fisher Scientific | Cat# L3000015 |
| Blasticidin S HCl solution | Santa Cruz | Cat# 3513-03-9 |

TABLE 1-continued

| Reagent or Resource | Source | Identifier |
|---|---|---|
| Key Resources | | |
| Critical Commercial Assays | | |
| Quick Change II XL Site-Directed Mutagenesis Kit | Agilent Technologies | Cat# 200521 |
| Super Script VILO cDNA Synthesis Kit Scientific | Thermo Fisher Scientific | Cat# 11754050 |
| Dual Glo Luciferase Assay System | Promega | Cat# E2920 |
| Duolink ™ In Situ Red Starter Kit Mouse/Rabbit | Sigma | Cat# DUO92101 |
| Cell Counting Kit-8 (CCK-8) | Glpbio | GK10001 |
| Experimental Models: Cell Lines | | |
| Human: MIA PaCa-2 | ATCC | Cat# CRL-1420; RRID: CVCL_0428 |
| Human: PANC-1 | ATCC | Cat# CRL-1469; RRID: CVCL_0480 |
| Human: COLO 357/FG | Andrew Lowy (Morgan et al., 1980) | RRID: CVCL8196 |
| Human: BxPC-3 | ATCC | Cat# CRL-1687; RRID: CVCL_0186 |
| Human: AsPC-1 | ATCC | Cat# CRL-1682; RRID: CVCL_0152 |
| Human: 1356E | Andrew Lowy This disclosure | N/A |
| Human: 1444 | Andrew Lowy This disclosure | N/A |
| Human: 1305 | Andrew Lowy This disclosure | N/A |
| Human: 1334 | Andrew Lowy (Strnadel et al., 2017) | N/A |
| Mouse: UN-KC-6141 | Surinder K. Batra | RRID: CVCL_1U11 |
| Human: H1299 | ATCC | Cat# CRL-5803; RRID: CVCL_0060 |
| Human: H358 | ATCC | Cat# CRL-5807; RRID: CVCL_1559 |
| Human: A549 | ATCC | Cat# CCL-185; RRID: CVCL_0023 |
| Human: H838 | ATCC | Cat# CRL-5844; RRID: CVCL_1594 |
| Human: H1435 | ATCC | Cat# CRL-5870 RRID: CVCL_1470 |
| Human: GFP-LC3 stable-MIA-PaCa-2 | This Disclosure | N/A |
| Human: GFP-LC3 stable-IKKα KD MIA-PaCa-2 | This Disclosure | N/A |
| Human: GFP-LC3 stable-IKKα$^\Delta$ MIA-PaCa-2 | This Disclosure | N/A |
| Experimental Models: Organisms/Strains | | |
| Mouse: C57BL/6 | The Jackson Laboratory | Strain: 000664 |
| Mouse: Crl:NU-Foxn1$^{nu}$ | Charles River Laboratories | Strain: 088 |
| Mouse: B6.FVB-Tg(Pdx1-cre)6Tuv/J | The Jackson Laboratory | Strain: 014647 |
| Mouse: B6.129S4-Kras$^{tm4Tyj}$/J | The Jackson Laboratory | Strain: 008179 |
| Mouse: B6.129X1-Nfe2l2$^{tm1Ywk}$/J | The Jackson Laboratory | Strain: 017009 |
| Mouse: IKKα$^{flox/flox}$ | Boehringer Ingelheim (Liu et al., 2008) | N/A |
| Mouse: p62$^{flox/flox}$ | Jorge Moscat (Müller et al., 2013) | N/A |
| Oligonucleotides | | |
| gRNA target DNA sequence of human IKKα/CHUK ACGTCTGTCTGTACCAGCAT (SEQ ID NO: 1) | This disclosure | N/A |
| gRNA target DNA sequence of mouse p62/SQSTM1: CAATGTGATCTGCGATGGCT (SEQ ID NO: 2) | This disclosure | N/A |
| shRNA target DNA sequence of mouse Ikkα/Chuk: GCAGCAATGTTAAGTCTTCTT (SEQ ID NO: 3) | This disclosure | N/A |

TABLE 1-continued

| Key Resources | | |
|---|---|---|
| Reagent or Resource | Source | Identifier |
| Human STX17 siRNA | Santa Cruz | Cat# sc-92492 |
| Primers for analysis of gene-expression changes, see Experimental Model And Subject Details | This disclosure | N/A |
| Primers for ChIP assay, see Experimental Model And Subject Details | This disclosure | N/A |
| Recombinant DNA | | |
| pCDH-CMV-MCS-EF1-Puro-IKKα-Flag | This disclosure | N/A |
| pCDH-CMV-MCS-EF1-Puro-IKKα F26A-Flag | This disclosure | N/A |
| pCDH-CMV-MCS-EF1-Puro-IKKα F212A-Flag | This disclosure | N/A |
| pCDH-CMV-MCS-EF1-Puro-IKKα W275A-Flag | This disclosure | N/A |
| pCDH-CMV-MCS-EF1-Puro-IKKα Y441A-Flag | This disclosure | N/A |
| pCDH-CMV-MCS-EF1-Puro-IKKα Y568A-Flag | This disclosure | N/A |
| pCDH-CMV-MCS-EF1-Puro-IKKα F605A-Flag | This disclosure | N/A |
| pCDH-CMV-MCS-EF1 -Puro-IKKα W651A-Flag | This disclosure | N/A |
| pCDH-CMV-MCS-EF1-Puro-IKKα W740A-Flag | This disclosure | N/A |
| pCDH-CMV-MCS-EF1-Puro-NRF2 E79Q-Myc | This disclosure | N/A |
| pCDH-CMV-MCS-EF1-Puro-NRF2-Myc | This disclosure | N/A |
| pCDH-CMV-MCS-EF1-Puro-NRF2-Flag | This disclosure | N/A |
| pGL3-NHE1 | This disclosure | N/A |
| pGL3-SDC1 | This disclosure | N/A |
| pGL3-PIK3CG | This disclosure | N/A |
| pGL3-EGF | This disclosure | N/A |
| pGL3-CDC42 | This disclosure | N/A |
| pGL3-NHE1 ARE$^\Delta$ | This disclosure | N/A |
| pGL3-SDC1 ARE$^\Delta$ | This disclosure | N/A |
| pGL3-PIK3CG ARE$^\Delta$ | This disclosure | N/A |
| PGL3-EGF ARE$^\Delta$ | This disclosure | N/A |
| pGL3-CDC42 ARE$^\Delta$ | This disclosure | N/A |
| lentiCRISPR v2-Blast-IKKα | This disclosure | N/A |
| lentiCRISPR v2-Puro-IKKα | This disclosure | N/A |
| lentiCRISPR v2-Puro-p62 | This disclosure | N/A |
| LentiCRISPR v2-Blast-ATG7 | Sina Ghaemmaghami (Zhang et al., 2016) | N/A |
| pLKO.1-blast-Ikkα | This disclosure | N/A |
| pLKO.1-puro-NRF2 | Sigma | Cat# TRCN0000007558 |
| pLKO.1-puro-KRAS | Sigma | Cat# TRCN0000033260 |
| pLKO.1-puro-NHE1-1 | Sigma | Cat# TRCN0000044649 |
| pLKO.1-puro-NHE1-2 | Sigma | Cat# TRCN0000044648 |
| pLKO.1-puro-SDC1-1 | Sigma | Cat# TRCN0000072579 |
| pLKO.1-puro-SDC1-2 | Sigma | Cat# TRCN0000072580 |
| pLKO.1-puro-CDC42-1 | Sigma | Cat# TRCN0000047629 |
| pLKO.1-puro-CDC42-2 | Sigma | Cat# TRCN0000047632 |
| pLKO.1-puro-Nhe1-1 | Sigma | Cat# TRCN0000313884 |
| pLKO.1-puro-Nhe1-2 | Sigma | Cat# TRCN0000317401 |
| pLKO.1-puro-Nrf2 | Sigma | Cat# TRCN0000054658 |
| pLKO.1-puro-p62 | Sigma | Cat# TRCN0000098619 |
| pLKO.1-puro-Cdc42 | Sigma | Cat# TRCN0000071686 |
| pLKO.1-puro-Pik3cg | Sigma | Cat# TRCN0000024570 |
| pHAGE-GFP-LC3 | J. Wade Harper (An and Harper, 2018) | N/A |
| CFP-SNAP29 | Vladimir Lupashin (Kudlyk et al., 2013) | N/A |
| Flag-STX17 | Juan S. Bonifacino (Jia et al., 2017) | N/A |

TABLE 1-continued

Key Resources

| Reagent or Resource | Source | Identifier |
| --- | --- | --- |
| Software and Algorithms | | |
| ImageJ | Open Source/National Institutes of Health | imagej.nih.gov/ij/ |
| GraphPad Prism 8.0 software | GraphPad Software, Inc. | graphpad.com/ scientificsoftware/prism/ |

EQUIVALENTS

The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds compositions or biological systems, which can, of course, vary. It is also to be understood that the terminology used herein is for the purpose of describing particular embodiments only, and is not intended to be limiting.

The inventions illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the disclosure claimed.

Thus, it should be understood that the materials, methods, and examples provided here are representative of preferred embodiments, are exemplary, and are not intended as limitations on the scope of the invention. The disclosure has been described broadly and generically herein. Each of the narrower species and sub-generic groupings falling within the generic disclosure also form part of the invention. This includes the generic description of the disclosure with a proviso or negative limitation removing any subject matter from the genus, regardless of whether or not the excised material is specifically recited herein.

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Unless otherwise defined, all technical and scientific terms used herein have the same meaning as commonly understood by one of ordinary skill in the art to which this disclosure belongs.

All patents, patent applications, provisional applications, and publications referred to or cited herein are incorporated by reference in their entirety, including all figures and tables, to the extent they are not inconsistent with the explicit teachings of this specification. In case of conflict, the present specification, including definitions, will control.

REFERENCES

The following references are incorporated herein by reference in their entireties.
1. Levine, B. & Kroemer, G. Biological Functions of Autophagy Genes: A Disease Perspective. Cell 176, 11-42 (2019).
2. Onodera, J. & Ohsumi, Y. Autophagy is required for maintenance of amino acid levels and protein synthesis under nitrogen starvation. J. Biol. Chem. 280, 31582-31586 (2005).
3. Levy, J. M. M., Towers, C. G. & Thorburn, A. Targeting autophagy in cancer. Nat. Rev. Cancer 17, 528-542 (2017).
4. Liang, X. H. et al. Induction of autophagy and inhibition of tumorigenesis by beclin 1. Nature 402, 672-676 (1999).
5. Kisen, G. O. et al. Reduced autophagic activity in primary rat hepatocellular carcinoma and ascites hepatoma cells. Carcinogenesis 14, 2501-2505 (1993).
6. Umemura, A. et al. p62, Upregulated during Preneoplasia, Induces Hepatocellular Carcinogenesis by Maintaining Survival of Stressed HCC-Initiating Cells. Cancer Cell 29, 935-948 (2016).
7. Ying, H. et al. Genetics and biology of pancreatic ductal adenocarcinoma. Genes Dev. 30, 355-385 (2016).
8. Perera, R. M. et al. Transcriptional control of autophagy-lysosome function drives pancreatic cancer metabolism. Nature 524, 361-365 (2015).
9. Bryant, K. L. & Der, C. J. Blocking autophagy to starve pancreatic cancer. Nat. Rev. Mol. Cell Biol. 20, 265 (2019).

10. Kimmelman, A. C. & White, E. Autophagy and Tumor Metabolism. Cell Metab. 25, 1037-1043 (2017).
11. Lowenfels, A. B. & Maisonneuve, P. Epidemiology and risk factors for pancreatic cancer. Best Pract. Res. Clin. Gastroenterol. 20, 197-209 (2006).
12. Kolodecik, T., Shugrue, C., Ashat, M. & Thrower, E. C. Risk factors for pancreatic cancer: underlying mechanisms and potential targets. Front. Physiol. 4, 415 (2013).
13. Gukovsky, I., Li, N., Todoric, J., Gukovskaya, A. & Karin, M. Inflammation, autophagy, and obesity: common features in the pathogenesis of pancreatitis and pancreatic cancer. Gastroenterology 144, 1199-1209.e4 (2013).
14. Guerra, C. et al. Pancreatitis-induced inflammation contributes to pancreatic cancer by inhibiting oncogene-induced senescence. Cancer Cell 19, 728-739 (2011).
15. Rosenfeldt, M. T. et al. p53 status determines the role of autophagy in pancreatic tumour development. Nature 504, 296-300 (2013).
16. Todoric, J. et al. Stress-Activated NRF2-MDM2 Cascade Controls Neoplastic Progression in Pancreas. Cancer Cell 32, 824-839.e8 (2017).
17. Yang, A. et al. Autophagy is critical for pancreatic tumor growth and progression in tumors with p53 alterations. Cancer Discov. 4, 905-913 (2014).
18. Li, N. et al. Loss of acinar cell IKKα triggers spontaneous pancreatitis in mice. J. Clin. Invest. 123, 2231-2243 (2013).
19. Commisso, C. et al. Macropinocytosis of protein is an amino acid supply route in Ras-transformed cells. Nature 497, 633-637 (2013).
20. Itakura, E., Kishi-Itakura, C. & Mizushima, N. The hairpin-type tail-anchored SNARE syntaxin 17 targets to autophagosomes for fusion with endosomes/lysosomes. Cell 151, 1256-1269 (2012).
21. Alemu, E. A. et al. ATG8 family proteins act as scaffolds for assembly of the ULK complex: sequence requirements for LC3-interacting region (LIR) motifs. J. Biol. Chem. 287, 39275-39290 (2012).
22. Jacomin, A.-C., Samavedam, S., Promponas, V. & Nezis, I. P. iLIR database: A web resource for LIR motif-containing proteins in eukaryotes. Autophagy 12, 1945-1953 (2016).
23. Kumar, S. et al. Mechanism of Stx17 recruitment to autophagosomes via IRGM and mammalian Atg8 proteins. J. Cell Biol. 217, 997-1013 (2018).
24. Recouvreux, M. V. & Commisso, C. Macropinocytosis: A Metabolic Adaptation to Nutrient Stress in Cancer. Front. Endocrinol. 8, 261 (2017).
25. Commisso, C., Flinn, R. J. & Bar-Sagi, D. Determining the macropinocytic index of cells through a quantitative image-based assay. Nat. Protoc. 9, 182-192 (2014).
26. Yao, W. et al. Syndecan 1 is a critical mediator of macropinocytosis in pancreatic cancer. Nature 568, 410-414 (2019).
27. Paradiso, A. et al. The Na+-H+ exchanger-1 induces cytoskeletal changes involving reciprocal RhoA and RacI signaling, resulting in motility and invasion in MDA-MB-435 cells. Breast Cancer Res. BCR 6, R616-628 (2004).
28. Fujii, M., Kawai, K., Egami, Y. & Araki, N. Dissecting the roles ofRacl activation and deactivation in macropinocytosis using microscopic photo-manipulation. Sci. Rep. 3, 2385 (2013).
29. Ohlund, D. et al. Type IV collagen is a tumour stroma-derived biomarker for pancreas cancer. Br. J. Cancer 101, 91-97 (2009).
30. Wu, M. C., Arimura, G. K. & Yunis, A. A. Mechanism of sensitivity of cultured pancreatic carcinoma to asparaginase. Int. J. Cancer 22, 728-733 (1978).
31. Nakase, I., Kobayashi, N. B., Takatani-Nakase, T. & Yoshida, T. Active macropinocytosis induction by stimulation of epidermal growth factor receptor and oncogenic Ras expression potentiates cellular uptake efficacy of exosomes. Sci. Rep. 5, 10300 (2015).
32. Katsuragi, Y., Ichimura, Y. & Komatsu, M. Regulation of the Keapl-Nrf2 pathway by p62/SQSTM1. Curr. Opin. Toxicol. 1, 54-61 (2016).
33. Moscat, J., Karin, M. & Diaz-Meco, M. T. p62 in Cancer: Signaling Adaptor Beyond Autophagy. Cell 167, 606-609 (2016).
34. Todoric, J. & Karin, M. The Fire within: Cell-Autonomous Mechanisms in Inflammation-Driven Cancer. Cancer Cell 35, 714-720 (2019).
35. Chude, C. I. & Amaravadi, R. K. Targeting Autophagy in Cancer: Update on Clinical Trials and Novel Inhibitors. Int. J. Mol. Sci. 18, (2017).
36. Kinsey, C. G. et al. Protective autophagy elicited by RAF-MEK-ERK inhibition suggests a treatment strategy for RAS-driven cancers. Nat. Med. 25, 620-627 (2019).
37. Bryant, K. L. et al. Combination of ERK and autophagy inhibition as a treatment approach for pancreatic cancer. Nat. Med. 25, 628-640 (2019).
38. Petherick, K. J. et al. Pharmacological inhibition ofULK1 kinase blocks mammalian target of rapamycin (mTOR)-dependent autophagy. J. Biol. Chem. 290, 11376-11383 (2015).
39. Robinson, E. et al. Virtual screening for novel Atg5-Atg16 complex inhibitors for autophagy modulation. MedChemComm 6, 239-246 (2015).
40. Haworth, R. S., Cragoe, E. J. & Fliegel, L. Amiloride and 5-(N-ethyl-N-isopropyl) amiloride inhibit medium acidification and glucose metabolism by the fission yeast *Schizosaccharomyces pombe*. Biochim. Biophys. Acta 1145, 266-272 (1993).
41. Chan, K., Lu, R., Chang, J. C. & Kan, Y. W. NRF2, a member of the NFE2 family of transcription factors, is not essential for murine erythropoiesis, growth, and development. Proc. Natl. Acad. Sci. 93, 13943-13948 (1996).
42. Liu, B. et al. IKKalpha is required to maintain skin homeostasis and prevent skin cancer. Cancer Cell 14, 212-225 (2008).
43. Müller, T. D. et al. p62 links β-adrenergic input to mitochondrial function and thermogenesis. J. Clin. Invest. 123, 469-478 (2013).
44. Su, H. et al. VPS34 Acetylation Controls Its Lipid Kinase Activity and the Initiation of Canonical and Non-canonical Autophagy. Mol. Cell 67, 907-921.e7 (2017).
45. Lee, S.-W., Alas, B. & Commisso, C. Detection and Quantification of Macropinosomes in Pancreatic Tumors. Methods Mol. Biol. Clifton NJ 1882, 171-181 (2019).

What is claimed is:

1. A method of inducing cell death of a cancer cell, the method comprising, contacting the cancer cell with:
   (1) an inhibitor of macropinocytosis upregulation, wherein the inhibitor of macropinocytosis upregulation is an inhibitor of:
      (a) NRF2 activity or expression selected from ML385 or Brusatol; or
      (b) p62 activity or expression is selected from LP1-106 or XRK3F2;
   and
   (2) an autophagy inhibitor, wherein the autophagy inhibitor is selected from 3-Methyladenine (3-MA), LY294002, Bafilomycin A1 (Baf A1), Chloroquine (CQ), hydroxychloroquine (HCQ), ABT-737, an IKKα downregulator, obatoclax, Clarithromycin, Resveratrol, Quinacrine, 4-Acetylantroquinonol B, antroquinonol, Epigallocatechin gallate (EGCG), MRT68921 dihydrochloride, ULK1 inhibitors, MRT67307, SBI-0206965, ULK-100, ULK-101, DCC-3116, SAR405, Vps34-IN1 (PIK-III), SU1261, Vps34 inhibitors, or a combination thereof, thereby inducing cell death of the cancer cell.

2. The method of claim 1, wherein the cancer cell is breast cancer, triple negative breast cancer, non-small-cell lung cancer, pancreatic cancer, leukemia, melanoma, colorectal cancer, bladder cancer, lung cancer, or pancreatic ductal adenocarcinoma (PDAC) cell.

3. The method of claim 1, wherein the autophagy inhibitor is an inhibitor of ULK1, MRT68921 dihydrochloride, ULK-100, ULK-101, DCC-3116, or SBI-0206965.

4. The method of claim 1, wherein contacting the cancer cell with the inhibitor of macropinocytosis upregulation and the autophagy inhibitor is sequential or concurrent.

* * * * *

SEQUENCE LISTING

<160> NUMBER OF SEQ ID NOS: 157

<210> SEQ ID NO 1

```
<211> LENGTH: 20
<212> TYPE: DNA
<213> ORGANISM: Homo sapiens

<400> SEQUENCE: 1
acgtctgtct gtaccagcat                                                    20

<210> SEQ ID NO 2
<211> LENGTH: 20
<212> TYPE: DNA
<213> ORGANISM: Mus sp.

<400> SEQUENCE: 2
caatgtgatc tgcgatggct                                                    20

<210> SEQ ID NO 3
<211> LENGTH: 21
<212> TYPE: DNA
<213> ORGANISM: Mus sp.

<400> SEQUENCE: 3
gcagcaatgt taagtcttct t                                                  21

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
ggactgtgtg ggtctcatcg                                                    20

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
tctcgccctt gttcttgtcc                                                    20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
ctctggacct gtgccttctg                                                    20

<210> SEQ ID NO 7
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
atctttgaat gcccccgtgt                                                    20
```

<210> SEQ ID NO 8
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
ctacccgcag acagacgtg                                                19

<210> SEQ ID NO 9
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
agatcaagct tcgtccccac                                               20

<210> SEQ ID NO 10
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
gagactgctg aaaagctggc g                                             21

<210> SEQ ID NO 11
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 11
ggctcttctt cggttctgga gg                                            22

<210> SEQ ID NO 12
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 12
cttccgggac tttctgcaat g                                             21

<210> SEQ ID NO 13
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 13
gtcaggctag agaggggctt                                               20

<210> SEQ ID NO 14
<211> LENGTH: 25
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 14
tcatgaagat aggtttccat gtgat                                           25

<210> SEQ ID NO 15
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 15
cgtctgattg caggaagggg                                                 20

<210> SEQ ID NO 16
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 16
cgtggagacg gtgacttaca                                                 20

<210> SEQ ID NO 17
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 17
ggtgtagtaa tgccgccaga                                                 20

<210> SEQ ID NO 18
<211> LENGTH: 18
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 18
tctggctctg gctctgcg                                                   18

<210> SEQ ID NO 19
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 19
gccgtgacaa agtatctggc                                                 20

```
<210> SEQ ID NO 20
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 20
actgacagag ctcctccgat                                             20

<210> SEQ ID NO 21
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 21
ttaaccgggc cttgtccaaa                                             20

<210> SEQ ID NO 22
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 22
acagctggtc aagaacggta                                             20

<210> SEQ ID NO 23
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 23
gctctcgcaa aggattcctc a                                           21

<210> SEQ ID NO 24
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 24
ggagcggact ttctgaccaa                                             20

<210> SEQ ID NO 25
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 25
gccacaccaa gagactggaa                                             20

<210> SEQ ID NO 26
```

```
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 26
gcttcaacat cctgtgcgtg                                               20

<210> SEQ ID NO 27
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 27
gtttcaaccc cacgttgctc                                               20

<210> SEQ ID NO 28
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 28
acctctcccg gtcagagatg                                               20

<210> SEQ ID NO 29
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 29
cttgtgcctt ggcagacttt c                                             21

<210> SEQ ID NO 30
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 30
ttctcacaag gaaagagcat ctc                                           23

<210> SEQ ID NO 31
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 31
gtcctgtccc gttaaggaaa ac                                            22

<210> SEQ ID NO 32
<211> LENGTH: 20
```

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 32
ctcctagcac agcacagcag                                                   20

<210> SEQ ID NO 33
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 33
gcttcagctc atggtggaat                                                   20

<210> SEQ ID NO 34
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 34
acagcgagga tgacaaggac                                                   20

<210> SEQ ID NO 35
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 35
gatgccaata gctgcgagga                                                   20

<210> SEQ ID NO 36
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 36
ctcttgcaaa tgcctccctg                                                   20

<210> SEQ ID NO 37
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 37
caagaagaca gacggacgac a                                                 21

<210> SEQ ID NO 38
<211> LENGTH: 20
<212> TYPE: DNA
```

<213> ORGANISM: Artificial Sequence
<220> FEATURE:
<223> OTHER INFORMATION: Description of Artificial Sequence: Synthetic
      oligonucleotide

<400> SEQUENCE: 38
cagtgtcaag gtggccaaag                                            20

<210> SEQ ID NO 39
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 39
cacctcacat ctgtctcctc                                            20

<210> SEQ ID NO 40
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 40
ctgctacctg cgtctggtc                                             19

<210> SEQ ID NO 41
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 41
gagtgtgctc gggtcatgtt                                            20

<210> SEQ ID NO 42
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 42
agcccctgcc ctttgtacac a                                          21

<210> SEQ ID NO 43
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 43
cgatccgagg gcctcacta                                             19

<210> SEQ ID NO 44
<211> LENGTH: 20
<212> TYPE: DNA
<213> ORGANISM: Artificial Sequence

```
<220> FEATURE:
<223> OTHER INFORMATION: Description of Artificial Sequence: Synthetic
      oligonucleotide

<400> SEQUENCE: 44
ggtttggcct gcttttggag                                                    20

<210> SEQ ID NO 45
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 45
ccattgcctc gacttgccta                                                    20

<210> SEQ ID NO 46
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 46
aggaggtgct gtggaatgtg                                                    20

<210> SEQ ID NO 47
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 47
ttggactcag aactggggga                                                    20

<210> SEQ ID NO 48
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 48
aaaaccggtg aatctgggct                                                    20

<210> SEQ ID NO 49
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 49
aagaacacat ctgtttgcgg a                                                  21

<210> SEQ ID NO 50
<211> LENGTH: 20
<212> TYPE: DNA
<213> ORGANISM: Artificial Sequence
<220> FEATURE:
```

```
<223> OTHER INFORMATION: Description of Artificial Sequence: Synthetic
      oligonucleotide

<400> SEQUENCE: 50
acgaccgctg agttatccac                                                    20

<210> SEQ ID NO 51
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 51
tctcaggcac ccacttttct                                                    20

<210> SEQ ID NO 52
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 52
gtcacagggg agtttacggg                                                    20

<210> SEQ ID NO 53
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 53
gcctgcgggt ttttcttctg                                                    20

<210> SEQ ID NO 54
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 54
ttcccttcct tactcgtggt g                                                  21

<210> SEQ ID NO 55
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 55
aatcgagcgt tctcgtggt                                                     19

<210> SEQ ID NO 56
<211> LENGTH: 20
<212> TYPE: DNA
<213> ORGANISM: Artificial Sequence
<220> FEATURE:
<223> OTHER INFORMATION: Description of Artificial Sequence: Synthetic
``` oligonucleotide

<400> SEQUENCE: 56
caacgtggag acggtgactt                                              20

<210> SEQ ID NO 57
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 57
tcccagtgta gtaatgccgc                                              20

<210> SEQ ID NO 58
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 58
caaccttggg cctctctcag                                              20

<210> SEQ ID NO 59
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 59
gtccaccctc cctctcatct                                              20

<210> SEQ ID NO 60
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 60
caggaaagag gtgctgggag                                              20

<210> SEQ ID NO 61
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 61
gctgccttcg tccttcttct                                              20

<210> SEQ ID NO 62
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 62
actgggagaa ggtgaagggt                                                      20

<210> SEQ ID NO 63
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 63
acagggtgag aagaaagccg                                                      20

<210> SEQ ID NO 64
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 64
tacttctggg agagtccgct                                                      20

<210> SEQ ID NO 65
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 65
tttgggttag aaaagcagcc c                                                    21

<210> SEQ ID NO 66
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 66
ggttccagtc tctcggtgtg                                                      20

<210> SEQ ID NO 67
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 67
gaatgtgttg ggggcagtca                                                      20

<210> SEQ ID NO 68
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

```
<400> SEQUENCE: 68
agcccttaga tgtggcgttt                                                 20

<210> SEQ ID NO 69
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 69 tcctttctt cagccgctcc                                                  20

<210> SEQ ID NO 70
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 70
ggctttgggg accagatcaa                                                 20

<210> SEQ ID NO 71
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 71
tcgggagtca tggtaggtgt                                                 20

<210> SEQ ID NO 72
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 72
cgcagttggg cacttttgaa                                                 20

<210> SEQ ID NO 73
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 73
ggacataacc agccacctcc                                                 20

<210> SEQ ID NO 74
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 74
```
gagatgtgag gagtcgcagg					20

<210> SEQ ID NO 75
<211> LENGTH: 20
<212> TYPE: DNA
<213> ORGANISM: Artificial Sequence
<220> FEATURE:
<223> OTHER INFORMATION: Description of Artificial Sequence: Synthetic
    oligonucleotide

<400> SEQUENCE: 75
ggttgcattg acccatctgc					20

<210> SEQ ID NO 76
<211> LENGTH: 21
<212> TYPE: DNA
<213> ORGANISM: Artificial Sequence
<220> FEATURE:
<223> OTHER INFORMATION: Description of Artificial Sequence: Synthetic
    oligonucleotide

<400> SEQUENCE: 76
cccagcaagc tgacaacata g					21

<210> SEQ ID NO 77
<211> LENGTH: 25
<212> TYPE: DNA
<213> ORGANISM: Artificial Sequence
<220> FEATURE:
<223> OTHER INFORMATION: Description of Artificial Sequence: Synthetic
    oligonucleotide

<400> SEQUENCE: 77
ttcaatttta gacacctttc tccag				25

<210> SEQ ID NO 78
<211> LENGTH: 20
<212> TYPE: DNA
<213> ORGANISM: Artificial Sequence
<220> FEATURE:
<223> OTHER INFORMATION: Description of Artificial Sequence: Synthetic
    oligonucleotide

<400> SEQUENCE: 78
tcgctcttga tactcggctc					20

<210> SEQ ID NO 79
<211> LENGTH: 20
<212> TYPE: DNA
<213> ORGANISM: Artificial Sequence
<220> FEATURE:
<223> OTHER INFORMATION: Description of Artificial Sequence: Synthetic
    oligonucleotide

<400> SEQUENCE: 79
aatggttcac gcttcccaga					20

<210> SEQ ID NO 80
<211> LENGTH: 20
<212> TYPE: DNA
<213> ORGANISM: Artificial Sequence
<220> FEATURE:
<223> OTHER INFORMATION: Description of Artificial Sequence: Synthetic
    oligonucleotide

<400> SEQUENCE: 80
ggtggtgctg aagctctttc                                          20

<210> SEQ ID NO 81
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 81
agctggtccg tggatacagt                                          20

<210> SEQ ID NO 82
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 82
acgtgtggct caagtgtcaa                                          20

<210> SEQ ID NO 83
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 83
agtgttcaca tcggacacca                                          20

<210> SEQ ID NO 84
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 84
ccttgccctg ggtctagtg                                           19

<210> SEQ ID NO 85
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 85
ccacagagga ggccattagt                                          20

<210> SEQ ID NO 86
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 86
cctgttcgct ctgggtattg t                                        21

<210> SEQ ID NO 87
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 87
gtgggaatct gggcagtcat                                               20

<210> SEQ ID NO 88
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 88
tgtggagaat ctgctgcctg                                               20

<210> SEQ ID NO 89
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 89
cctcccagtc cttcagcttg                                               20

<210> SEQ ID NO 90
<211> LENGTH: 17
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 90
tggccctcaa aggcgag                                                  17

<210> SEQ ID NO 91
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 91
gagcaggtca gaacgaaggt                                               20

<210> SEQ ID NO 92
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 92
cactaagcat gtgcccgaga                                               20

<210> SEQ ID NO 93
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 93
agatcaggaa gttggcggac                                              20

<210> SEQ ID NO 94
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 94
tcctgtctct ctgctgctac                                              20

<210> SEQ ID NO 95
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 95
atcaaaggag cggatcgagt                                              20

<210> SEQ ID NO 96
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 96
gactcaggcg gaatccaacc                                              20

<210> SEQ ID NO 97
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 97
atgaggaaac cttgggctgt                                              20

<210> SEQ ID NO 98
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 98
gcaccggctc atctttgtct                                              20

```
<210> SEQ ID NO 99
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 99
gattgctctc atctcgcctg                                                   20

<210> SEQ ID NO 100
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 100
gctgcccccg acttcagcag                                                   20

<210> SEQ ID NO 101
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 101
actattgccc tgttcctcat ttgcctca                                          28

<210> SEQ ID NO 102
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 102
ctggagtgca gtggtgtgat c                                                 21

<210> SEQ ID NO 103
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 103
aggcaggaga attgctggaa c                                                 21

<210> SEQ ID NO 104
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 104
ggacacggac aggattgaca g                                                 21

<210> SEQ ID NO 105
```

```
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 105
caactaagaa cggccatgca c                                              21

<210> SEQ ID NO 106
<211> LENGTH: 26
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 106
ttggccagat ctttagacca gacaac                                         26

<210> SEQ ID NO 107
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 107
ccgtaccaca tccaggacag aatc                                           24

<210> SEQ ID NO 108
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 108
tcacccacac tgtgcccatc tac                                            23

<210> SEQ ID NO 109
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 109
ggaaccgctc attgccaatg                                                20

<210> SEQ ID NO 110
<211> LENGTH: 15
<212> TYPE: DNA
<213> ORGANISM: Homo sapiens

<400> SEQUENCE: 110
tctcagcctg ggctc                                                     15

<210> SEQ ID NO 111
<211> LENGTH: 15
<212> TYPE: DNA
<213> ORGANISM: Homo sapiens
```

-continued

```
<400> SEQUENCE: 111
ctatccctat cctgc                                                        15

<210> SEQ ID NO 112
<211> LENGTH: 17
<212> TYPE: DNA
<213> ORGANISM: Homo sapiens

<400> SEQUENCE: 112
tccttcctct tcctacg                                                      17

<210> SEQ ID NO 113
<211> LENGTH: 14
<212> TYPE: DNA
<213> ORGANISM: Homo sapiens

<400> SEQUENCE: 113
cagctgcagc tcct                                                         14

<210> SEQ ID NO 114
<211> LENGTH: 17
<212> TYPE: DNA
<213> ORGANISM: Homo sapiens

<400> SEQUENCE: 114
tactgtctct acttaac                                                      17

<210> SEQ ID NO 115
<211> LENGTH: 16
<212> TYPE: DNA
<213> ORGANISM: Homo sapiens

<400> SEQUENCE: 115
gtgaggttct ctgtat                                                       16

<210> SEQ ID NO 116
<211> LENGTH: 15
<212> TYPE: DNA
<213> ORGANISM: Homo sapiens

<400> SEQUENCE: 116
cttaggagcg ggccg                                                        15

<210> SEQ ID NO 117
<211> LENGTH: 15
<212> TYPE: DNA
<213> ORGANISM: Homo sapiens

<400> SEQUENCE: 117
tcggctcgga ttcgg                                                        15

<210> SEQ ID NO 118
<211> LENGTH: 20
<212> TYPE: DNA
<213> ORGANISM: Homo sapiens

<400> SEQUENCE: 118
tttcttgcag cccttccgtg                                                   20

<210> SEQ ID NO 119
<211> LENGTH: 20
<212> TYPE: DNA
<213> ORGANISM: Homo sapiens
```

```
<400> SEQUENCE: 119
cttcaaccga cgggcaaaca                                                  20

<210> SEQ ID NO 120
<211> LENGTH: 21
<212> TYPE: DNA
<213> ORGANISM: Homo sapiens

<400> SEQUENCE: 120 cagcttttg aactgaggcc c                                                 21

<210> SEQ ID NO 121
<211> LENGTH: 23
<212> TYPE: DNA
<213> ORGANISM: Homo sapiens

<400> SEQUENCE: 121
ccttagttta aacagctgca ccc                                              23

<210> SEQ ID NO 122
<211> LENGTH: 23
<212> TYPE: DNA
<213> ORGANISM: Homo sapiens

<400> SEQUENCE: 122
tcgccgggac gtcgagattg cag                                              23

<210> SEQ ID NO 123
<211> LENGTH: 23
<212> TYPE: DNA
<213> ORGANISM: Homo sapiens

<400> SEQUENCE: 123
cttatctcta cctacaccca gtg                                              23

<210> SEQ ID NO 124
<211> LENGTH: 21
<212> TYPE: DNA
<213> ORGANISM: Homo sapiens

<400> SEQUENCE: 124
ggacactggg tgtaggtaga g                                                21

<210> SEQ ID NO 125
<211> LENGTH: 21
<212> TYPE: DNA
<213> ORGANISM: Homo sapiens

<400> SEQUENCE: 125
ccattttgca gagaagacgg a                                                21

<210> SEQ ID NO 126
<211> LENGTH: 20
<212> TYPE: DNA
<213> ORGANISM: Homo sapiens

<400> SEQUENCE: 126
taggccccaa atgctctgaa                                                  20

<210> SEQ ID NO 127
<211> LENGTH: 26
<212> TYPE: DNA
```

```
<213> ORGANISM: Homo sapiens

<400> SEQUENCE: 127
gccacagtat taggtatcct attagg                                          26

<210> SEQ ID NO 128
<211> LENGTH: 22
<212> TYPE: DNA
<213> ORGANISM: Homo sapiens

<400> SEQUENCE: 128
tgctcagtct catactccta cc                                              22

<210> SEQ ID NO 129
<211> LENGTH: 20
<212> TYPE: DNA
<213> ORGANISM: Homo sapiens

<400> SEQUENCE: 129
aaacctaccc agtgtgcgtc                                                 20

<210> SEQ ID NO 130
<211> LENGTH: 20
<212> TYPE: DNA
<213> ORGANISM: Homo sapiens

<400> SEQUENCE: 130
gagccccaga aaagcggaag                                                 20

<210> SEQ ID NO 131
<211> LENGTH: 21
<212> TYPE: DNA
<213> ORGANISM: Homo sapiens

<400> SEQUENCE: 131
tattccgagt cagaccccac a                                               21

<210> SEQ ID NO 132
<211> LENGTH: 16
<212> TYPE: DNA
<213> ORGANISM: Homo sapiens

<400> SEQUENCE: 132
cattcctctg tgctgg                                                     16

<210> SEQ ID NO 133
<211> LENGTH: 17
<212> TYPE: DNA
<213> ORGANISM: Homo sapiens

<400> SEQUENCE: 133
cctgaggcca aatgaag                                                    17

<210> SEQ ID NO 134
<211> LENGTH: 17
<212> TYPE: DNA
<213> ORGANISM: Homo sapiens

<400> SEQUENCE: 134
acagaggctc actcaag                                                    17

<210> SEQ ID NO 135
<211> LENGTH: 15
```

```
<212> TYPE: DNA
<213> ORGANISM: Homo sapiens

<400> SEQUENCE: 135
aaggaagaac tgatg                                                15

<210> SEQ ID NO 136
<211> LENGTH: 15
<212> TYPE: DNA
<213> ORGANISM: Homo sapiens

<400> SEQUENCE: 136
tggccttggc tctgg                                                15

<210> SEQ ID NO 137
<211> LENGTH: 14
<212> TYPE: DNA
<213> ORGANISM: Homo sapiens

<400> SEQUENCE: 137
gacgcgggag ctgg                                                 14

<210> SEQ ID NO 138
<211> LENGTH: 23
<212> TYPE: DNA
<213> ORGANISM: Homo sapiens

<400> SEQUENCE: 138
aacccggggg ctgagggaga tag                                       23

<210> SEQ ID NO 139
<211> LENGTH: 21
<212> TYPE: DNA
<213> ORGANISM: Homo sapiens

<400> SEQUENCE: 139
agctgggtcc gagtctcctc c                                         21

<210> SEQ ID NO 140
<211> LENGTH: 21
<212> TYPE: DNA
<213> ORGANISM: Homo sapiens

<400> SEQUENCE: 140
cagttagagg cagggagtac c                                         21

<210> SEQ ID NO 141
<211> LENGTH: 20
<212> TYPE: DNA
<213> ORGANISM: Homo sapiens

<400> SEQUENCE: 141
gacactctcc cagcaagacg                                           20

<210> SEQ ID NO 142
<211> LENGTH: 20
<212> TYPE: DNA
<213> ORGANISM: Homo sapiens

<400> SEQUENCE: 142
tcctgagctg cctgcaaatg                                           20

<210> SEQ ID NO 143
```

```
<211> LENGTH: 21
<212> TYPE: DNA
<213> ORGANISM: Homo sapiens

<400> SEQUENCE: 143
gctctgtcca aacatgtcga a                                              21

<210> SEQ ID NO 144
<211> LENGTH: 16
<212> TYPE: DNA
<213> ORGANISM: Homo sapiens

<400> SEQUENCE: 144
gcaggtacct gtagtc                                                    16

<210> SEQ ID NO 145
<211> LENGTH: 15
<212> TYPE: DNA
<213> ORGANISM: Homo sapiens

<400> SEQUENCE: 145
gaagaatgct aggtg                                                     15

<210> SEQ ID NO 146
<211> LENGTH: 18
<212> TYPE: DNA
<213> ORGANISM: Homo sapiens

<400> SEQUENCE: 146
gtacctagta cataatag                                                  18

<210> SEQ ID NO 147
<211> LENGTH: 16
<212> TYPE: DNA
<213> ORGANISM: Homo sapiens

<400> SEQUENCE: 147
gcctcccaag tagctg                                                    16

<210> SEQ ID NO 148
<211> LENGTH: 10
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 148
tgacagaagc                                                           10

<210> SEQ ID NO 149
<211> LENGTH: 6
<212> TYPE: PRT
<213> ORGANISM: Homo sapiens

<400> SEQUENCE: 149

Gly Gly Phe Gly Asn Val
1               5

<210> SEQ ID NO 150
<211> LENGTH: 6
<212> TYPE: PRT
<213> ORGANISM: Homo sapiens

<400> SEQUENCE: 150
```

```
Met Val Phe Glu Cys Ile
1               5

<210> SEQ ID NO 151
<211> LENGTH: 6
<212> TYPE: PRT
<213> ORGANISM: Homo sapiens

<400> SEQUENCE: 151

Glu Asn Trp Leu Gln Leu
1               5

<210> SEQ ID NO 152
<211> LENGTH: 6
<212> TYPE: PRT
<213> ORGANISM: Homo sapiens

<400> SEQUENCE: 152

Glu Asp Tyr Ser Arg Leu
1               5

<210> SEQ ID NO 153
<211> LENGTH: 6
<212> TYPE: PRT
<213> ORGANISM: Homo sapiens

<400> SEQUENCE: 153

Ile His Tyr Ala Glu Val
1               5

<210> SEQ ID NO 154
<211> LENGTH: 6
<212> TYPE: PRT
<213> ORGANISM: Homo sapiens

<400> SEQUENCE: 154

Asp Leu Tyr Lys Gln Leu
1               5

<210> SEQ ID NO 155
<211> LENGTH: 6
<212> TYPE: PRT
<213> ORGANISM: Homo sapiens

<400> SEQUENCE: 155

Glu Leu Phe Gly His Leu
1               5

<210> SEQ ID NO 156
<211> LENGTH: 6
<212> TYPE: PRT
<213> ORGANISM: Homo sapiens

<400> SEQUENCE: 156

Glu Ile Trp His Leu Leu
1               5
```

```
<210> SEQ ID NO 157
<211> LENGTH: 6
<212> TYPE: PRT
<213> ORGANISM: Homo sapiens

<400> SEQUENCE: 157

Leu Asp Trp Ser Trp Leu
1               5
```